United States Patent
Nakae et al.

(10) Patent No.: US 12,493,820 B2
(45) Date of Patent: Dec. 9, 2025

(54) SYSTEM, METHOD, AND PROGRAM FOR AUGMENTING TRAINING DATA USED FOR MACHINE LEARNING

(71) Applicants: Osaka University, Osaka (JP); PaMeLa, Inc., Osaka (JP)

(72) Inventors: Aya Nakae, Osaka (JP); Koutarou Nomura, Osaka (JP)

(73) Assignees: OSAKA UNIVERSITY, Osaka (JP); PAMELA, INC, Osaka (JP)

( * ) Notice: Subject to any disclaimer, the term of this patent is extended or adjusted under 35 U.S.C. 154(b) by 980 days.

(21) Appl. No.: 17/606,343

(22) PCT Filed: Apr. 26, 2020

(86) PCT No.: PCT/JP2020/017655
§ 371 (c)(1),
(2) Date: Oct. 25, 2021

(87) PCT Pub. No.: WO2020/218490
PCT Pub. Date: Oct. 29, 2020

(65) Prior Publication Data
US 2022/0207425 A1 Jun. 30, 2022

(30) Foreign Application Priority Data
Apr. 26, 2019 (JP) ................................. 2019-085782

(51) Int. Cl.
*G06N 20/00* (2019.01)
(52) U.S. Cl.
CPC .................................. *G06N 20/00* (2019.01)

(58) Field of Classification Search
None
See application file for complete search history.

(56) References Cited

U.S. PATENT DOCUMENTS

2013/0310660 A1* 11/2013 Zuckerman-Stark ........................ A61B 5/02055
600/301
2017/0336488 A1* 11/2017 Pipe ...................... G01R 33/482

FOREIGN PATENT DOCUMENTS

| EP | 3649933 A1 | 5/2020 |
| JP | 2007200044 A | 8/2007 |
| JP | 2010523226 A | 7/2010 |

(Continued)

OTHER PUBLICATIONS

Cancer Detection in Mass Spectrometry Imaging Data by Recurrent Neural Networks; Zanjani et. al. (Year: 2019).*

(Continued)

*Primary Examiner* — Mandrita Brahmachari
(74) *Attorney, Agent, or Firm* — MUNCY, GEISSLER, OLDS & LOWE, P.C.

(57) ABSTRACT

The problem to be solved is to provide a system and the like for augmenting supervisory data while maintaining the relationship among a plurality supervisory data used for machine learning. The present disclosure provides a system for augmenting supervisory data used for machine learning, the system including an obtaining means that obtains a plurality of supervisory data, a first processing means that derives a covariance matrix from the plurality of supervisory data, a second processing means that decomposes the covariance matrix, and a third processing means that applies a random number to the decomposed matrix.

2 Claims, 78 Drawing Sheets

(56) References Cited

FOREIGN PATENT DOCUMENTS

WO      2008124566 A2    10/2008
WO      2019009420 A1    1/2019

OTHER PUBLICATIONS

Objective Correlate of Subjective Pain Perception by Contact Heat-Evoked Potentials; Granovsky et.al. (Year: 2008).*
Logistic Regression Model Optimization and Case Analysis; Zou et. al. (Year: 2019).*
International Search Report issued in connection with corresponding PCT Application No. PCT/JP2020/017655 on Jul. 14, 2020.
Rogachov et al: "Abnormal Low-Frequency Oscillations Reflect Trait-Like Pain Ratings in Chronic Pain Patients Revealed through a Machine Learning Approach", The Journal of Neuroscience, vol. 38, No. 33, Aug. 15, 2018 (Aug. 15, 2018), pp. 7293-7302, XP093001762.
Zanjani et al: "Cancer Detection in Mass Spectrometry Imaging Data by Recurrent Neural Networks", 2019 IEEE 16th International Symposium on Biomedical Imaging (ISBI 2019), IEEE, Apr. 8, 2019 (Apr. 8, 2019), pp. 674-678, XP033576702.
Wood et al: "On the Variability of Manual Spike Sorting", IEEE Transactions on Biomedical Engineering, IEEE, USA, vol. 51, No. 6, Jun. 1, 2004 (Jun. 1, 2004), pp. 912-918, XP011113256.

* cited by examiner

[Figure 1]
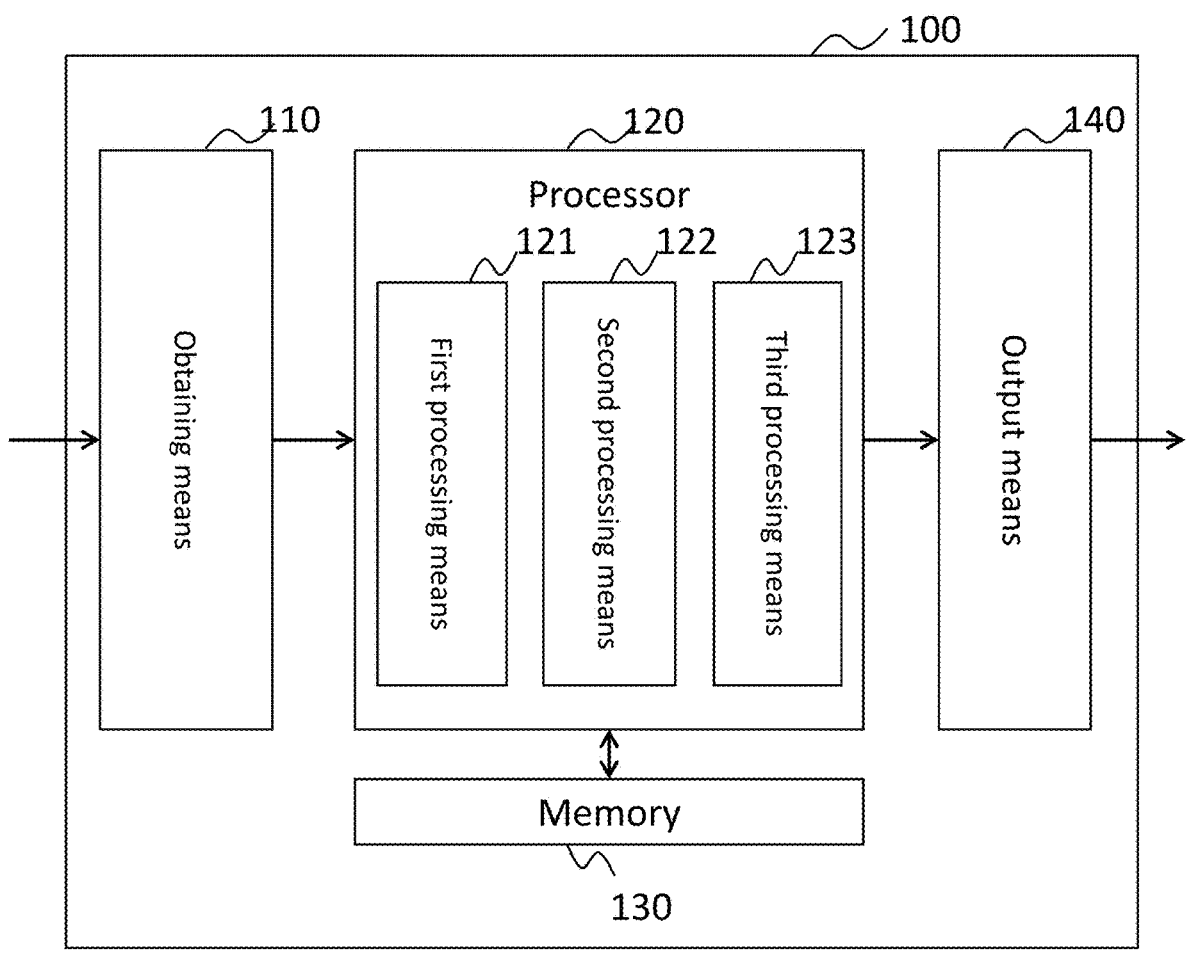

[Figure 2]
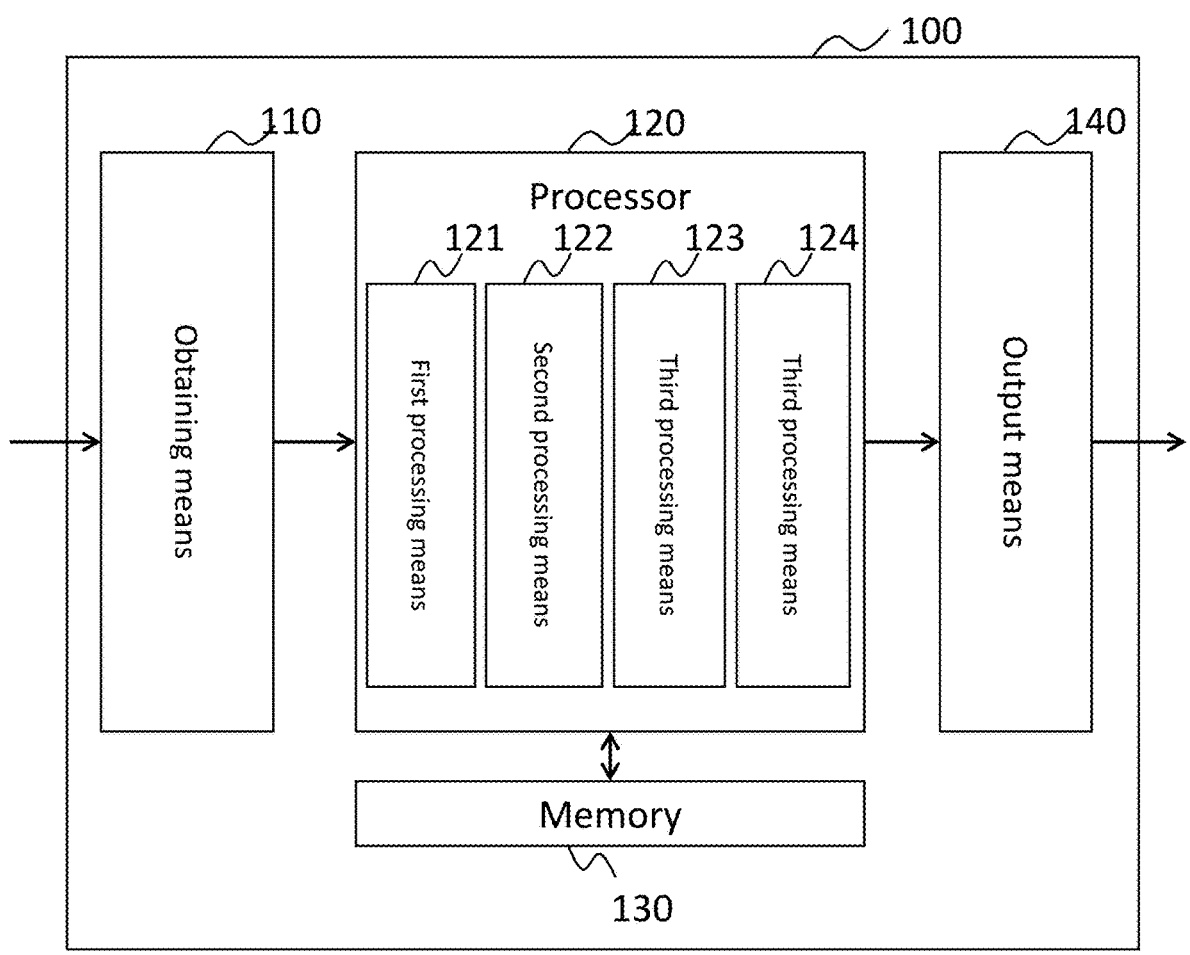

[Figure 3]
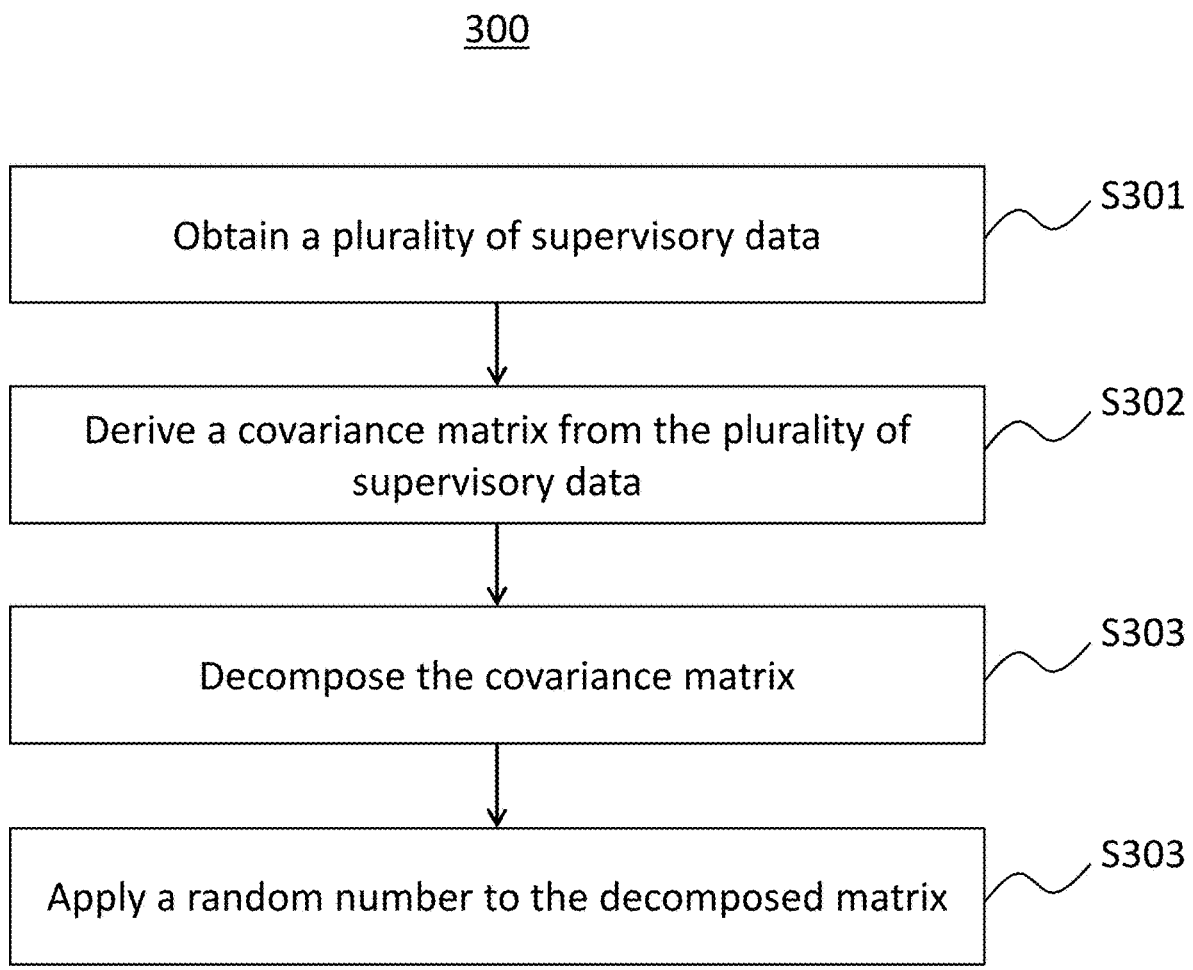

[Figure 4]
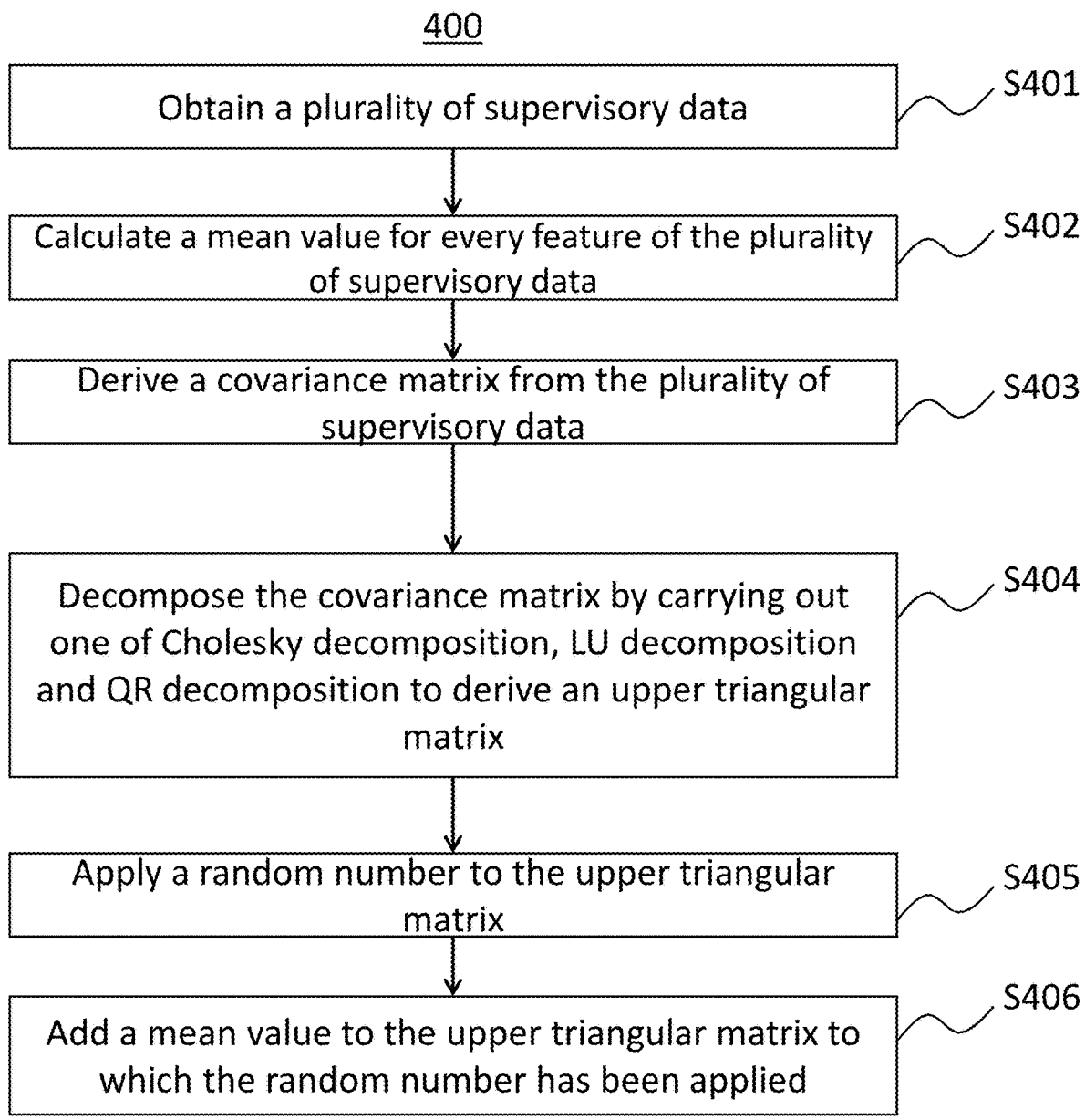

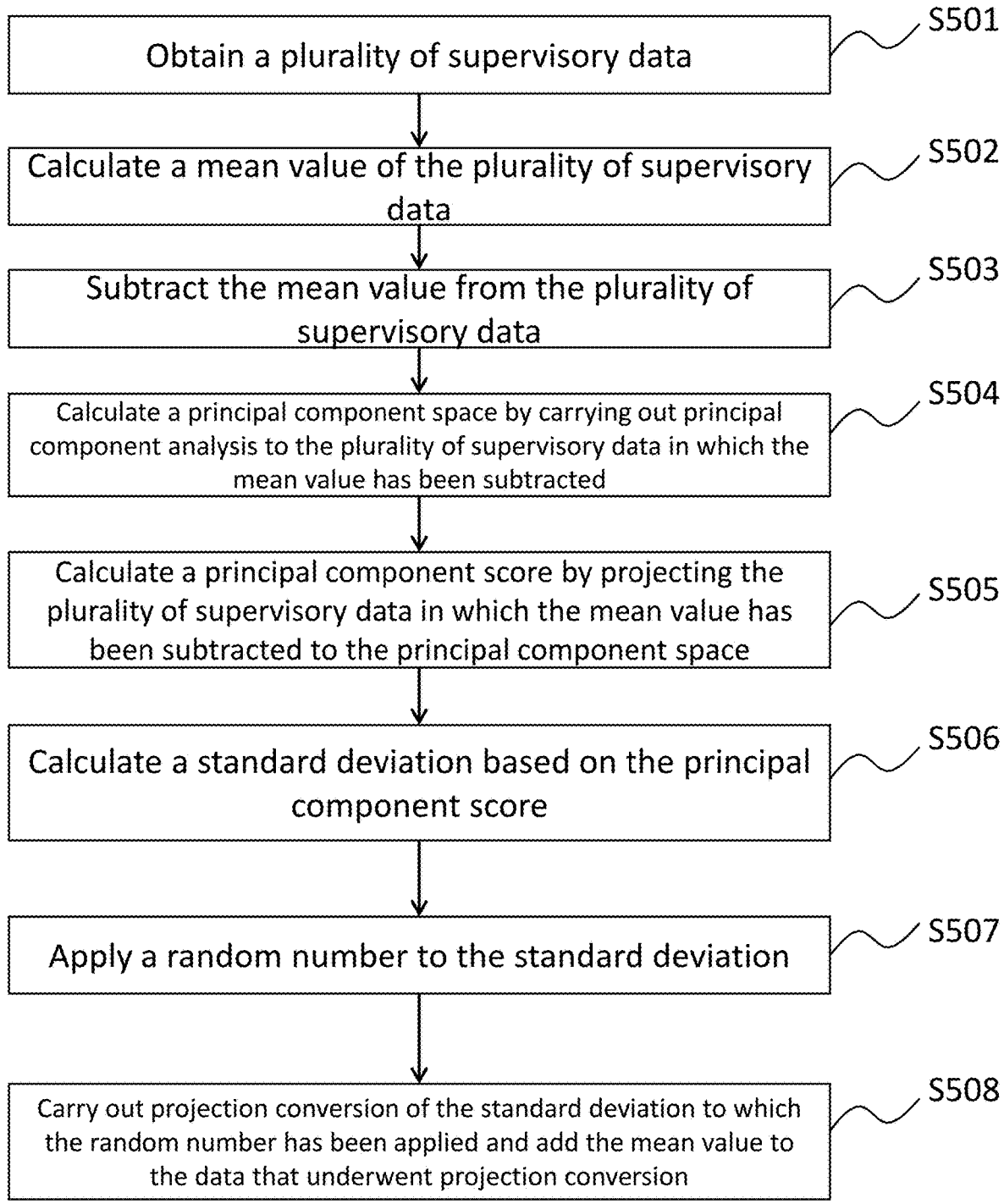

[Figure 5B]
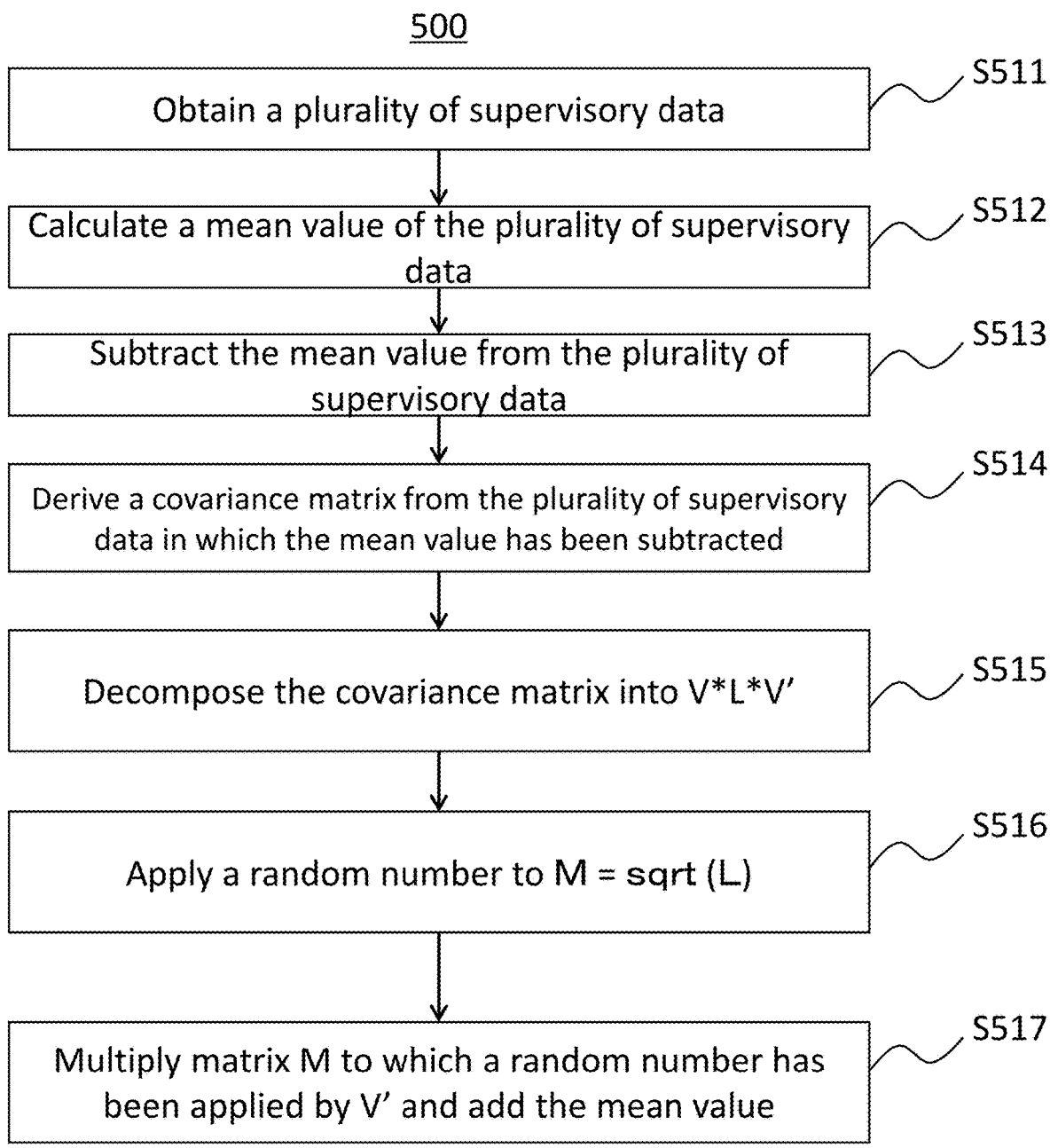

[Figure 6A]
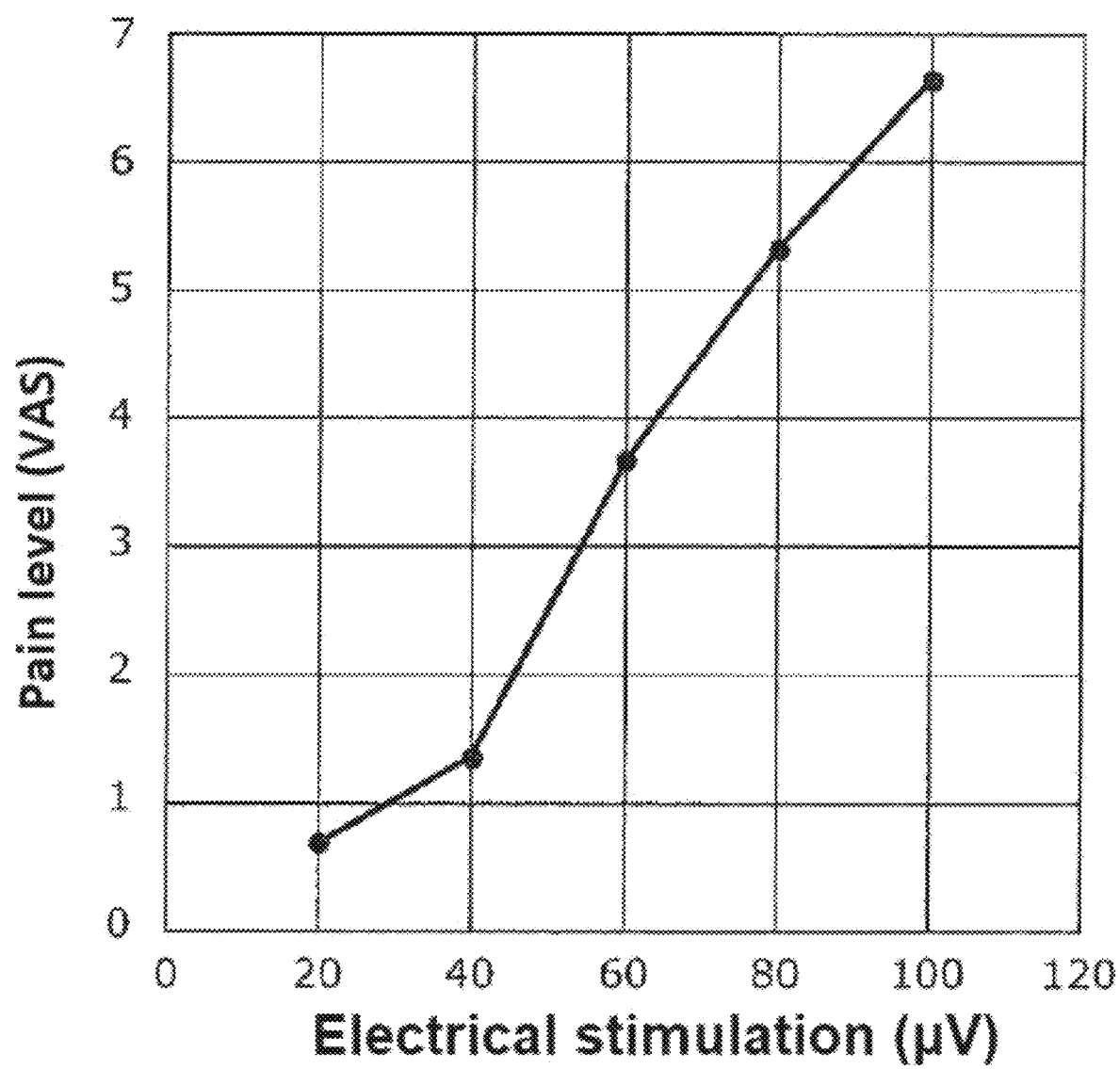

[Figure 6B]
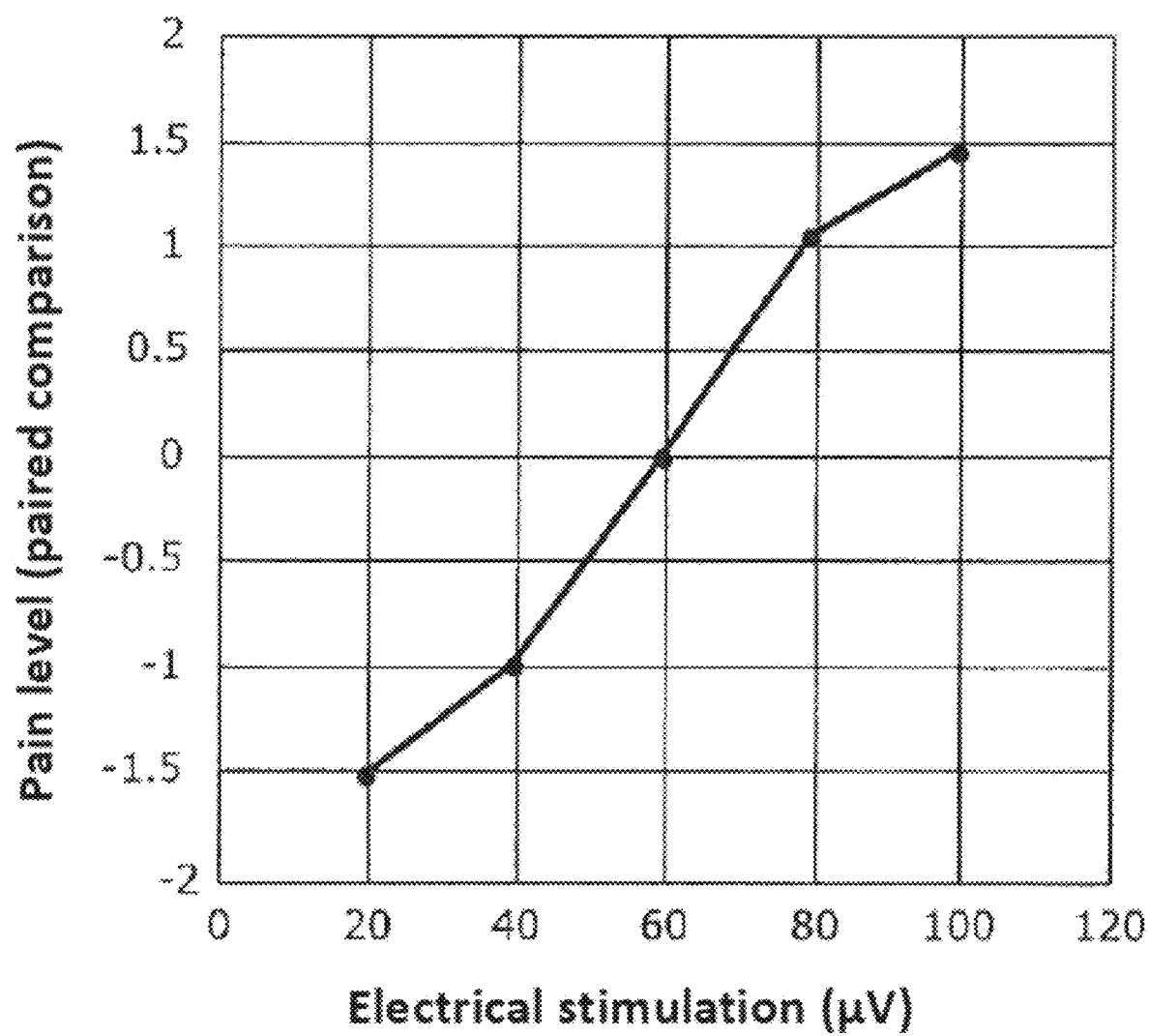

[Figure 6C]
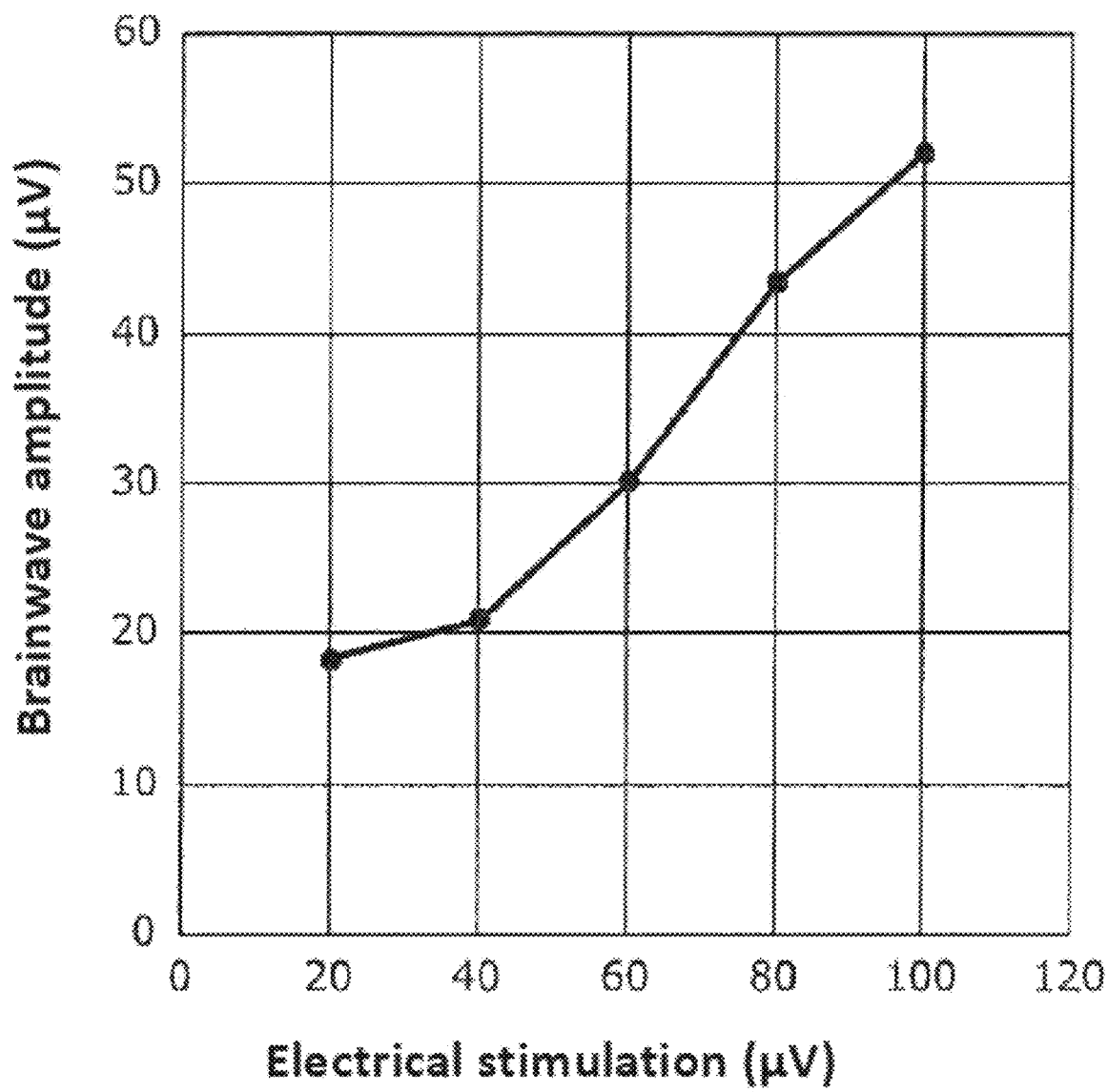

[Figure 6D]
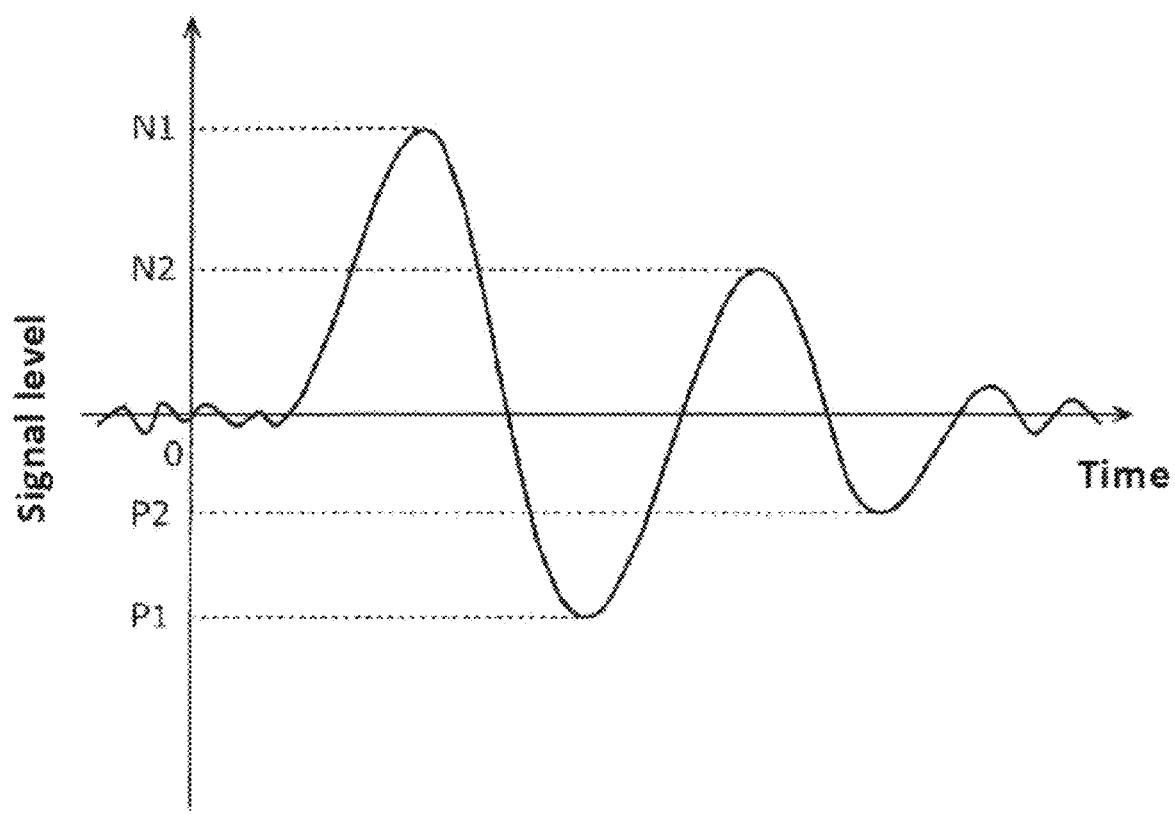

[Figure 6E]
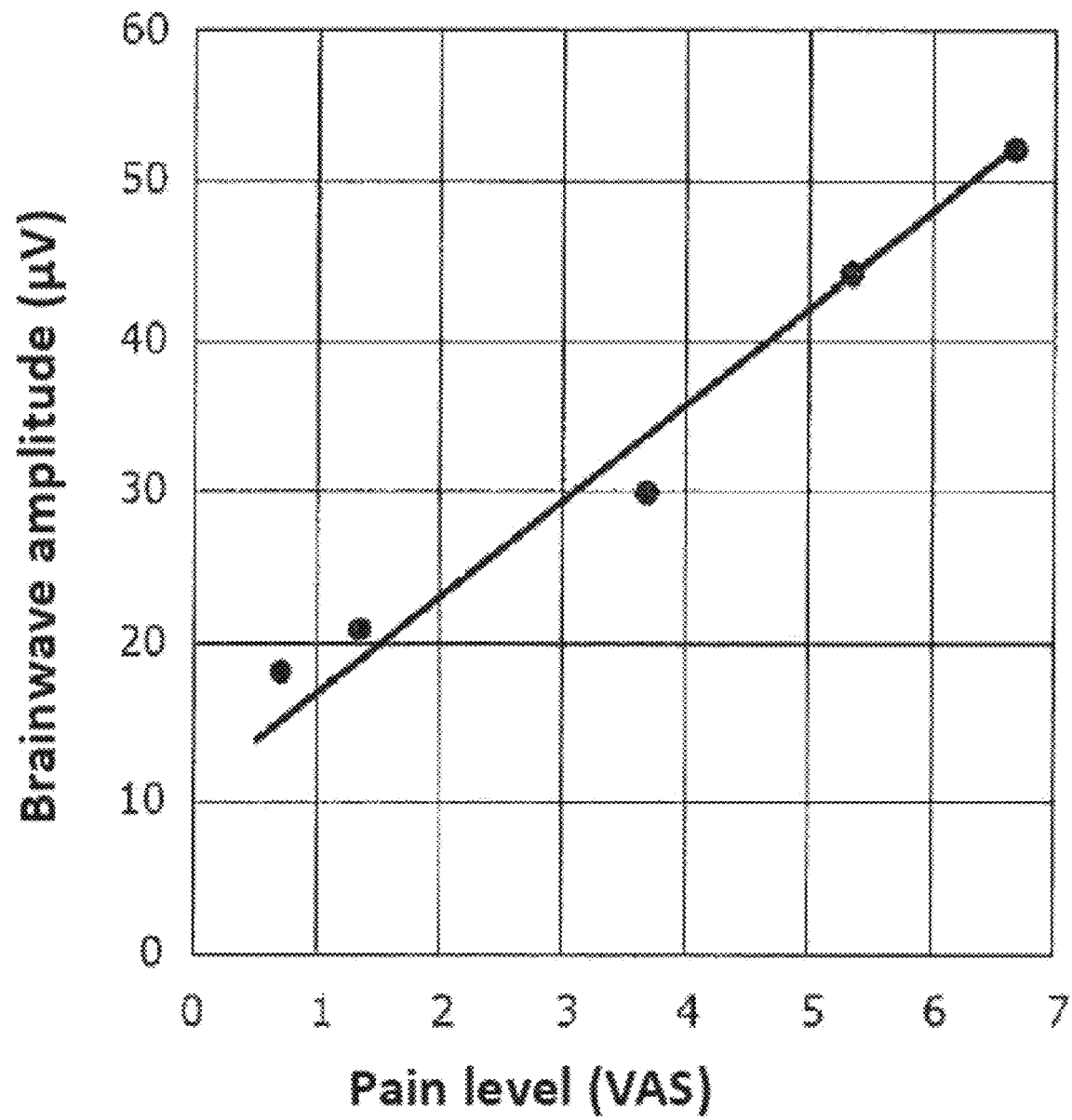

[Figure 6F]
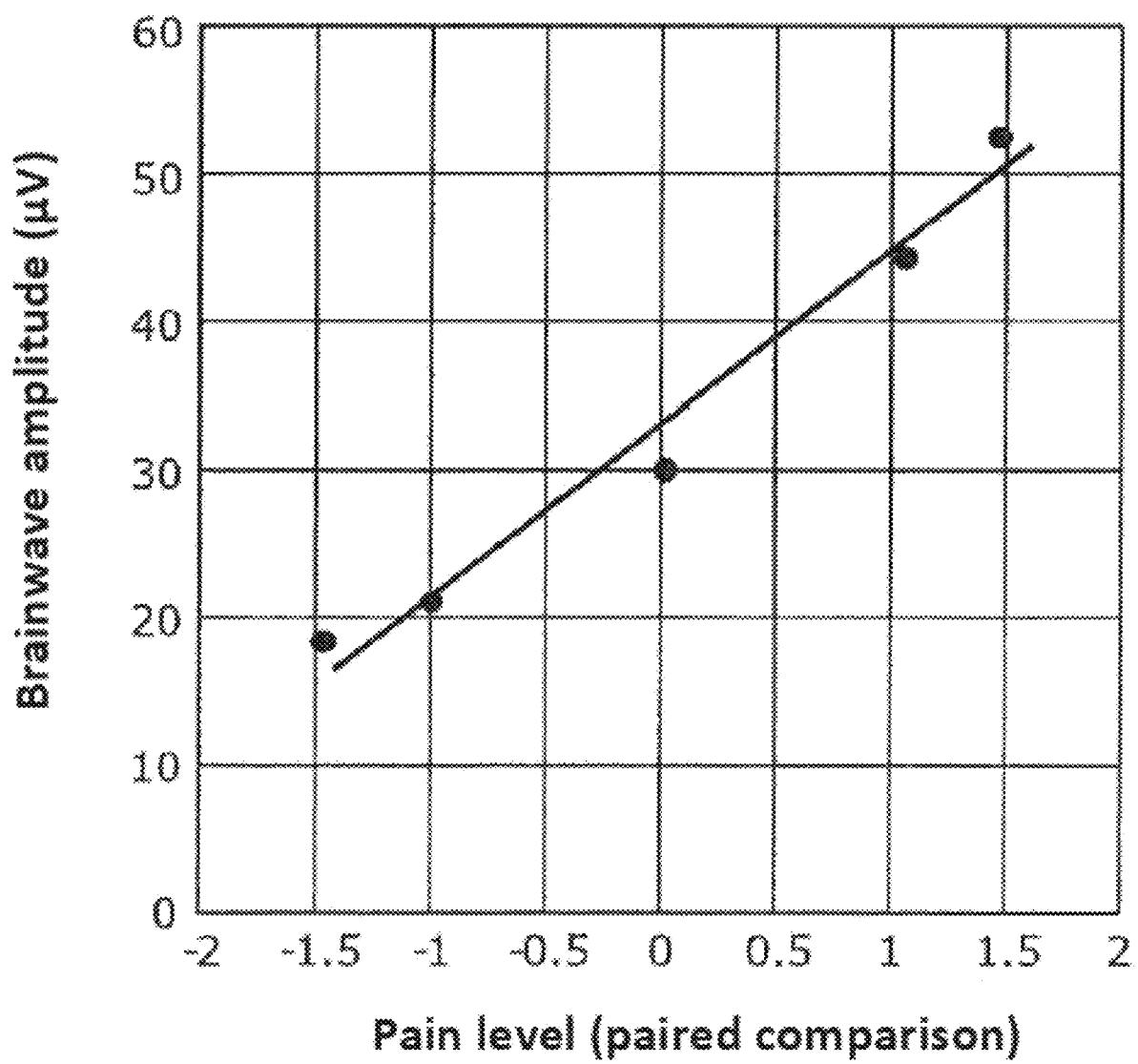

[Figure 6G]
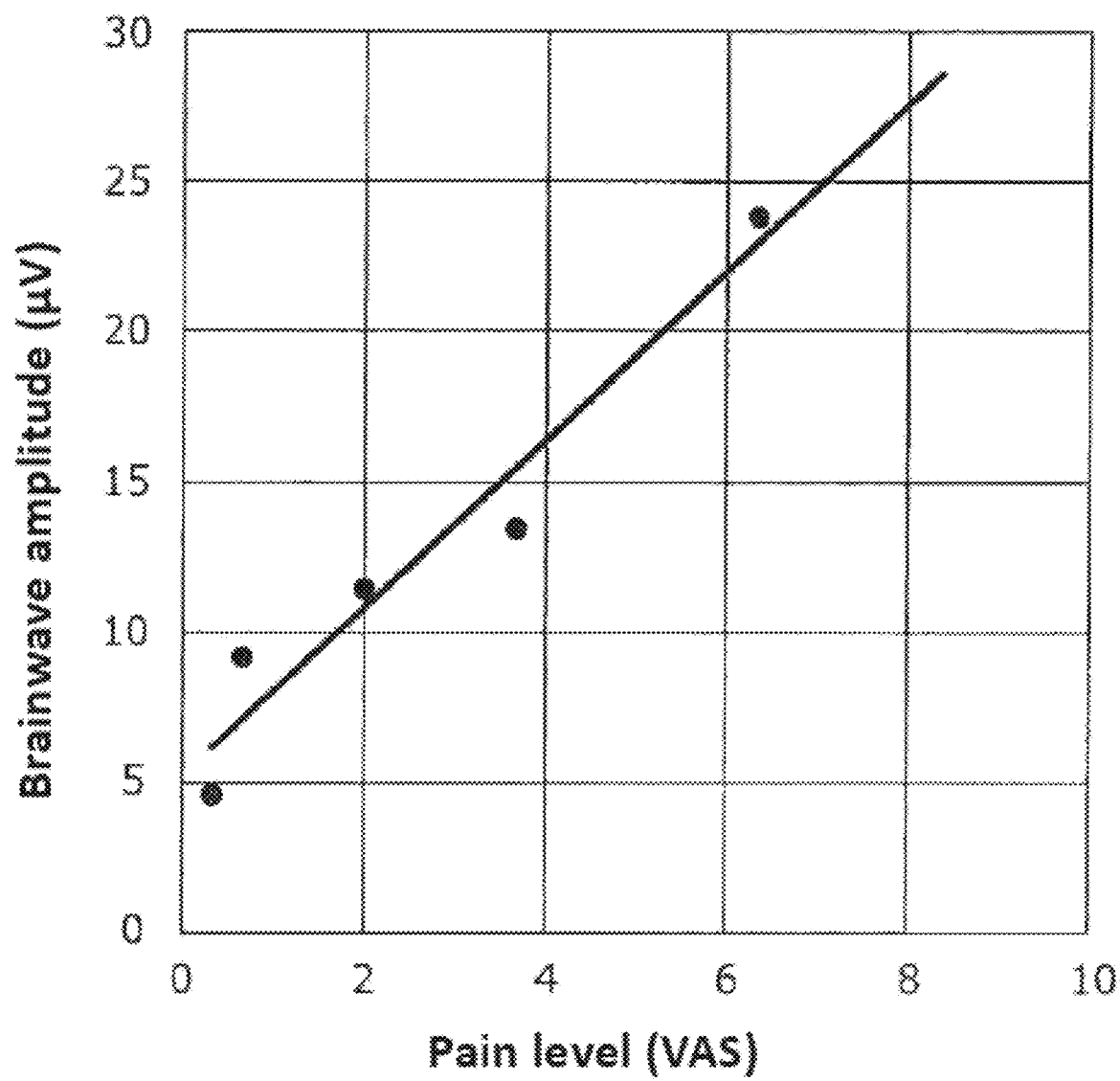

[Figure 6H]
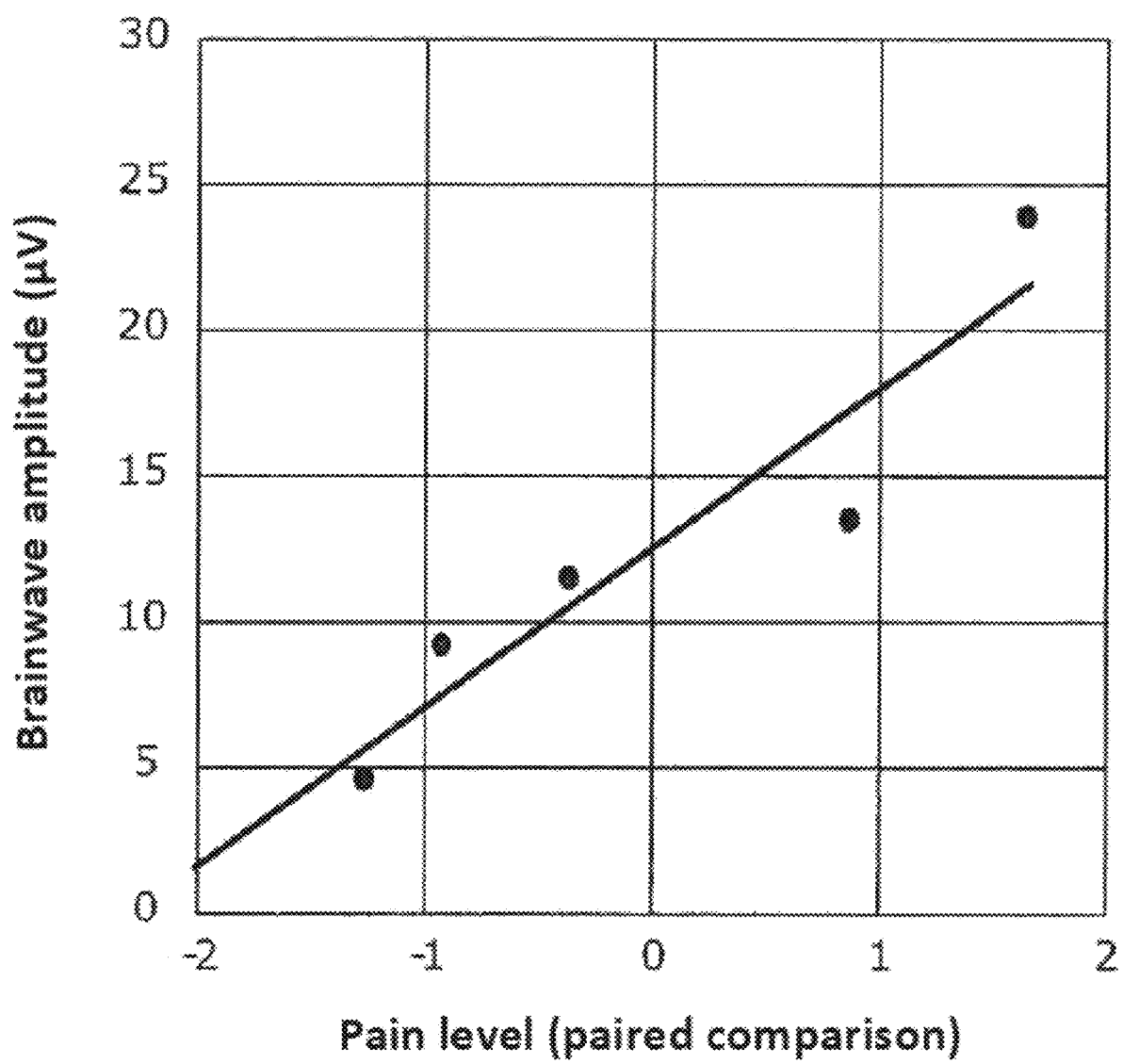

[Figure 9]
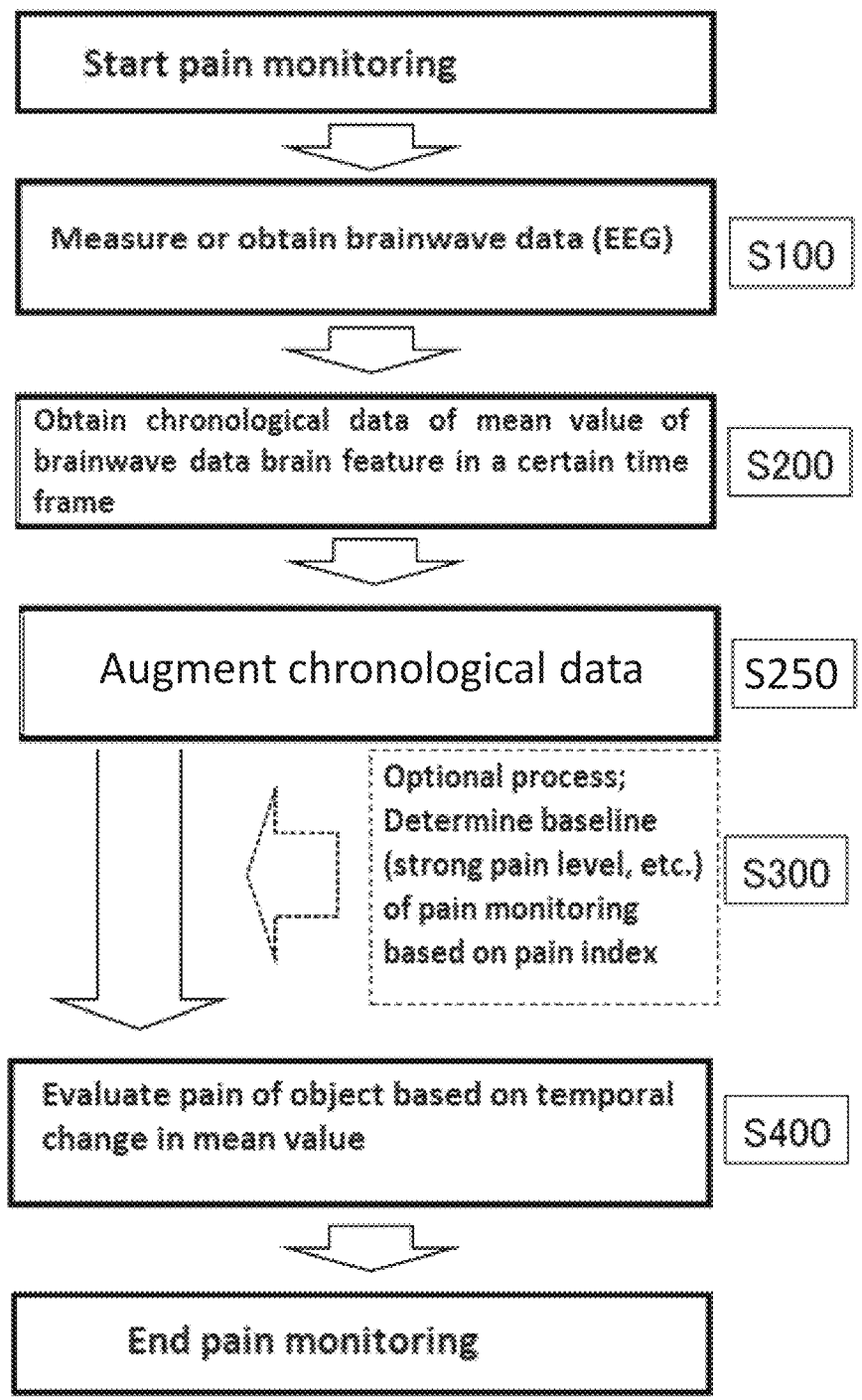

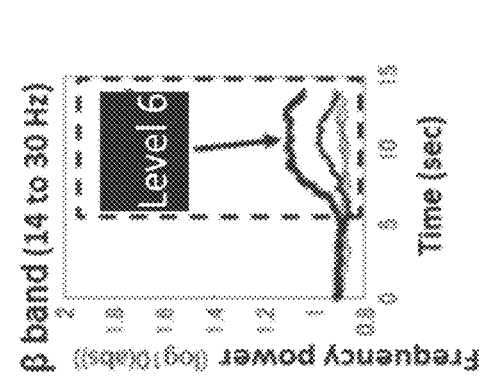

Example of temporal change property of hot pain stimulation feature

Outline of analysis method

*Data used*
1. Electrode used: 4 electrodes at the frontal portions (Fp1, Fp2, F3, F4)
2. Experimental designs: 6 levels of hot stimulation (15 second interval between stimulations, 3 runs each, increased by 2°C from 40°C to 50°C)
3. Number of samples and subjects: 170

*Feature extraction unit (5 features × 5 electrodes)*
1. EOG removal: "main component analysis" → "filter" → "regression filter"
2. EMG removal: 0.022 (stimulation segment × 3) × 30 Hz (before V region)
3. Addition of EOG feature: added EOG main component as "reverse utilization of noise"
4. Extraction of amplitude and frequency (δ, θ, α, β) features (5 features × 4 electrodes)
   *use segment from 5 to 15 sec after applying stimulation ("delayed pain feature")

*Differentiation estimation unit (Lasso multiple regression)*
1. Differentiation levels: 2 levels; level 1 (30 samples) and level 6 (30 samples) (10,200 samples)
2. Standardization: frequency power (5 sec × 6 sections) and amplitude (30 sec overall) which is 30 sec before starting application of stimulation
3. Refinement: exclude subject with differentiation accuracy of 70% or less
4. Determine feature coefficient of differentiation model (same number of means as number of subjects)
5. Calculate judgment indicator "pain estimation value"
6. Calculate judgment support indicator "pain occupancy"; certainty of having pain

Figure 11

Pain occupancy

*Certainty of when a pain estimation value is differentiated as "having pain".
*Calculation method:

i. Calculate an estimate for no pain (30 samples × 81 subjects) and having pain (30 samples × 81 subjects) by a differentiation model for 81 subjects (differentiation accuracy > 70%) after refinement.

ii. The minimum value (-1) and maximum value (2) of all pain estimation values are divided into, for example, 0.1 widths, and the occupancy of estimation value for having pain for each estimation value is calculated:

"Occupancy (%) for having pain = number of estimation value for having pain/(number of estimation values for having pain + number of estimation values for no pain)".

iii. This is fitted to a sigmoid function to obtain a "pain occupancy function" to create an occupancy model.

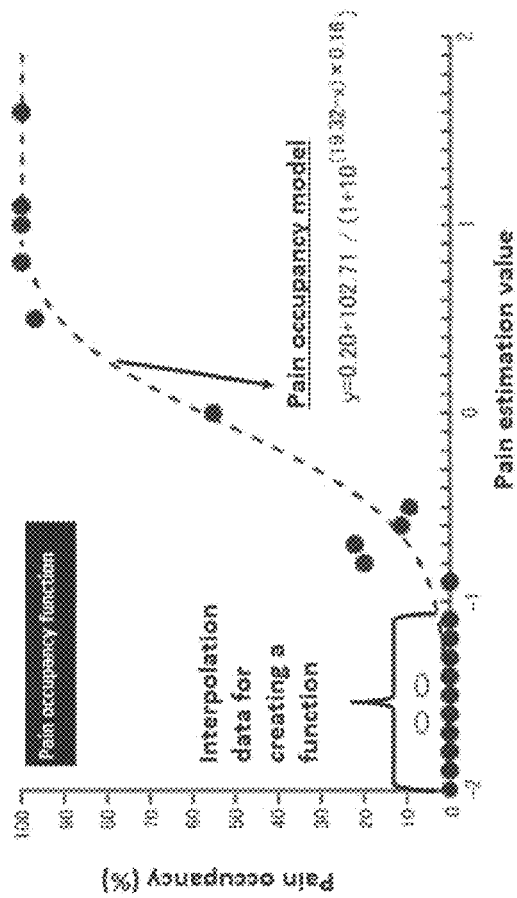

Figure 13

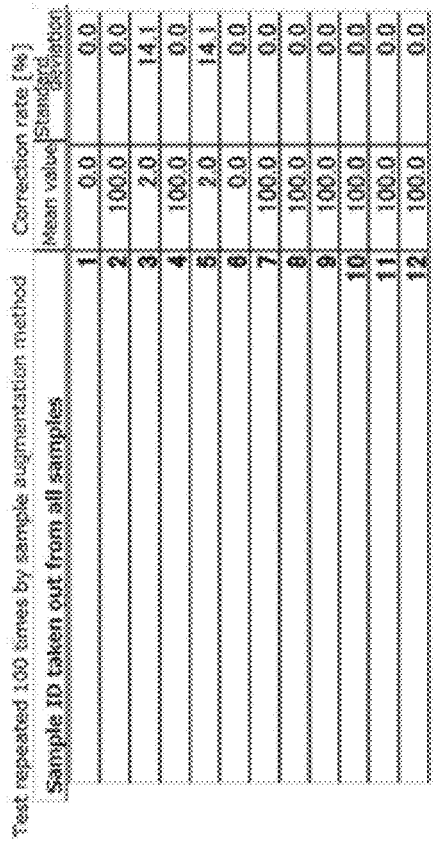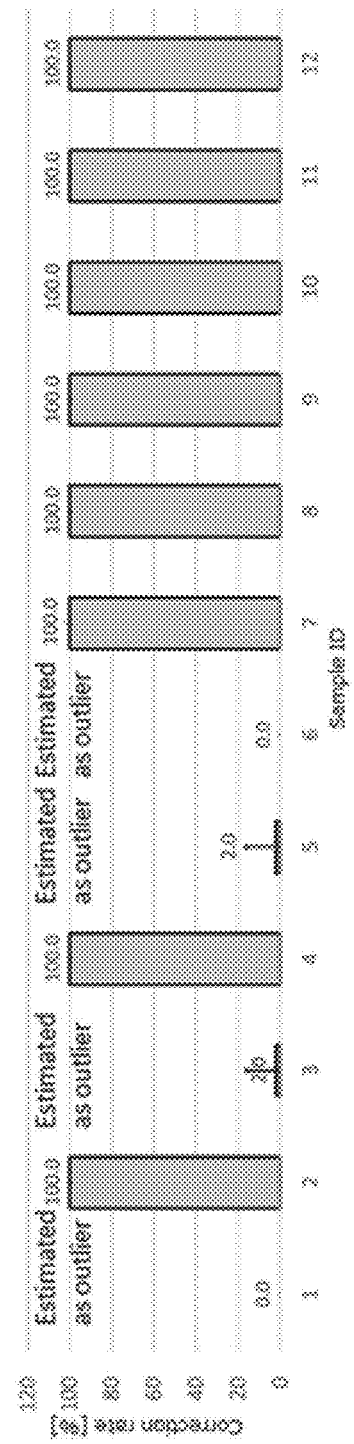
Figure 36D c. POD2 vs POD28(C1C2)
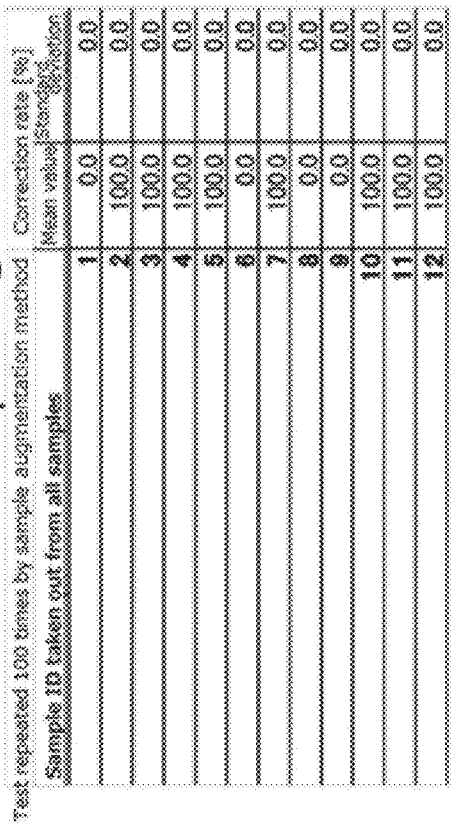
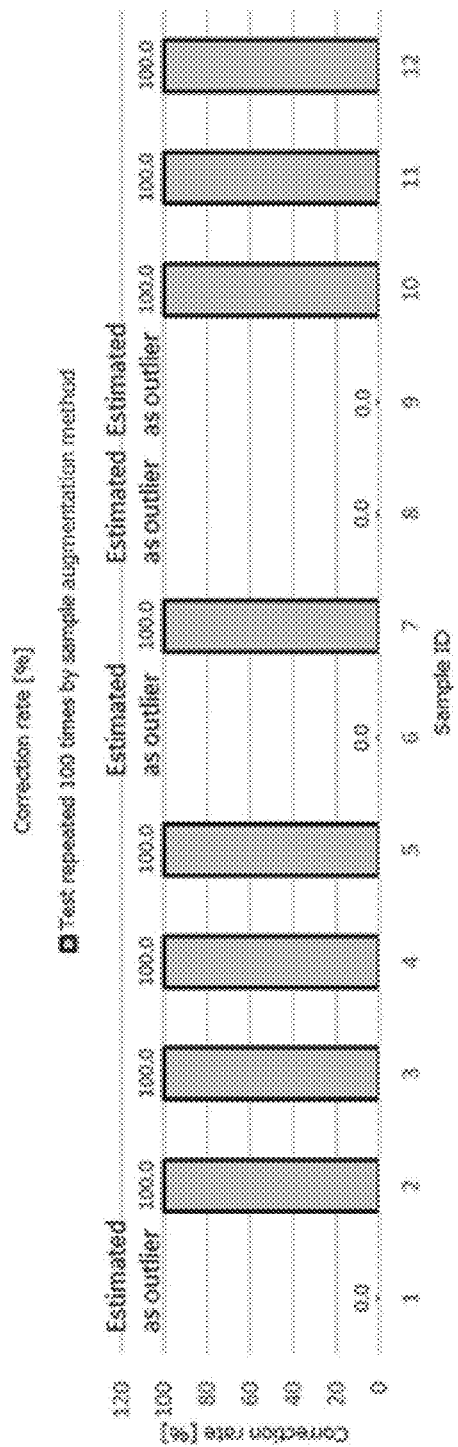
Figure 36E

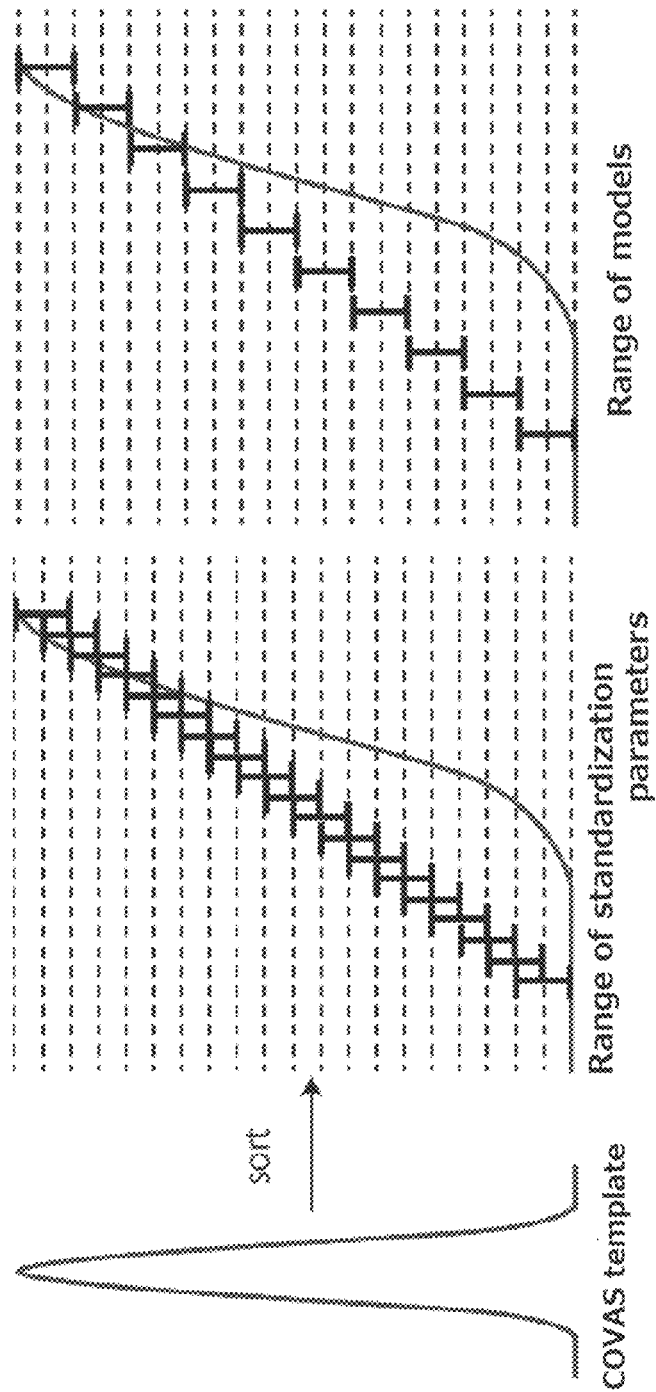

SYSTEM, METHOD, AND PROGRAM FOR AUGMENTING TRAINING DATA USED FOR MACHINE LEARNING

CROSS-REFERENCE TO RELATED APPLICATION

This application is a national stage application filed under 35 U.S.C. § 371, of International Patent Application No. PCT/JP2020/017655 filed on Apr. 24, 2020, which claims the benefit of and priority to Japanese Application No. 2019-085782 filed Apr. 26, 2019; the contents of each of which are hereby incorporated by reference in their entirety.

TECHNICAL FIELD

The present disclosure relates to a system, method and program for augmenting supervisory data used for machine learning. More specifically, the present disclosure relates to a system and the like for augmenting reaction data obtained from an organism upon analyzing the organism as an object. Even more specifically, the present disclosure relates to a system and the like for augmenting brainwave data or analysis data thereof obtained from an object being estimated upon generating a pain classifier for classifying the pain the object being estimated has based on the brainwave of the object being estimated. The present disclosure is also related to a system and the like for augmenting brainwave data or analysis data thereof obtained from an object upon generating a model for differentiating the pain of the object.

BACKGROUND ART

Pain is intrinsically subjective, but objective evaluation thereof is desirable for therapy. Patients often suffer from an undesirable experience due to underestimation of pain. In this regard, a method for objectively estimating pain using brainwaves has been proposed (see, for example, Patent Literature 1).

However, the intensity of pain is subjective, so that objective evaluation is challenging. Brainwave signals also vary widely such that the signals do not necessarily correspond to subjective evaluation. Further, a methodology for effectively monitoring temporal changes in pain has not been established. Pain differentiation is still at a nascent stage, such that efficient model generation and differentiation methods have not been provided.

Machine learning is widely used as a method for materializing artificial intelligence. Many supervisory data are required to be learned in order to improve accuracy of machine learning.

CITATION LIST

Patent Literature

[PTL 1] Japanese National Phase PCT Laid-open Publication No. 2010-523226

SUMMARY OF INVENTION

Solution to Problem

In one aspect, the present disclosure provides a system, method and program for augmenting supervisory data used for machine learning. More specifically, the present disclosure provides a system and the like for augmenting reaction data obtained from an organism upon analyzing the organism as an object. Furthermore, the present disclosure provides a system and the like for augmenting brainwave data or analysis data thereof obtained from an object being estimated upon generating a pain classifier for classifying the pain the object being estimated has based on the brainwave of the object being estimated. The present disclosure is also related to a system and the like for augmenting brainwave data or analysis data thereof obtained from an object upon generating a model for differentiating the pain of the object.

In this aspect, the present disclosure provides, for example, the following items.

(Item 1)

A system for augmenting supervisory data used for machine learning, comprising:
an obtaining means obtaining a plurality of supervisory data;
a first processing means deriving a covariance matrix from the plurality of supervisory data;
a second processing means decomposing the covariance matrix; and
a third processing means applying a random number to the decomposed matrix.

(Item 2)

The system of item 1, wherein the supervisory data is data obtained from an organism.

(Item 3)

The system of item 2, wherein the supervisory data is brainwave data, MRI image data, or gene expression data.

(Item 4)

The system of item 3, wherein the supervisory data is brainwave data or MRI data of when pain is applied to the organism.

(Item 5)

The system of any one of items 1 to 4, wherein: the second processing means is configured to decompose the covariance matrix into $Q*Q'$, wherein matrix $Q'$ is a transposed matrix of matrix $Q$; and
the third processing means is configured to apply a random number to the matrix $Q$ or the matrix $Q'$.

(Item 6)

The system of item 5, wherein: the second processing means is configured to decompose the covariance matrix into $Q*Q'$ by carrying out one of Cholesky decomposition, LU decomposition and QR decomposition to the covariance matrix, wherein the matrix $Q$ or matrix $Q'$ is an upper triangular matrix; and
the third processing means is configured to apply a random number to the upper triangular matrix.

(Item 7)

The system of any one of items 1 to 6, wherein: the first processing means is further configured to calculate a mean value vector of the plurality of supervisory data; and
the third processing means is further configured to add a mean value vector to the decomposed matrix to which the random number has been applied.

(Item 8)

The system of any one of items 1 to 4, wherein: the first processing means is configured to
calculate a mean value of the plurality of supervisory data,
subtract a mean value from the plurality of supervisory data, and derive a covariance matrix from a plurality of supervisory data in which the mean value has been subtracted;

the second processing means is configured to decompose the covariance matrix into V*L*V', wherein matrix L is a diagonal matrix consisting of an eigenvalue, matrix V is a matrix having a corresponding right eigenvector in a column, and matrix V' is a transposed matrix of matrix V, wherein when sqrt( ) is set as a function employing a square root, matrix M=sqrt(L) is expressed, and the third processing means is configured to apply a random number to the matrix M, wherein the system further comprises a fourth processing means carrying out projection conversion of the matrix M to which the random number has been applied, wherein the fourth processing means adds the mean value to matrix M that underwent projection conversion.

(Item 9)

The system of any one of items 1 to 8, further comprising a dividing means dividing the plurality of supervisory data into a plurality of subsets, wherein the first processing means, the second processing means and the third processing means carry out each processing to each of the plurality of subsets.

(Item 10)

A pain estimation system estimating pain that an object being measured has, comprising:

the system for augmenting supervisory data used for machine learning of item 1; and a system for learning a plurality of supervisory data augmented by the system for augmenting the supervisory data and generating a pain estimation model.

(Item 11)

A method for augmenting supervisory data used for machine learning, comprising:

obtaining a plurality of supervisory data;

deriving a covariance matrix from the plurality of supervisory data;

decomposing the covariance matrix; and applying a random number to the decomposed matrix.

(Item 12)

A program for augmenting supervisory data used for machine learning, wherein the program is performed in a computer system comprising a processor, wherein the program causes the processor unit to perform a processing comprising:

obtaining a plurality of supervisory data;

deriving a covariance matrix from the plurality of supervisory data;

decomposing the covariance matrix; and applying a random number to the decomposed matrix.

(Item 13)

A method of generating a pain classifier for classifying pain that an object being estimated has based on a brainwave of the object being estimated, comprising:

a) the step of stimulating the object being estimated with a plurality of levels of stimulation intensities;

b) the step of obtaining brainwave data or analysis data thereof of the object being estimated corresponding to the stimulation intensity;

c) the step of augmenting brainwave data or analysis data thereof of the object being estimated, comprising:

i) deriving a covariance matrix from brainwave data or analysis data thereof of the object being estimated;

ii) decomposing the covariance matrix; and iii) applying a random number to the decomposed matrix;

d) the step of plotting the stimulation intensity or a subjective pain sensation level corresponding to the stimulation intensity and the augmented brainwave data or analysis data thereof to fit to a pain function to obtain a pain function specific to the object being estimated; and e) the step of, when regression coefficient of the fitting to the specific pain function is equal to or more than what is predetermined, identifying a pain classifier for dividing a pain level into at least two or more based on the specific pain function.

(Item 14)

An apparatus generating a pain classifier for classifying pain that an object being estimated has based on a brainwave of the object being estimated, comprising:

A) a stimulation unit stimulating the object being estimated with a plurality of levels of stimulation intensities;

B) a brainwave data obtaining unit obtaining brainwave data or analysis data thereof the object being estimated corresponding to the stimulation intensity;

C) an augmentation unit augmenting brainwave data or analysis data thereof of the object being estimated, wherein the augmentation unit is configured to:

i) derive a covariance matrix from brainwave data or analysis data thereof of the object being estimated;

ii) decompose the covariance matrix; and iii) apply a random number to the decomposed matrix; and D) a pain classifier generation unit plotting the stimulation intensity or a subjective pain sensation level corresponding to the stimulation intensity and the augmented brainwave data or analysis data thereof to fit to a pain function to obtain a pain function specific to the object being estimated and identifying a pain classifier for dividing a pain level into at least two or more based on the specific pain function.

(Item 15)

A method of generating a model for differentiating pain of an object, comprising:

a) the step of obtaining brainwave data or analysis data thereof from the object;

b) the step of contracting features based on the brainwave data or analysis data thereof with respect to the pain after determining a feature coefficient associated with the pain;

c) augmenting the features that have been weighted after the contracting or combination thereof, comprising:

i) deriving a covariance matrix from the features that have been weighted after the contracting or combination thereof;

ii) decomposing the covariance matrix; and iii) applying a random number to the decomposed matrix;

d) the step of creating a differentiation analysis model by machine learning and examination based on the augmented features or combination thereof; and d) the step of determining a differentiation analysis model achieving a predetermined precision.

(Item 16)

A system generating a model for differentiating pain of an object, the system comprising:

A) a brainwave data obtaining unit obtaining brainwave data or analysis data thereof from the object;

B) a feature contracting unit contracting features based on the brainwave data or analysis data thereof with respect to the pain after determining a feature coefficient associated with the pain;
C) an augmentation unit augmenting the features that have been weighted after the contracting or combination thereof, wherein the augmentation unit is configured to:
  i) derive a covariance matrix from the features that have been weighted after the contracting or combination thereof;
  ii) decompose the covariance matrix;
  iii) apply a random number to the decomposed matrix; and
D) a pain differentiation/estimation model generation unit creating a differentiation analysis model by machine learning and examination based on the augmented features that have been weighted after the contracting or combination thereof.

(Item 17)
A method of analyzing an organism as an object, comprising:
  a) the step of stimulating the organism with a plurality of types of stimulations;
  b) the step of obtaining reaction data of the organism corresponding to the stimulation type;
  c) augmenting reaction data of the organism, comprising:
    i) deriving a covariance matrix from reaction data of the organism;
    ii) decomposition the covariance matrix; and
    iii) applying a random number to the decomposed matrix; and
  d) the step of plotting the stimulation type and the augmented reaction data for analysis.

(Item 18)
The method of item 17, wherein stimulation of the organism is stimulation to gene or candidate of an agent, and the reaction data comprises gene expression data or reaction of an organism.

(Item 19)
A method of generating a model for differentiating pain of an object, comprising:
  a) the step of obtaining a plurality of COVAS data by carrying out a pain test to a plurality of subjects;
  b) the step of creating a COVAS template by averaging the plurality of COVAS data;
  c) the step of obtaining brainwave data or analysis data thereof from the object by carrying out the pain test to the object;
  d) the step of cutting out the brainwave data or analysis data thereof based on the COVAS template; and
  e) the step of creating a model by setting the cut out brainwave data or analysis data thereof as data for learning and learning a value of a COVAS template corresponding to the cut out brainwave data or analysis data thereof as a label.

(Item 20)
The method of item 19, wherein the learning comprises the step of augmenting the cut out brainwave data or analysis data thereof, comprising:
  i) deriving a covariance matrix from the cut out brainwave data or analysis data thereof;
  ii) decomposing the covariance matrix; and
  iii) applying a random number to the decomposed matrix.

The present disclosure is intended so that one or more of the aforementioned characteristics can be provided not only as the explicitly disclosed combinations, but also as other combinations thereof. Additional embodiments and advantages of the present disclosure are recognized by those skilled in the art by reading and understanding the following detailed description as needed.

Advantageous Effects of Invention

The present disclosure can augment supervisory data while maintaining the relationship among a plurality of supervisory data used for machine learning. The use of such augmented supervisory data for machine learning does not compromise prediction accuracy and can achieve the intended prediction accuracy. This is because, for example, a highly accurate and highly reliable prediction by machine learning can be carried out even when there is only a small number of samples. This is especially useful when learning data obtained from an organism and useful when learning reaction data against stimulation.

The present disclosure can also efficiently differentiate pain from a small number of samples. Pain can be differentiated at an exceptionally high level of accuracy, which enables therapy or surgery that is further detailed and matching with the subjectivity, which is useful in the medical-related industry.

The present disclosure can provide a system and the like for augmenting supervisory data while maintaining the relationship among a plurality of supervisory data used for machine learning as described above.

Accordingly, when learning data obtained from an organism, the sample augmentation of the present disclosure can reduce the burden imposed on an organism as much as possible instead of imposing many stimulations on the organism in order to obtain many supervisory data when, for example, obtaining reaction data against the stimulation, in a scene where it is difficult to obtain many supervisory data or the like, such as when the number of samples is generally limited.

While simple augmentation of the number of a plurality of supervisory data is insufficient as supervisory data for machine learning and cannot achieve the intended prediction accuracy and high prediction accuracy is required when, for example, learning data obtained from an organism, the present disclosure can also improve the low reliability that can be seen in the prediction by learning the supervisory data in which the number of a plurality of supervisory data has been simply augmented.

BRIEF DESCRIPTION OF DRAWINGS

FIG. 1 shows an example of a configuration of a system 100 for augmenting supervisory data used for machine learning.

FIG. 2 shows another example of a system 100 for augmenting supervisory data used for machine learning.

FIG. 3 is a flow chart showing an example of a processing 300 in a system 100 for augmenting supervisory data used for machine learning.

FIG. 4 is a flow chart showing an example of a processing 400 in a system 100 for augmenting supervisory data used for machine learning.

FIG. 5A is a flow chart showing an example of a processing 500 in a system 100 for augmenting supervisory data used for machine learning.

FIG. 5B is a flow chart of a processing equivalent to the processing 500.

FIG. 6A is a graph showing the relationship between electrical stimulation and pain levels (VAS).

FIG. 6B is a graph showing the relationship between electrical stimulation and pain levels (paired comparison).

FIG. 6C is a graph showing the relationship between electrical stimulation and brainwave amplitude.

FIG. 6D is a graph showing an example of a waveform of a brainwave.

FIG. 6E is a graph showing the relationship between pain level due to electrical stimulation (VAS) and brainwave amplitude.

FIG. 6F is a graph showing the relationship between pain level due to electrical stimulation (paired comparison) and brainwave amplitude.

FIG. 6G is a graph showing the relationship between pain level due to hot stimulation (VAS) and brainwave amplitude.

FIG. 6H is a graph showing the relationship between pain level due to hot stimulation (paired comparison) and brainwave amplitude.

FIG. 7A shows the correlation between arithmetic mean potential amplitude (absolute value) and subjective pain evaluation, and FIG. 7B shows correlation between arithmetic mean potential amplitude (absolute value) and high temperature stimulation intensity. The vertical axis indicates the correlation coefficient, and the horizontal axis indicates the arithmetic mean time interval (seconds).

FIG. 8A shows the correlation between geometric mean potential amplitude (absolute value) and subjective pain evaluation, and FIG. 8B shows correlation between geometric mean potential amplitude (absolute value) and high temperature stimulation intensity. The vertical axis indicates the correlation coefficient, and the horizontal axis indicates the geometric mean time interval (seconds).

FIG. 9 is a diagram of a scheme of the present disclosure.

FIG. 11 shows an outline of the analysis method of Example 2 in Example 7. The property of temporal change in the frequency feature (β band) exhibiting the property of delayed pain sensation of C fiber is illustrated (displayed by time frequency analysis). In particular, the frequency power is increased compared to other levels with a delay of 5 seconds after applying stimulation of level 6.

FIG. 13 shows pain occupancy. This is a concept indicating the certainty when a pain estimation value is differentiated as "having pain". The calculation method thereof is the following. i. Calculate an estimate for no pain (30 samples×81 subjects) and having pain (30 samples×81 subjects) by a differentiation model for 81 subjects (differentiation accuracy>70%) after refinement. ii. The minimum value (−1) and maximum value (2) of all pain estimation values are divided into, for example, 0.1 widths, and the occupancy of estimation value for having pain among each estimation value is calculated: "occupancy (%) for having pain=number of estimation value for having pain/(number of estimation values for having pain+number of estimation values for no pain)". iii. This is fitted to a sigmoid function to obtain a "pain occupancy function" to create an occupancy model. An example of a pain occupancy function is shown below.

FIG. 23 shows a schematic diagram when curve fitting using a histogram of features. The numerical value where distributions of samples for no pain and having pain intersect is used as a differentiation threshold value. Samples less than the threshold value are converted to a category scale of "−1" and samples that are greater than the threshold value are converted to a category scale of "1". Poincare distribution or the like can also be used as the sample distribution for determining such a threshold value.

FIG. 36D shows the result of using a model created in leave-one-out (n−1) data and differentiating one sample that has been left out 1000 times.

FIG. 36E shows the result of using a model created in leave-one-out (n−1) data and differentiating one sample that has been left out 1000 times.

FIG. 37B shows the range of 19 types of standardization parameters cut out from the sorted COVAS template and 10 models corresponding to 10 types of standardization parameters.

DESCRIPTION OF EMBODIMENTS

Figure 7A:
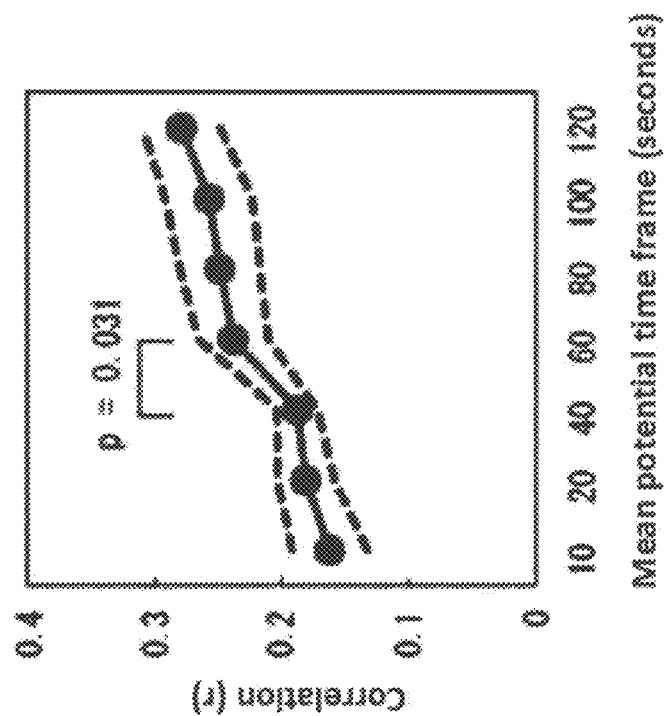
FIGS. 7A and 7B show the change in the correlation coefficient when changing the arithmetic mean time interval from 10 seconds to 120 seconds using high temperature stimulation test data (six levels of pain). A tendency for a correlation coefficient to increase with longer mean time interval is observed.
Figure 7B:
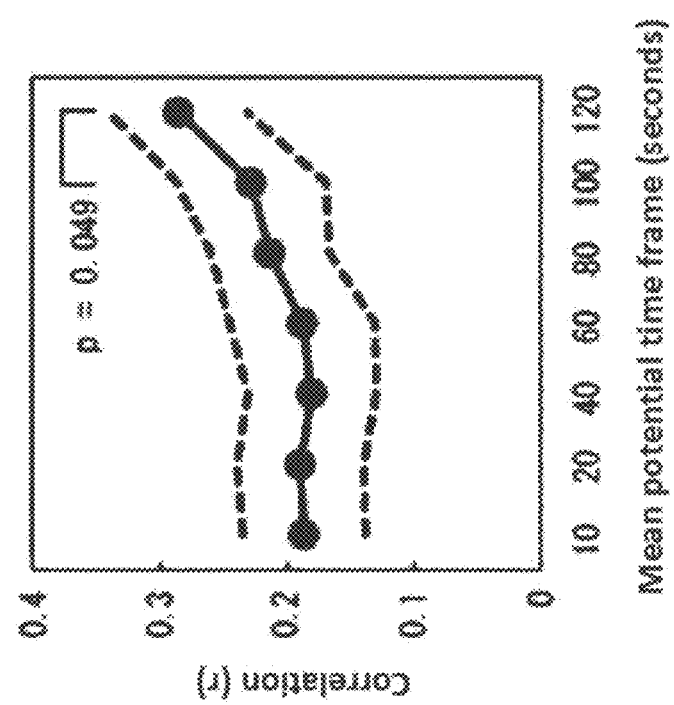
Figure 8B:
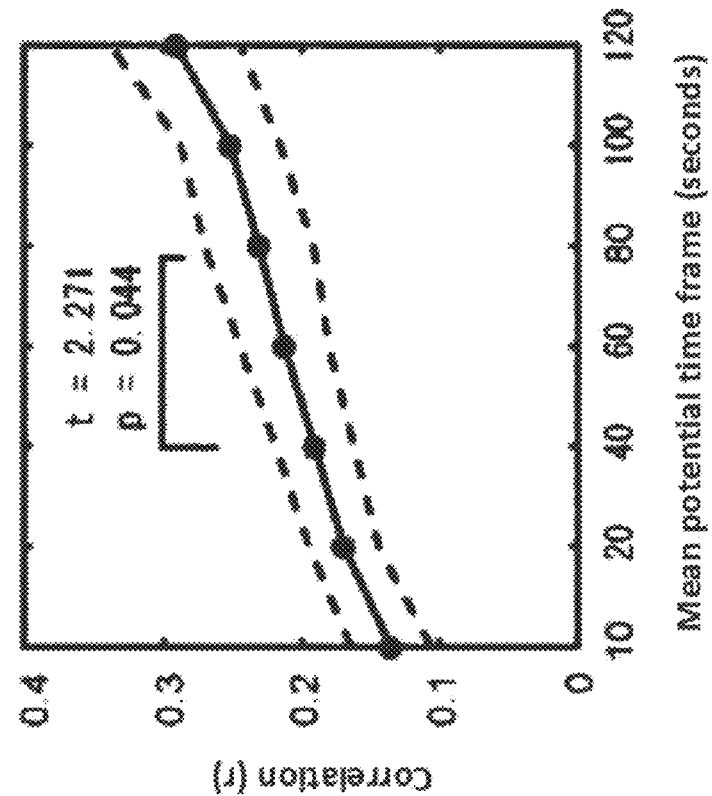
FIGS. 8A and 8B show the change in the correlation coefficient when changing the geometric mean time interval from 10 seconds to 120 seconds using high temperature stimulation test data (six levels of pain). A tendency for a correlation coefficient to increase with longer mean time interval is observed.
Figure 8A:
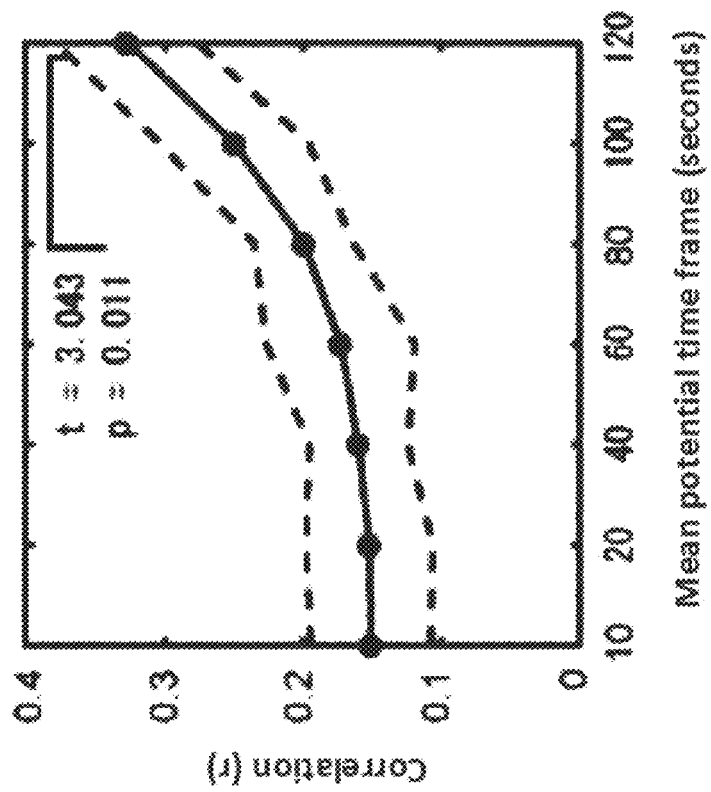

The present disclosure is explained hereinafter. Throughout the entire specification, a singular expression should be understood as encompassing the concept thereof in the plural form, unless specifically noted otherwise. Thus, singular articles (e.g., "a", "an", "the", and the like in the case of English) should also be understood as encompassing the concept thereof in the plural form, unless specifically noted otherwise. The terms used herein should also be understood as being used in the meaning that is commonly used in the art, unless specifically noted otherwise. Thus, unless defined otherwise, all terminologies and scientific technical terms that are used herein have the same meaning as the general understanding of those skilled in the art to which the present disclosure pertains. In case of a contradiction, the present specification (including the definitions) takes precedence.

Definition

The terms and the general technologies used herein are first explained.

(Information Processing Related Matters)

As used herein, "machine learning" refers to a technology for imparting a computer the ability to learn without explicit programming. This is a process of improving a function unit's own performance by acquiring new knowledge/skill or reconfiguring existing knowledge/skill. Most of the effort required for programming details can be reduced by programming a computer to learn from experience. In the machine learning field, a method of constructing a computer program that enables automatic improvement from experience has been discussed. Data analysis/machine learning plays a role in elemental technology that is the foundation of intelligent processing along with field of the algorithms. Generally, data analysis/machine learning is utilized in conjunction with other technologies, thus requiring the knowledge in the cooperating field (domain specific knowledge; e.g., medical field). The range of application thereof includes roles such as prediction (collect data and predict what would happen in the future), search (find a notable feature from the collected data), and testing/describing (find relationship of various elements in the data). Machine learning is based on an indicator indicating the degree of achievement of a goal in the real world. The user of machine learning must understand the goal in the real world. An indicator that improves when an objective is achieved needs to be formularized. Machine learning has the opposite problem that is an ill-posed problem for which it is unclear whether a solution is found. The behavior of the learned rule is not definitive, but is stochastic (probabilistic). Machine learning requires an innovative operation with the premise that some type of uncontrollable element would remain. The present disclosure can be considered as a solution to such problem upon carrying out machine learning in an environment in which the number of samples such as biological information is limited. It is useful for a user of machine learning to sequentially select data or information in accordance with the real world goal while observing performance indicators during training and operation.

Linear regression, logistic regression, support vector machine, or the like can be used for machine learning, and cross validation (CV) can be performed to calculate differentiation accuracy of each model. After ranking, a feature can be increased one at a time for machine learning (linear regression, logistic regression, support vector machine, or the like) and cross validation to calculate differentiation accuracy of each model. A model with the highest accuracy can be selected thereby. Any machine learning can be used herein. Linear, logistic, support vector machine (SVM), or the like can be used as supervised machine learning.

Machine learning uses logical reasoning. There are roughly three types of logical reasoning, i.e., deduction, induction, and abduction as well as analogy. Deduction, under the hypothesis that Socrates is a human and all humans die, reaches a conclusion that Socrates would die, which is a special conclusion. Induction, under the hypothesis that Socrates would die and Socrates is a human, reaches a conclusion that all humans would die, and determines a general rule. Abduction, under a hypothesis that Socrates would die and all humans die, arrives at Socrates is a human, which falls under a hypothesis/explanation. However, it should be noted that how induction generalizes is dependent on the premise, so that this may not be objective. Analogy is a probabilistic logical reasoning method which reasons that if object A has 4 features and object B has three of the same features, object B also has the remaining one feature so that object A and object B are the same or similar and close.

Impossible has three basic principles, i.e., impossible, very difficult, and unsolved. Further, impossible includes generalization error, no free lunch theorem, and ugly duckling theorem and true model observation is impossible, so that this is impossible to verify. Such an ill-posed problem should be noted.

Feature/attribute in machine learning represents the state of an object being predicted when viewed from a certain aspect. A feature vector/attribute vector combines features (attributes) describing an object being predicted in a vector form.

As used herein, "model" or "hypothesis" are used synonymously, which is expressed using mapping describing the relationship of inputted prediction targets to prediction results, or a mathematical function or Boolean expression of a candidate set thereof. For learning with machine learning, a model considered the best approximation of the true model is selected from a model set by referring to training data.

Examples of models include generation model, identification model, function model, and the like. Models show a difference in the direction of classification model expression of the mapping relationship between the input (object being predicted) x and output (result of prediction) y. A generation model expresses a conditional distribution of output y given input x. An identification model expresses a joint distribution of input x and output y. The mapping relationship is probabilistic for an identification model and a generation model. A function model has a definitive mapping relationship, expressing a definitive functional relationship between input x and output y. While identification is sometimes considered slightly more accurate in an identification model and a generation model, there is basically no difference in view of the no free lunch theorem.

Model complexity: the degree of whether mapping relationship of an object being predicted and prediction result can be described in more detail and complexity. Generally, more training data is required for a model set that is more complex.

If a mapping relationship is expressed as a polynomial equation, a higher order polynomial equation can express a more complex mapping relationship. A higher order polynomial equation is considered a more complex model than a linear equation.

If a mapping relationship is expressed by a decision tree, a deeper decision tree with more nodes can express a more complex mapping relationship. Therefore, a decision tree with more nodes can be considered a more complex model than a decision tree with less nodes.

Classification thereof is also possible by the principle of expressing the corresponding relationship between inputs and outputs. For a parametric model, the distribution or shape of the function is completely determined by parameters. For a nonparametric model, the shape thereof is basically determined from data. Parameters only determine smoothness.

Parameter: an input for designating one of a set of functions or distribution of a model. It is also denoted as Pr[y|x; θ], y=f(x; θ), or the like to distinguish from other inputs.

For a parametric model, the shape of a Gaussian distribution is determined by mean/variance parameters, regardless of the number of training data. For a nonparametric model, only the smoothness is determined by the number of bin parameter in a histogram. This is considered more complex than a parametric model.

For learning in machine learning, a model considered the best approximation of the true model is selected from a model set by referring to training data. There are various learning methods depending on the "approximation" performed. A typical method is the maximum likelihood estimation, which is a standard of learning that selects a model with the highest probability of producing training data from a probabilistic model set. Maximum likelihood estimation can select a model that best approximates the true model. KL divergence to the true distribution becomes small for greater likelihood. There are various types of estimation that vary by the type of form for finding a parameter or estimated prediction value. Point estimation finds only one value with the highest certainty. Maximum likelihood estimation, MAP estimation, and the like use the mode of a distribution or function and are most often used. Meanwhile, interval estimation is often used in the field of statistics in a form of finding a range within which an estimated value falls, where the probability of an estimated value falling within the range is 95%. Distribution estimation is used in Bayesian estimation or the like in combination with a generation model introduced with a prior distribution for finding a distribution within which an estimated value falls.

In machine learning, over-training (over-fitting) can occur. With over-training, empirical error (prediction error relative to training data) is small, but generalization error (prediction error relative to data from a true model) is large due to selecting a model that is overfitted to training data, such that the original objective of learning cannot be achieved. Generalization errors can be divided into three components, i.e., bias (error resulting from a candidate model set not including a true model; this error is greater for a more simple model set), variance (error resulting from selecting a different prediction model when training data is different; this error is greater for a more complex model set), and noise (deviation of a true model that cannot be fundamentally reduced, independent of the selection of a model set). Since bias and variance cannot be simultaneously reduced, the overall error is reduced by balancing the bias and variance. Since less training data tends to cause over-learning, the possibility of overlearning may be reduced by using the sample augmentation of the present disclosure.

As used herein, "contract" refers to reducing or consolidating variables, i.e., features. For example, factor analysis refers to explaining, when there are a plurality of variable, the relationship between a plurality of variables with a small number of potential variables by assuming that there is a constituent concept affecting the variables in the background thereof. This is a form of conversion to a small number of variables, i.e., contracting. The potential variables explaining the constituent concept are referred to as factors. Factor analysis contracts variables that can be presume to have the same factors in the background to create new quantitative variables. The sample augmentation of the present disclosure can be used after contracting features with respect to a sample, which enables augmentation of a sample in a state in which the features are contracted.

As used herein, "differentiation function" is a numerical sequence, i.e., a function, created to match the arrangement of samples to be differentiated by assigning continuous numerical values to the number of levels to be differentiated. For example, if samples to be differentiated are arranged to match the levels when there are two differentiation levels, the numerical sequence thereof, i.e., differentiation function, is generated, for example, to have a form of a sigmoid function. For three or more levels, a step function can be used. A model approximation index numerically represents the relationship between a differentiation function and differentiation level of samples to be differentiated. When a difference therebetween is used, the range of fluctuation is controlled. A smaller absolute value of a value of difference indicates higher approximation. When correlation analysis is performed, a higher correlation coefficient (r) indicates higher approximation. When regression analysis is used, a higher $R^2$ value is deemed to have higher approximation.

As used herein, "weighting coefficient" is a coefficient that is set so that an important element is calculated as more important in the calculation of the present disclosure, including approximation coefficients. For example, a coefficient can be obtained by approximating a function to data, but the coefficient itself only has a description indicating the degree of approximation. When coefficients are ranked or chosen/discarded on the basis of the magnitude or the like, a difference in contribution within the model is provided to a specific feature, so that this can be considered a weighting coefficient. A weighting coefficient is used in the same meaning as an approximation index of a differentiation function. Examples thereof include $R^2$ value, correlation coefficient, regression coefficient, residual sum of squares (difference in feature from differentiation function), and the like.

As used herein, "differentiation function model" refers to a model of a function used for differentiation of pain or the like. Examples thereof include, but are not limited to, sigmoid function and step function.

(Brainwave Related Matters)

As used herein, "object" refers to any entity subjected to machine learning. However, when referred to regarding a brainwave, "object" is used synonymously with patient and subject and refers to any organism or animal which is subjected to the technology in the disclosure such as pain measurement and brainwave measurement. An object is preferably, but is not limited to, humans. As used herein, an object may be referred to an "object being estimated" when estimating pain, but this has the same meaning as object or the like. There may be a plurality of "objects". In such a case, each individual may be referred to as a "sample" (of objects).

As used herein, "brainwave" has the meaning that is commonly used in the art and refers to a current generated by a difference in potential due to neurological activity of the brain when a pair of electrodes is placed on the scalp. Brainwave encompasses electroencephalogram (EEG), which is obtained from deriving and recording temporal changes in the current. A wave with an amplitude of about 50 µV and a frequency of approximately 10 Hz is considered the primary component at rest. This is referred to as an α wave. During mental activity, α waves are suppressed and a fast wave with a small amplitude of 17 to 30 Hz appears, which is referred to as a β wave. During a period of shallow sleep, α waves gradually decrease and θ waves of 4 to 8 Hz appear. During a deep sleep, δ waves of 1 to 4 Hz appear. These brainwaves can be expressed by a specific amplitude, frequency, complexity index, correlation, or the like. Brainwaves can be represented by a specific, amplitude and frequency or analysis of amplitude in the present disclosure.

As used herein, "brainwave data" is any data related to brainwaves (also referred to as "amount of brain activity", "brain feature", or the like), such as amplitude data (EEG amplitude), frequency property, or the like. "Analysis data" from analyzing such brainwave data can be used in the same manner as brainwave data, so that such data is collectively referred to as "brainwave data or analysis data thereof" herein. Examples of analysis data include mean amplitude and peak amplitude (e.g., Fz, Cz, C3, C4), frequency power (e.g., Fz (δ), Fz (θ), Fz (α), Fz (β), Fz (γ), Cz (δ), Cz (θ), Cz (α), Cz (β), Cz (γ), C3 (δ), C3 (θ), C3 (α), C3 (β), C3 (γ), C4 (δ), C4 (θ), C4 (α), C4 (β), and C4 (γ)) and the like of brainwave data. Of course, this does not exclude other data commonly used as brainwave data or analysis data thereof. For example, raw data sampled out for a certain period of time, when used for differentiation, is also a feature, so this can also be used in the present disclosure.

As used herein, "brainwave feature" or "feature of brainwave" refers to any feature of a brainwave, encompassing "brainwave data or analysis data thereof" such as amplitude, interrelation of brainwave features, frequency power, and complexity index. As examples thereof, the amplitude can comprise an amplitude distribution property value such as a mean amplitude (e.g., absolute mean amplitude, relative mean amplitude, or the like), an amplitude median value, an amplitude mode, an amplitude maximum value, a peak amplitude, or a quartile amplitude, the interrelation of brainwave features can comprise potential correlation (e.g., frontal-parietal potential correlation (a correlation coefficient, a partial correlation coefficient, Connectivity, Causality, and subtypes thereof)) or phase synchronization between electrodes (e.g., coherence, Phase locking value, and subtypes thereof), the frequency power can comprise a spectral density, a power spectrum, or a subtype thereof, and the complexity index can comprise at least one selected from entropy (e.g., multiscale entropy (MSE), sample entropy, self entropy, mean entropy, joint entropy, relative entropy, conditional entropy, and the like), and a biological potential feature manifested in association with an event in conjunction with occurrence of pain (eye movement potential reflecting eye movement such as a blink reflex or the like)

As used herein, "amplitude data" is one type of "brainwave data" and refers to data for amplitudes of brainwaves. This is also referred to as simply "amplitude" or "EEG amplitude". Since such amplitude data is an indicator of brain activity, such data can also be referred to as "brain activity data", "amount of brain activity", or the like. Amplitude data can be obtained by measuring electrical signals of a brainwave and is indicated by potential (can be indicated by µV or the like). Amplitude data that can be used include, but are not limited to, mean amplitude.

As used herein, "frequency power" expresses frequency components of a waveform as energy and is also referred to as power spectrum. Frequency power can be calculated by extracting and calculating frequency components of a signal embedded in a signal contained in noise within a time region by utilizing fast Fourier transform (FFT) (algorithm for calculating discrete Fourier transform (DFT) on a computer at high speeds). FFT on a signal can, for example, use the function periodgram in MATLAB to normalize the output thereof and calculate the power spectrum density PSD or power spectrum, which is the source of measurement of power. PSD indicates how power of a time signal is distributed with respect to frequencies. The unit thereof is watt/Hz. Each point in PSD is integrated over the range of frequencies where the point is defined (i.e., over the resolution bandwidth of PSD) to calculate the power spectrum. The unit of a power spectrum is watt. The value of power can be read directly from power spectrum without integration over the range of frequencies. PSD and power spectrum are both real numbers, so that no phase information is included. In this manner, frequency power can be calculated with a standard function in MATLAB. As the analysis method, time frequency analysis can be used as exemplified in FIG. 11. For example, temporal change in frequency power can be found, for example, by determining a unit of time such as 1 second and shifting the point. As shown in FIG. 11, this elucidates the delay property of thermal pain. For example, a time segment where pain is sharp (e.g., 5 seconds after application of stimulation and thereafter) can be identified, and a feature that can be categorically distinguished from "delayed pain feature" among frequency features can be created.

As used herein, "complexity" refers to a situation where logically possible connection relationships among various elements are excessive, and one relationship must be selected therefrom. When used in the context of brainwaves, this refers to a state where the possible connection relationship of each brainwave is excessive. An index thereof is referred to as a "complexity index".

As used herein, "complexity index" refers to a scale of complex and superficially irregular appearing behavior due to the large number of constituent elements or nonlinearity. A complexity index can be represented with entropy or the like. Entropy refers to the scale of disorderliness of a system and refers to the mean value of the amount of information that is communicated by knowing which event has occurred from a limited complete event system. In informatics, entropy is also referred to as the amount of information, which is an indicator of complexity of activity. Thus, complexity is broader than the concept of entropy in the chaotic sense. Examples of entropy include, but are not limited to, multiscale entropy (MSE), sample entropy, self entropy, mean entropy, joint entropy, relative entropy, conditional entropy, and the like.

Multiscale entropy (MSE) is an analysis method that has drawn attention as a new nonlinear analysis method, which has overcome problems of existing nonlinear analysis methods (data stability, i.e., state where a property of the entire data (variance or the like) is not locally reproduced). MSE is vulnerable to artifacts and requires data from an extended period of time with high resolution, but was further improved upon from approximate entropy (ApEn; Pincus S M. Approximate entropy as a measure of system complexity.

Proc Natl Acad Sci USA 1991; 88:2297-2301) and an improved version thereof, i.e., sample entropy (SampEn; Richman J S. Moorman J R. Physiological time-series analysis using approximate entropy and sample entropy. Am J Physiol Heart Circ Physiol 2000; 278: 2039-2049) as a practical nonlinear analysis method to overcome the fact that measurements meeting such conditions are challenging for actual measurement data in clinical settings. MSE was developed by Costa et al (Costa M. Goldberger A L. Peng C K. Multiscale entropy analysis of complex physiologic time series. Phys Rev Lett 2002; 89: 068102). MSE is found by reconstructing the original data from finding the arithmetic mean so that the data does not overlap and calculating each of ApEn/SampEn of the reconstructed data with a plurality of number of additions (time axis). With a low number of additions, complexity of a high frequency band is represented. With a high number of additions, complexity of a low frequency band is represented. Therefore, MSE analysis enables nonlinear extraction, which was challenging with existing nonlinear analysis methods. For example, Busa & Emmerik have recently published a report for brainwaves (Journal of Sport and Health Science Volume 5, Issue 1, March 2016, Pages 44-51).

As used herein, "interrelation of brainwave features" refers to the interrelation of two or more brainwave features. Any brainwave feature may be used as long as the feature is brainwave data or analysis data thereof. Examples thereof include, but are not limited to, amplitude (including mean amplitude and the like), frequency power, potential, complexity index (including MSE and the like), and the like.

As used herein, "interrelation" refers to any relationship between two features. Interrelation is a broad concept including the relationship of different features of the same electrode, relationship of the same features at different times, and the like, including correlation. There is a phase synchronization indicator, which retrieves multiple phases of activity to find synchronicity between periods. This is encompassed by a broadly defined concept of interrelation. In this manner, interrelation does not use a correlation coefficient, but encompasses the same type of relational indicator.

As used herein, "correlation" generally indicates a concept of association between two or more variable amounts or a value thereof in mathematical statistics and biological statistics. As an example of correlation, the statistical scale can be represented by a correlation coefficient (r, ρ, or the like). The value thereof is between −1 and +1. A value close to +1 means positive correlation, a value close to −1 means negative correlation, and a value close to 0 means non-correlation. For example, human body length/body weight has a positive correlation with a certain r value. If there is a positive or negative correlation, the functional relationship (empirical formula) between variables can be found in a form of a regression line, and this methodology can be expanded to nonlinear regression. Qualitative correlation for only large or small (+1 or −1) for each variable can be called association. One characteristic of the sample augmentation of the present disclosure is that the correlation can also be retained by augmentation.

In one embodiment, interrelation encompasses correlation as well as indicators that cannot be considered correlation such as a phase synchronization indicator for finding synchronicity between periods. Examples of narrowly defined correlation, i.e., various forms of correlation (synchronicity, unrelatedness, delay, positive/negative, similarity, and match) include temporal correlation, spatial correlation, spatiotemporal synchronicity, spatial relationship or connectivity, unrelatedness or uncorrelatedness, delay or breakdown in temporal correlation, positive/negative or correlated property, similarity or level of correlation coefficient, and a match or complete correlation. In this manner, it can be understood that synchronicity is temporal correlation, connectivity is a spatial (e.g., parts of brain) relationship, unrelatedness is uncorrelatedness, delay is breakdown in temporal correlation, positive/negative is correlated property, similarity is having a high correlation coefficient, and match is complete correlation.

As used herein, "pain" refers to a sensation that is generated as stimulation, generally upon intense injury such as damage/inflammation to a body part. Pain is not a disease but is a symptom. The state thereof is determined by the combination of three main properties, i.e., central nervous, nociceptive, and neuropathic pain. Acute pain and chronic pain are distinguished, which are different in terms of the associated cerebral site network (connectivity). Chronic pain is sometimes subjectively reported as painful when in fact it is not painful. Chronic pain includes psychogenic factors that cannot be explained by sensational intensity of pain stimulation.

In humans, pain is encompassed by common sensations as a sensation accompanying strong unpleasant feeling. In addition, cutaneous pain and the like also has an aspect as an external receptor to a certain degree, which plays a role in determining the quality such as hardness, sharpness, hotness (thermal pain), coldness (cold pain), or spiciness of an external object in cooperation with other skin sensation or taste. The sensation of pain of humans can occur at almost any part of the body (e.g., pleura, peritoneum, internal organs (visceral pain, excluding the brain), teeth, eyes, ears, and the like) other than the skin and mucous membrane, which can all be sensed as a brainwave or a change thereof in the brain. Additionally, internal sensation of pain represented by visceral pain is also encompassed by sensation of pain. The aforementioned sensation of pain is referred to as somatic pain relative to visceral pain. In addition to somatic pain and visceral pain, sensation of pain called "referred pain", which is a phenomenon where pain is perceived at a surface of a site that is different from a site that is actually damaged, is also reported. The present disclosure provides a methodology of expressing a temporal change in such various pain types as a trend and monitoring subjective pain levels, and other methodologies described herein.

For sensation of pain, there are individual differences in sensitivity (pain threshold), as well as qualitative difference due to a difference in the receptor site or how a pain stimulation occurs. Sensation of pain is classified into dull pain, sharp pain, and the like, but sensation of pain of any type can be measured, estimated, and classified in this disclosure. The disclosure is also compatible with fast sensation of pain (A sensation of pain), slow sensation of pain (B sensation of pain), (fast) topical pain, and (slow) diffuse pain. The present disclosure is also compatible with abnormality in sensation of pain such as hyperalgesia. Two nerve fibers, i.e., "Aδ fiber" and "C fiber", are known as peripheral nerves that transmit pain. For example, when a hand is hit, the initial pain is transmitted as sharp pain from a clear origin (primary pain: sharp pain) by conduction through the Aδ fiber. Pain is then conducted through the C fiber to feel throbbing pain (secondary pain; dull pain) with an unclear origin. Pain is classified into "acute pain" lasting 4 to 6 weeks or less and "chronic pain" lasting 4 to 6 weeks or more. Pain is an important vital sign along with pulse, body temperature, blood pressure, and breathing, but is difficult to express as objective data. Representative pain scales VAS (visual analogue scale) and faces pain rating scale are subjective evaluation methods that cannot compare pain between patients. Meanwhile, the inventors have focused on brainwaves which are hardly affected by the peripheral circulatory system as an indicator for objectively evaluating pain, arriving at the conclusion that pain can be differentiated and classified by observing the change during latency/amplitude in response to pain stimulation and performing trend analysis. In particular, instantaneous pain and throbbing sustained pain can also be distinguishable by the trend analysis of the present disclosure. Since instantaneous pain is pain during a short time segment, associated brain activity can decrease if a time direction averaging method over at least several tens of seconds is used in trend analysis (e.g., significant correlation with pain evaluation is not observed). Meanwhile, sustained pain is continuous, so that significant correction with pain evaluation can be rather strengthened by a time direction averaging method. The inventors focused on brainwaves that are less susceptible to the effect of the peripheral circulatory system as an indicator for objective evaluation of pain. Observation of the change during latency/amplitude in response to pain stimulation lead to classification of types of pain (comfort/discomfort). Instantaneous stimulation and sustained stimulation can also be classified in this manner.

One of the important points of the present disclosure is in the ability to distinguish whether pain is pain "requiring therapy", rather than the intensity in itself. Therefore, it is important that "pain" can be clearly categorized based on the concept of "therapy". For example, this leads to "qualitative" classification of pain such as "pleasant/unpleasant" or "unbearable". For example, the position of a "pain index", baseline, and the relationship thereof can be defined. In addition to a case of n=2, cases where n=3 or greater can also be envisioned. When n is 3 or greater, pain can be separated into "not painful", "comfortable pain", and "painful". For example, pain can be differentiated as "unbearable, need therapy", "moderate", or "painful, but not bothersome". When the trend analysis of the present disclosure is used, "unbearable" and "painful but bearable" pain can be distinguished by identifying a threshold value for long/short duration of a signal associated with strong pain. For example, when the sample augmentation of the present disclosure is used on a signal that can separate whether or not a pain needs therapy, machine learning can be carried out to find out whether or not a pain needs such therapy, while being accurately retained.

As used herein, "subjective pain sensation level" refers to the level of sensation of pain of an object, and can be expressed by conventional technology such as computerized visual analog scale (COVAS) or other known technologies such as Support Team Assessment Schedule (STAS-J), Numerical Rating Scale (NRS), Faces Pain Scale (FPS), Abbey pain scale (Abbey), Checklist of Nonverbal Pain Indicators (CNPI), Non-communicative Patient's Pain Assessment Instrument (NOPPAIN), Doloplus 2, or the like.

As used herein, "pain classifier" refers to the value or range thereof of the brainwave data (e.g., amplitude) or analysis thereof specified to classify the type of pain. In the present disclosure, a portion, apparatus, or device generating the "pain classifier" (and thus predicting the pain) may be referred to as "pain classification tool", "pain prediction tool", or the like. The present disclosure can carry out, but not limited to, stimulation of an object being estimated and determination of data such as amplitude data of brainwave obtained therefrom using, for example, an inflection point or the like based on a specific pain function (e.g., also referred to as a liner function or sigmoid curve specific to the object being estimated) obtained by plotting stimulation intensity thereof or a subjective pain sensation level corresponding to the stimulation intensity and for application and fitting to a pain function. After being generated, a pain classifier can be improved by carrying out calibration. The pain classifier may also be expressed as pain predictor and the like, which all have the same meaning. It is possible to distinguish between "change within an intense pain level" and "qualitative change showing a mild pain level deviated from an intense pain level" with the use of the "pain classifier". When there is a deviation reaction that exceeds a change within an intense pain level, distinguishment from the change within an intense pain level is possible by using the pain classifier of the present disclosure. In the case of a change within an intense pain level, this is not an error but a change that can be distinguished, wherein when this is exceeded, processing as a deviation reaction may be carried out. For example, when a signal such as a brainwave signal that can classify the type of pain is augmented using the sample augmentation of the present disclosure for machine learning, such pain classifier can also be accurately calculated.

As used herein, "pain function" refers to a term expressing the correlation between a pain level and a stimulation level with a numerical formula function of a dependent variable (variable Y) and an independent variable (variable X), which expresses the relationship thereof as a function based on a "broadly defined" linearity between a brainwave or analysis data thereof (including, for example, amplitude) and pain, which were unraveled by the inventors of the present invention. Because of this relationship, it is possible to (i) estimate that, when the first brainwave data or analysis data thereof (including, for example, amplitude) is greater than the second brainwave data or analysis data thereof (including, for example, amplitude), a first pain corresponding to the first brainwave data is greater than a second pain corresponding to the second brainwave data, and (ii) estimate that, when the first brainwave data or analysis data thereof (including, for example, amplitude) is less than the second brainwave data or analysis data thereof (including, for example, amplitude), the first pain is less than the second pain. It is understood that any function would be within the scope of the pain function as long as the function can express such a matter. An example of such a pain function can include a linear function or a sigmoid function, and a more specific example can include a linear function with the range of inflection linearly approximated, or a comprehensive sigmoid function encompassing the linear function. Other than amplitude, the linearity can be referred to in a frequency or wavelet processing value as long as it is a brainwave feature, wherein the linearity in the range of inflection can be found not only in the brainwave feature but also in subjective evaluation. For example, when brainwave data or analysis data thereof is augmented using the sample augmentation of the present disclosure for machine learning, it is possible to accurately calculate such pain function.

As used herein, "stimulation" refers to anything that causes some type of a reaction to an object. If the object is an organism, stimulation refers to a factor resulting in a temporarily change in the physiological activity of the organism or a portion thereof.

Events related to sensation of pain presented as specific examples of "stimulation" includes any stimulation that can cause sensation of pain. Examples thereof include electrical stimulation, cold stimulation, thermal stimulation, physical stimulation, chemical stimulation, and the like. In the present disclosure, stimulation can be any stimulation. Evaluation of stimulation can be matched with subjective pain sensation levels using, for example, conventional technology such as computerized visual analog scale (COVAS) or other known technologies such as Support Team Assessment Schedule (STAS-J), Numerical Rating Scale (NRS), Faces Pain Scale (FPS), Abbey pain scale (Abbey), Checklist of Nonverbal Pain Indicators (CNPI), Non-communicative Patient's Pain Assessment Instrument (NOPPAIN), Doloplus 2, or the like. Examples of values that can be employed as stimulation intensity include nociceptive threshold (threshold for generating neurological impulses in nociceptive fiber), pain detection threshold (intensity of nociceptive stimulation that can be sensed as pain by humans), pain tolerance threshold (strongest stimulation intensity among nociceptive stimulation that is experimentally tolerable by humans), and the like.

As used herein, "classification" of pain can be performed from various viewpoints. Representative examples include classification by whether pain is "painful" or "not painful" for the object being estimated, but a methodology of classification for pain felt by whether pain is strong pain or weak pain, or "bearable" pain or "unbearable" pain can be envisioned. Other examples include a methodology of classification between "painful and unpleasant" and "painful but pleasant". For example, when a signal that can classify the intensity of pain is augmented using the sample augmentation of the present disclosure and undergoes machine learning, it is possible to chronologically differentiate/estimate whether an object feels unbearable strong pain or weak pain by observing monotonous increase or monotonous decrease.

As used herein, "pain index" refers to an index obtained by appropriately processing brainwave data or analysis data thereof. As long as an explanation is provided for the provided index, any processing method can be used, but a methodology that can visualize and track a property (trend) of temporally sustained or changing pain is important. A pain index can be calculated by the machine learning described in herein. A pain index can also be referred to as a "pain level index". The term "pain indicator" refers to subjective evaluation, stimulation intensity, associated brain feature, or the like.

As used herein, "baseline" refers to a standard or reference for facilitating the reading of pain levels, such as a feature associated with strong pain level at the start of monitoring, mean value or normalized value thereof, or a method using a pain index as zero, and a calculated numerical value. The sample augmentation of the present disclosure cab also be used for baseline calculation.

As used herein, "headset" refers to equipment used for obtaining brainwaves from the head. A headset can have any shape. Any obtaining method can be used as long as brainwaves can be directly or indirectly obtained. A headset can be preferably shaped to be worn on the head, but the shape is not limited thereto. Examples thereof include those in a shape of a wireless head gear as well as existing shapes such as a hat, net, or band type headsets. With further improvement, the shape can be of any form, as long as brainwaves are obtained directly from the head via electrodes such as a hair pin form. Brainwaves can also be obtained without contact from the outside. The above forms can be collectively called headsets.

As used herein, "base unit" refers to a part that obtains information such as brainwave signals from a headset and performs action such as analysis, differentiation, communication, and display. Abase unit can comprises a process, which is configured mainly to extract a quantitative feature such as a brainwave feature from brain electrical activity data (brainwave data, analysis data thereof or the like) of an object, and further generate and apply a differentiation model, differentiate pain, and the like. A base unit may include an input device for input into a memory device that is operably connected to a processor.

PREFERRED EMBODIMENTS

The preferred embodiments of the present disclosure are described hereinafter. It is understood that the embodiments provided hereinafter are provided to facilitate better understanding of the present disclosure, so that the scope of the present disclosure should not be limited by the following descriptions. Thus, it is apparent that those skilled in the art can refer to the descriptions herein to make appropriate modifications within the scope of the present disclosure. It is also understood that the following embodiments of the present disclosure can be used individually or as a combination.

Each of the embodiments described below provides a comprehensive or specific example. The numerical values, shapes, materials, constituent elements, positions of arrangement and connection forms of the constituent elements, steps, order of steps, and the like in the following embodiments are one example, which is not intended to limit the Claims. Further, the constituent elements in the following embodiments that are not recited in the independent claims showing the most superordinate concept are described as an optional constituent element.

The present disclosure provides, in one aspect, a system 100 for augmenting supervisory data used in machine learning.

FIG. 1 shows an example of a configuration of the system 100 for augmenting supervisory data used in machine learning.

The system 100 comprises an obtaining means 110, a processor 120, a memory 130 and an output means 140.

The obtaining means 110 is configured to obtain a plurality of supervisory data. The obtaining means 110 obtains a plurality of supervisory data from outside the system 100. The obtaining means 110 may be caused to, for example, obtain a plurality of supervisory data from a storage medium (e.g., database) inside a system 100 or connected to a system 100, may be caused to obtain a plurality of supervisory data via a network connected to the system 100, and may be caused to obtain data detected using a detection means (not shown) that the system 100 may comprise as the supervisory data. The detection means can detect any data by any methodology. The detection means can, for example, detect reaction data by applying stimulation to an organism, wherein, upon doing so, the reaction data may be, for example, brainwave data. For example, when a system for generating the pain estimation model described below, an apparatus generating a pain classifier, or a system generating a model for differentiating the pain of an object is connected to the system 100, the obtaining means 110 may be caused to obtain a plurality of data obtained by a system for generating a pain estimation model, an apparatus generating a pain classifier, or a system generating a model for differentiation of the pain of an object from a system for generating a pain estimation model, an apparatus generating a pain classifier, or a system generating a model for differentiating the pain of an object as supervisory data.

Each of the plurality of supervisory data obtained by the obtaining means 110 may have a plurality of features.

The processor 120 implements the processing of the system 100 and controls the operation of the entirety of the system 100. The processor 120 reads a program stored in a memory 130 and implements the program. This enables the system 100 to function as a system implementing a desired step. The processor 120 may be caused to carry out the processing of conversion into a form suitable for processing when the supervisory data obtained by the obtaining means 110 is in a form that is not suitable for processing. The processor 120 may be implemented by a single processor, or may be implemented by a plurality of processors.

The processor 120 may comprise a first processing means 121, a second processing means 122 and a third processing means 123.

The first processing means 121 is configured to derive a covariance matrix from a plurality of supervisory data obtained by the obtaining means 110. Since each of a plurality of supervisory data obtained by the obtaining means 110 has a plurality of features, the first processing means 121 can express the plurality of supervisory data with an n×d matrix when the number of the supervisory data (number of samples) obtained by the obtaining means 110 is set as n and the number of features comprised in each supervisory data is set as d. The first processing means 121 can derive a covariance matrix from this n×d matrix. In the covariance matrix derived from the first processing means 121, variance of each feature is retained in a diagonal component, and covariance between two features is retained in the other components.

The first processing means 121 may also be configured to calculate a mean value for every feature from the plurality of supervisory data obtained from the obtaining means 110. Upon doing so, the first processing means 121 may be caused to, for example, subtract the calculated mean value of each feature from the feature of the plurality of supervisory data and derive a covariance matrix from the plurality of supervisory data in which the mean value of each feature has been subtracted.

The second processing means 122 is configured to decompose a covariance matrix derived by the first processing means 121.

The second processing means 122 can, for example, decompose a covariance matrix into Q*Q'. In this regard, matrix Q' is a transposed matrix of matrix Q. The second processing means can decompose a covariance matrix into Q*Q' by carrying out one of, for example, Cholesky decomposition and singular value decomposition. Cholesky decomposition is a decomposition of a matrix related to solving of a linear equation system, and the singular value decomposition is a decomposition of a matrix based on an eigenvalue or a concept associated thereto.

For example, a covariance matrix may be decomposed by Cholesky decomposition into an upper triangular matrix and a lower triangular matrix which is a transposed matrix thereof.

For example, a covariance matrix may be decomposed into U*W*V' by singular value decomposition. Matrix U and matrix V are orthogonal matrices, matrix W is a diagonal matrix and matrix V' is a transposed matrix of matrix V.

U*W*V' obtained by singular value decomposition of a covariance matrix may also be expressed with Q*Q'.
This is because, since W=W_*W_ would be achieved when W_=sqrt(W), $$U*W*V' = U*W_*W_*V'$$
$$= U*W_*(V*W_)'$$

would be achieved, and since U=V would be achieved when a covariance matrix is decomposed, $$U*W*V' = U*W_*(U*W_)'$$
$$= Q*Q'$$

would be achieved. In this regard, sqrt( ) is a function employing a square root.

Eigenvalue decomposition is a singular value decomposition of when a covariance matrix is a square matrix, wherein the covariance matrix may be decomposed into P*W*P' by the eigenvalue decomposition. Matrix P is an orthogonal matrix, matrix W is a diagonal matrix and matrix P' is a transposed matrix of matrix P. P*W*P' obtained by eigenvalue decomposition of a covariance matrix may also be expressed with Q*Q'.

The second processing means 122 may be caused to derive an upper triangular matrix by, for example, carrying out LU decomposition or QR decomposition instead of Cholesky decomposition. LU decomposition is a general form of Cholesky decomposition, which is a methodology of decomposing a matrix into an upper triangular matrix and a lower triangular matrix. QR decomposition is a methodology of decomposing a matrix into an orthogonal matrix and an upper triangular matrix.

The third processing means 123 is configured to apply a random number to a matrix decomposed by the second processing means 122. The third processing means 123 can apply a random number by multiplying a decomposed matrix by a random number matrix. The random number may be, for example, a normal random number. The third processing means 123 can apply a random number to, for example, matrix Q or matrix Q' decomposed by the second processing means 122. The third processing means 123 can apply a random number to, for example, matrix Q' (upper triangular matrix) decomposed by Cholesky decomposition, can apply a random number to, for example, matrix Q' (upper triangular matrix) decomposed by LU decomposition, or can apply a random number to, for example, matrix Q' (upper triangular matrix) decomposed by QR decomposition.

The third processing means 123 may also be configured to add a mean value calculated by the first processing means 121 to a matrix to which a random number has been applied.

A memory 130 stores a program required for implementation of processing of the system 100, data required for implementation of the program, and the like. The memory 130 may store a program (e.g., program for materializing the processing shown in FIGS. 3 to 5 described below) for causing the processor 120 to carry out the processing for augmentation of supervisory data used for machine learning. The processor 120 may store a program for causing the processor 120 to carry out the processing of learning a plurality of augmented supervisory data. In this regard, the method in which the program is stored in the memory 130 may be any method. For example, the program may be preinstalled in the memory 130. Alternatively, the program may be installed in the memory 130 by being downloaded through a network. In this case, the type of the network may be any type. The memory 130 may be implemented by any storage means.

The output means 140 is configured to enable output of data outside the system 100. The output means 140 can output the augmented supervisory data. The form in which the output means 140 outputs the augmented supervisory data may be any form. For example, when the output means 140 is a transmitter, output may be carried out by the transmitter transmitting the augmented supervisory data outside the system 100 via a network 500. For example, when the output means 140 is a data writing apparatus, the augmented supervisory data may be outputted by writing the augmented supervisory data to a storage medium a database unit 200 connected to the system 100. For example, when the below-mentioned system for generating a pain estimation model, apparatus generating a pain classifier, or system generating a model for differentiation of the pain of an object is connected to the system 100, output may be carried out by providing the augmented supervisory data to the system for generating a pain estimation model, apparatus generating a pain classifier, or system generating a model for differentiation of the pain of an object. For example, the output means 140 may be caused to carry out conversion into a form that enables handling by a hardware or software of an output destination of data or adjustment to a response speed that enables handling by a hardware or software of an output destination of data to output the data.

FIG. 2 shows another example of a configuration of the system 100 for augmenting supervisory data used for machine learning. In FIG. 2, the same reference numbers are provided to the elements that are same as the elements shown in FIG. 1, wherein the explanation is omitted. The system 100' shown in FIG. 2 is a configuration in which a fourth processing means 124 is added to the processor 120 of the system 100 shown in FIG. 1. The system 100' can use principal component analysis to augment a plurality of supervisory data.

In this example, it is preferable that the first processing means 121 be caused to calculate a mean value for every feature from a plurality of supervisory data obtained by the obtaining means 110 and subtract the mean value of each feature that has been calculated from the features of the plurality of supervisory data. This is because this causes each component to be distributed around the origin of a principal component space when the result of principal component analysis is projected to the principal component space. Augmentation of data in which each component is distributed around the origin enables augmentation of the data while maintaining the relationship among the features.

In this example, the second processing means 122 can carry out principal component analysis to a plurality of supervisory data to calculate the principal component space. In addition, the second processing means 122 can calculate a principal component score and seek the standard deviation of every feature from the principal component score by projecting a plurality of supervisory data to the principal component space. The principal component score may correspond to a product in which the matrix of the plurality of supervisory data has been divided with the below-mentioned matrix V'.

In this example, the third processing means 123 can apply a random number to, for example, a standard deviation calculated by the second processing means 122.

The fourth processing means 124 is configured to carry out projection conversion of the standard deviation to which a random number has been applied by the third processing means 123 from the principal component space to the original space. The fourth processing means 124 can carry out projection conversion from the principal component space to the original space using, for example, the principal component coefficient of the principal component space calculated by the second processing means 122.

When the mean value of each feature is subtracted by the first processing means 121, the fourth processing means 124 can add the mean value to the data in which projection conversion has been carried out to the original space. This enables restoration of the information that is originally held by the plurality of supervisory data that has been subtracted by the first processing means 121.

The above-mentioned processing of principal component analysis by the first processing means 121 to the fourth processing means 124 may be equivalent to decomposition of covariance matrix derived from a plurality of supervisory data into V*L*V'. In this regard, matrix L is a diagonal matrix consisting of an eigenvalue, matrix V is a matrix having a corresponding eigenvector in the column and matrix V' is a transposed matrix of matrix V.

Upon doing so, the first processing means 121 can derive a covariance matrix from a plurality of supervisory data or a plurality of supervisory data in which the mean value of each feature has been subtracted. The second processing means 122 can decompose a covariance matrix derived by the first processing means 121 into V*L*V'. Upon doing so, when it is defined that matrix M=sqrt(L), a diagonal component of matrix M corresponds to the standard deviation of the principal component score. In this regard, sqrt( ) is a function employing a square root. The third processing means 123 can apply a random value to matrix M. For example, the third processing means 123 can apply a random number by multiplying matrix M by a random number matrix. The fourth processing means 124 can return to the original space by carrying out projection conversion of a random number to matrix M. The fourth processing means 124 can carry out projection conversion to the original space by, for example, multiplying matrix M to which a random number has been applied by V' from the right. For example, when the mean value of each feature is subtracted by the first processing means 121, the fourth processing means 124 can be caused to add the mean value to the matrix M that underwent projection conversion. This enables recovery of information originally held by a plurality of supervisory data subtracted by the first processing means 121.

In the above-described example, each constituent element of the system 100 is provided within the system 100, but the present disclosure is not limited thereto. Any of the constituent elements of the system 100 can be provided outside or distal with respect to the system 100. For example, when each of the processor 120 and memory 130 is configured with separate hardware parts, each hardware part may be connected via any network. Upon doing so, the type of the network may be any type. Each hardware part, for example, may be connected via a LAN, may be wirelessly connected, or may be wire connected. The system 100 is not limited to a specific hardware configuration. For example, it is within the scope of the present disclosure that the processor 120 is configured not by a digital circuit but by an analog circuit. The configuration of the system 100 is not limited to the discussion above as long as the function thereof can be materialized.

FIG. 3 shows an example of a processing 300 in a system 100 for augmenting supervisory data used for machine learning. The processing 300 enables augmentation of a plurality of supervisory data put into the system 100 for use in machine learning.

In step S301, the obtaining means 110 of the processor 120 obtains a plurality of supervisory data. The obtaining means 110, for example, obtains a plurality of supervisory data from outside the system 100. The obtaining means 110, for example, can obtain a plurality of supervisory data from a storage means that may be connected to the system 100, network, system for generating a pain estimation model, apparatus generating a pain classifier, or system generating a model for differentiation of the pain of an object. The obtained plurality of supervisory data is passed on to the processor 120.

In step S302, the first processing means 121 of the processor 120 derives a covariance matrix from the plurality of supervisory data obtained in step S301. Each of the plurality of supervisory data obtained by the obtaining means 110 has a plurality of features, wherein the plurality of supervisory data may be expressed with an n×d matrix. n is the number of supervisory data (number of samples) and d is the number of features included in each supervisory data. The first processing means 121 may derive a covariance matrix from the n×d matrix. In the derived covariance matrix, the diagonal component retains variance of each feature and the other components retain covariance between two features.

The derived covariance matrix is passed on to the second processing means 122 of the processor 120.

In step S303, the second processing means 122 of the processor 120 decomposes the covariance matrix derived in step S302. The second processing means 122, for example, can decompose a covariance matrix into Q*Q', wherein the matrix Q' is a transposed matrix of matrix Q. This decomposition may be any of, for example, Cholesky decomposition, LU decomposition, QR decomposition and singular value decomposition. When the decomposition is Cholesky decomposition, LU decomposition, or QR decomposition, the matrix Q or matrix Q' would be an upper triangular matrix as a result. The processing of when the decomposition is Cholesky decomposition, LU decomposition, or QR decomposition, is discussed in detail while referring to FIG. 4.

Alternatively, the second processing means 122 can, for example, decompose a covariance matrix into V*L*V', wherein matrix L is a diagonal matrix consisting of an eigenvalue, matrix V is a matrix having a corresponding right eigenvector vector in the column and matrix V' is a transposed matrix of matrix V. This corresponds to the act of carrying out the principal component analysis to a plurality of supervisory data. The processing of carrying out principal component analysis to a plurality of supervisory data is discussed in detail while referring to FIG. 5A and FIG. 5B.

The matrix of the result that has been decomposed is passed on to the third processing means 123 of the processor 120.

In this step S304, the third processor means 123 of the processor 120 applies a random number to a decomposed matrix. The third processing means 123 can apply a random number by multiplying the decomposed matrix by a random number matrix. The random number may be, for example, a normal random number. The third processing means 123 can, for example, apply a random number to the decomposed matrix Q or matrix Q'. For example, when the second processing method 122 carried out Cholesky decomposition, a random number can be applied to matrix Q' (upper triangular matrix) of the result that has been decomposed by Cholesky decomposition. For example, when the second processing means 122 carried out Cholesky decomposition, a random number can be applied to matrix Q (lower triangular matrix) of the result that has been decomposed by Cholesky decomposition. For example, when the second processing means 122 carried out LU decomposition, a random number can be applied to matrix Q' (upper triangular matrix) of the result that has been decomposed by the LU decomposition. For example, when the second processing means 122 carried out QR decomposition, a random number can be applied to matrix Q' (upper triangular matrix) of the result that has been decomposed by the QR decomposition. For example, when the second processing means 122 carried out singular value decomposition, a random number can be applied to matrix (U*W_)' of the result that has been decomposed by the singular value decomposition. For example, a random number can be applied to matrix sqrt(L) of the result that has been decomposed into V*L*V'. In this regard, sqrt( ) is a function employing a square root.

The number of the rows can be increased while retaining the relationship of features of a plurality of supervisory data in the matrix obtained as a result by multiplication by a random number having the number of rows that is wished to be reached. Since the rows correspond to the number of supervisory data (number of samples), it can be considered that the number of samples is augmented in the matrix obtained as a result.

Since the above-mentioned processing enables increase of the number of samples while retaining the relationship of features of a plurality of supervisory data, the prediction precision does not decrease even when machine learning is carried out using augmented data. In other words, the augmented data can be used as supervisory data significant in machine learning. This is especially useful when learning data obtained from an organism. This is because that the number of times of directly obtaining data from an organism can be decreased extremely. For example, when reaction data against stimulation is obtained, it is possible to obtain supervisory data in the amount that enables application to machine learning for predicting pain only by imposing stimulation on the organism several times. This can reduce burden on the organism.

FIG. 4 shows an example of a processing 400 in the system 100 for augmenting supervisory data used for machine learning. The processing 400 is a processing of when the second processing means 122 of the processor 120 decomposes a covariance matrix by one of Cholesky decomposition, LU decomposition and QR decomposition.

In step S401, the obtaining means 110 of the processor 120 obtains a plurality of supervisory data. Step S401 may be the same processing as the above-described step S301.

In step S402, the first processing means 121 of the processor 120 calculates the mean value for every feature from a plurality of supervisory data obtained in step S401. The mean value for every feature may be calculated by, for example, averaging the value of each column of the n×d matrix of a plurality of supervisory data.

In step S403, the first processing means 121 of the processor 120 derives a covariance matrix from the plurality of supervisory data obtained in step S301. Step S403 may be the same processing as the above-described step S302.

In step S404, the second processing means 122 of the processor 120 decomposes the covariance matrix derived from step S403. Specifically, the second processing means 122 of the processor 120 carries out one of Cholesky decomposition, LU decomposition and QR decomposition to the covariance matrix to derive an upper triangular matrix. For example, when a covariance matrix is decomposed into Q*Q' by Cholesky decomposition, matrix Q would become an upper triangular matrix. For example, when a covariance matrix is decomposed into Q*Q' by LU decomposition, matrix Q' would become an upper triangular matrix. For example, when a covariance matrix is decomposed into Q*Q' by QR decomposition, matrix Q' would become an upper triangular matrix.

In step S405, the third processing means 123 of the processor 120 applies a random number to the upper triangular matrix derived in step S404. The third processing means 123 can apply a random number, by for example, multiplying the upper triangular matrix by a normal random number matrix.

In step S406, the third processing means 123 of the processor 120 adds a mean value to each feature of the upper triangular matrix to which a random number has been applied in step S405. This enables recovery of information originally held by a plurality of supervisory data deleted by forming a covariance matrix of the plurality of supervisory data.

Since the above-described processing enables increase in the number of samples while retaining the relationship of features of a plurality of supervisory data, the prediction precision does not decrease even when machine learning is carried out using augmented data. In addition, decomposition of a covariance matrix by Cholesky decomposition not only enables augmentation of a sample by providing a random number to a decomposed upper triangular matrix, but also enables sample augmentation by applying a random number to a decomposed lower triangular matrix. This achieves the advantage of being able to augment more samples.

FIG. 5A shows an example of a processing 500 in the system 100 for augmenting supervisory data used for machine learning. The processing 500 is a processing of when the second processing means 122 of the processor 120 carries out principal component analysis.

In step S501, the obtaining means 110 of the processor 120 obtains a plurality of supervisory data. Step S501 is the same processing as the above-described step S301.

In step S502, the first processing means 121 of the processor 120 calculates a mean value for every feature from the plurality of supervisory data obtained in step S501. The mean value for every feature may be calculated by, for example, averaging the value of each column of the n×d matrix of a plurality of supervisory data.

In step S503, the first processing means 121 of the processor subtracts the mean value for every feature of the plurality of supervisory data obtained in step S502 from each feature of the plurality of supervisory data. The mean value for every feature may be, for example, subtracted from the value of the column of the n×d matrix of a plurality of supervisory data.

In step S504, the second processing means 121 of the processor 120 calculates a principal component space by carrying out principal component analysis to the plurality of supervisory data in which the mean value has been subtracted in step S503.

In step S505, the second processing means 122 of the processor 120 calculates the principal component score by projecting the plurality of supervisory data in which the mean value has been subtracted in step S503 to the principal component space calculated in step S504.

In step S506, the second processing means 122 of the processor 120 calculates the standard deviation based on the principal component score calculated in step S505.

In step S507, the third processing means 123 of the processor 120 applies a random number to the standard deviation calculated in step S506. The random number is, for example, a normal random number.

In step S508, the fourth processing means 124 of the processor 120 carries out projection conversion of the standard deviation to which a random number has been applied in step S507 and adds the mean value calculated in step S502 to the data that underwent projection conversion. This enables recovery of information originally held by the plurality of supervisory data deleted in the process of subtracting the mean value.

Since the above-described processing enables increase in the number of samples while retaining the relationship of features of a plurality of supervisory data, the prediction precision does not decrease even when machine learning is carried out using augmented data.

FIG. 5B shows a processing 510 which is equivalent to the processing 500. The processing 510 is a processing comprising derivation of a covariance matrix from a plurality of supervisory data and decomposition of the covariance matrix into V*L*V'.

In step S511, the obtaining means 110 of the processor 120 obtains a plurality of supervisory data. Step S511 is the same processing as the above-described step S501.

In step S512, the first processing means 121 of the processor 120 calculates a mean value for every feature from the plurality of supervisory data obtained in step S511. The mean value for every feature may be calculated by, for example, averaging the value of each column of the n×d matrix of a plurality of supervisory data. Step S512 is the same processing as the above-described step S502.

In step S513, the first processing means 121 of the processor 120 subtracts the mean value of every feature of the plurality of supervisory data obtained in step S512 from each feature of the plurality of supervisory data. The mean value of every feature may be subtracted from, for example, the value of the column corresponding to the n×d matrix of a plurality of supervisory data. Step S513 is the same processing as the above-described step S503.

In step S514, the first processing means 121 of the processor 120 derives a covariance matrix from the plurality of supervisory data in which a mean value has been subtracted in step S513. Step S514 may be the same process as the above-described step S302.

In step S515, the second processing means 122 of the processor 120 decomposes the covariance matrix derived in step S514 into V*L*V'. In this regard, matrix L is a diagonal matrix consisting of an eigenvalue, matrix V is a matrix having a corresponding right eigenvector vector in the column and matrix V' is a transposed matrix of matrix V.

In step S516, the third processing means 123 of the processor 120 applies a random number to the sqrt(L)=M of the L derived in step S515. In this regard, sqrt( ) is a function employing a square root. The third processing means 123 can apply a random number by multiplying M by a random number matrix.

In step S517, the fourth processing means 124 of the processor 120 multiplies M to which a random number has been applied in step S516 by matrix V' and adds the mean value calculated in step S512. This enables recovery of information originally held by the plurality of data deleted in the process of forming a covariance matrix.

Since the above-described processing enables increase in the number of samples while retaining the relationship of features of a plurality of supervisory data, the prediction precision does not decrease even when machine learning is carried out using augmented data.

Furthermore, the principal component analysis can be carried out only when the number of supervisory data (number of samples) n obtained by the obtaining means 110 and the number of features d included in each supervisory data would be n>d. When n<d, there is a need to add noise (e.g., 1/10 of the standard deviation or the like) to increase the number of data until n>d is achieved. In this regard, since the principal component analysis can also be carried out in the case of n<d when a covariance matrix is decomposed by Cholesky decomposition, LU decomposition, QR decomposition, or singular value analysis, the pre-processing of increasing data before decomposition is not required.

The above-described processing has been explained to be carried out in a specific order, but the present disclosure is not limited thereto. The above-described processing can be carried out in any logically possible order.

The above-described processing, for example, divides the supervisory data obtained by the obtaining means 110 into a plurality of subunits, wherein each processing may be caused to be carried out to each of the plurality of divided subunits. Upon doing so, sample augmentation can be completed by summing the total of the subunits that have been augmented.

The system 100 for augmenting supervisory data used for machine learning described above can be used, for example, for augmenting the data obtained by an organism in machine learning of the data obtained from the organism. The data obtained from the organism may be, for example, brainwave data, MRI image data, or gene expression data, and may be, for example, brainwave data or MRI data of when pain is applied to the organism.

An embodiment of estimating pain from brainwave data of when pain is applied to an organism is explained below.

First, the relationship between pain due to electrical stimulation and brainwaves is described. The data provided hereinafter shows data for one representative subject from a plurality of subjects.

FIG. 6A is a graph showing the relationship between electrical stimulation and pain level (VAS). FIG. 6B is a graph showing the relationship between electrical stimulation and pain level (paired comparison). FIG. 1C is a graph showing the relationship between electrical stimulation and brainwave amplitude. FIG. 6D is a graph showing an example of a waveform of a brainwave.

The horizontal axes of FIGS. 6A, 6B, and 6C indicate the value of current of electrical stimulation. The vertical axis of FIG. 6A indicates the pain level reported by the subject in accordance with VAS. The vertical axis of FIG. 6B indicates the pain level reported by the subject in accordance with paired comparison. The vertical axis of FIG. 6C indicates the value of brainwave amplitude. In FIG. 6D, the horizontal axis indicates time, and the vertical axis indicates signal levels.

Paired comparison is a method of using two magnitudes of electrical stimulation as a set and having a subject report which electrical stimulation is how much more painful by a numerical value for each of a plurality of sets of electrical stimulation. In such a case, pain levels are reported by comparing two pains, so that the effect of past experience of a subject with respect to pain levels can be mitigated.

As shown in FIGS. 6A and 6B, the relationship between the value of current of electrical stimulation (i.e., intensity of stimulation) and pain level is represented roughly by a sigmoid (S-shaped) curve, regardless of which of VAS or paired comparison method is used. The shape of the sigmoid curve (e.g., the upper limit value and lower limit value, and the like) varies depending on the subject.

As shown in FIG. 6C, the relationship between the value of current of electrical stimulation and the value of brainwave amplitude is also roughly represented by a sigmoid curve. In this regard, the difference between the maximum peak value and minimum peak value (i.e., peak-to-peak value) is used as the value of brainwave amplitude. For example in FIG. 6D, the maximum value of difference (N1–P1) among three differences (N1–P1, N2–P2, and N1–P2) is used as the value of amplitude.

In this manner, the relationship between the intensity of electrical stimulation and pain level and the relationship between the intensity of electrical stimulation and the value of brainwave amplitude are both represented by a sigmoid curve. In other words, pain levels and brainwave amplitude both have an upper limit and lower limit to electrical stimulation and exhibit a similar change with respect to the intensity of electrical stimulation. In this regard, the relationship between the value of brainwave amplitude and pain level, when analyzed, was represented as shown in FIGS. 6E and 6F.

FIG. 6E is a graph showing the relationship between pain level due to electrical stimulation (VAS) and brainwave amplitude. FIG. 6F is a graph showing the relationship between pain level due to electrical stimulation (paired comparison) and brainwave amplitude. In FIGS. 6E and 6F, the horizontal axis indicates the brainwave amplitude, and the vertical axis indicates the pain level.

As shown in FIGS. 6E and 6F, the pain level due to electrical stimulation and the value of brainwave amplitude have linearity for both VAS and paired comparison. In other words, the value of brainwave amplitude is proportional to the pain level.

As used herein, linearity includes strict linearity as well as substantial linearity. In other words, linearity includes relationships that can be approximated to linearity within a given range of error. A given range of error is defined, for example, by a coefficient of determination $R^2$ in regression analysis. The coefficient of determination $R^2$ is a value found by subtracting 1 from a result of dividing the Residual Sum of Squares by total Sum of Squares of the difference in the observed value from the mean value. The give range of error is, for example, a range where $R^2$ is 0.5 or greater.

For the relationship between pain due to thermal stimulation and brainwaves, the pain level and brainwave amplitude also have linearity in the same manner as electrical stimulation.

FIG. 6G is a graph showing the relationship between the pain level due to thermal stimulation (VAS) and brainwave amplitude. FIG. 6H is a graph showing the relationship between the pain level due to thermal stimulation (paired comparison) and brainwave amplitude. In FIGS. 6G and 6H, the horizontal axis indicates the brainwave amplitude, and the vertical axis indicates the pain level.

As shown in FIGS. 6G and 6H, the pain level due to thermal stimulation and the value of brainwave amplitude have linearity for both VAS and paired comparison. While the upper limit value and lower limit value of the value of brainwave amplitude have variations depending on the subject, the inventors found through previous experiments that the upper limit value of amplitude does not exceed about 60 µV.

In this manner, this embodiment has elucidated that brainwave amplitudes and pain have a specific relationship as a result of analyzing the relationship between values of brainwave amplitude and pain levels from evaluation of a plurality of types of pain by a plurality of methods. In addition, the present disclosure found that a pain classifier for estimating the magnitude of pain can be calculated based on the specific relationship between brainwave amplitudes and pain. Upon doing so, the methodology of the sample augmentation described above can be incorporated.

Figure 10:
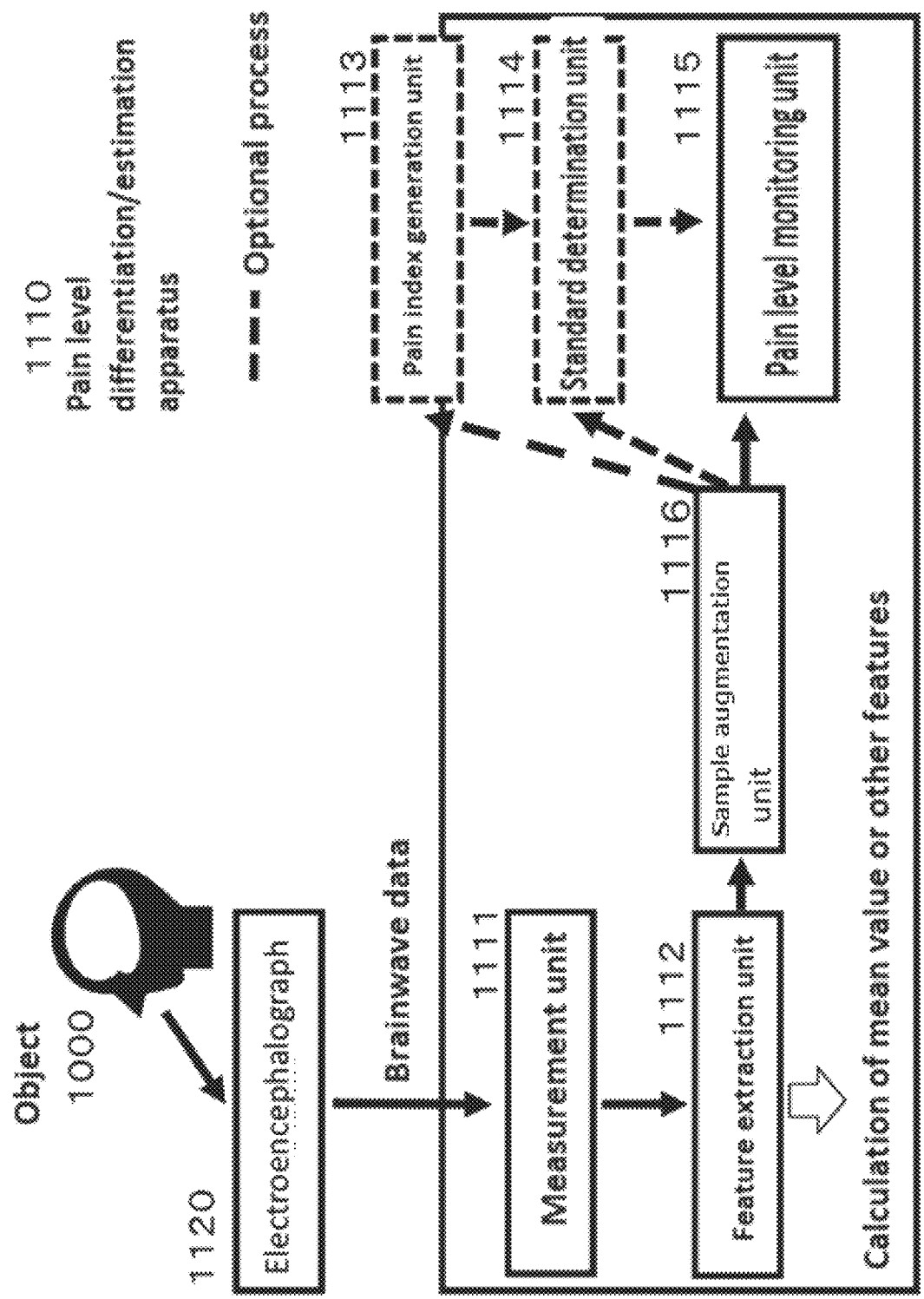
FIG. 10 is a block diagram of the configuration of the apparatus of the present disclosure.

A pain level differentiation/estimation apparatus 1110 for monitoring pain of an object being estimated based on a brainwave of the object being estimated of the present disclosure comprises: A) a brainwave data measurement unit 1111 for obtaining brainwave data or analysis data thereof of the object being estimated; B) a feature extraction unit 1112 for retrieving feature based on the brainwave data and analysis data thereof (e.g., electrical potential, frequency, others, a mean value (e.g., arithmetic/geometric mean potential) to obtain a temporal change of a mean value (e.g., arithmetic/geometric mean potential) in a specific time frame), and optionally a pain index generation unit 1113, and optionally a pain monitoring standard determination unit 1114 for determining a baseline of monitoring using a pain index (e.g., degree of feature indicating a strong level of pain or the like) for chronologically evaluating or monitoring a level of pain of the object being estimated from the brainwave data; and C) a pain level monitoring unit 1115 for monitoring a level of pain of the object being estimated from the brainwave data or analysis data thereof. The brainwave data measurement unit 1111 performs step S100 of FIG. 9, the feature extraction unit 1112 performs step S200, the pain index generation unit 1113 optionally generates a pain index, a standard determination unit optionally determines a standard (step S300), and the pain level monitoring unit 1115 performs step S400. The pain level monitor unit 1115 may be caused to, for example, monitor the level of pain based on the temporal change of the mean value of the feature. The feature extraction unit and pain level monitor unit and optional pain index generation unit and standard determination unit may be configured so that the same part has three functions, or configured as separate parts. A pain index generation unit and standard determination unit are optional parts, so that a pain index and/or a standard value (baseline) can be introduced or received from an external source. Sample augmentation can be applied to the data obtained by the brainwave data measurement unit 1111. The sample augmentation may be applied in the brainwave data measurement unit 1111, or may be applied in a different configuration unit such as the feature extraction unit 1112, the pain index generation unit 1113, or the pain monitoring standard determination unit 1114, or a sample augmentation unit 1116 may be provided independently as shown in FIG. 10. The sample augmentation unit 1116 performs, for example step S250. Sample augmentation is efficient and preferred to be carried out after completion of the feature extraction processing by the feature extraction unit 1112.

FIG. 10 is a block diagram showing the functional configuration of the system 1100 comprising a pain level differentiation/estimation apparatus of one embodiment. The system 1100 comprises the pain level differentiation/estimation apparatus 1110 and an electroencephalograph 1120. An electroencephalograph can be configured to be separate from the pain level differentiation/estimation apparatus in this manner.

The apparatus 1110 comprises the measurement unit 1111, the feature extraction unit 1112, the pain index generation unit 1113, the standard determination unit 1114, and the pain level monitoring unit 1115. The apparatus 1110 is materialized by, for example, a computer comprising a processor and a memory. In such a case, the apparatus 1110 makes the processor function as the measurement unit 1111 and the feature extraction unit 1112, and optionally the pain index generation unit 1113 and the standard determination unit 1114 when a program stored in the memory is implemented by the processor. The apparatus 1110 can also be materialized by, for example, a dedicated electrical circuit. A dedicated electrical circuit can be a single integrated circuit or a plurality of electrical circuits. The amplitude data measurement unit 1111 and the pain index generation unit 1113 for providing a pain index to the standard determination unit can be configured internally or externally. Sample augmentation can be applied to data obtained at the measurement unit. Sample augmentation may be applied in the measurement unit 1111, or may be applied at a different configuration such as the feature extraction unit 1112, the pain index generation unit 1113, or the standard determination unit 1114, or a sample augmentation unit 1116 may be independently provided.

The measurement unit 1111 obtains a plurality of brainwave data by measuring a brainwave from an object being estimated 1000 via the electroencephalograph 1120. The object being estimated 1000 is an organism in which a change in brainwave is induced by pain, which can be an organism having a pain sensing nerve (e.g., vertebrae such as mammals and avian (including livestock animals, pet animals, and the like) and is not limited to humans.

The feature extraction unit 1112 generates each type of feature (e.g., a mean value of brainwave data in an appropriate time frame). The unit optionally provides a feature to the pain index generation unit 1113 and the pain monitoring standard determination unit 1114 for a higher level model based pain level differentiation/estimation (machine learning or the like) or online monitoring of pain level. When calculating a mean value, the mean value can be calculated by a methodology that is well known in the art. An algorithm for such a calculation method can be stored in advance in the feature extraction unit 1112 or inputted upon use via a medium or a communication function. In other words, when using a mean value, the feature extraction unit 1112 can generate a feature for pain trend monitoring including mean data. The pain level monitoring unit 1115 tracks a feature including calculated mean data to contribute to a supervisor monitoring or evaluating subjective pain of an object. The monitoring unit 1115 can express the output results of the standard determination unit 1114 as individual number (pain level of 0 to 100 or the like) or a change in numbers.

The electroencephalograph 1120 measures the electrical activity generated in the brain of an object being estimated with an electrode on the scalp. The electroencephalograph 1120 then outputs brainwave data, which is the result of measurement in concert with the measurement unit 1111.

The process or method of the apparatus configured in such a manner can execute the flow chart showing the series of processes exemplified in FIG. 9. In other words, S100 to S400 of FIG. 9 can be executed with the apparatus shown in FIG. 10.

The present disclosure can be utilized as a medical apparatus with the configuration exemplified in FIG. 10. For example, data is obtained from a subject undergoing pain evaluation and sample augmentation is carried out. The mean is calculated as needed. The method of calculating the mean value in such a case can be performed while monitoring the data or performed after accumulation of data to a certain degree, or both. Herein, after the sample is augmented, a mean value or another feature is calculated, and the point of time where the pain level is strong is identified based on a pain index, so that a baseline of pain trend can be determined. Furthermore, after calculating a mean value or another feature, sample augmentation is carried out and the point of time where the pain level is strong is identified based on a pain index, so that a baseline of pain trend can be determined. It is more efficient and preferred that sample augmentation is carried out after calculating the feature. In other words, brainwave data (or analysis data thereof) is obtained from the electroencephalograph 1120 and measured at the measurement unit 1111. A feature or the like is extracted from the measurement value at the feature extraction unit 1112. Sample augmentation can be carried out after obtainment or measurement or brainwave data or analysis data thereof, or after extraction of feature. Optionally, a pain index can be generated at the pain index generation unit 1113 from the feature, and a baseline to be used as the standard for pain level monitoring can be determined using the index at the standard determination unit 1114. With a specific embodiment using a hierarchical pain trend monitoring methodology, when a model is already determined, a trend of pain levels can be monitored online as soon as a baseline is obtained or determined.

OTHER EMBODIMENTS

The pain estimation apparatus according to one or more embodiments of the present disclosure has been described based on the embodiments, but the present disclosure is not limited to such embodiments. Various modifications applied to the present embodiments and embodiments constructed by combining constituent elements in different embodiments that are conceivable to those skilled in the art are also encompassed within the scope of one or more embodiments of the present disclosure as long as such embodiments do not deviate from the intent of the present disclosure.

Some or all of the constituent elements of the pain estimation apparatus in each of the above embodiments can be comprised of a single system LSI (Large Scale Integration). For example, the apparatus 1110 can be comprised of system LSI having the measurement unit 1111, mean data obtaining unit 1112, the pain monitoring standard determination unit 1114 and pain level monitoring unit 1115.

System LSI is ultra-multifunctional LSI manufactured by integrating a plurality of constituents on a single chip, or specifically a computer system comprised of a microprocessor, ROM (Read Only Memory), RAM (Random Access Memory), and the like. A computer program is stored in a ROM. The system LSI accomplishes its function by the microprocessor operating in accordance with the computer program.

The term system LSI is used herein, but the term IC, LSI, super LSI, and ultra LSI can also be used depending on the difference in the degree of integration. The methodology for forming an integrated circuit is not limited to LSI. An integrated circuit can be materialized with a dedicated circuit or universal processor. After the manufacture of LSI, a programmable FPGA (Field Programmable Gate Array) or reconfigurable processor which allows reconfiguration of the connection or setting of circuit cells inside the LSI can be utilized.

If a technology of integrated circuits that replaces LSI by advances in semiconductor technologies or other derivative technologies becomes available, functional blocks can obviously be integrated using such technologies. Application of biotechnology or the like is also a possibility.

One embodiment of the present disclosure can be not only such a pain index generation, pain differentiation/classification apparatus, but also a pain index generation, pain level monitoring method using characteristic constituent units in the pain differentiation/estimation apparatus as steps. Further, one embodiment of the present disclosure can be a computer program for implementing each characteristic step in the pain index generation, pain level monitoring method on a computer. Further, one embodiment of the present disclosure can be a computer readable non-transient recording medium on which such a computer program is recorded.

In each of the embodiments described above, each constituent element can be comprised of a dedicated hardware or materialized by implementing software program that is suited to each constituent element. Each constituent element can be materialized by a program implementation unit such as a CPU or a processor reading out and implementing a software program recorded on a recording medium such as a hard disk or semiconductor memory. In this regard, software materializing the pain differentiation/estimation apparatus of each of the embodiments described above is a program such as those described below.

Specifically, this program makes a computer implement a method of monitoring pain of an object being estimated based on a brainwave of the object being estimated, comprising: a) measuring or obtaining brainwave data or analysis data thereof by measuring brainwaves in response to stimulation from the object being estimated, b) obtaining a temporal change of a mean value (e.g., arithmetic/geometric mean potential) of the brainwave data or analysis data thereof in a specific time frame (and optionally extracting a feature for temporal change in the mean value), and optionally generating a pain index (e.g., degree of feature indicating a strong pain level) for chronologically evaluating or monitoring a level of pain of the object being estimated from brainwave data and optionally determining a baseline of monitoring, and c) optionally monitoring a level of pain of the object being estimated from the brainwave data based on the baseline determination process.

The present disclosure provides a recording medium storing a program for implementing a method of monitoring pain of an object being estimated based on a brainwave of the object being estimated on a computer. The program makes the computer implement the method of monitoring pain of an object being estimated based on a brainwave of the object being estimated, comprising: a) measuring or obtaining from the object being estimated brainwave data or analysis data thereof by measuring a brainwave in response to stimulation; b) obtaining and plotting a feature based on brainwave data or analysis data thereof (e.g., a temporal change of a mean value (e.g., arithmetic/geometric mean potential) of the brainwave data or analysis data thereof in a specific time frame, wherein extraction of a feature for obtaining a temporal change of the mean value when appropriate may be carried out), wherein sample augmentation of a feature based on the brainwave data or analysis data thereof may be carried out after a) or after b), and then, optionally generating a pain index (e.g., degree of feature indicating a strong pain level) for chronologically evaluating or monitoring a level of pain of the object being estimated from brainwave data and optionally determining a baseline of monitoring; and c) monitoring a level of pain of the object being estimated from the brainwave data or analysis data thereof based on a change in the mean value over time.

It is understood that the method implemented herein can use one or a combination of a plurality of any of the embodiments described regarding the system 100 for augmenting supervisory data used for machine learning of the present disclosure.

In another aspect, the present invention provides a method of generating a model for differentiating pain of an object, comprising:

a) the step of obtaining brainwave data or analysis data thereof from the object;

b) the step of contracting features based on the brainwave data or analysis data thereof with respect to the pain after determining a feature coefficient associated with the pain as needed;

c) augmenting the brainwave data or analysis date thereof, the features before contracting, or the features that have been weighted after the contracting or combination thereof, comprising:

i) deriving a covariance matrix from brainwave data or analysis data thereof, or the features that have been weighted after the contracting or combination thereof;
ii) decomposing the covariance matrix; and
iii) applying a random number to the decomposed matrix;
d) the step of creating a differentiation analysis model by machine learning and examination based on the features that have been weighted after the contracting or combination thereof; and
e) the step of determining a differentiation analysis model achieving a predetermined precision.

Furthermore, in another aspect, the present disclosure provides a method of generating a model for differentiating pain of an object, comprising:
a) the step of obtaining brainwave data or analysis data thereof from the object;
b) the step of extracting features based on the brainwave data or analysis data thereof;
c) augmenting the features, comprising:
i) deriving a covariance matrix from the features;
ii) decomposing the covariance matrix; and
iii) applying a random number to the decomposed matrix;
d) the step of determining a feature coefficient from the augmented features to carry out contraction with respect to the pain as needed;
e) the step of creating a differentiation analysis model by machine learning and examination based on the features that have been weighted after the contracting or combination thereof; and
f) the step of determining a differentiation analysis model achieving a predetermined precision.

In one embodiment, the present disclosure is characterized by performing the contraction, after determining the feature coefficient, by repeating differentiation and estimation, calculating a mean of and ranking the feature coefficients for the differentiation and estimation, and selecting a feature based on a given threshold value in step b). The feature coefficients are determined by, preferably but not limited to, machine learning.

Examples of machine learning include Support Vector Machine (SVM), neutral network, deep learning, logistic regression, reinforcement learning, and the like.

In another embodiment, the present disclosure comprises, upon determining the feature coefficients in b), determining a hyperparameter resulting in the highest differentiation accuracy, and determining the feature coefficients based on the hyperparameter, and excluding a feature which has no effect or a low ratio of contribution for differentiation. The feature coefficients and the hyperparameter are determined by, preferably but not limited to, machine learning.

In another embodiment of the present disclosure, b) to e) comprise: (C1) dividing the features and data corresponding to the pain corresponding to the features into data for learning and data for testing; (C2) performing machine learning using the learning data to create a differentiation model and calculating an optimal λ value (and a partial regression coefficient, a regression equation, and a model intercept); (C3) calculating differentiation accuracy of the differentiation model by using the data for testing; (C4) if there is a target sample with the differentiation accuracy at or below a chance level in the objects, repeating steps C1 to C3 after excluding the sample, and if there is no sample at or below a chance level, ending the steps to determine a differentiation model, wherein the chance level is a numerical value obtained by dividing 100% by the number of classifications. In this regard, the chancel level refers to a value obtained by dividing 100% by the number of classifications. This is verification to avoid accidental match. Such a backward elimination method is also useful for generation of a differentiation model in the present disclosure. The sample augmentation of the present disclosure can also be applied upon making data for learning.

A model created based on the method of the present disclosure, albeit just one example, can materialize 70% accuracy even with few features, such that the significance thereof is high. There are several method of ranking and selecting features other than the methodologies of the present disclosure. For example, machine learning (SVM-RFE) disclosed as a comparative example is a more complex method of actually creating a differentiation model using features while calculating and ranking a weighting coefficient of each feature. Unlike such a method, one of the feature of the present disclosure is in first finding the robustness of a change pattern of brainwave features before differentiating and analyzing by contracting (e.g., using the neuron firing principle, the "all-or-none" law, as the selection criteria) based on the most basic property of classification instead of ranking features by differentiation.

With regard to contracting before or after, it is more advantageous to perform the contracting of the present disclosure first. As a reason thereof, the present disclosure is characterized by fitting features by contracting (e.g., sigmoid function) and then extracting an all-or-none feature, and determining select few differentiation models by machine learning, such that calculation can be simple. Meanwhile, if fitting such as sigmoid fitting is performed after, sigmoid would be used to identify how many all-or-none patterns the features used in a differentiation pattern have (or approximate) rather than used for contracting. In such a case, machine learning is performed, individual feature or a plurality of features are used to determine the feature or differentiation model with the highest accuracy, a sigmoid function is fitted to the feature with high differentiation accuracy, the robustness of the feature is found, and if it is desirable to make an economical differentiation model, only features with a high degree of fit are selected to re-run machine learning. Thus, the calculation cost would be high and the learning process would be inefficient. In this manner, if sigmoid fitting of features or the like additively materialize previous to "machine learning process with contracting of the number of features", an addition procedure for futilely performing machine learning would be required so that the calculation cost would be high. In view of the above, it is more advantageous to perform the contracting of the present disclosure first. In addition, in the case of an embodiment carrying out contraction, sample augmentation is more efficient when carried out after the contraction, and is thus advantageous. By carrying out sample augmentation right before carrying out machine learning, the machine learning can be carried out in a state in which there are enough samples.

For example, sample augmentation can be carried out before the contraction. In this case, sample augmentation may be carried out for the purpose of how high the precision should be upon carrying out the contraction. In this case, the more the sample is augmented, the higher the calculation cost for the contraction may be.

For example, sample augmentation and contraction may be carried out alternately. For example, a sample is carried out before the contraction, wherein if the sample is not enough, sample augmentation can be additionally carried out again after the contraction.

For contracting, for example correlation between features can be studied to consolidate those with high correlation, or a primary factor can be found by deleting one of the features or performing factor analysis or the like (e.g., 10 factors from 100 data or the like). Contracting can also be materialized as in the above example by using a sigmoid function or the like to find only features that are in accordance with a specific reaction pattern model and use the features in the model. While various specific patterns can be set, differentiation of "0 or 1" such as having pain or no pain can be used for pain. In this regard, a sigmoid function (example of logistic regression) or step function can be used for 0 or 1. A sigmoid function is created with "0, 1" and approximated. If a statistically significant approximation is observed, this can be used in a model. "All-or-none", in other words, can be expressed as reacting at two values of "0 or 1" to specific stimulation, which can be considered a feature indicating a digital discrete reaction. When contracting, contracting can be kept within a certain range by determining the target objective. For example, contracting can be expressed as "contracting with respect to pain" or "contracting with respect to pain stimulation".

Figure 14:
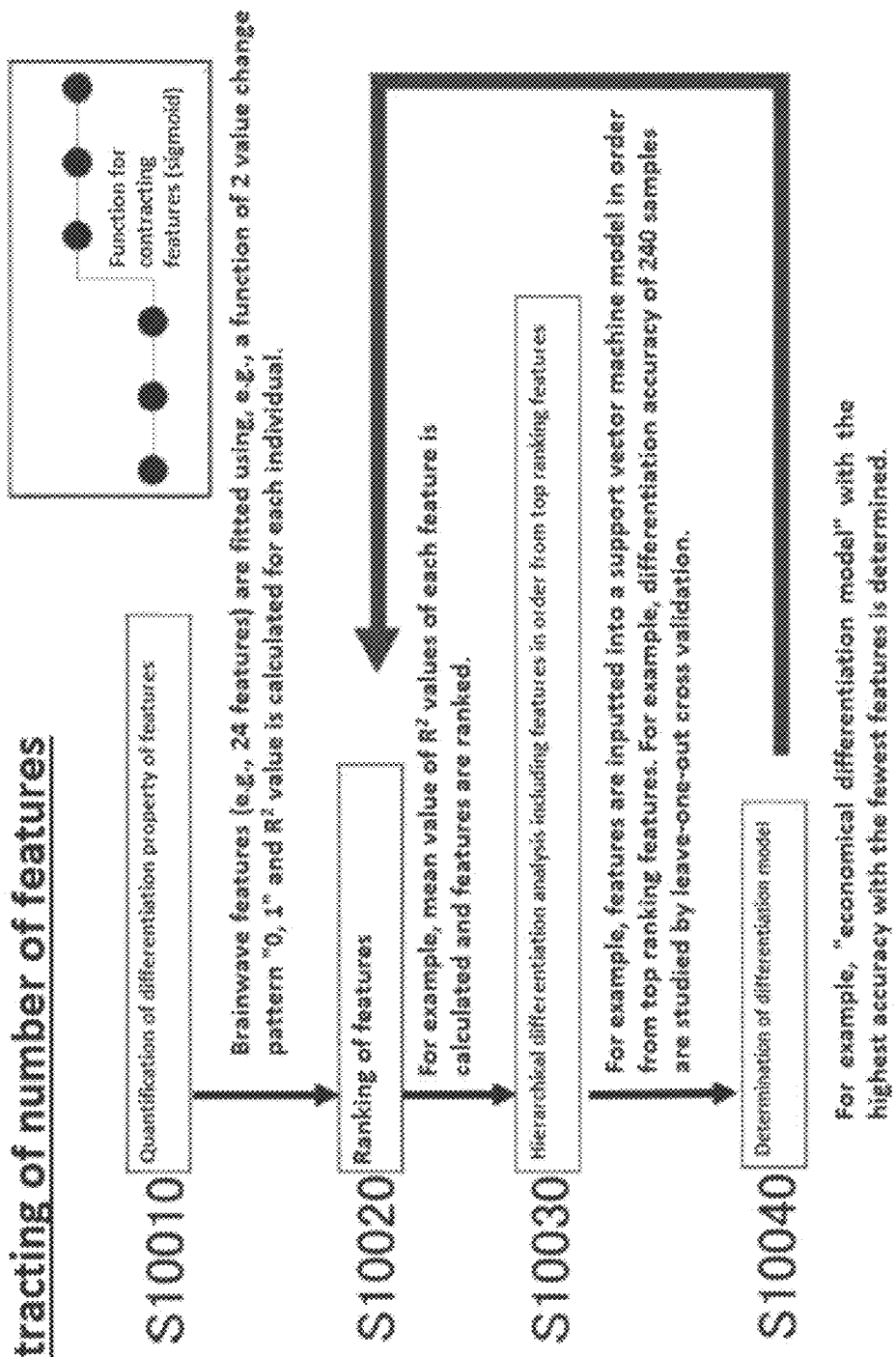
FIG. 14 shows the flow of differentiation analysis with a process for contracting the number of features.

The example described above is function approximation for the purpose of contracting features. Meanwhile, for identification of an optimal differentiation model, a change in differentiation accuracy of a plurality of differentiation models (from a model with few features to a model with the maximum number of features) can be approximated to a function to select an economical model. For example, the sigmoid function materializing binomial classification described above can be used for function approximation. A sigmoid function is an elemental function used at various levels, which can certainly be a neuron firing principle, as well a pain reaction function, pain differentiator, or pain occurrence function (see FIG. 13), a feature contracting tool described above (see FIG. 14), or can be related to the selection process of a differentiation model described herein. Therefore, in a preferred embodiment, an asymptote of the minimum value and maximum value is derived by sigmoid approximation by first limiting the inflection area to that with a relatively large inflection range (amplitude). Next, the variation in differentiation accuracy is expressed as a representative value (minimum value, maximum value), and the value of improvement in differentiation accuracy (maximum value−minimum value) is calculated, and with the maximum value as the threshold value, the number of features that first exceeds this value can be presented as an economical differentiation model attaining the maximum gain in the percentage of improvement.

The step of differentiating and analyzing by machine learning and cross validation from top of ranking of weighting coefficients (including approximation coefficients; e.g., regression coefficients) of each feature after the contracting or combination thereof can differentiate and analyze by creating a ranking of features after contracting (or combination thereof) and weighting coefficients and performing cross validation thereon by machine learning or the like.

In one embodiment, the present disclosure further comprises, after step c), calculating a value of difference (Diff) of adjacent models in differentiation accuracy obtained by differentiating and analyzing, wherein the adjacent models are models comprising n−1 features and n features, wherein n is 2 or greater, and wherein judgment of a differentiation model in step d) takes into consideration the difference. In this regard, the value of difference is implemented in software such as the MATLAB function Diff or the like as is well known in the art. This is a function for "continuously subtracting adjacent numerical values". In other words, the Diff function is one of the functions implemented in MATLAB for finding the value of difference of adjacent values while shifting by one point. This function mathematically corresponds to "differentiation" and mechanically corresponds to "speed". While the usage varies, for signal processing, this can be used to find a rapid or discontinuous (or stepwise) inflection point in a time series or spatial data distribution. For sigmoid functions, the Diff function is effective for finding an inflection area. The function can also be used to find a temporal or spatial point where the feature dramatically changes in brainwaves.

In one embodiment, taking into consideration of the value of difference comprises a process of re-ranking features from values with a greater value of difference and recalculating differentiation accuracy to generate a model with higher differentiation accuracy.

In one embodiment, the judgment based on the value of difference comprises classifying the features into a main feature and supporter features and re-ranking the supporter features. In this regard, a feature with a number one ranking or a feature with significant correlation thereto can be selected as the main feature and others can be selected as supporter features for re-ranking based on a value of difference of n feature model and n−1 feature model when supporter features are inputted. For example, the function Diff implemented in MATLAB or the like can be used. For example, the number 1 ranking can be fixed and the rest can be used as supporters. Therefore, the single main feature, or the combination of the main feature and other supporter features can be used.

As used herein, the number 1 ranking feature after rearranging by $R^2$ values is referred to as the single main feature. Since top ranking features exhibiting significant correlation with the single main feature have a similar differentiation pattern, such a group of features that is not limited to one single main feature can also be collectively the main feature. In such a case, number 1 ranked feature and features that exhibit significant correlation thereto can be the main feature.

In one embodiment, the method of the present disclosure comprises, after the re-ranking, changing the features and repeating step c).

In another embodiment of the present disclosure, the method comprises, after the re-ranking, changing the features and performing machine learning (linear, logistic regression, support vector machine, or the like) and cross validation to calculate differentiation accuracy of each model. After re-ranking, a feature is increased one at a time to perform machine learning (linear, logistic regression, support vector machine, or the like) and cross validation to calculate differentiation accuracy of each model. The most accurate model can be selected thereby. In the present disclosure, any machine learning can be used. Linear, logistic, support vector machine (SVM) or the like can be used as supervised machine learning. The sample augmentation methodology of the present disclosure can also be provided in an aspect of carrying out such machine learning.

In one embodiment, the step described above can be repeated at least once. In this regard, the ranking of features has changed, so that only the inputted feature would be different. The sample augmentation of the present disclosure can be re-applied upon repetition.

Once model candidates are calculated, a model attaining a given accuracy can be optionally determined to generate a model of interest.

A given accuracy can be appropriately determined in accordance with the objective. A model with the highest accuracy and fewest number of features, a model with the highest accuracy, or the like can be determined. For example, if there are a plurality of differentiation models that attain the same or same degree of differentiation accuracy, it is preferable to select a model comprising the fewest number of features (this is referred to as the economical standard).

Thus, one embodiment comprises selecting a model with fewer types of features among models that attain a give accuracy.

In another embodiment, the given differentiation accuracy comprises the highest accuracy. Contracting can be characterized by extracting an effective feature. More specifically, contracting is characterized by selecting a feature close to all or none corresponding to having pain or no pain, i.e., two value feature. To extract a feature associated with a subordinate classification within having pain or no pain, the same process can be repeated to further recursively perform contracting.

In one embodiment, the weighting coefficient is used in the same meaning as an approximation index of a differentiation function, and is selected from the group consisting of an $R^2$ value, a correlation coefficient, a regression coefficient, a residual sum of squares (difference between differentiation function and feature), and the like.

In another embodiment, a differentiation function (model) is selected from the group consisting of a sigmoid function, step function, and the like.

In still another embodiment, a model approximation index is a subset of weighting coefficients, and is selected from the group consisting of an $R^2$ value, a correlation coefficient, a regression coefficient, a residual sum of squares, and a subset thereof.

In still another embodiment, the effective feature, for binomial classification, is presence or absence corresponding to having pain or no pain, i.e., a 2 value feature, or a feature with higher approximation to a differentiation function.

Figure 15:
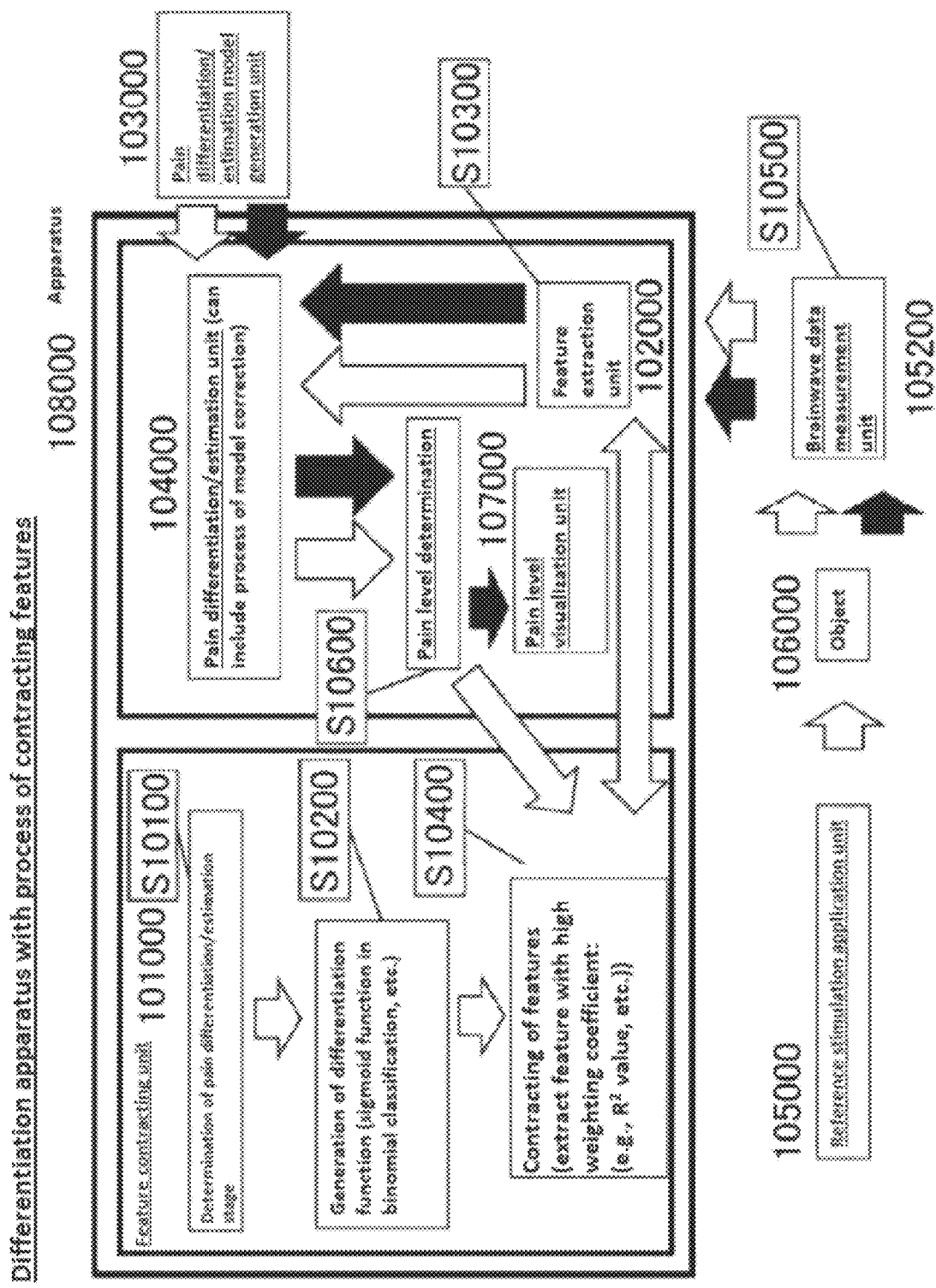
FIG. 15 shows a schematic diagram of a differentiation apparatus with a process for contracting features.

FIG. 15 describes a schematic diagram of the apparatus of the present disclosure (differentiation apparatus with a process of contracting features) (101000 to 108000) (it should be noted that some of the configuration diagrams are optional constituents that can be omitted). In this schematic diagram, each step is described when appropriate (S10100 to S10600).

This apparatus is comprised of a feature contracting unit 101000, feature extraction unit 102000, pain differentiation/estimation model generation unit 103000, pain differentiation/estimation unit (can comprise a model correction process) 104000, reference stimulation application unit 105000, brainwave data measurement unit 105200, and pain level visualization unit 107000. An object is denoted as 106000.

In such differentiation with a process of contracting, the number of pain differentiation/estimation stages (2 stages, 3 stages, or the like) is determined (S10100), and a differentiation function is generated (examples include sigmoid functions in binomial classification and the like; S10200). A feature is obtained after a reference stimulation (electrical stimulation or the like) is applied to the object 106000 from the reference stimulation application unit 105000 in accordance with the differentiation stage determined at S10100, and a feature related to a pain stage is collected (S10300) and contracted (S10400). Sample augmentation may be carried out after collecting feature, or may be carried out after contraction. The collected feature is approximated by a differentiation function generated at S10200 and ranked in accordance with the magnitude of the obtained approximation coefficient (regression coefficient or the like). Features are used in order from the top features. The pain level of reference stimulation is differentiated and estimated with the pain differentiation/estimation unit 104000, and a differentiation model with the number of features with the highest differentiation accuracy is used for monitoring pain. This is one embodiment of the process of contracting features S10400. A differentiation model (algorithm) installed in a pain differentiation/estimation unit used in the process of contracting (white arrows) and actual pain monitoring process (black arrows) is created at the pain differentiation/estimation model generation unit 103000, and installed in the pain differentiation/estimation unit 104000. A differentiation model may be created using, for example, a plurality of supervisory data augmented by the system 100 for augmenting supervisory data used for machine learning described above. After completion of the preprocessing described above at the feature contracting unit 101000, actual pain related brainwave data is collected from the object 106000 at the brainwave data measurement unit 105200 comprising an electroencephalograph or the like (S10500). This is transmitted to the feature extraction unit 102000 and converted to a feature selected in the process of contracting amplitudes or frequencies (e.g., specific amplitude or frequency band of specific electrodes or the like). The extracted feature is taken into the pain differentiation/estimation unit 104000 (can comprise a model correction process) from the feature extraction unit 102000, and a pain level is determined (S10600). The result of the determination is indicated as a trend of changes or numerical value (e.g., 1 to 100) at the pain level visualization unit 107000.

The determination of pain differentiation/estimation stages at S10100 determines the number of levels to be differentiated or estimated (e.g., 2 stages, 3 stages, or the like).

The generation of a differentiation function at S10200 creates a differentiation function used in accordance with the number of differentiation levels of S10100 (sigmoid function or step function in binomial classification or the like).

The collection of pain stage related features at S10300 applies reference stimulations (electrical stimulation or the like) a plurality of times from the reference stimulation application unit 105000 to the object 106000 in accordance with the number of levels determined at S10100 to collect related brainwave features.

In contracting of features at S10400, features obtained at S10300 are approximated with a differentiation function, features with a high approximation index (e.g., $R^2$ value or the like) are ranked, and features are inputted into the pain differentiation/estimation unit 4104000 in order from top ranking features to differentiate and estimate a level of reference stimulation. A model with a number of features with the highest differentiation accuracy thereamong is used for actual pain differentiation/estimation.

For collection of pain related brainwave data at S10500, actual pain related brainwave data subjected to monitoring of pain is collected after completion of the contracting process at the feature contracting unit 101000. This step is data collection in an actual pain monitoring process. Sample augmentation may be applied to data collected by this data collection.

For pain level determination at S10600, actual pain related data obtained at S10500 is processed at the feature extraction unit 102000 to obtain a feature set and then differentiated and estimated at the pain differentiation/estimation unit 104000, a pain level is quantified from an estimated value, and a pain level is determined and made visible at the pain level visualization unit 107000.

The apparatus 108000 is configured to comprise or to be connected to an electroencephalograph that is or can be connected to the object (106000), so that brainwave data synchronized with stimulation emitted from the reference stimulation application unit 105000 to the object (106000) is obtained at the brainwave data measurement unit 105200. This is the summary of the apparatus 108000.

The apparatus 108000 can comprise a brainwave measurement unit, which internally comprises or externally connects to a brainwave recording sensor and optionally a brainwave augmentation unit, and process signals of a pain related brainwave and differentiate/estimate pain in the apparatus 108000. The brainwave augmentation unit may be caused to augment the signal intensity of the brainwave and the processing of the above-described sample augmentation may be carried out to the brainwave.

In the apparatus 108000, collected brainwave signals are processed to extract a brainwave feature at the feature extraction unit 102000. Upon extraction, a feature contracted in advance at the feature contracting unit 101000 is selected. Further, pain is (optionally) made visible at the pain level visualization unit 107000. The apparatus internally or externally comprises the reference stimulation application unit 105000, which applies reference stimulation such as electrical stimulation a plurality of times in accordance with the pain level determined at S10100 in order to contract features that are effective for monitoring pain of the object 106000. Brainwave data related thereto is recorded at the brainwave data measurement unit 105200, the related brainwave feature is obtained at the feature extraction unit 102000, a pain level of reference stimulation is differentiated and estimated from the feature at the pain differentiation/estimation unit 104000, and the feature is contracted S10400 from the result thereof. The reference stimulation application unit 105000 also transmits pain stimulation information (stimulation type, environmental information, or the like) for differentiating an actual unknown pain level and differentiator creation. The reference stimulation application unit 105000 optionally comprises a stimulation information visualization unit in addition to the reference stimulation application unit 105000 and may display information such as an image or number associated with stimulation or environment. The apparatus 108000 can also internally or externally comprise the pain differentiation/estimation unit 104000 for generating a determination value or differentiator.

In this manner, the apparatus 108000 comprises the brainwave data measurement unit 105200 and the pain differentiation/estimation unit 104000 and optionally the reference stimulation application unit 105000. The apparatus 108000 is materialized, for example, by a computer comprising a processor and a memory. In such a case, the apparatus 108000 makes the processor function as the feature contracting unit 101000, feature extraction unit 102000, pain differentiation/estimation model generation unit 103000, pain differentiation/estimation unit 104000, or the like as needed when a program stored in the memory is implemented by the processor. The processor is also made to make stimulation or environmental information visible as needed. The apparatus 108000 of the present disclosure can be materialized, for example, by a dedicated electronic circuit. A dedicated electronic circuit can be a single integrated circuit or a plurality of electrical circuits. A brainwave data obtaining unit and pleasant/unpleasant determination value generation unit can have the same configuration as a pleasant/unpleasant determination apparatus.

The feature extraction unit 102000 can also obtain a plurality of brainwave data by measuring a brainwave a plurality of times from an object being estimated via an electroencephalograph (included in the brainwave data measurement unit 105200). An object is an organism in which a change in brainwave is induced by stimulation or environment, which does not need to be limited to humans. The sample augmentation of the present disclosure may also be applied in this stage.

The pain differentiation/estimation unit 104000 differentiates/estimates the degree of unpleasantness using a determination value, and also generates a differentiator of determination value if not generated in advance externally or internally. The apparatus 108000 can comprise a part generating a differentiator or determination value externally or internally as the pain differentiation/estimation unit 104000. A differentiation value used for differentiation/estimation of pain is for estimating or classifying the degree of unpleasantness from amplitudes of a plurality of brainwave data. In other words, the pain differentiation/estimation unit 104000 or the pain differentiation/estimation model generation unit 103000 can generate a determination value for estimating or classifying the degree of unpleasantness of an object from brainwave data.

A brainwave recording sensor contained in the brainwave data measurement unit 105200 measures electrical activity generated inside the brain of an object being estimated with an electrode on the scalp. The brainwave recording sensor also outputs the result of measurement, brainwave data. Brainwave data can be augmented as needed.

OTHER EMBODIMENTS

The differentiation apparatus with a process of contracting features according to one or more embodiments of the present disclosure has been described based on the embodiments, but the present disclosure is not limited to such embodiments. Various modifications applied to the present embodiments and embodiments constructed by combining constituent elements in different embodiments that are conceivable to those skilled in the art are also encompassed within the scope of one or more embodiments of the present disclosure as long as such embodiments do not deviate from the intent of the present disclosure.

For example, a peak to peak value can be used as the amplitude value of brainwave data in each of the embodiments described above, but the amplitude value is not limited thereto. For example, a simple peak value can be used as the amplitude value.

In the embodiment described above, the range of the value of magnitude of the degree of unpleasantness is envisioned to be set so that the value of Pmax, which is the magnitude of the degree of unpleasantness corresponding to the upper limit value Amax of a feature such as brainwave amplitude or a combination thereof, would be 1, or the value of Pmin, which is the magnitude of pain corresponding to the lower limit value Amin of the feature or combination thereof, would be 0, but the range of values is not limited thereto. For example, the magnitude of pain can be represented by 0 to 100. In such a case, the pain differentiation/estimation unit 104000 can estimate the value Px of magnitude of pain, when shown by the pain level visualization unit 107000, by the following equation.

$$Px = Pmax \times (Ax - Amin)/(Amax - Amin)$$

Curve fitting including sigmoid fitting was described above as an example of generating a pleasant/unpleasant determination value by analyzing a plurality of brainwave data, but this is not a limiting example. A predetermined value can also be used as the upper limit value of a brainwave amplitude. The predetermined value (absolute value) is for example 50 µV to 100 µV, which can be experimentally or empirically determined. In such normal analysis, data from about plus or minus 50 µV to 100 µV is eliminated as an artifact removal method. Such artifact removal can also be performed in the present disclosure as needed.

Any type of stimulation can be applied as stimulation applied to the object 106000 by the reference stimulation application unit 105000 (see FIG. 15) as long as the magnitude of the degree of unpleasantness sensed by the object 106000 changes in accordance with the type of stimulation or application environment.

Some or all of the constituent elements of the apparatus of the present disclosure in each of the embodiments described above can be comprised of a single system LSI (Large Scale Integration). For example, as shown in FIG. 15, the apparatus 108000 can be comprised of the feature contracting unit 101000, pain differentiation/estimation model generation unit 103000, pain differentiation/estimation unit 104000, and pain level visualization unit 107000, as well as a system LSI having the feature extraction unit 102000 and the reference stimulation application unit 105000. In this system LSI or the like, the sample augmentation of the present disclosure may be carried out, wherein the function of sample augmentation may be installed in each unit such as a feature contracting unit and a different unit that is not separately shown (sample augmentation unit) may be set to carry out sample augmentation in said unit.

System LSI is ultra-multifunctional LSI manufactured by integrating a plurality of constituents on a single chip, or specifically a computer system comprised of a microprocessor, ROM (Read Only Memory), RAM (Random Access Memory) and the like. A computer program is stored in a ROM. The system LSI accomplishes its function by the microprocessor operating in accordance with the computer program.

The term system LSI is used herein, but the term IC, LSI, super LSI, and ultra LSI can also be used depending on the difference in the degree of integration. The methodology for forming an integrated circuit is not limited to LSI. An integrated circuit can be materialized with a dedicated circuit or universal processor. After the manufacture of LSI, a programmable FPGA (Field Programmable Gate Array) or reconfigurable processor which allows reconfiguration of the connection or setting of circuit cells inside the LSI can be utilized.

If a technology of integrated circuits that replaces LSI by advances in semiconductor technologies or other derivative technologies becomes available, functional blocks can obviously be integrated using such technologies. Application of biotechnology or the like is also a possibility.

One embodiment of the present disclosure can be not only such a pain differentiation/estimation model generation, sustained pain differentiation/estimation unit, but also a pain classifier generation, pain differentiation/classification method using characteristic constituent units contained in a pain estimation apparatus as steps. Further, one embodiment of the present disclosure can be a computer program for implementing each characteristic step in feature contracting, feature extraction, pain differentiation/estimation model generation, and pain differentiation/estimation on a computer. One embodiment of the present disclosure can also be a computer readable non-transient recording medium on which such a computer program is recorded.

In each of the embodiments described above, each constituent element can be materialized by being configured with a dedicated hardware or by implementing software program that is suited to each constituent element. Each constituent element can be materialized by a program implementation unit such as a CPU or a processor reading out and implementing a software program recorded on a recording medium such as a hard disk or semiconductor memory. In this regard, software materializing the pain estimation apparatus of each of the embodiments described above or the like can be a program such as those described below.

(Embodiment Using Cloud, IoT, and AI)

Figure 16:
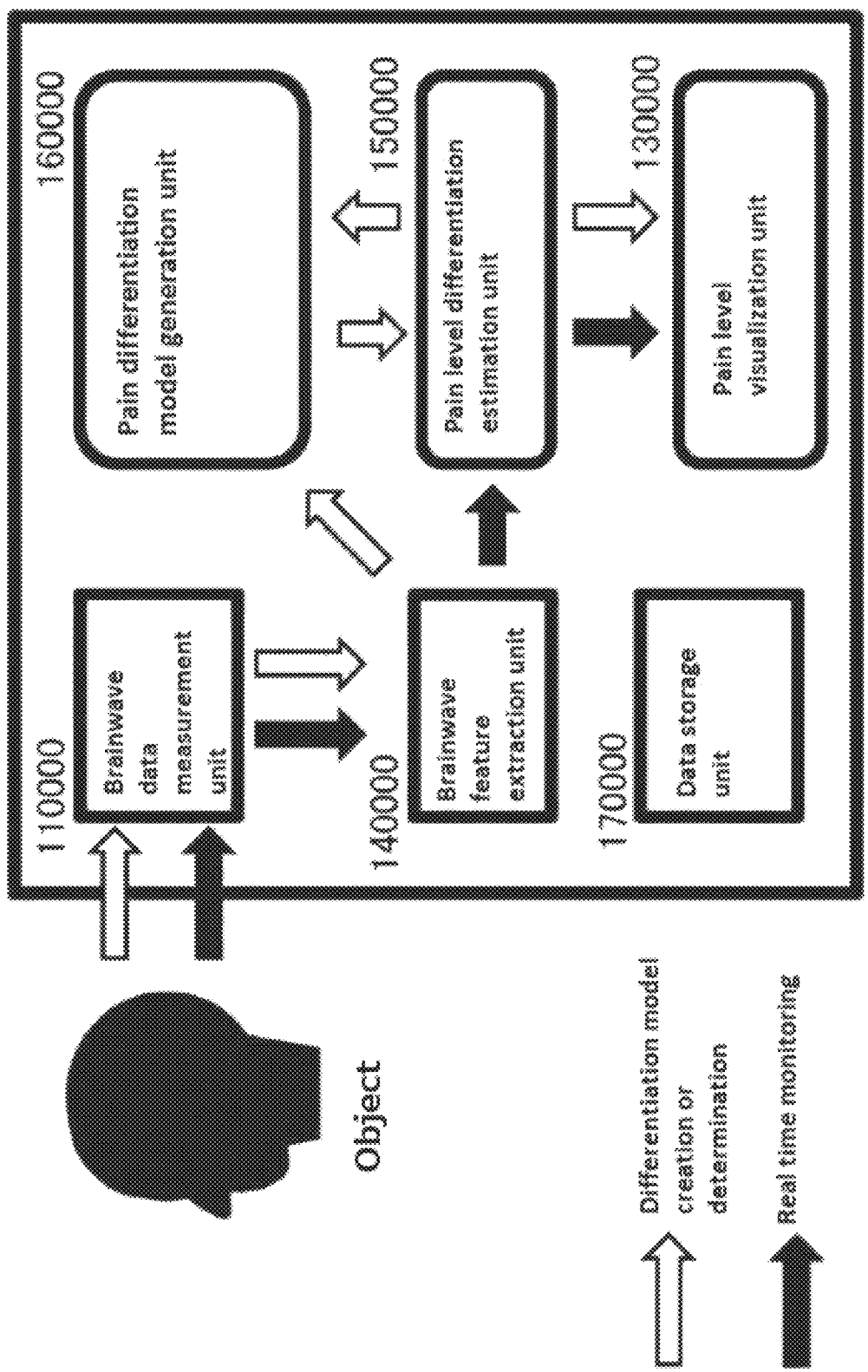
FIG. 16 is a schematic diagram of the device of the present disclosure. This presumes an example equipped with all parts.

The pain determination technology of the present disclosure can be provided in a form comprising all constituents as a single system or apparatus (see FIG. 16). Alternatively, a pain differentiation apparatus can also be envisioned in a form of mainly measuring brainwaves and displaying results while calculation or differentiation model calculation are performed on a server or cloud (see FIGS. 17, 18, and 19). Some or all of them can be performed using IoT (Internet of Things) and/or artificial intelligence (AI).

Figure 19:
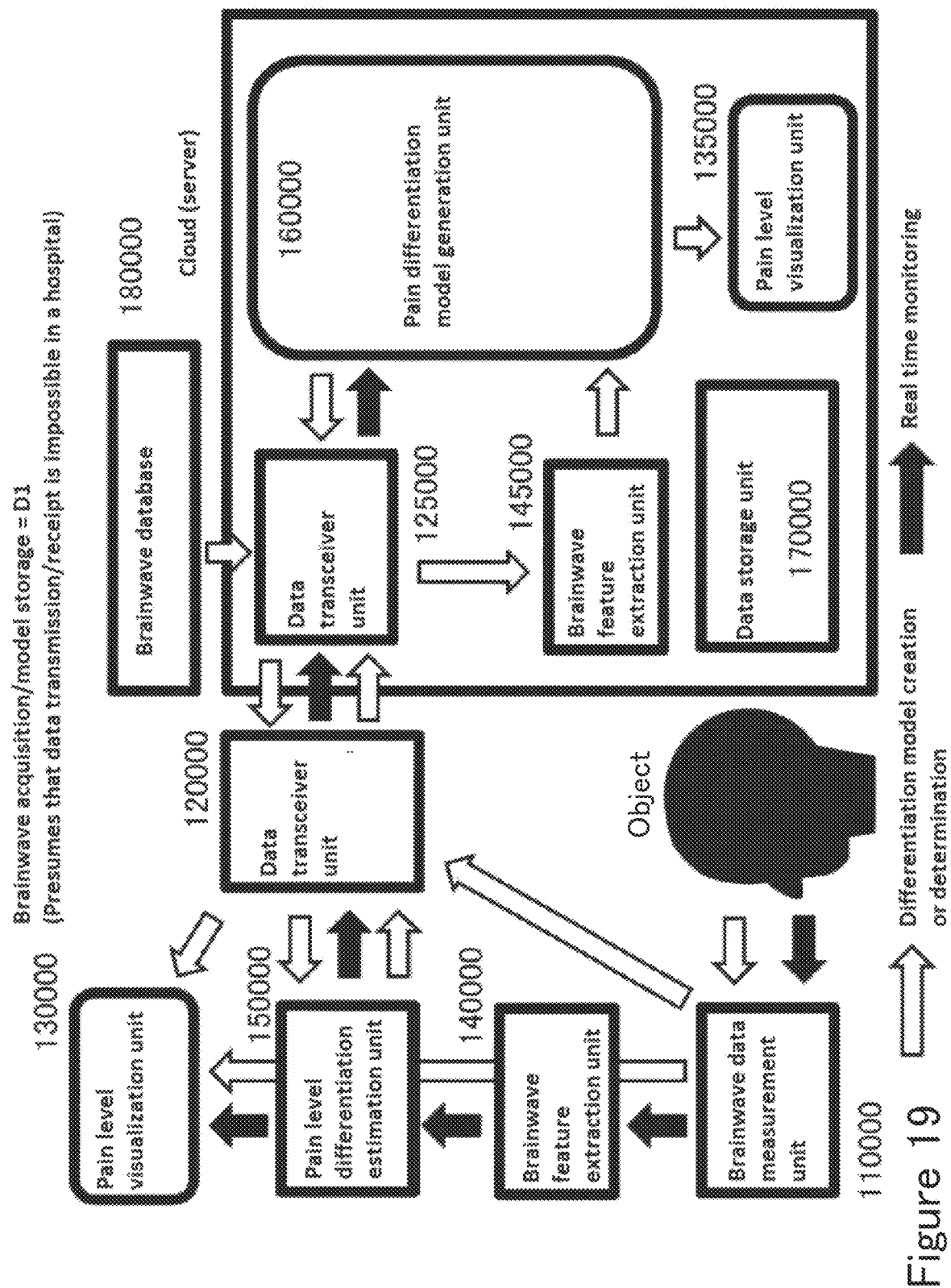
FIG. 19 is a schematic diagram of the device of the present disclosure, showing an embodiment of the device portion (left side) having a function for obtaining brainwaves, transmitting/receiving data, enabling on-site differentiation by storing a differentiation model, and making them visible. Such an embodiment presumes use at a facility or location where it is difficult to transmit/receive radio waves such as a hospital. This is an embodiment where a determination/differentiation model is generated on the cloud or server, and actual measurement data is actually fitted to a model at a device. The brainwave feature (analysis data) can be extracted at a terminal or on the server side.

Alternatively, a pain differentiation apparatus can also be envisioned in a semi-standalone form where a differentiation model is stored and performs differentiation therein, but main calculation such as calculation of a differentiation model is performed on a server or cloud (FIG. 19). Since transmitting/receiving is not necessarily always possible at some locations where the apparatus is implemented such as hospitals, this is a model envisioned for use when communication is blocked.

Therefore, in one aspect, the present disclosure provides a program for implementing a method of differentiating pain of an object on a computer, the method comprising: a) obtaining brainwave data or analysis data thereof from the object; b) generating a differentiation model based on the brainwave data or analysis data thereof; and c) differentiating pain by fitting the brainwave data or analysis data thereof from the object to the differentiation model, and a recording medium, system, and apparatus storing the same. The sample augmentation of the present disclosure may be provided to be performed in this program.

A system that materializes such a program is materialized in an embodiment that deems the entirety as a system. In this aspect, the present disclosure is a system for differentiating pain of an object, the system comprising: X) a brainwave data obtaining unit for obtaining brainwave data or analysis data thereof from an object; Y) a pain differentiation/estimation model generation unit for generating a differentiation model based on the brainwave data or analysis data thereof; and Z) a pain differentiation/estimation unit for differentiating pain by fitting the brainwave data or analysis data thereof from the object to the model. In such a case, the brainwave data obtaining unit is illustrated as a brainwave data measurement unit 110000 and brainwave feature extraction unit 140000, as schematically exemplified in FIG. 16. The pain differentiation/estimation model generation unit is depicted as a pain differentiation model generation unit 160000. Furthermore, the pain differentiation/estimation unit is depicted as a pain level differentiation estimation unit 150000. In FIG. 16, a pain level visualization unit 130000 and data storage unit 170000 are also depicted. Such a visualization unit and storage unit are not necessarily essential, but it is preferable that they are comprised when provided as a medical equipment. The sample augmentation of the present disclosure may also be carried out in a system, wherein the function of sample augmentation may be installed in each unit such as the brainwave data obtaining unit and a different unit that is not separately shown (sample augmentation unit) may be set to carry out sample augmentation in said unit.

A visualization unit can be any unit, as long as a user can recognize the result of differentiating pain. An input/output apparatus, display, television, monitor, or the like can be used. Instead of a visualization unit, another recognition means can be used such as audio. A sound generation apparatus (e.g., speaker), vibration apparatus, electrode, or other apparatuses that can present a challenge to a subject can be comprised.

A storage unit can be a recording medium such as a CD-R, DVD, Blueray, USB, SSD, or hard disk. A storage unit can be stored in a server or an appropriate recording form on the cloud.

As schematically exemplified in FIG. 16, the present apparatus can be used when creating or determining a differentiation model (white arrow) and when monitoring actual pain. When creating/determining a model, the brainwave data measurement unit 110000 obtains brainwaves when a plurality of pain stimulations is applied to an object. Recorded data is transmitted to the brainwave feature extraction unit 140000 to create a plurality of features. The features are transmitted to the pain differentiation model generation unit 160000 to generate a differentiation algorithm. Upon doing so, a plurality of features may be augmented by the above-mentioned system 100 to transmit the augmented features to the pain differentiation model generation unit 160000 to generate a differentiation algorithm. The differentiation algorithm is transmitted to the pain level differentiation estimation unit 150000, and differentiation results from the created model are transmitted to the pain level visualization unit 130000 and displayed for reviewing the appropriateness of pain level differentiation results. After the differentiation model is determined, real-time monitoring of actual pain levels occurs through the flow of black arrows. Specifically, once pain monitoring starts, brainwave data is obtained by the brainwave data measurement unit 110000 from an object, and the brainwave data is transmitted to the brainwave feature extraction unit 140000 to extract a plurality of brainwave features. The created features are transmitted to the pain level differentiation estimation unit 150000, and the differentiation results are displayed on the pain level visualization unit 130000. The processes can be combined. If differentiation results are not appropriate upon real-time monitoring, results of the pain level differentiation estimation unit 150000 are fed back to the pain differentiation model generation unit 160000. After the model is corrected, the corrected model is retransmitted to the pain level differentiation estimation unit 150000. The sample augmentation of the present disclosure may also be carried out in this apparatus, wherein the function of sample augmentation may be installed in each unit such as a brainwave data measurement unit and a different unit that is not separately shown (sample augmentation unit) may be set to carry out sample augmentation in said unit.

Figure 17:
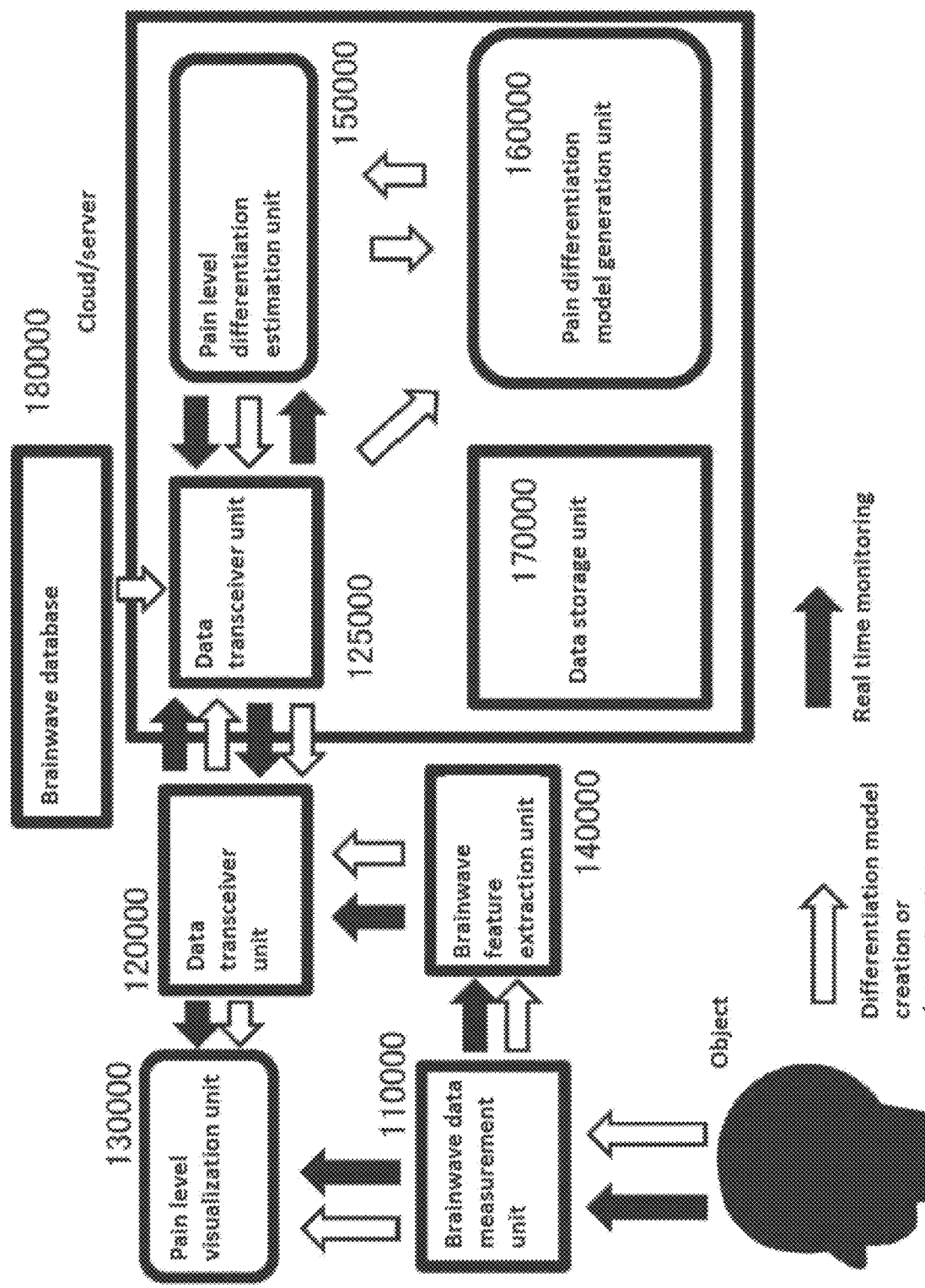
FIG. 17 is a schematic diagram of the device of the present disclosure, showing an embodiment of the device portion (left side) having only a function for obtaining brainwaves, transmitting/receiving data, and making them visible. This is an embodiment presuming that analysis and determination/differentiation model generation and the like are performed on the cloud or a server. A brainwave feature (analysis data) is extracted on the terminal side in this model.

In one aspect, based on FIG. 17, a terminal only obtains brainwaves, and the present disclosure is a system for differentiating pain of an object, the system comprising X) a pain differentiation terminal and Y) a pain differentiation/estimation server, wherein the pain differentiation terminal comprises: X-1) a brainwave data obtaining terminal for obtaining brainwave data or analysis data thereof from an object; and X-2) a module for transmitting and receiving the brainwave data or analysis data thereof and a differentiation result to a pain differentiation/estimation server, wherein the pain differentiation/estimation server comprises: Y-1) a pain differentiation/estimation model generation module for generating a differentiation model based on the brainwave data or analysis data thereof; Y-2) a pain differentiation/estimation module for generating a differentiation result from differentiating pain by fitting the brainwave data or analysis data thereof from the object to the model; and Y-3) a differentiation result transceiver module for transmitting and receiving the brainwave data or analysis data thereof and the differentiation result. The sample augmentation may also be carried out in this system, wherein the function of sample augmentation may be installed in an existing module and a different module that is not separately shown (sample augmentation module) may be set to carry out sample augmentation in said module.

As schematically exemplified in FIG. 19, the present apparatus can be used when creating or determining a differentiation model (white arrow) and when monitoring actual pain. When creating/determining a model, the brainwave data measurement unit 110000 obtains brainwaves when a plurality of pain stimulations is applied to an object. Recorded data is displayed online at the pain level visualization unit 130000 and transmitted to the brainwave feature extraction unit 140000 to create a plurality of features. The created features are transmitted, through a data transceiver unit 120000, to a data transceiver unit 125000 of a cloud/server and to the pain differentiation model generation unit 160000. Upon doing so, a plurality of features may be augmented by the above-mentioned system 100 to transmit the augmented features to the data transceiver unit 125000 of a cloud/server through the data transceiver unit 120000 for transmission to the pain differentiation model generation unit 160000. The created model is ultimately stored in the pain level differentiation estimation unit. At this time, the outputted differentiation/estimation results are transmitted to the external data transceiver unit 120000 through the data transceiver unit 125000 and displayed at the pain level visualization unit 130000 for reviewing. After the differentiation model is determined, real-time monitoring of actual pain levels occurs through the flow of black arrows. Specifically, once pain monitoring starts, brainwave data is obtained by the brainwave data measurement unit 110000 from an object, and the brainwave data is displayed at the pain level visualization unit 130000 and simultaneously transmitted to the brainwave feature extraction unit 140000 to extract a plurality of brainwave features. The created features are augmented by the above-mentioned system 100 and transmitted to the pain level differentiation estimation unit 150000 through the data transceiver units 120000 and 125000 for differentiation and estimation of pain levels. The differentiation results are displayed on the pain level visualization unit 130000 through the data transceiver units 120000 and 125000. The processes can be combined. If differentiation results are not appropriate upon real-time monitoring, results of the pain level differentiation estimation unit 150000 are fed back to the pain differentiation model generation unit 160000. After the model is corrected, the corrected model is retransmitted to the pain level differentiation estimation unit 150000. The recorded data or created feature or differentiation model is stored in the data storage unit 170000 when appropriate.

In another aspect, "brain feature"=analysis data extracting module is in a separated form based on FIG. 17. A feature is presumed to be calculated on the terminal side. In this regard, the present disclosure provides a system for differentiating pain of an object, the system comprising X) a pain differentiation terminal and Y) a pain differentiation/estimation server, wherein the pain differentiation terminal comprises: X-1) a brainwave data obtaining terminal for obtaining brainwave data from an object; and X-2) a module for transmitting and receiving the brainwave data and a differentiation result to the pain differentiation/estimation server, wherein the pain differentiation/estimation server comprises: Y-1) a pain differentiation/estimation model generation module for generating a differentiation model based on the brainwave data or analysis data thereof; Y-1') a brainwave feature extraction module for extracting analysis data from the brainwave data; Y-2) a pain differentiation/estimation module for generating a differentiation result from differentiating pain by fitting the brainwave data or analysis data thereof from the object to the model; and Y-3) a differentiation result transceiver module for transmitting and receiving the brainwave data or analysis data thereof and the differentiation result. The sample augmentation of the present disclosure may also be carried out in this case, wherein the function of sample augmentation may be installed in an existing module and a different module that is not separately shown (sample augmentation module) may be set to carry out sample augmentation in said module.

Figure 18:
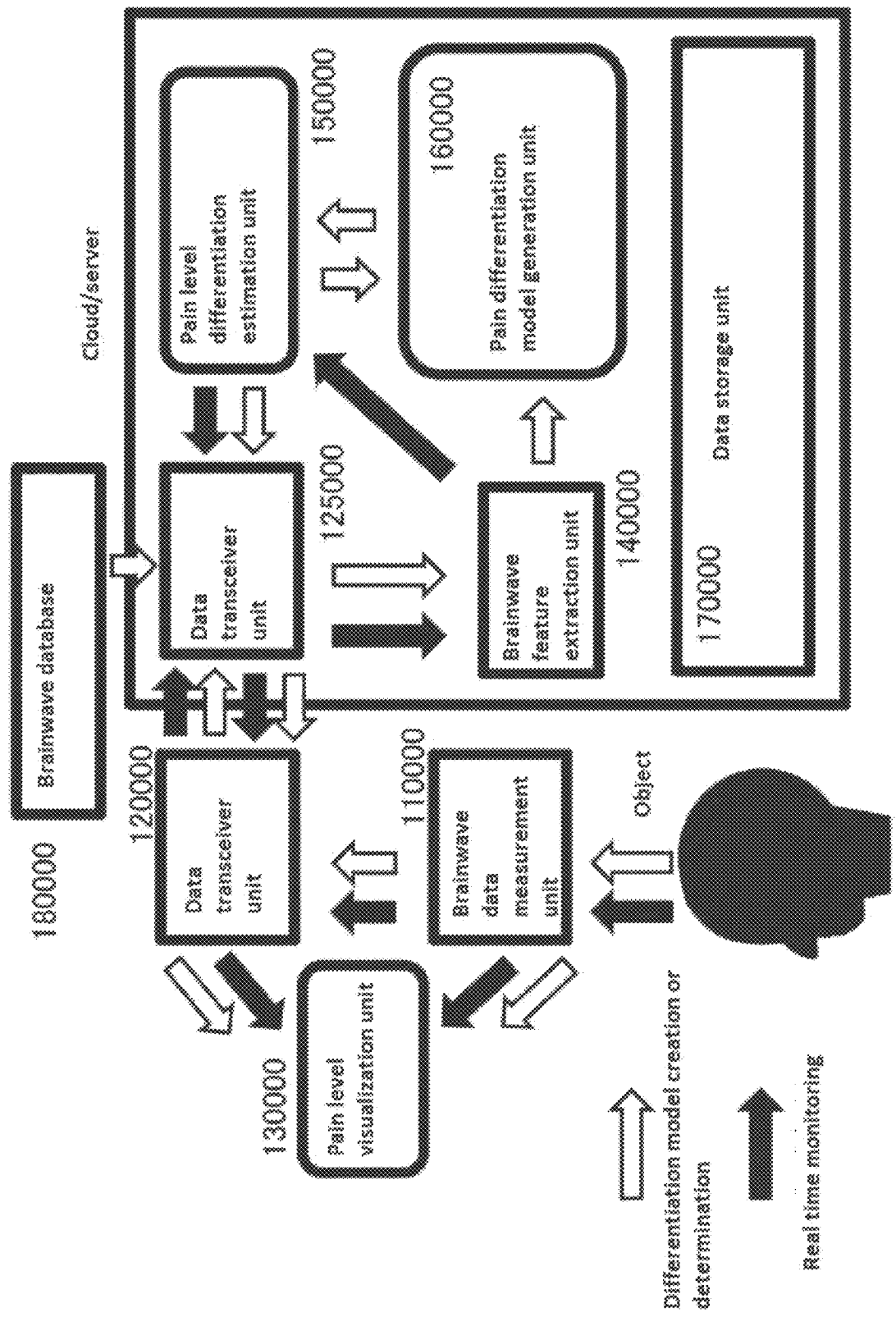
FIG. 18 is a schematic diagram of the device of the present disclosure, showing an embodiment of the device portion (left side) having only a function for obtaining brainwaves, transmitting/receiving data, and making them visible. This is an embodiment presuming that analysis and determination/differentiation model generation and the like are performed on the cloud or a server. A brainwave feature (analysis data) is extracted on the server side in this model.

As schematically exemplified in FIG. 18, the present apparatus can be used when creating or determining a differentiation model (white arrow) and when monitoring actual pain. When creating/determining a model, the brainwave data measurement unit 110000 obtains brainwaves when a plurality of pain stimulations is applied to an object. Recorded data is displayed online at the pain level visualization unit 130000 and transmitted to the data transceiver unit 125000 of a cloud server through the data transceiver unit 120000 and to the brainwave feature extraction unit 140000 to create a plurality of features. The created features are transmitted to the pain differentiation model generation unit 160000. Upon doing so, a plurality of features may be augmented by the above-mentioned system 100 to transmit the augmented features to the pain differentiation model generation unit 160000. The created model is ultimately stored in the pain level differentiation estimation unit 150000. At this time, the outputted differentiation/estimation results are transmitted to the external data transceiver unit 120000 through the data transceiver unit 125000 and displayed at the pain level visualization unit 130000 for reviewing. After the differentiation model is determined, real-time monitoring of actual pain levels occurs through the flow of black arrows. Specifically, once pain monitoring starts, brainwave data is obtained by the brainwave data measurement unit 110000 from an object, and the brainwave data is displayed at the pain level visualization unit 130000 and simultaneously transmitted to the brainwave feature extraction unit 140000 through the data transceiver units 120000 and 125000 to extract a plurality of brainwave features. The created features are augmented by the above-mentioned system 100 and transmitted to the pain level differentiation estimation unit 150000 for differentiation or estimation of pain levels. The differentiation results are displayed on the pain level visualization unit 130000 through the data transceiver units 120000 and 125000. The processes can be combined. If differentiation results are not appropriate upon real-time monitoring, results of the pain level differentiation estimation unit 150000 are fed back to the pain differentiation model generation unit 160000. After the model is corrected, the corrected model is retransmitted to the pain level differentiation estimation unit 150000. The recorded data or created feature or differentiation model is stored in the data storage unit 170000 when appropriate.

In still another aspect, an embodiment of a terminal obtaining brainwaves and fitting the brainwaves to a stored model is provided. In this aspect, the present disclosure provide a system for differentiating pain of an object, the system comprising X) a pain differentiation terminal and Y) a pain differentiation/estimation server, wherein the pain differentiation terminal comprises: X-1) a brainwave data obtaining terminal for obtaining brainwave data or analysis data thereof from an object; X-2) a module for transmitting and receiving the brainwave data or analysis data thereof and a differentiation model to the pain differentiation/estimation server; and X-3) a differentiation model module for storing a differentiation model, wherein pain is differentiated by fitting the brainwave data or analysis data thereof from the object to the differentiation model, wherein the pain differentiation/estimation server comprises: Y-1) a pain differentiation/estimation model generation module for generating a differentiation model based on the brainwave data or analysis data thereof; Y-2) a model transmission module for transmitting the differentiation model to the pain differentiation terminal; and optionally a brainwave feature extraction module for extracting analysis data from the brainwave data.

As schematically exemplified in FIG. 19, the present apparatus can be used when creating or determining a differentiation model (white arrow) and when monitoring actual pain. When creating/determining a model, the brainwave data measurement unit 110000 obtains brainwaves when a plurality of pain stimulations is applied to an object. Recorded data is displayed online at the pain level visualization unit 130000 and transmitted, through the data transceiver unit 120000, to the data transceiver unit 125000 of a cloud server and to a brainwave feature extraction unit 145000 in a cloud server to create a plurality of features. Upon doing so, a plurality of features may be augmented by the above-mentioned system 100 to transmit the augmented features to the pain differentiation model generation unit 160000. The created features are transmitted to the pain differentiation model generation unit 160000. The created model is ultimately stored in the pain level differentiation estimation unit 150000. At this time, the outputted differentiation/estimation results are transmitted to the external data transceiver unit 120000 through the data transceiver unit 125000 and displayed at the pain level visualization unit 130000 for reviewing. After the differentiation model is determined, real-time monitoring of actual pain levels occurs through the flow of black arrows. Specifically, once pain monitoring starts, brainwave data is obtained by the brainwave data measurement unit 110000 from an object transmitted to the brainwave feature extraction unit 140000 to extract a plurality of brainwave features. The created features are transmitted to the pain level differentiation estimation unit 150000 for differentiation or estimation of pain levels and displayed at the pain level visualization unit 130000. The processes can be combined. If differentiation results are not appropriate upon real-time monitoring, results of the pain level differentiation/estimation unit 150000 are fed back to the pain differentiation model generation unit 160000. After the model is corrected, the corrected model is retransmitted to the pain level differentiation estimation unit 150000. The recorded data or created feature or differentiation model is stored in the data storage unit 170000 when appropriate. The sample augmentation of the present disclosure may also be carried out in this system, wherein the function of sample augmentation may be installed in an existing brainwave data measurement unit and a different module that is not separately shown (sample augmentation unit) may be set to carry out sample augmentation in said module.

"Software as service (SaaS)" mostly falls under such a cloud service. Since a pain differentiation apparatus at the early stages is understood to be installed with a differentiation algorithm made from data in a laboratory environment, the apparatus can be provided as a system comprising two or three features of these embodiments.

For example, the following is contemplated.

1. A function for incorporating brainwave data is included on the terminal side (brainwave data measurement unit 110000 in FIGS. 16 to 19).
2. An apparatus can have a function for extracting a feature, or the feature can be included on the terminal side (e.g., brainwave data itself is the responsibility of another equipment, which provides a feature to a terminal by transmission/receipt.) In this regard, the brainwave feature extraction unit 140000 or 145000 (FIGS. 16 to 19) can be on the terminal side or the server side, or integrated with the brainwave data measurement unit or provided separately. FIGS. 16 to 19 show embodiments comprising them separately. The sample augmentation of the present disclosure may be carried out at a stage somewhere in these series of processes, wherein the function of sample augmentation may be installed in an existing brainwave data measurement unit and a different module that is not separately shown (sample augmentation unit) may be set to carry out sample augmentation in said module.

For example, basic features such as potential, frequency, potential correlation, and entropy can be stored as standard specification, and other features for increasing differentiation accuracy or the like can be stored as options.

A pain differentiation model is generated in the pain differentiation model generation unit 160000. At the pain differentiation model generation unit, a pain differentiation model is generated based on brainwave data or analysis data thereof, and the pain differentiation model is transmitted to a pain level differentiation estimation unit.

For example, a standard (general differentiation model with stand installation) as well as options can be included in a pain differentiation model generation unit. For example, the pain differentiation model generation unit can comprise option 1 (tailor-made differentiation model, where price changes depending on the extent of model creation), option 2 (creation of a facility dedicated differentiation model), option 3 (client requested setting), option 4 (model creatable by the clients themselves), option 5 (increase in the number of created differentiation models), or the like.

A preferred embodiment may comprise a function for improving a differentiation model. This function can be in a pain differentiation model generation unit, or comprised as a separate module. Such a differentiation model improving function can comprise options such as option 1 (period of 1 year, 1 to 2 times a year), option 2 (period of 1 year, once every 1 or 2 months), option 3 (extended period, once or twice a year), or option 4 (extended period+1, once every 1 or 2 months).

Data can be stored as needed. Data storage is generally equipped on the sever side (data storage unit 170000 in FIGS. 17 to 19), but data storage can be at the terminal side for not only fully equipped models but also for cloud models (not shown due to being optional). When a service is provided on the cloud, options such as standard (e.g., up to 10 Gb on the cloud), option 1 (e.g., additional 1 Tb on the cloud), option 2 (parameter is set for divided storage on the cloud), and option 3 (stored by differentiation model on the cloud) can be provided for data storage. Data is stored, and data is imported from all sold apparatuses to create big data (e.g., brainwave database 180000), and a differentiation model is continuously updated or a new model is constructed so that new differentiation model software such as "burn pain differentiation model" can be provided.

There can also be data analysis options. In this regard, a pattern classification of patients (search for a patient cluster based on a change in patters of feature or differentiation accuracy) or the like can be provided. In other words, this can be envisioned as an option for a calculation method of the pain differentiation model generation unit 160000.

(Brainwave Feature Correlation)

In another aspect, the present disclosure provides a method of differentiating or determining pain using brainwave feature correlation. Examples of brainwave features targeted for correlation include, but are not limited to, raw brainwave data and analysis data thereof (also referred to as processed feature) such as potential, frequency power, amplitude (e.g., mean amplitude, complexity index (entropy or the like)) and the like. It was found that any of them can be used as an indicator of functional connectivity by studying the correlation between electrodes. A more desirable method estimates the intracranial source from scalp data and studying the correlation between sites. If recording electrodes are limited, it is inferred from the correlation between electrodes described above. While "brainwave feature correlation" is also referred to as "brainwave relation feature", they have the same meaning. Examples of features that can be used for brainwave feature correlation or the like include, but are not limited to, "potential correlation", "phase synchronization (phase locking value)" and the like. Coherence and the like can also be used.

It was found in the present disclosure that correlation of processed features such as frequencies and entropy can also be used, besides brainwave potential correlation, in differentiating pain. Since they can be used as an indicator of function connectivity by observing correlation between electrodes, "brainwave feature correlation" itself can be used more broadly in differentiating pain.

As correlation, "potential correlation", "phase synchronization (phase locking value)" or the like can be preferably used in the Examples, but coherence that has been used conventionally or the like can also be used.

In one embodiment, the brainwave feature used in the present disclosure can be a plurality of brainwave features from the same electrode or brainwave features from different electrodes when calculating correlation. Thus, the brainwave feature correlation used in the present disclosure is correlation between brainwave features at the same or different electrodes. When brainwave features at the same electrode are used, features can be from the same category (e.g., frequency power, mean amplitude, complexity index, or the like) of features from different categories. When using brainwave features at different electrodes, features can be from the same category (e.g., frequency power, mean amplitude, complexity index, or the like) of features from different categories. Brainwave features that can be used may be simply the extracted raw brainwave data itself or processed data thereof. Examples of brainwave features that can be used include, but are not limited to, potential, frequency power, mean amplitude, complexity index (e.g., MSE), and the like. Examples of correlation include, but are not limited to, potential frequency and phase synchronization (phase locking value). Coherence can also be used. Coherence and phase synchronization (phase locking value) are phase synchronicity of the same frequency or different frequencies between or in electrodes, and they can be used in the same manner. Coherence is a phase synchronization indicator that is calculated based on the premise of signals being stable (overall activity property is also consistently materialized locally) and linear. However, prior art is not used after verifying the premises in many cases. Meanwhile, phase synchronization (phase locking value (PLV)) can detect phase synchronization properties more strongly, with no premise presumed by coherence. Thus, in one embodiment herein, phase synchronization (PLV) can be more preferable than coherence. Alternatively, coherence and PLV can both be used, where they can be used as a multiple choice system that uses one that better approximates a binomial classification pattern of sigmoid or step function or uses both alternatingly (Coh×PLV).

Figure 12:
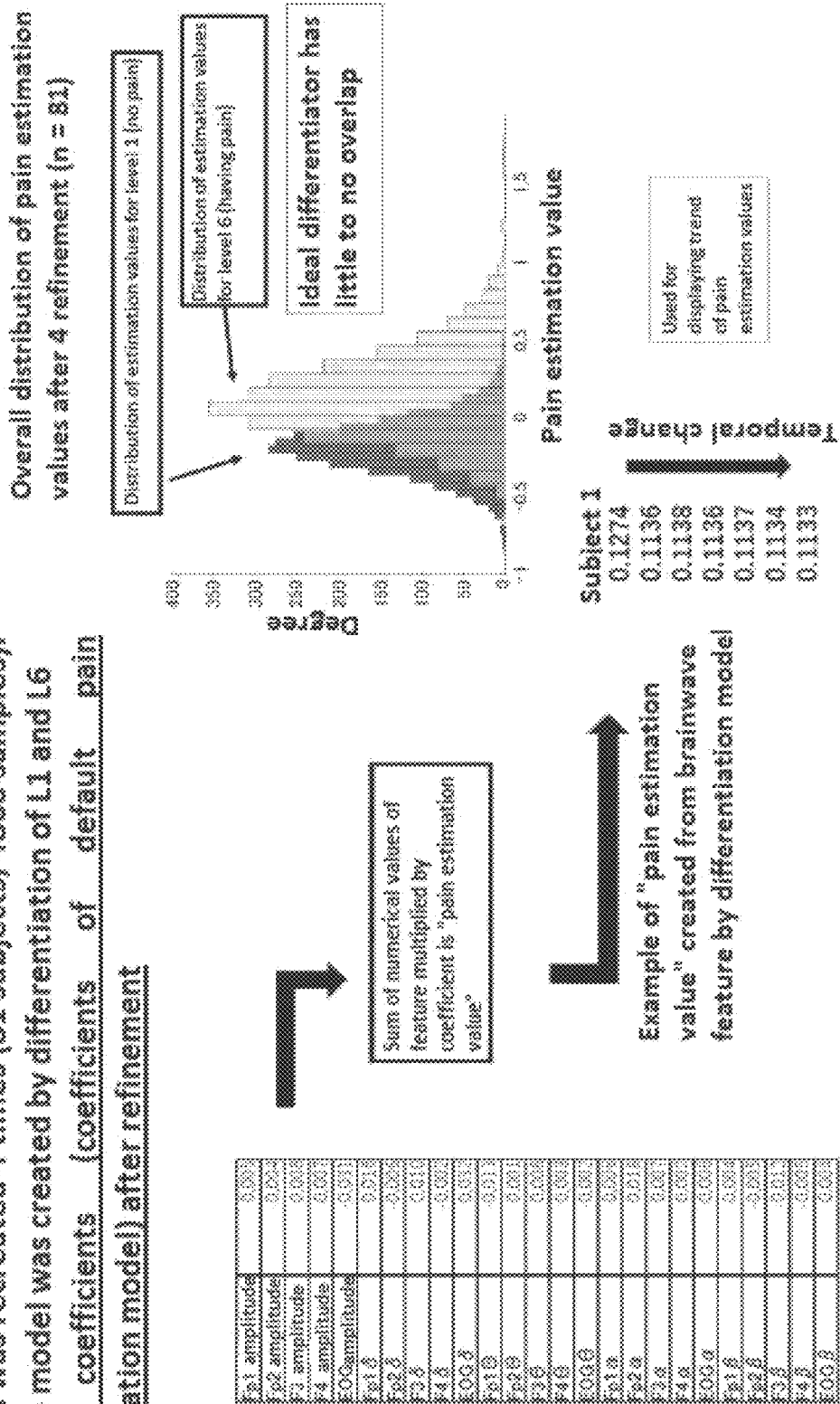
FIG. 12 shows a differentiation model (standardized in rest section, with EOG feature). Subjects at or below the chance level were removed, and the model was recreated 4 times (81 subjects, 4860 samples). The base model was created by differentiation of L1 (40° C.) and L6 (50° C.). The left side shows feature coefficients (coefficients of default pain differentiation model) after refinement. The right graph shows the overall distribution of pain estimation values after four refinements.
Figure 23:
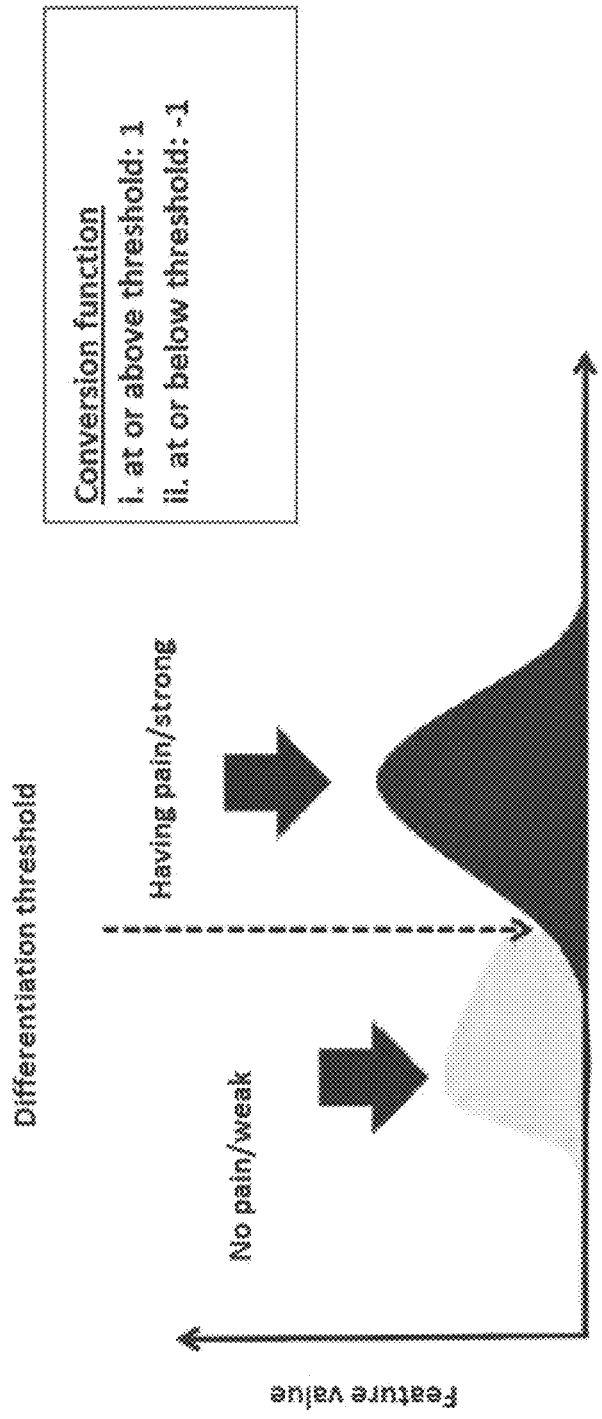
FIG. 23 is another embodiment of "discrete feature" comprising the sigmoidal feature shown in FIG. 22. Prior to pain monitoring, pain test stimulation is applied multiple times to an object to find the distribution property of features for no pain and having pain.

A feature exhibiting a binomial classification pattern (e.g., sigmoidal feature) is a form of "discrete feature", i.e., feature exhibiting a binomial distribution property. Such a double-peak distribution is also observed in pain estimation values (see FIG. 12), so that this is involved in the principal mechanism of pain differentiation. In actual pain monitoring, a distribution property of features for no pain and having pain can be studied by applying a plurality of pain test stimulations to an object. FIG. 23 shows a schematic diagram from function or curve fitting to plotting of a histogram of a feature. The numerical value where distributions of samples for no pain and having pain intersect is used as a "differentiation threshold value". Samples less than the threshold value are converted to a category scale of "−1" and samples that are greater than the threshold value are converted to a category scale of "1" using this threshold value for each feature. The converted samples can be inputted into a differentiation model. Poincare distribution or the like can also be used as the distribution for determining such a threshold value.

In various embodiments, the present disclosure is intended to be directed to broadly defined "interrelation" including synchronicity and narrowly defined relation expressed by a correlation coefficient (r or p). In this regard, correlation can include various embodiments such as synchronicity, connectivity, unrelatedness, delay, positive/negative, similarity, and match. Examples thereof include temporal correlation, spatial correlation, spatiotemporal synchronicity, special relationship or connectivity, unrelatedness or uncorrelatedness, delay or breakdown in temporal correlation, positive/negative or correlated property, similarity or level of correlation coefficient, and match or complete correlation. It can be understood that synchronicity is temporal correlation, connectivity is spatial (e.g., parts of brain) relationship, unrelatedness is uncorrelated, delay is breakdown in temporal correlation, positive/negative is correlated property, similarity is high correlation coefficient, and match is complete correlation.

In one embodiment, the brainwave feature correlation used in the present disclosure is correlation of brainwave features between different electrodes. It was not conventionally known that correlation of brainwave features between different electrodes is useful for differentiation or determination of pain. The frontal-occipital potential correlation is between electrodes. In addition for correlation of frequency power, correlation between different frequencies in the same electrodes can be the feature correlation.

It has been elucidated that anesthesia and pain can be distinguished by observing the correlation between different electrodes in the present disclosure. In this regard, it is generally understood that functional connectivity decreases when consciousness decreases due to the effect of anesthesia. Meanwhile, as demonstrated in the present disclosure, it was found that the frontal-parietal potential correlation decreases when pain at the highest level of Level 6 (50° C.) exemplified in the Examples becomes unbearable. This is understood to explain functional connectivity. It was found that activity correlation breaks down with a decrease in consciousness while activity correlation breaks down when pain is strong, which was unexpected. It can be understood as a result of further study thereon that activity is fragmented from a decrease in consciousness due to anesthesia: decrease in overall cortex activity, and consciousness is extremely focused on pain if pain is excessive, resulting in fragmentation due to excessive local increase in the intensity of activity of the front portion of the prefrontal portion. In this manner, this can be interpreted as break down in correlation due to "Hypo-activity" for anesthesia and "Hyper-activity" for excessive pain. The differentiation of the present disclosure can distinguish such a difference between hypo and hyper. For example, functional connectivity breaks down and correlation decreases due to anesthesia, so that it is inconsistent to predict that a strong pain level similarly results in decreased correlation. Thus, the findings in the present disclosure would not have been readily expected. In other words, increased pain generally elicits attention so that functional connectivity between sites should rather be understood to increase. Despite of the above, a decrease in frontal-parietal potential correlation when pain is excessive in the present disclosure is different from intuition. In this regard, the present disclosure is interpreted so that a "similar" correlation decrease can be understood with vectors in different directions based on the concept of hyper and hypo.

In one embodiment, if correlation of brainwave features at two or more different electrodes is used, the different electrodes preferably have a relationship of being positioned relatively in front and back of a head. Pain can be more effectively differentiated by observing the interrelation of brainwave features with such a positional relationship. The relative back and front relationship can be determined by the relationship that is generally understood in the art. When an absolute positional relationship is to be identified, a line connecting ear lobes can be used for the determination.

In one embodiment, at least one of the different electrodes is at a front portion of a head. In another embodiment, at least one of the different electrodes is at a back portion of a head. In still another embodiment, at least one of the different electrodes is at a front portion of ahead, and another electrode is at a back portion of the head. The "front portion" of the head refers to an area in front of a line connecting the left and right ear lobes, and "back portion" of the head refers to an area behind a line connecting the left and right ear lobes. Electrodes at the center portion on the scalp with a name of C or T alone can be included in either or both the front and back portions. In a preferred embodiment, electrodes at the center portion on the scalp on a line connecting earlobes with a name of C or T alone are excluded, but if the electrode in the center portion is relatively behind the electrode in the front portion, or relatively in front of the electrode in the back portion, the electrodes can be used for extraction of a correlation feature. This is not a limiting example.

In one preferred embodiment, the correlation used in the present disclosure comprises correlation between an electrode in a front portion of a head and an electrode in a back portion of the head. In another preferred embodiment, the correlation used in the present disclosure comprises correlation between an electrode in a frontal portion and an electrode in a parietal portion.

In one specific embodiment, the brainwave features used in correlation used in the present disclosure comprise at least one feature at the frontal portion such as the frontal pole Fp1, frontal pole Fp2, frontal portion F3, frontal portion F4, anterior-temporal portion F7, anterior-temporal portion F8, and midline frontal portion Fz and adjacent sites, and at least one feature at the parietal portion such as midline parietal portion Pz, parietal portion P3, and parietal portion P4. In one specific embodiment, the electrodes used can comprise, but not limited to, electrodes at at least one of the frontal pole Fp1, frontal pole Fp2, frontal portion F3, and frontal portion F4 and parietal electrode Pz.

In one embodiment, "front-back signal correlation" can be used, which uses a brainwave recording electrode worn at the front portion from a line connecting the left and right ear lobes as an electrode at the front portion, and uses a brainwave recording electrode warn at the back portion from the line connecting the left and right ear lobes as an electrode at the back portion. As an embodiment of such a "front-back signal correlation", electrodes comprising an "electrode at the frontal portion" and an "electrode at the parietal portion" are used. The "parietal portion" is encompassed by "back portion", and "back" can include the parietal portion as well as the central portion and occipital portion, but this can be only the parietal portion and the occipital portion. Alternatively, mid-temporal and posterior temporal portions can also be encompassed by back portion.

In one embodiment, the brainwave feature comprises at least one selected from the group consisting of a potential (mean amplitude or the like), frequency power, and a complexity index. In a preferred embodiment, potential is included as a brainwave feature. In such a case, the brainwave feature correlation is also referred to as potential correlation.

In one embodiment, the mean amplitude that can be used in the present disclosure is dependent on a stimulation application time or pain duration, but can be a mean value of an absolute value of amplitude during 15 seconds after application of stimulation as shown in the Examples. When seven electrodes are used, there would be a mean of seven amplitude absolute values for each level of stimulation.

In one embodiment, the frequency power comprises at least one of 5 bandwidths $\delta$, $\theta$, $\alpha$, $\beta$, and $\gamma$ in Fp1, Fp2, F3, F4, C3, C4, and Pz.

In one embodiment, the method of the present disclosure comprises generating a differentiation model by machine learning using the brainwave feature. The machine learning used can use any algorithm used in the art. Upon doing so, the brainwave feature may be augmented by the above-mentioned system 100 to generate a differentiation model by machine learning using the augmented brainwave feature.

For example, differentiation model creation using machine learning can be provided by a method comprising: a) obtaining brainwave data or analysis data thereof from the object; b) contracting features in the brainwave data or analysis data thereof with respect to the pain; c) differentiating and analyzing by machine learning and cross validation from top of ranking of weighting coefficient (including approximation coefficient; e.g., regression coefficient) of each feature after the contracting or combination thereof; and d) determining a model that attains a given accuracy. (Medical Apparatus/System/Program)

In one aspect, the present disclosure provides an apparatus for evaluating or determining pain experienced by an object, the apparatus comprising: A) a headset comprising at least one electrode for obtaining a brainwave signal; and B) a base unit, wherein the base unit calculates a parameter comprising at least one selected from the group consisting of brainwave feature correlation and/or a complexity index of a brainwave, wherein a differentiation model correlating the parameter with a pain level of the object is generated, and wherein the pain level of the object is calculated and displayed by applying the parameter of the object to the differentiation model.

Any headset can be used herein, as long as the headset can be worn on the head and measure brainwaves. Examples thereof include, but not limited to, wireless head gear shaped headsets with electrodes attached thereto. Any base unit can be used, as long as the function described above can be materialized. The base unit used can have any shape used in normal medical equipment or device. For example, a base unit can comprise portions that receive, analyze, differentiate, and display brainwave signals from a headset.

In one aspect, the present disclosure provides a computer program for making an apparatus implement a process for evaluating or determining pain experienced by an object, the process: calculating a parameter comprising at least one selected from the group consisting of correlation of brainwave features of a brainwave and/or a complexity index of a brainwave; generating a differentiation model for correlating the parameter with a pain level of the object; and calculating and displaying the pain level of the object by applying the parameter of the object to the differentiation model.

In another aspect, the present disclosure provides a recording medium storing a computer program for making an apparatus implement a process for evaluating or determining pain experienced by an object, the process: calculating a parameter comprising at least one selected from the group consisting of correlation of brainwave features of a brainwave and/or a complexity index of a brainwave; generating a differentiation model for correlating the parameter with a pain level of the object; and calculating and displaying the pain level of the object by applying the parameter of the object to the differentiation model.

In still another aspect, the present disclosure provides a method of evaluating or determining pain experienced by an object, the method comprising: calculating a parameter comprising at least one selected from the group consisting of correlation of brainwave features and/or a complexity index of a brainwave; generating a differentiation model for correlating the parameter with a pain level of the object; and calculating and displaying the pain level of the object by applying the parameter of the object to the differentiation model.

It is understood that each of the brainwave feature correlation and complexity index of a brainwave used in the apparatus, program, recording medium, and method of the present disclosure can use any embodiment described in the sections of (Brainwave feature correlation) and (Complexity index).

Each step for differentiation of pain using correlation of brainwave features or a complexity index of brainwave is described hereinafter.

Figure 20:
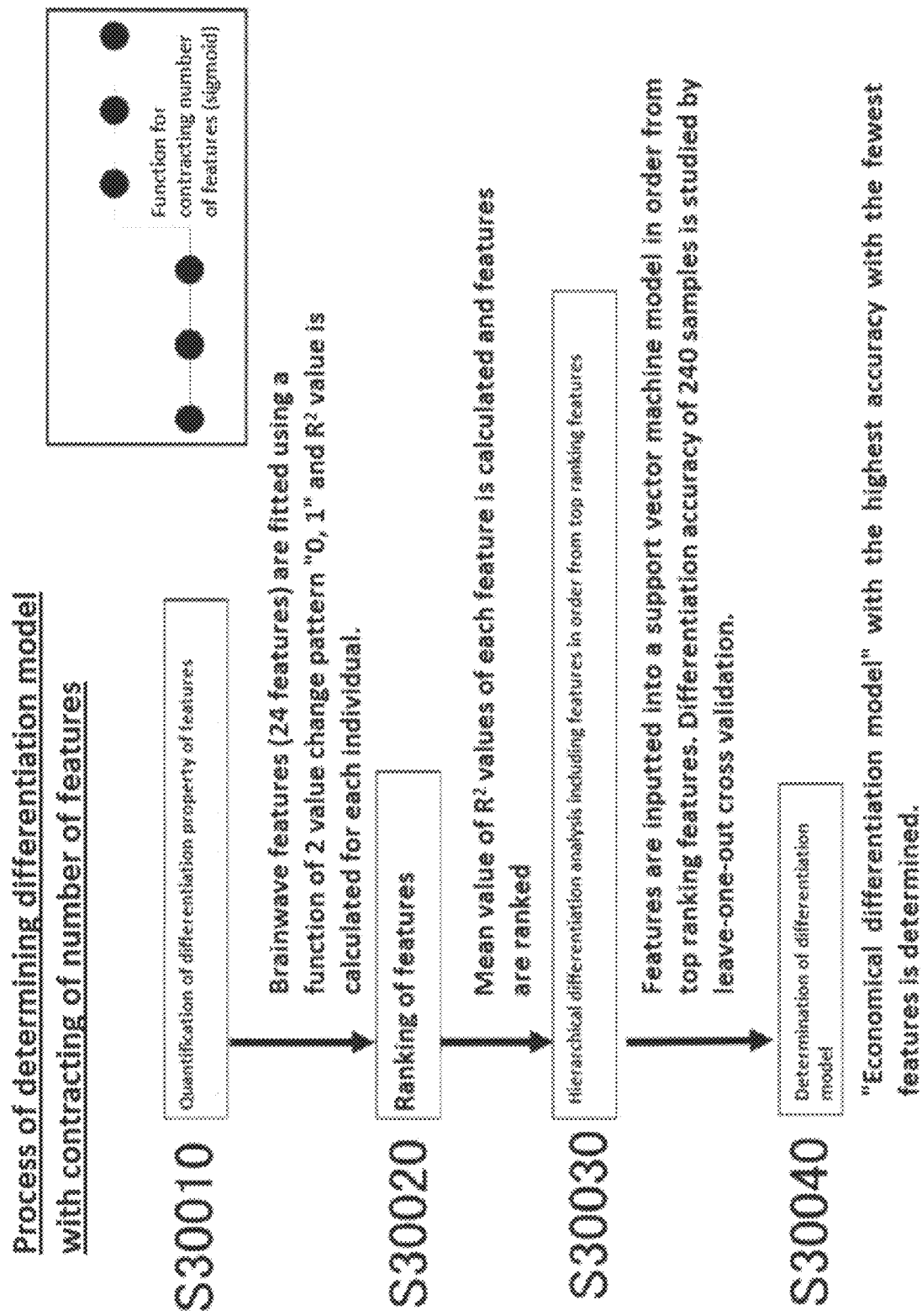
FIG. 20 shows an example of the flow of a determination process in differentiation analysis with a process of contracting the number of features. This is an example for 1) quantifying the feature differentiation properties, 2) ranking features, 3) performing hierarchical differentiation analysis with features included in order from the top feature, and 4) determining a differentiation model. All numerical values in the figure are exemplary.

A method of differentiating and analyzing using correlation of brainwave features or a complexity index is described hereinafter using a schematic diagram (FIG. 20).

a) First, the differentiation properties of features of brainwave data or analysis data thereof or the like or brainwave feature correction or complexity index are quantified (S30010). Specifically, this step fits a feature, or brainwave feature correction or complexity index, using a sigmoid function of two value change pattern "0, 1" to calculate a model approximation index (e.g., $R^2$ value) for each individual. This step can be considered a step for contracting features, or brainwave feature correction or complexity index, with respect to pain. This step can be used as a step for determining a threshold value or determination index in a model curve obtained by fitting when the objective is to differentiate or estimate individual features, or brainwave feature correction or complexity index. In other words, a threshold value can be determined by a numerical value such as a threshold potential and used as a determination index. More specifically, a differentiation/estimation model is created for 2, 3, or 4 classifications or more in accordance with conditional parameters using a feature, or brainwave feature correction or complexity index. As one method, a plot diagram is created and applied (fitted) to an appropriate fitting function such as a sigmoid function pattern or a step function. Any methodology that is known in the art can be used for fitting. Specific examples of such fitting functions include, but are not limited to, the functions described above, as well as a Boltzmann function, double Boltzmann function, Hill function, logistic dose response, sigmoid Richards function, sigmoid Weibull function, and the like. A standard logistic function is particularly called a sigmoid function. A standard function or a modified form thereof is common and preferred. The sample augmentation of the present disclosure may be carried out in any step, wherein the sample augmentation may be carried out after obtaining brainwave feature, or sample augmentation may be carried out after carrying out other processing such as contraction.

If a regression coefficient for fitting to an appropriate function pattern such as the sigmoid function pattern is at or greater than a given value, a threshold value for determining pain can optionally be determined based on the sigmoid curve or the like. In this regard, this can be generated based on an inflection point for sigmoid curves, but this is not limited thereto. As needed, pain classifiers can be calibrated to maximize the pain level classification.

b) Next, features such as brainwave feature correction or complexity index are ranked (S30020). In this regard, a weighting coefficient can be used. The mean value of $R^2$ values of each parameter or the like can be used as the weighting coefficient. Once calculation is completed, features such as brainwave feature correction or complexity index are ranked.

Next, c) hierarchical differentiation analysis that includes features such as brainwave feature correction or complexity index in order from top ranking features is performed (S30030). Examples thereof include inputting features in order from top ranking features into a machine learning model such as support vector machine and studying the differentiation accuracy of all samples by leave-one-out or 10-fold cross validation and the like. b) and c) correspond to steps for differentiating and analyzing by machine learning and cross validation after inputting the weighting coefficients of each feature after contracting or a combination thereof from top of the ranking.

d) Next, a differentiation model is determined (S30040). This corresponds to a step of determining a model that attains a given accuracy. For example, a model with the highest accuracy or an "economical differentiation model" with the fewest feature for a model with the same accuracy can be determined. However, a setting such as select any model that attains a give accuracy (e.g., 70% differentiation accuracy) or the like can be provided. In the present disclosure, steps c) and d) can be performed in a model generation unit. If it is expected that a model is predetermined using a known database, pain data may be inputted during actual monitoring to perform differentiation and estimation. Black arrows are the envisioned flow of actual monitoring.

Figure 21:
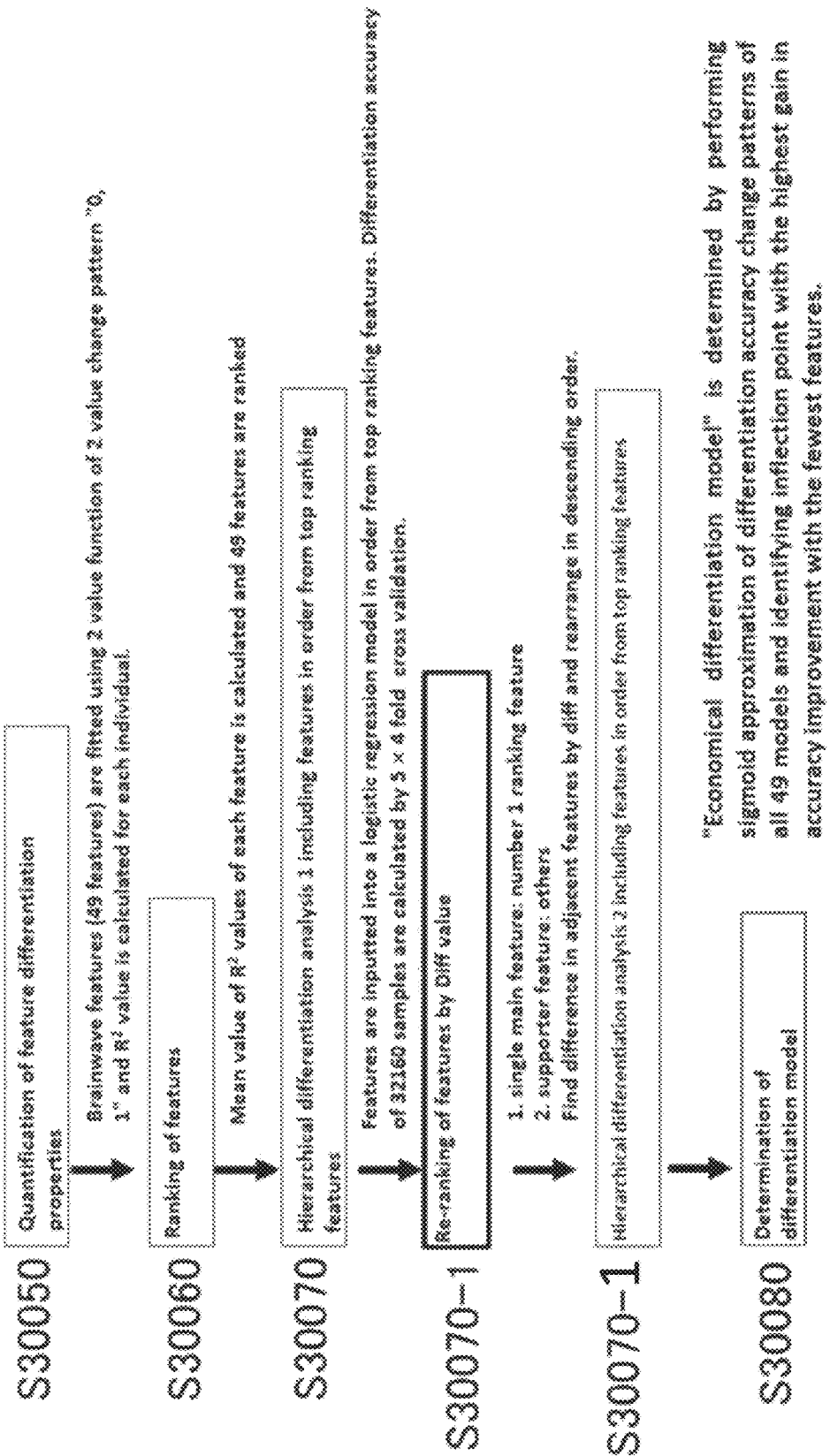
FIG. 21 shows a differentiation model determination process using double contracting process upon selecting a differentiation model and features. The differentiation model determination process in FIG. 79 includes the same processes up to 1) quantification of feature differentiation properties, 2) ranking of features, and 3) hierarchical differentiation analysis with features included in order from the top feature. Meanwhile, approximation of a change in differentiation accuracy using a sigmoid function or the like to select an economical differentiation model is newly included as of the final differentiation model selection. All numerical values in the figure are exemplary.
Figure 22:
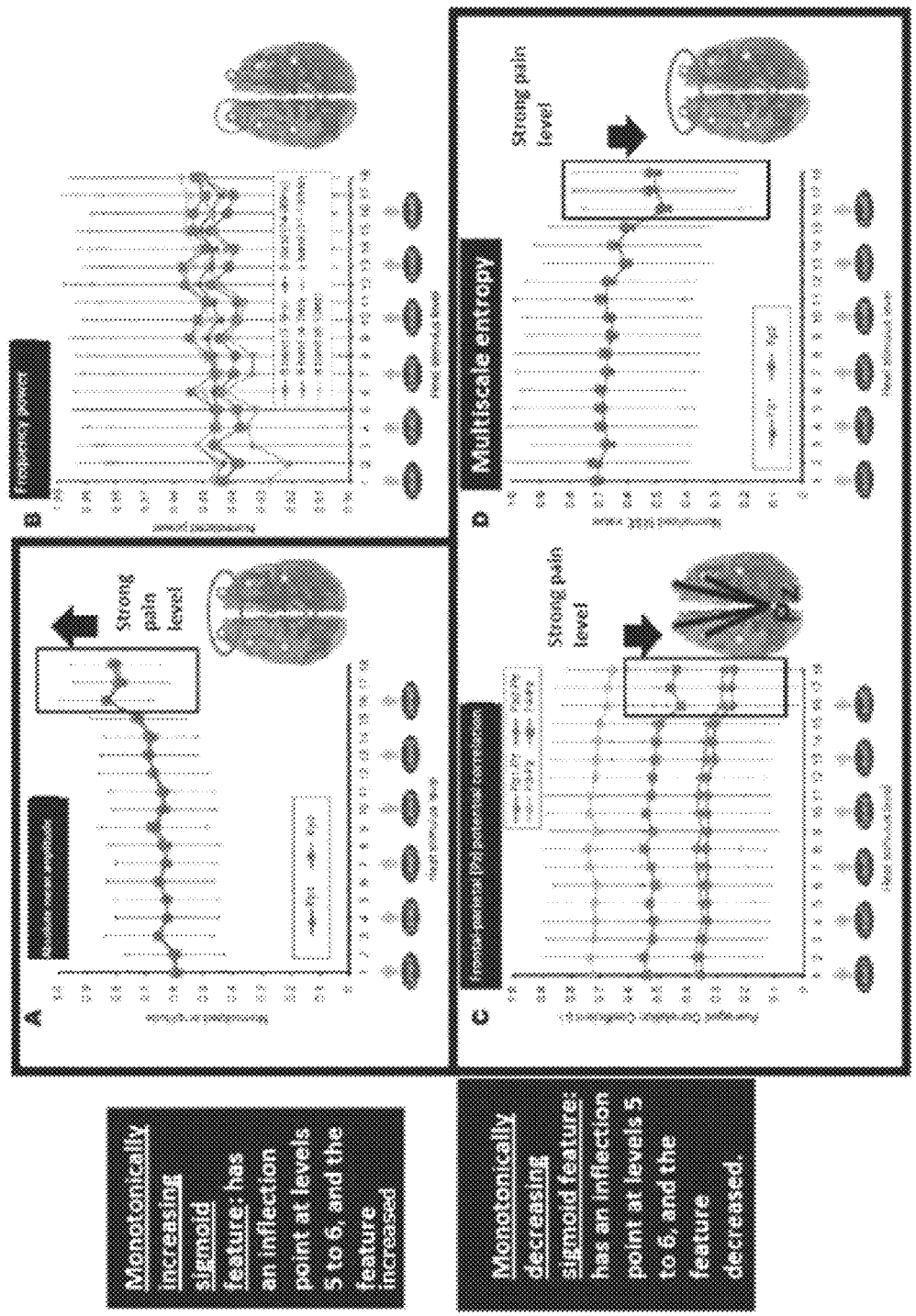
FIG. 22 shows a change in monotonically increasing sigmoid and monotonically decreasing sigmoid features. A shows the absolute mean amplitude, and B shows the frequency power. C shows frontal-parietal amplitude correlation (also known as potential correction), and D shows multiscale entropy (MSE). Monotonically increasing sigmoid: has an inflection point at monotonically increasing sigmoid feature: levels 5 to 6 in A, and the feature increased. Monotonically decreasing sigmoid: has an inflection point at monotonically decreasing sigmoid feature: levels 5 to 6 in C and D, and the feature decreased.

A method of re-ranking features such as correlation of brainwave features and a complexity index can also be used in a different optimal model selection process (see FIG. 21). In such a case, a differentiation model is determined in S30040 and then regressed to the feature ranking in S30020, features are re-ranked by a value of difference in differentiation accuracy of n−1 feature model (n≥2) and n feature model, and features are inputted into the model one at a time from the top features in S30030 to recalculate the differentiation accuracy. A differentiation model is then determined through the 2nd model determination process in S30040. These steps are as follows when using the symbols in FIG. 21. Specifically, a differentiation model is determined then regressed to the feature ranking in S30060, and features are re-ranked by a value of difference in differentiation accuracy of n−1 feature model (n≥2) and n feature model (S30070-1), and features are inputted into the model one at a time from top features in S30070-2 to recalculate the differentiation accuracy. A differentiation model is then determined through the model determination process in S30080.

A feature can be a feature that is obtained in response to some type of stimulation (e.g., low temperature stimulation, electrical stimulation, or the like) or obtained in a natural environment, or various brainwave data, brain activity data, amount of brain activity, amplitude data (EEG amplitude), frequency property, or the like can be used. It was found in the present disclosure that brainwave feature correction, complexity index, and the like are prioritized. Such brainwave data can be obtained using any methodology that is well known in the art. Brainwave data can be obtained by measuring electrical signals of a brainwave and is displayed by potential (can be displayed by μV or the like) as amplitude data or the like. Frequency properties are displayed as power spectrum density or the like (also referred to as frequency power or the like). A complexity index can also be calculated. After basic signal processing of brainwave data such as filtering, eye movement correction, or artifact removal, the data can be associated with a conditional parameter and a signal of the corresponding portion is extracted to create a brainwave feature. This includes mean value (arithmetic mean or geometric mean), other representative value (median or mode), entropy, frequency power, wavelet, mean and single run event related potential component, and the like. Further, the correlation of brainwave features can be calculated from such brainwave features.

In a preferred embodiment, brainwave data is preferably collected by a simple method, which can 1) use electrodes at a number that is required for analysis, 2) avoid the scalp with hair as much as possible, and 3) record while sleeping, to carry out the present disclosure. Exemplary number of electrodes used is, but not limited to, 24, but the number can be 12 to 24, 24 to 36, 6 to 12, or fewer (e.g., 3, 4, 5, or the like). When brainwave feature correlation is used, brainwave feature correlation at any preferred positions described herein can be used.

For contracting, sigmoid fitting, or a step function with stepwise inflection, a linear function with a continuous stepwise change, or the like can be used.

As a weighting coefficient, a regression coefficient, or an $R^2$ value, correlation coefficient, residual sum of squares (difference between differentiation function and feature), or the like can be used. However, it is important that pain or stress sensed by an individual can be distinguished with as much accuracy as possible for differentiation of pain, so that efficacy which is different from detection of statistically significant difference can be required or intended.

In one embodiment, brainwave data or analysis data thereof for obtaining the brainwave feature correction or complexity index used in the present disclosure comprises, as data recording positions, frontal-parietal portions such as F3, F4, C3, C4, P3, and P4 in compliance with the international 10-20 system or expanded standard thereof, and positions on the scalp over the occipital portion as electrode positions. Alternatively, a position at a specific uniform distance (e.g., 2.5 cm or the like) can be covered. The duration of recording and analysis can be, for a short period of event related potential activity, 0 to 100, 100 to 200, 200 to 300, 300 to 400, 400 to 500, 500 to 600, 600 to 700, 700 to 800 milliseconds (ms), a shorter time segment (10 milliseconds or the like), or a longer time frame (sometimes spanning several seconds).

In still another embodiment, features such as correlation of brainwave features or a complexity index that can be used comprises a feature in an electrode at at least one selected from the group consisting of Fp1, Fp2, Fpz, F3, F4, Fz, C3, C4, Cz, P3, P4, and Pz, such as mean amplitude Fz, C3, and C4, and frequency Fz ($\delta$), Fz ($\beta$), Cz ($\delta$), C3 ($\theta$), and C4 ($\beta$). A feature can comprise Cz (amplitude), C3 ($\alpha$), Cz ($\beta$), Fz ($\delta$), and Cz ($\gamma$). In a preferred embodiment, any feature described in the sections of (Complexity index) and (Brainwave feature correlation) can be used herein.

Figure 24:
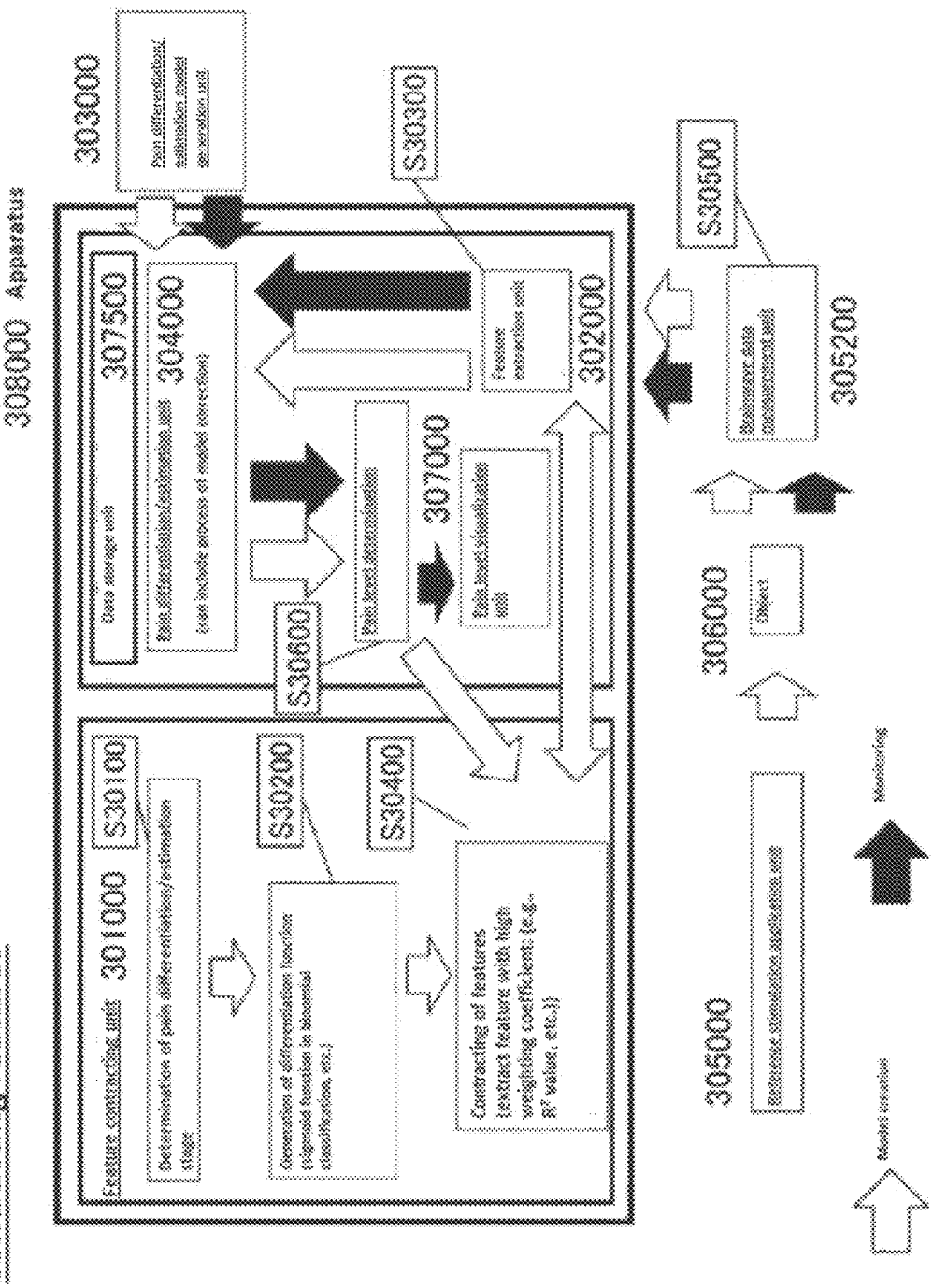
FIG. 24 is a schematic diagram of a differentiation apparatus with a feature contracting process. As of the model creation (white arrow), a differentiation function matching the number of classification levels is created and fitted to each feature, and a feature is selected with a weighting coefficient such as R square value to create a differentiation model. This information is stored in a feature extraction unit and a differentiation estimation unit. A pain level is differentiated and estimated online in actual pain monitoring (black arrow).

FIG. 24 describes a schematic diagram of the apparatus of the present disclosure (differentiation apparatus with a process of contracting features) (301000 to 308000) (it should be noted that some of the configuration diagrams are optional constituents that can be omitted). In this schematic diagram, each step is described when appropriate (S30100 to S30600). The sample augmentation of the present disclosure may be carried out in this apparatus, wherein the function of sample augmentation may be installed in an existing feature contracting unit and a different module that is not separately shown (sample augmentation unit) may be set to carry out sample augmentation in said module.

As shown in FIG. 24, this apparatus is comprised of a feature contracting unit 301000, a feature extraction unit 302000, pain differentiation/estimation model generation unit 303000, pain differentiation/estimation unit (can comprise a model correction process) 304000, a reference stimulation application unit 305000, a brainwave data measurement unit 305200, and a pain level visualization unit 307000. An object is denoted as 306000. A data storage unit 307500 can be optionally installed.

In such differentiation with a process of contracting, the number of pain differentiation/estimation stages (2 stages, 3 stages, or the like) is determined (S30100), and a differentiation function is generated (examples include sigmoid functions in binomial classification and the like; S30200). A feature is obtained after a reference stimulation (electrical stimulation or the like) is applied to the object 306000 from the reference stimulation application unit 305000 in accordance with the differentiation stage determined at S30100, and a feature related to a pain stage is collected (S30300) and contracted (S30400). The collected feature is approximated by a differentiation function generated at S30200 and ranked in accordance with the magnitude of the obtained approximation coefficient (regression coefficient or the like) Features are used in order from the top features. The pain level of reference stimulation is differentiated and estimated with the pain differentiation/estimation unit 304000, and a differentiation model with the number of features with the highest differentiation accuracy is used for monitoring pain. This is one embodiment of the process of contracting features S30400. A differentiation model (algorithm) installed in a pain differentiation/estimation unit used in the process of contracting (white arrows) and actual pain monitoring process (black arrows) is created at the pain differentiation/estimation model generation unit 303000, and installed in the pain differentiation/estimation unit 304000. After completion of the preprocessing described above at the feature contracting unit 301000, actual pain related brainwave data is collected from the object 306000 at the brainwave data measurement unit 305200 comprising an electroencephalograph or the like (S30500). This is transmitted to the feature extraction unit 302000 and converted to a feature selected in the process of contracting amplitudes, frequencies, or the like (e.g., can be complexity index, brainwave feature correlation, or the like of specific electrodes). The extracted parameter is taken into the pain differentiation/ estimation unit 304000 (can comprise a model correction process) from the feature extraction unit 302000, and a pain level is determined (S30600). The result of the determination is indicated as a trend of changes or numerical value (e.g., 1 to 100) at the pain level visualization unit 307000.

The determination of the pain differentiation/estimation stages at S30100 determines the number of levels to be differentiated or estimated (e.g., 2 stages, 3 stages, or the like).

The generation of a differentiation function at S30200 creates a differentiation function used in accordance with the number of differentiation levels at S30100 (sigmoid function or step function in binomial classification or the like).

In the collection of pain stage associated features at S30300, reference stimulation (electrical stimulation or the like) is applied a plurality of times from the reference stimulation application unit 305000 to the object 306000 in accordance with the number of levels determined at S30100 to collect related features such as brainwave feature correction and complexity index.

In contracting of a feature at S30400, a feature obtained at S30300 is approximated with a differentiation function, features with high approximation index (e.g., $R^2$ value or the like) are ranked, and features are inputted into the pain differentiation/estimation unit 304000 in order from top ranking features to differentiate and estimate a level of reference stimulation. A model with a number of features with the highest differentiation accuracy thereamong is used for actual pain differentiation/estimation.

For collection of pain related brainwave data at S30500, actual pain related brainwave data subjected to monitoring of pain is collected after completion of the contracting process at the feature contracting unit 301000. This step is data collection in an actual pain monitoring process.

For pain level determination at S30600, actual pain related data obtained at S30500 is processed at the feature extraction unit 302000 to obtain a feature set, which is then differentiated and estimated at the pain differentiation/estimation unit 304000, and a pain level is quantified from an estimated value, and a pain level is determined and made visible at the pain level visualization unit 307000.

The apparatus 308000 is configured to comprise or to be connected to an electroencephalograph that is or can be connected to the object (306000), so that brainwave data synchronized with stimulation emitted from the reference stimulation application unit 305000 to the object (306000) is obtained at the brainwave data measurement unit 305200. This is a summary of the apparatus 308000.

The apparatus 308000 can comprise a brainwave measurement unit, which internally comprises or externally connects to a brainwave recording sensor and optionally a brainwave augmentation unit, and processes signals of a pain related brainwave and differentiates/estimates pain in the apparatus 308000. The brainwave augmentation unit may be caused to augment the signal intensity of the brainwave and the processing of the above-described sample augmentation may be carried out to the brainwave.

In the apparatus 308000, collected brainwave signals are processed to extract a brainwave feature at the feature extraction unit 302000. Upon extraction, a feature contracted in advance at the feature contracting unit 301000 is selected. Further, pain is (optionally) made visible at the pain level visualization unit 307000. The apparatus internally or externally comprises the reference stimulation application unit 305000, which applies reference stimulation such as electrical stimulation a plurality of times in accordance with the pain level determined at S30100 in order to contract features that are effective for monitoring pain of the object 306000. Brainwave data related thereto is recorded at the brainwave data measurement unit 305200, a related brainwave feature is obtained at the feature extraction unit 302000, a pain level of reference stimulation is differentiated and estimated from the feature at the pain differentiation/estimation unit 304000, and the feature is contracted S30400 from the result thereof. The reference stimulation application unit 305000 also transmits pain stimulation information (stimulation type, environmental information, or the like) for differentiating an actual unknown pain level and creating a differentiator. The reference stimulation application unit 305000 optionally comprises a stimulation information visualization unit in addition to the reference stimulation application unit 305000 and may display information such as an image or number associated with the stimulation or environment. The apparatus 308000 can also internally or externally comprise the pain differentiation/estimation unit 304000 for generating a determination value or differentiator.

In this manner, the apparatus 308000 comprises the brainwave data measurement unit 305200 and the pain differentiation/estimation unit 304000 and optionally the reference stimulation application unit 305000. The apparatus 308000 is materialized, for example, by a computer comprising a processor and a memory. In such a case, the apparatus 308000 makes the processor function as the feature contracting unit 301000, feature extraction unit 302000, pain differentiation/estimation model generation unit 303000, pain differentiation/estimation unit 304000, or the like as needed when a program stored in the memory is implemented by the processor. Stimulation or environmental information is also made visible as needed. The apparatus 308000 of the present disclosure can be materialized, for example, by a dedicated electronic circuit. A dedicated electronic circuit can be a single integrated circuit or a plurality of electrical circuits. The brainwave data obtaining unit and pleasant/unpleasant determination value generation unit can have the same configuration as a pleasant/unpleasant determination apparatus.

The feature extraction unit 302000 can also obtain a plurality of brainwave data by measuring a brainwave a plurality of times from an object being estimated via an electroencephalograph (included in the brainwave data measurement unit 305200). An object is an organism in which a change in a brainwave is induced due to stimulation or environment, which does not need to be limited to humans.

The pain differentiation/estimation unit 304000 differentiates/estimates the degree of unpleasantness using a determination value, and also generates a differentiator of determination value if not generated in advance externally or internally. The part generating a differentiator or determination value can be comprised external or internal to the apparatus 308000 as the pain differentiation/estimation unit 304000. A differentiation value used for differentiation/estimation of pain is for estimating or classifying the degree of unpleasantness from amplitudes of a plurality of brainwave data. Specifically, the pain differentiation/estimation unit 304000 or the pain differentiation/estimation model generation unit 303000 can generate a determination value for estimating or classifying the degree of unpleasantness of an object from brainwave data.

A brainwave recording sensor contained in the brainwave data measurement unit 305200 measures electrical activity generated inside the brain of an object being estimated with an electrode on the scalp. The brainwave recording sensor also outputs the result of measurement, i.e., brainwave data. Brainwave data can be augmented as needed.

OTHER EMBODIMENTS

The differentiation method, program, and apparatus according to one or more embodiments of the present disclosure has been described based on the embodiments, but the present disclosure is not limited to such embodiments. Various modifications applied to the present embodiments and embodiments constructed by combining constituent elements in different embodiments that are conceivable to those skilled in the art are also encompassed within the scope of one or more embodiments of the present disclosure as long as such embodiments do not deviate from the intent of the present disclosure.

For example, a peak to peak value can be used as the amplitude value of brainwave data in each of the embodiments described above, but the amplitude value is not limited thereto. For example, a simple peak value can be used as the amplitude value.

In the embodiment described above, the range of the value of magnitude of the degree of unpleasantness is envisioned to be set so that the value of Pmax, which is the magnitude of the degree of unpleasantness corresponding to the upper limit value Amax of a feature such as brainwave amplitude or a combination thereof, would be 1, or the value of Pmin, which is the magnitude of pain corresponding to the lower limit value Amin of the feature or combination thereof, would be 0, but the range of values is not limited thereto. For example, the magnitude of pain can be represented by 0 to 100. In such a case, the pain differentiation/estimation unit 304000 can estimate the value Px of magnitude of pain, when shown by the pain level visualization unit 307000, by the following equation.

$$Px = Pmax \times (Ax - Amin)/(Amax - Amin)$$

Curve fitting including sigmoid fitting was described above as an example of generating a pleasant/unpleasant determination value by analyzing a plurality of brainwave data, but this is not a limiting example. A predetermined value can also be used as the upper limit value of a brainwave amplitude. The predetermined value (absolute value) is for example 50 µV to 100 µV, which can be experimentally or empirically determined. In such normal analysis, data from about plus or minus 50 µV to 100 µV is eliminated as an artifact removal method. Such artifact removal can also be performed in the present disclosure as needed.

Any type of stimulation can be applied as stimulation applied to the object 306000 by the reference stimulation application unit 305000 (see FIG. 24) as long as the magnitude of the degree of unpleasantness sensed by the object 306000 changes in accordance with the type of stimulation or application environment.

Some or all of the constituent elements of the apparatus of the present disclosure in each of the embodiments described above can be comprised of a single system LSI (Large Scale Integration). For example, as shown in FIG. 24, the apparatus 308000 can be comprised of the feature contracting unit 301000, pain differentiation/estimation model generation unit 303000, pain differentiation/estimation unit 304000, and pain level visualization unit 307000, as well as a system LSI having the feature extraction unit 302000 and the reference stimulation application unit 305000.

System LSI is ultra-multifunctional LSI manufactured by integrating a plurality of constituents on a single chip, or specifically a computer system comprised of a microprocessor, ROM (Read Only Memory), RAM (Random Access Memory) and the like. A computer program is stored in a ROM. The system LSI accomplishes its function by the microprocessor operating in accordance with the computer program.

The term system LSI is used herein, but the term IC, LSI, super LSI, and ultra LSI can also be used depending on the difference in the degree of integration. The methodology for forming an integrated circuit is not limited to LSI, but can be materialized with a dedicated circuit or universal processor. After the manufacture of LSI, a programmable FPGA (Field Programmable Gate Array) or reconfigurable processor which allows reconfiguration of connection or setting of circuit cells inside the LSI can be utilized.

If a technology of integrated circuits that replaces LSI by advances in semiconductor technologies or other derivative technologies becomes available, functional blocks can obviously be integrated using such technologies. Application of biotechnology or the like is also a possibility.

One embodiment of the present disclosure can be not only such a pain differentiation/estimation model generation, sustained pain differentiation/estimation unit, but also a pain classifier generation, pain differentiation/classification method using characteristic constituent units contained in a pain differentiation/estimation apparatus as steps. Further, one embodiment of the present disclosure can be a computer program for implementing each characteristic step in feature contracting, feature extraction, pain differentiation/estimation model generation, and pain differentiation/estimation on a computer. One embodiment of the present disclosure can also be a computer readable non-transient recording medium on which such a computer program is recorded.

In each embodiment described herein, generation of a sample for differentiating the pain of an object may be carried out by, for example, the following method. In other words, a method comprising: a) the step of carrying out a pain test to a plurality of subjects to obtain a plurality of COVAS data;
b) the step of averaging the plurality of COVAS data to create a COVAS template;
c) the step of carrying out the pain test to the subjects to obtain brainwave data or analysis data thereof from the subjects;
d) the step of cutting out the brainwave data or analysis date thereof based on the COVAS template; and
e) the step of using the cut out brainwave data or analysis data thereof as data for learning and learning a value of a COVAS data corresponding to the cut out brainwave data or analysis data thereof as a label to create a model.

This method is characterized in that a pain test is carried out beforehand to a plurality of subjects that are not an object, wherein the plurality of COVAS data obtained from the pain test is averaged to create a COVAS template.

The pain test is a test of imposing any pain, wherein the pain is imposed on a plurality of subjects in accordance with a predetermined profile. The pain may be, for example, electrical stimulation, or may be thermal stimulation. The pain, for example, may be stimulation with an intensity that increases in a step-like manner from weak stimulation to strong stimulation, may be stimulation with an intensity that decreases in a step-like manner from strong stimulation to weak stimulation, may be a combination thereof, or may be stimulation with an intensity that fluctuates between weak stimulation and strong stimulation.

The COVAS (computerized visual analog scale) data expresses subjective evaluation of pain by a plurality of subjects when a pain test has been carried out to the plurality of subjects. The COVAS data is associated with each subjective evaluation to each pain in the pain test. The COVAS data has the length of the amount of time of the pain test.

The plurality of subjects may preferably be healthy people against the pain. This means that a COVAS template expresses the subjective evaluation of pain by healthy people by averaging the COVAS data by a plurality of subjects.

Furthermore, this method is characterized in that the brainwave data or analysis data thereof obtained by carrying out the pain test to an object differentiating pain is cut out based on a COVAS template that has been created beforehand. Herein, in the pain test, the pain is imposed on the object in accordance with the same profile as the pain test carried out for creating a COVAS template.

Upon cutting out the brainwave data or analysis data hereof based on a COVAS template that has been created beforehand, it is preferable that timing of initiation of pain stimulation be made consistent between a COVAS template and brainwave data or analysis data thereof to be cut out. This enables the COVAS template to correspond to the cut out brainwave data or analysis data thereof as a label. In other words, it becomes possible to differentiate what kind of pain causes the brainwave data or analysis data thereof via the subjective evaluation of the COVAS template. The brainwave data or analysis data thereof labeled by the COVAS template can be used for learning for creating a model for differentiating pain.

The timing of initiation of pain stimulation may be able to be made consistent by, for example, matching a trigger showing the timing of initiation of pain stimulation comprised in the brainwave data or analysis data thereof and a trigger showing the timing of initiation of pain stimulation comprised in the COVAS template.

Furthermore, this method is characterized in that the cut out brainwave data or analysis data thereof is used as data for learning and a value of a COVAS template corresponding to the cut out brainwave data or analysis date thereof is learned as a label to create a model.

The methodology used for learning may be any methodology. The methodology used for learning may be, for example, LSTM (Long short-term memory). For example, the cut out brainwave data or analysis data thereof is used for input of LSTM and a value of the COVAS template is used for the label thereof (supervisory output) to carry out learning.

In the step of learning, the processing of augmenting the supervisory data used for the machine learning described above can be carried out.

It is preferable that, before augmenting the cut out brainwave data or analysis data thereof, the COVAS template be sorted, and, in accordance therewith, the cut out brainwave data or analysis date thereof corresponding to the COVAS template be sorted, and the brainwave data or analysis data thereof close to the value of the COVAS template be augmented as a collective (e.g., unit of 5 samples). This enables definition of an appropriate label for an augmented sample.

The sorting can be carried out in any order. For example, sorting may be carried out in an order of increase from lower to higher value of the COVAS template, or sorting may be carried out in an order of decrease from higher to lower of the value of the COVAS template.

(Pain Classifier Generation)

In one aspect, the present disclosure provides a method of generating a pain classifier for generating pain that an object being estimated has based on a brainwave of the object being estimated. The method encompasses a) the step of stimulating the object being estimated with a plurality of levels stimulation intensities, b) the step of obtaining brainwave data of the object being estimated corresponding to the stimulation intensity (also referred to as brain activity data, amount of brain activity; e.g., brainwave amplitude data ("EEG amplitude"), frequency property, or the like), c) the step of augmenting brainwave data or analysis data thereof of the object being estimated, comprising i) deriving a covariance matrix from brainwave data or analysis data thereof of the object being estimated, ii) decomposing the covariance matrix and iii) applying a random number to the decomposed matrix, d) the step of plotting the stimulation intensity or a subjective pain sensation level corresponding to the stimulation intensity and the brainwave data to fit to a pain function such as a linear function with the range of inflection linearly approximated or a more comprehensive sigmoid function pattern encompassing the above to obtain a pain function specific to the object being estimated, and e) the step of, when regression coefficient of the fitting to the specific pain function is equal to or more than what is predetermined, identifying a pain classifier for dividing a pain level into at least two or more (strong, medium, weak and the like are also possible) based on the specific pain function.

Alternatively, the present disclosure provides an apparatus generating a classifier for classifying pain that an object being estimated has based on a brainwave of the object being estimated. This apparatus comprises A) a stimulation unit stimulating the object being estimated with a plurality of levels of stimulation intensities, B) a brainwave data obtaining unit obtaining brainwave data (e.g., amplitude data) of the object being estimated corresponding to the stimulation intensity, C) an augmentation unit augmenting brainwave data or analysis data thereof of the object being estimated, wherein the augmentation unit is configured to i) derive a covariance matrix from brainwave data or analysis data thereof of the object being estimated, ii) decompose the covariance matrix and iii) apply a random number to the decomposed matrix, and D) a pain classifier generation unit plotting the stimulation intensity or a subjective pain sensation level corresponding to the stimulation intensity and the brainwave data to fit to a pain function such as a linear function with the range of inflection linearly approximated or a more comprehensive sigmoid function pattern encompassing the above to obtain a pain function specific to the object being estimated and identifying a pain classifier for dividing a pain level into at least two or more based on the specific pain function. Typically, step a) is performed in the A) stimulation unit, step b) is performed in the B) brainwave data obtaining unit, the above-described processing is carried out in view of FIGS. 3 to 5 in the C) augmentation unit, and step c) and step d) are performed in the D) pain classifier generation unit.

In the present disclosure, "estimation" or "differentiation" can be carried out by "classification" of pain. It is understood that, when whether the pain is strong/weak is understood by carrying out "pain classification" operation can be carried out so as not to impose strong intensity and the action/effect of an analgesic agent such as objectively understanding therapeutic effect would be obtained. It is possible to estimate "strong stimulation" from "weak stimulation", and, as long as it is possible to identify the range of change in the brain activity feature related to weak pain, "whether or not pain that is not weak is felt" can be estimated that "increase in the frequency of appearance of deviated feature=stronger pain". Since there is no label regarding the degree of pain that is strongly felt by a patient in an actual scene, it is preferable to present reference stimulation from weak pain to about a medium degree of the inflection point and identify the pattern of change in brain activity. It is possible to estimate the pain from the brain activity of the patient and differentiate the state of the pain. When "the range of inflection in the brain activity feature regarding weak pain" is understood, when the frequency of deviation from the range increases, it can be estimated that "pain that is not weak is felt".

Figure 25:
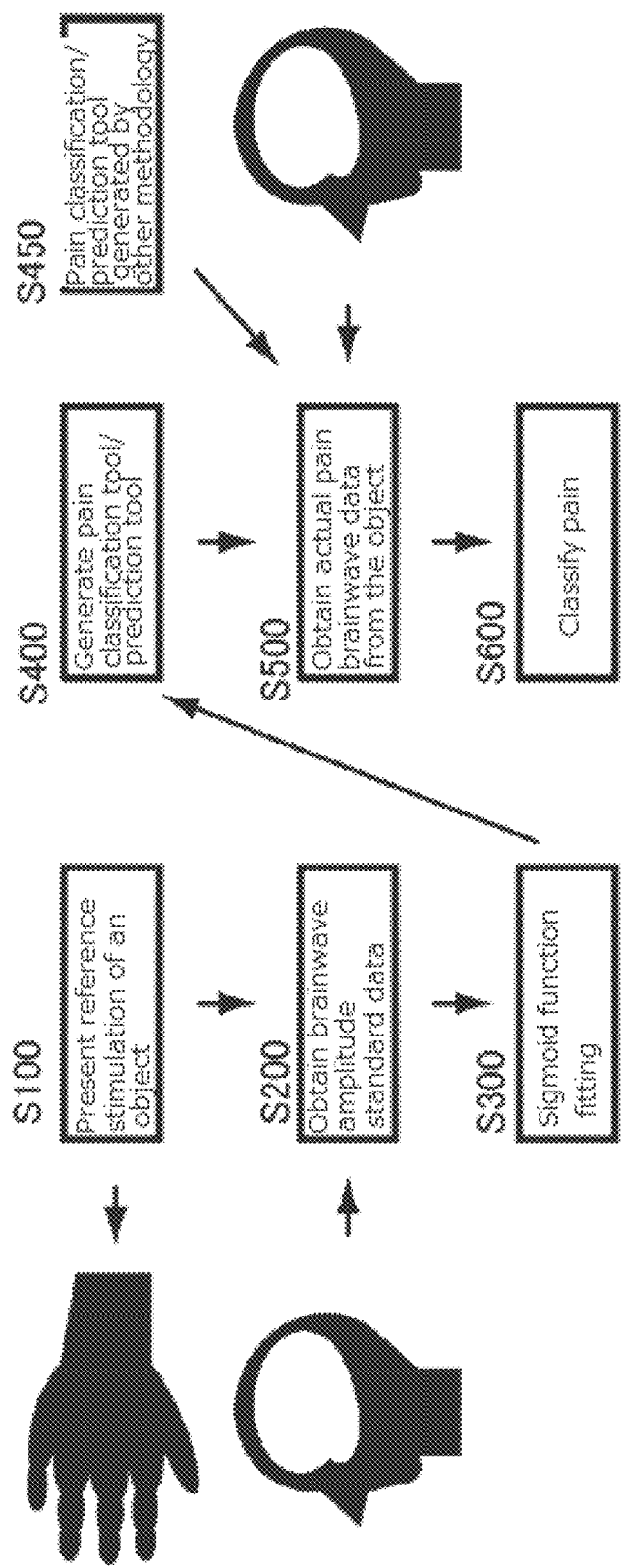
FIG. 25 is an example of a flow chart showing the flow in an embodiment of the present disclosure.

The following schematic diagram is used to describe a methodology of pain classifier generation (FIG. 25).

In the step (S100) of stimulating the object being estimated with a plurality of levels of stimulation intensities which is step a), the object being estimated is stimulated with a plurality of levels (strength or greatness) of stimulations (e.g., low temperature stimulation, electrical stimulation, or the like). The number of types of the stimulation intensities may be a number required for fitting to the pain function, which generally needs to be, for example, at least three types. This number of types is not necessarily required since fitting to the pain function is possible even with one type or two types by combining with previously obtained information. Meanwhile, when a fitting is newly carried out, it may be generally advantageous to carry out stimulation with at least 3 types, preferably four types, five types, six types or more types of levels of stimulation. In this regard, since burden on the object being estimated should be as little as possible, the stimulation intensity has high invasiveness to the object being estimated (in other words, the intensity that a subject cannot bear) and it is preferable that the number thereof be minimum or zero. Meanwhile, since stimulation with high invasiveness to an object being estimated may be required for a more accurate fitting, a minimum number can be taken in in accordance with the purpose. For example, the number of types of levels with high invasiveness to an object being estimated may be at least one type, at least two types, or at least three types, or may be four types or more when allowed by the object being estimated.

Step b) is a stem (S200) of obtaining brainwave data of the object being estimated corresponding to the stimulation intensity (also referred to as brainwave activity data, amount of brainwave activity, or the like; including, for example, amplitude data ("EEG augmentation"), frequency property, or the like), wherein such brainwave data can be obtained using any methodology that is well known in the art. Brainwave data can be obtained by measuring electrical signals of a brainwave and is displayed by potential (can be displayed by µV or the like) as amplitude data or the like. Frequency properties are displayed as power spectrum density or the like.

In a preferred embodiment, in order to practice the present disclosure, brainwave data is preferably collected by a simple method, which can 1) use as less electrodes as possible (about two), 2) avoid the scalp with hair as much as possible, and 3) record while sleeping, to carry out the invention. However, the number of electrodes may be increased as needed (e.g., may be three, four, five, or the like).

Step c) is a step of plotting the stimulation intensity and the augmented brainwave data to fit to a pain function (linear function or sigmoid curve) to obtain a pain function specific to the object being estimated (S300). In this step, the stimulation intensity used in step a) and the data in which the brainwave data obtained in step b) has been augmented by the augmentation unit are used to create a plot diagram to fit to a pain function. Fitting to a pain function can be carried out using any methodology known in the art. Specific examples of such fitting functions include, but are not limited to, linear function, as well as a Boltzmann function, double Boltzmann function, Hill function, logistic dose response, sigmoid Richards function, sigmoid Weibull function, and the like. A standard logistic function is particularly called a sigmoid function. A standard function or a modified form thereof is common and preferred.

Step d) is a step (S400) of, when regression coefficient of fitting to the pain function is equal to or more than what is predetermined as needed, identifying a pain classifier for dividing a pain level into at least two or more (or two to three or more stages of pain levels in terms of quantity/quality) based on the pain function. Identification of a classifier can be determined, but not limited to, based on the inflection point (central value or the like) of the pain function. As needed, pain classifiers can be calibrated to maximize the pain level classification. For example, a pain classifier can provisionally determine brainwave data corresponding to the inflection point of the pain function as a pain classifier. This pain classifier can be calibrated so that the original brainwave data and stimulation intensity corresponding thereto or the subjective pain sensation level of an object corresponding to the stimulation intensity would be actually evaluated and that the outlier would be less, preferably minimized. Such a pain classifier can be applied to calculation or classification of pain level and can be used for determination of the effect of therapy.

When the same subject is the object, previous classifier data may be used to comprise the step of succeeding or updating the classifier.

In the apparatus for the pain classifier generation of the present disclosure, A) the stimulation unit stimulating the object being estimated with a plurality of levels of stimulation intensities is configured so as to perform step a). In other words, the apparatus has means or function that can provide a plurality of types of stimulation intensities. Furthermore, the apparatus is configured so that such stimulation can be imposed on an object.

B) the brainwave data obtaining unit obtaining brainwave data (e.g., amplitude data) or analysis date thereof of the object being estimated corresponding to the stimulation intensity is configured to obtain brainwave data or analysis data thereof of an object being estimated. The brainwave data obtaining unit performs step b) and may also have other functions (e.g., step e) in a classification apparatus).

C) the pain classifier generation unit plotting the stimulation intensity or subjective pain sensation level corresponding to the stimulation intensity and brainwave data augmented by the augmentation unit to fit to a pain function such as a linear function with the range of inflection linearly approximated or a more comprehensive sigmoid function pattern encompassing the above to obtain a pain function specific to the object being estimated and identifying a pain classifier for dividing a pain level into at least two or more based on the specific pain function may have the function of carrying out fitting of the calculated specific pain function and generation of a pain classifier. C) the pain classifier generation unit normally performs step c) and step d). These two functions may be materialized in separate apparatuses, devices, CPUs, terminals, or the like, or may be materialized as one part. One CPU or calculation apparatus is normally configured to incorporate or be able to incorporate a program materializing these calculations.

Figure 26:
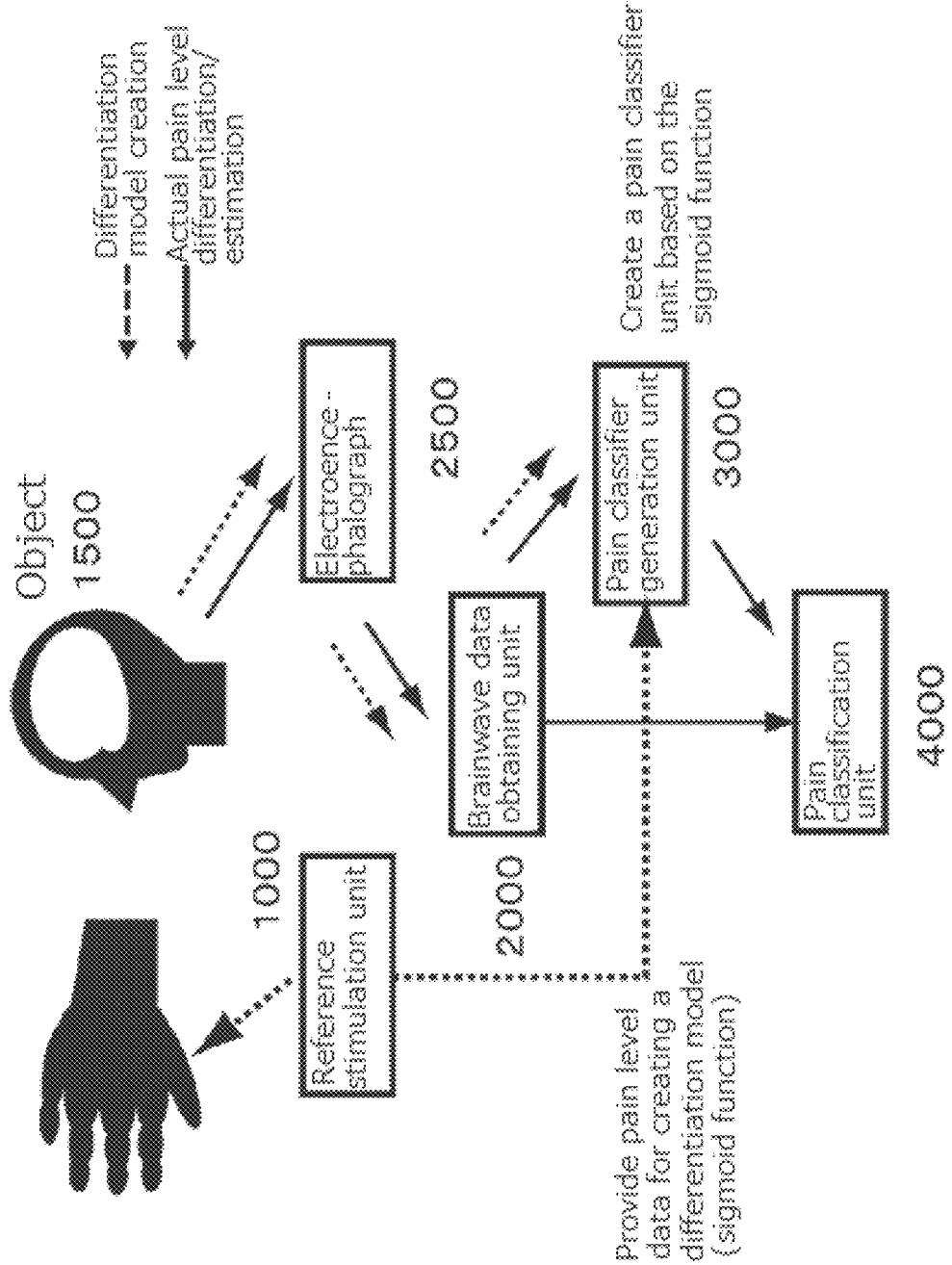
FIG. 26 is an example of a block diagram showing the functional configuration in an embodiment of the present disclosure.

FIG. 26 describes a schematic diagram of the apparatus of the present disclosure. Among the embodiments, this embodiment is a pain classifier measurement apparatus, thereby involving 1000 to 3000. A stimulation unit 1000 corresponds to A), wherein a value of stimulation is communicated to a brainwave data obtaining unit 2000 and pain classifier generation unit 3000. The brainwave data obtaining unit 2000 is configured (2500) so as to comprise or be connected with an electroencephalograph that is or can be connected to the object (1500), so that brainwave data or analysis data thereof is obtained from stimulation emitted from the reference stimulation application unit to the object (1500). Sample augmentation can be applied to the data obtained at the brainwave data obtaining unit. The sample augmentation may be applied in the electroencephalograph 2500, or may be applied to a different unit such as a pain classifier generation unit 3000 or a pain classifier unit 4000, or a sample augmentation unit (not shown) may be independently provided.

Figure 27:
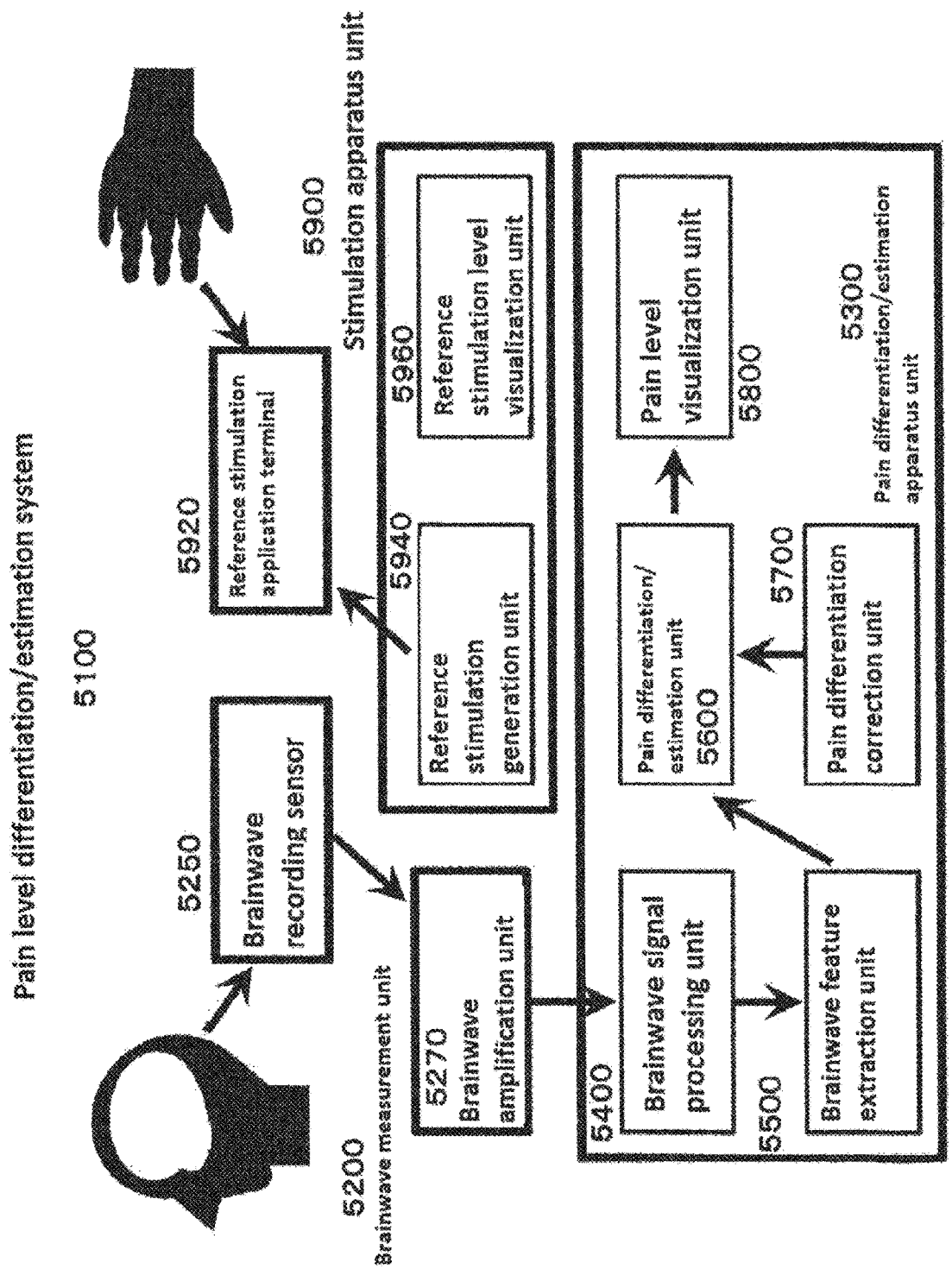
FIG. 27 is an example of a block diagram showing the functional configuration in an embodiment of the present disclosure.

FIG. 27 is a block diagram showing the functional configuration of pain estimation or pain classification or pain classifier generation system 5100 of one embodiment (it should be noted that parts of this configuration diagram are optional configuration parts which may be omitted). The system 5100 comprises a brainwave measurement unit 5200, which internally comprises or externally connects to a brainwave recording sensor 5250 and optionally a brainwave augmentation unit 5270, and processes signals of a pain related brainwave and differentiates/estimates pain in the pain differentiation/estimation apparatus unit 5300. The pain differentiation/estimation apparatus unit 5300 carries out processing of a brainwave signal in a brainwave signal processing using 5400, (if necessary, extracts brainwave feature in a brainwave feature extraction unit 5500), estimates/differentiates pain in the pain differentiation/estimation unit 5600, and (as needed) visualize pain in a pain level visualization unit 5800. In addition, a stimulation apparatus unit 5900 is comprised inside or outside, wherein this stimulation apparatus unit 5900 comprises a reference stimulation application unit (terminal) 5920, which contributes to creation of a pain classification tool of a patient. The stimulation apparatus unit may, as needed, comprise a reference stimulation level visualization unit 5960 also comprising a reference stimulation generation unit 5940.

Accordingly, the pain classifier generation system 5100 comprises a brainwave measurement unit 5200 and a pain differentiation/estimation apparatus unit estimation unit 5300, and comprises a stimulation apparatus unit 5900 (may comprise a reference stimulation unit) as needed. The pain differentiation/estimation apparatus unit 5300 is, for example, materialized by a computer comprising a processor and a memory. In this case, when a program stored in the memory is performed by the processor, the pain differentiation/estimation apparatus unit estimation unit 5300 causes the processor to function as a brainwave augmentation unit 5270 as needed, brainwave signal processing unit 5400, pain differentiation/estimation unit 5600 (as needed), pain level visualization unit 5800 (as needed) and the like. The brainwave augmentation unit 5270 can augment the signal intensity of a brainwave. Reference stimulation and visualization are also caused as needed. In addition, the system 5100 or apparatus unit 5300 of the present disclosure may be materialized by, for example, a dedicated electrical circuit. A dedicated electrical circuit can be a single integrated circuit or a plurality of electrical circuits. The brainwave data obtaining unit and pain classifier generation unit may have the same configuration as this pain estimation apparatus. The sample augmentation can be applied to data obtained in the brainwave measurement unit 200. Sample augmentation may be applied in the brainwave measurement unit 5200 (e.g., brainwave augmentation unit 5270), or may be applied to a different configuration unit in the pain differentiation/estimation apparatus 5300, or a sample augmentation unit (not shown) may be independently provided.

The brainwave measurement unit 5200 obtains a plurality of brainwave data by carrying out a plurality of times of brainwave measurement from an object being estimated via an electroencephalograph (brainwave recording sensor 5250). An object being estimated is an organism in which change in the brainwave is caused by pain, which does not have to be limited to people.

The pain differentiation/estimation unit 5600 generates pain classifier. The pain classifier is for estimating or classifying the greatness of pain from the amplitude of plurality of brainwave data. In other words, the pain differentiation/estimation unit 5600 can generate pain classifier for estimation of classification of pain of the object from the brainwave data.

The brainwave recording sensor 5250 measures the electrical activity generated in the brain of an object being estimated with an electrode on the scalp. Furthermore, the brainwave recording sensor 5250 outputs brainwave data which is the result of measurement. The brainwave data can be augmented as needed.

Next, a processing or method of an apparatus with the above-described configuration is explained. FIG. 25 is a flow chart showing a series of processing. In this aspect, S100 to S400 are involved. A pain classifier (also referred to as pain classification tool/plain prediction tool) is generated in S400.

Stimulation with a plurality of levels (greatness) of stimulation intensities are imposed on an object through the reference stimulation unit 1000 (S100).

Next, brainwave data (brainwave amplitude standard data such as amplitude data) is obtained (S200). Obtainment of brainwave data is carried out by the brainwave data obtaining unit 2000 according to FIG. 26. According to FIG. 27, the brainwave measurement unit 5200 obtains a plurality of brainwave data from an object being estimated via an electroencephalograph (brainwave recording sensor 5250) by carrying out a plurality of times of brainwave measurement to achieve brainwave data (e.g., amplitude data). The brainwave measurement unit 5200 may carry out brainwave measurement at a plurality of times. The brainwave data may be augmented by the above-described system 100.

The pain classifier generation unit 3000 (see FIG. 26) carries out pain function fitting (S300). When pain function fitting is carried out and it is determined that the regression coefficient is an appropriate value as needed, this pain function can be used to generate a pain classifier (pain classification tool/pain prediction tool) (S400). After generating a pain classifier, calibration can be carried out as needed.

In each of the embodiments described above, each constituent element can be materialized by being configured with a dedicated hardware or by implementing software program that is suited to each constituent element. Each constituent element can be materialized by a program implementation unit such as a CPU or a processor reading out and implementing a software program recorded on a recording medium such as a hard disk or semiconductor memory. In this regard, software materializing the pain estimation apparatus of each of the embodiments described above or the like can be a program such as those described below.

As used herein, "or" is used when "at least one or more" of the listed matters in the sentence can be employed. When explicitly described herein as "within the range of two values", the range also includes the two values themselves.

Reference literatures such as scientific literatures, patents, and patent applications cited herein are incorporated herein by reference to the same extent that the entirety of each document is specifically described.

As described above, the present disclosure has been described while showing preferred embodiments to facilitate understanding. The present disclosure is described hereinafter based on Examples. The above descriptions and the following Examples are not provided to limit the present disclosure, but for the sole purpose of exemplification. Thus, the scope of the present disclosure is not limited to the embodiments or the Examples specifically described herein and is limited only by the scope of claims.

EXAMPLES

Examples are described hereinafter. The objects used in the following Examples were handled, as needed, in compliance with the standards of the Osaka University, and the Declaration of Helsinki and ICH-GCP in relation to clinical studies.

Example 1: Augmentation of Pain Analysis
Result=Closed Eye Sample Augmentation

In this example, a closed eye sample was used to carry out pain analysis. Upon doing so, sample augmentation was carried out.
(Method and Material)
(Closed Eye Sample)
A closed eye sample refers to reaction data against stimulation of when the eyes of a subject are closed. In this example, in the eye-closing task of having the subject close the eyes, reaction data, which is brainwave data herein, in four different classes, "no pain", "having pain", "no pain with noise", "having pain with noise", was obtained. "No pain" shows a stable state with no stimulation, "having pain" shows a state when having 48° C. of thermal stimulation, "no pain with noise" shows a state of when noise upon movement such as tightly closing the eyes, stretching the body, or reading out loud is inputted, and "having pain with noise" shows the state of when noise associated with movement of the body upon 48° C. of thermal stimulation is inputted. A subject was asked to create each of the four states to obtain brainwave data thereupon.

The experimental trial is as described below.
(1) artifact1: noise test (tightly closing the eyes, stretching the body, reading out loud), eyes opened
(2) artifact2: noise test (tightly closing the eyes, stretching the body, reading out loud), eyes opened
(3) artifact_pain1: noise test upon pain stimulation (voluntary reaction with noise inputted), eyes opened
(4) artifact_pain2: noise test upon pain stimulation (voluntary reaction with noise inputted), eyes opened
(5) ref: pain stimulation, stable, eyes closed
(6) main1: pain stimulation, stable, eyes closed
(7) main2: pain stimulation, stable, eyes closed
(8) main3: noise test upon pain stimulation, eyes closed
(9) 2temp: pain stimulation (moderate: 46° C., great: 48° C.), eyes opened
(10) 2temp_artifact: noise test upon pain stimulation (moderate: 46° C., great: 48° C.) (voluntary reaction with noise inputted), eyes opened The brainwave uses 6ch of the forehead to extract the frequency power from the absolute amplitude and six frequency bands (2-5 Hz, 5-8 Hz, 8-14 Hz, 14-29 Hz, 31-40 Hz, 40-49 Hz) as a feature.

As pre-processing, EOG removal and bandpass filter were applied.

Data was collected while being divided into data for model creation and data for test (actual performance). (2), (4) and (5) of the experimentation trial are for creating a model, and (1), (3) and (6) to (10) are for test. Brainwave data of each class, no pain with no noise, having pain with no noise, no pain with noise and having pain with noise, was cut out using the time window of 8 seconds. A plurality of original samples were generated by shifting the time window in the direction of the time axis and carrying out cutout a plurality of times.

Sample augmentation method is applied to the plurality of original samples for each individual and to each of four classes to create a model to be fitted to the individual using LSTM (Long short-term memory).

Figure 28:
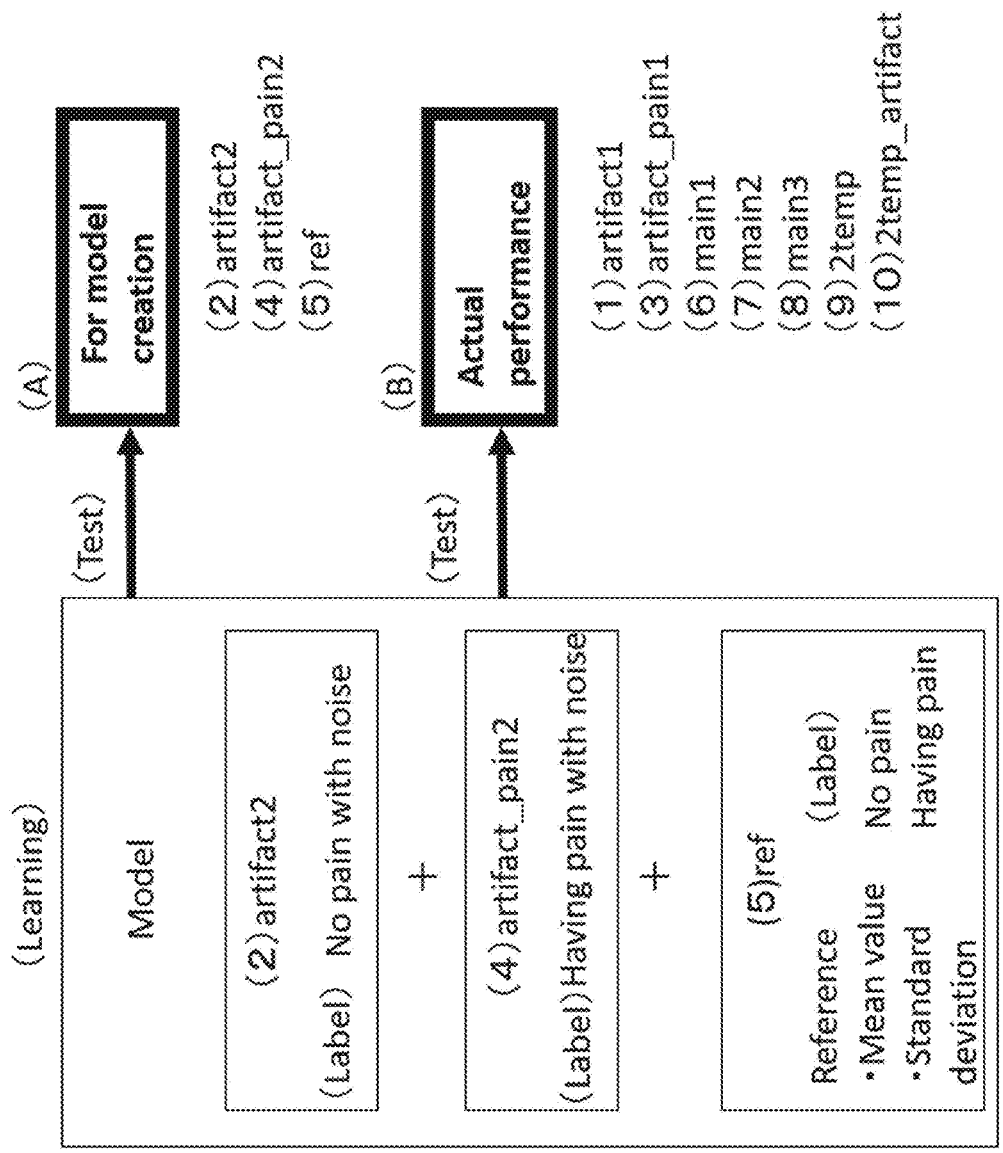
FIG. 28 shows the flow of 4 class LSTM analysis.
Figure 29:
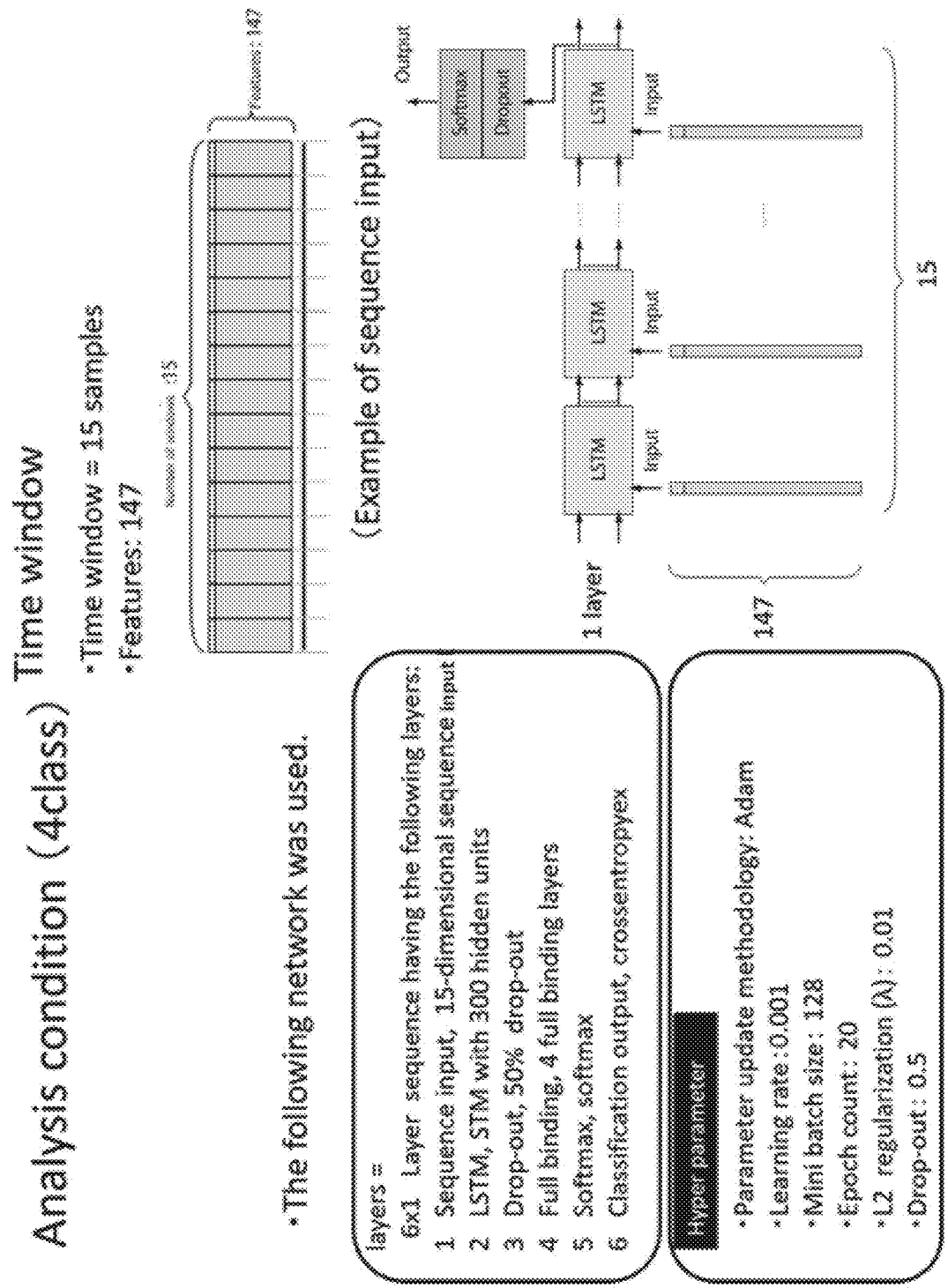
FIG. 29 shows the analysis condition for 4 class LSTM analysis.

FIG. 28 shows the flow of 4 class LSTM analysis. FIG. 29 shows the analysis condition for the 4 class LSTM analysis.

15 sequences were obtained from an 8 second time window by cutting 1 second sequences with a 0.5 second overlap. Since there are 147 original features, the overall features would be 147×15. The sample augmentation was carried out after feature extraction and before creation of a model. The result was outputted in 4 classes ("0: no pain/1: having pain/2: no pain with noise/3: having pain with noise") and 2 classes ("0: no pain/1: having pain") of softmax functions with respect to the off-line chronological data. The evaluation standards (differentiation precision, relevance ratio, recall ratio, F1 value) are compared in the 2 classes and 4 classes.

(Off-Line Chronological Data Analysis)

Off-line chronological data analysis was carried out in the following viewpoints.
(I) Differentiation Value (Softmax: 4 Classes)

A value differentiating which of the 4 classes is the one. The output values are, 0: no pain with no noise, 1: having pain with no noise, 2: no pain with noise, and 3: having pain with noise.

The results of all binding layers are inputted to the softmax function and the class with the highest percentage was determined as the differentiation value.
(II) Differentiation Value (Softmax: 2 Classes)

A value differentiating which of the 2 classes is the one. The output values are, 0: no pain and 1: having pain.

The result in the 4 classes of (1) was converted to the 2 classes. Specifically, the differentiation values 0 and 2 of the 4 classes were converted to the differentiation value 0 of the 2 classes and the differentiation values 1 and 3 of the 4 classes were converted into the differentiation value 1 of the 2 classes.

In this example, the differentiation values of these 2 classes and the correct label (where there is thermal stimulation) are compared to carry out the evaluation (differentiation precision, relevance ratio, recall ratio, F1 value).

The following 8 trials have the correct label of thermal stimulation:
(III) artifact_pain1, (4) artifact_pain2, (5) ref, (6) main1, (7) main2, (8) main3, (9) 2temp, (10) 2temp_artifact.
(3) Pain Estimation Value: −Log(1−x)

The pain estimation value (0-1) is a value converted with −log(1−x). When setting a threshold close to 1 (e.g., 0.99), the fluctuation in the estimated value is easier to see.
(IV) Brainwave: Fp1
(V) Feature: There are 147×15 Features, Wherein 147 Features and 15 Chronological Sequences Form a Unit.
(Result)

Figure 30A:
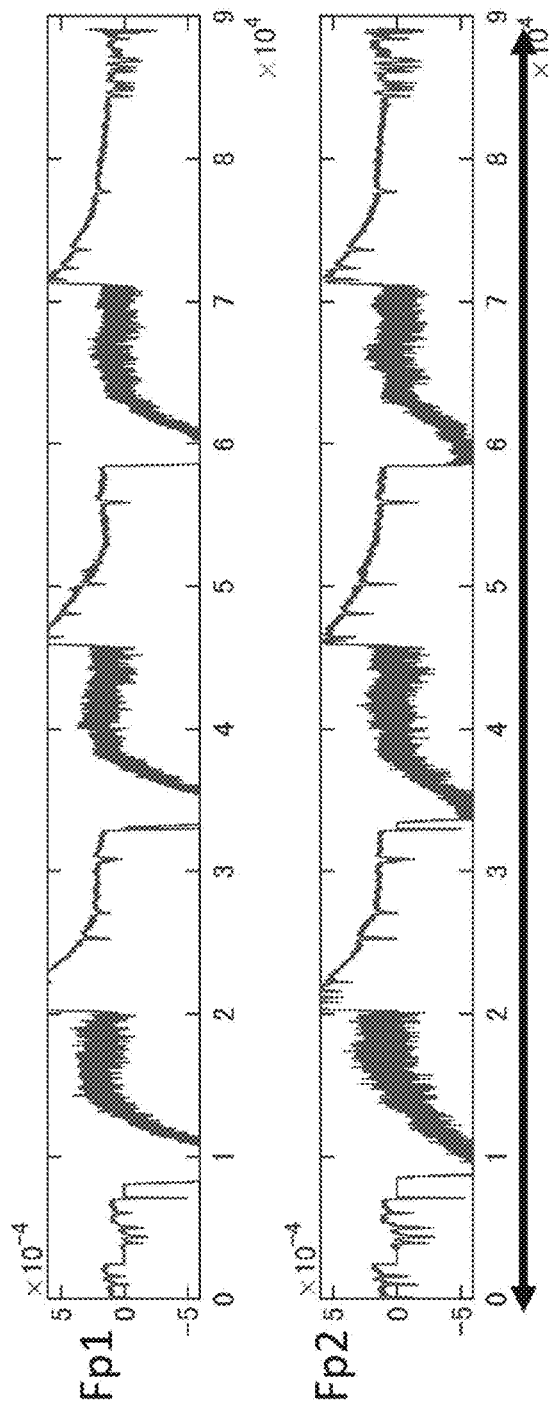
FIG. 30A shows raw data obtained in Example 1.
Figure 30B:
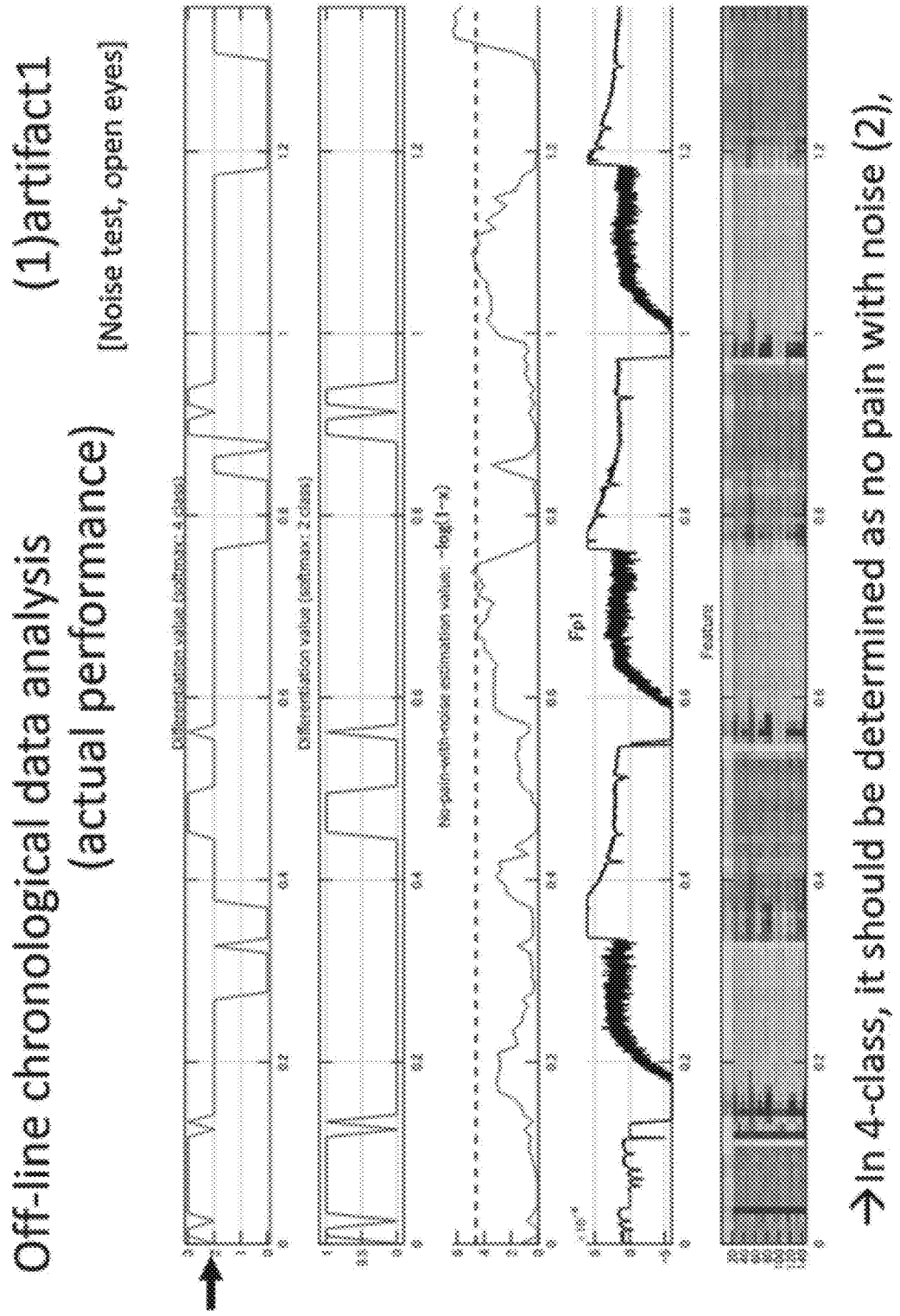
FIG. 30B shows the off-line chronological analysis result obtained in Example 1.
Figure 30C:
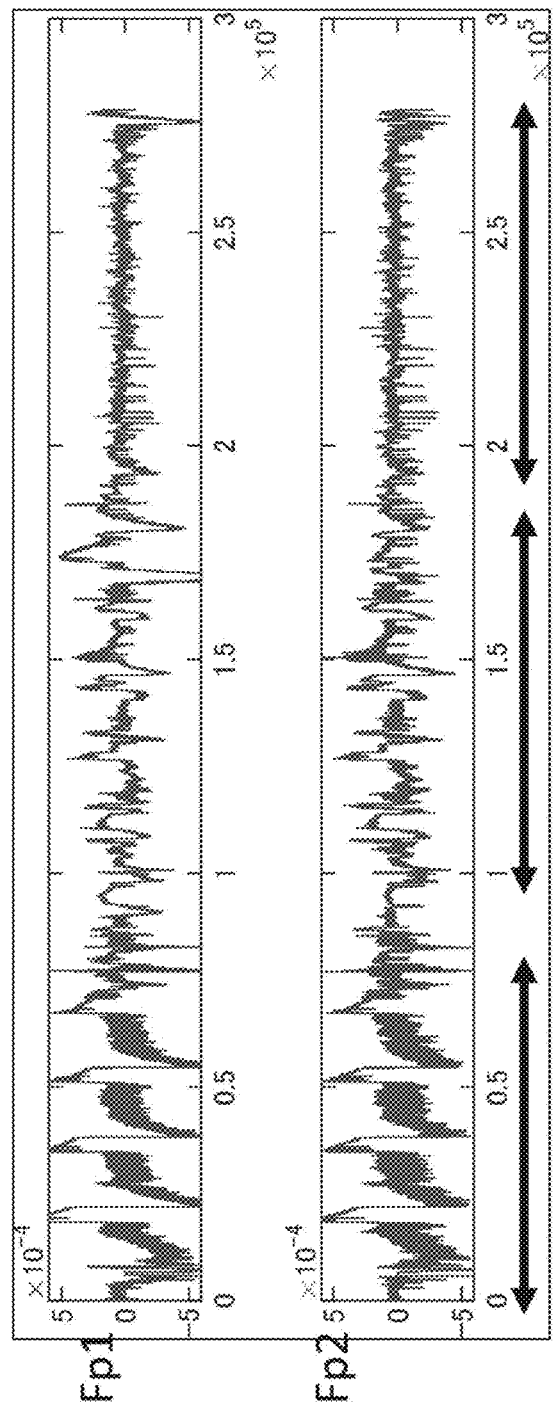
FIG. 30C shows raw data obtained in Example 1.
Figure 30D:
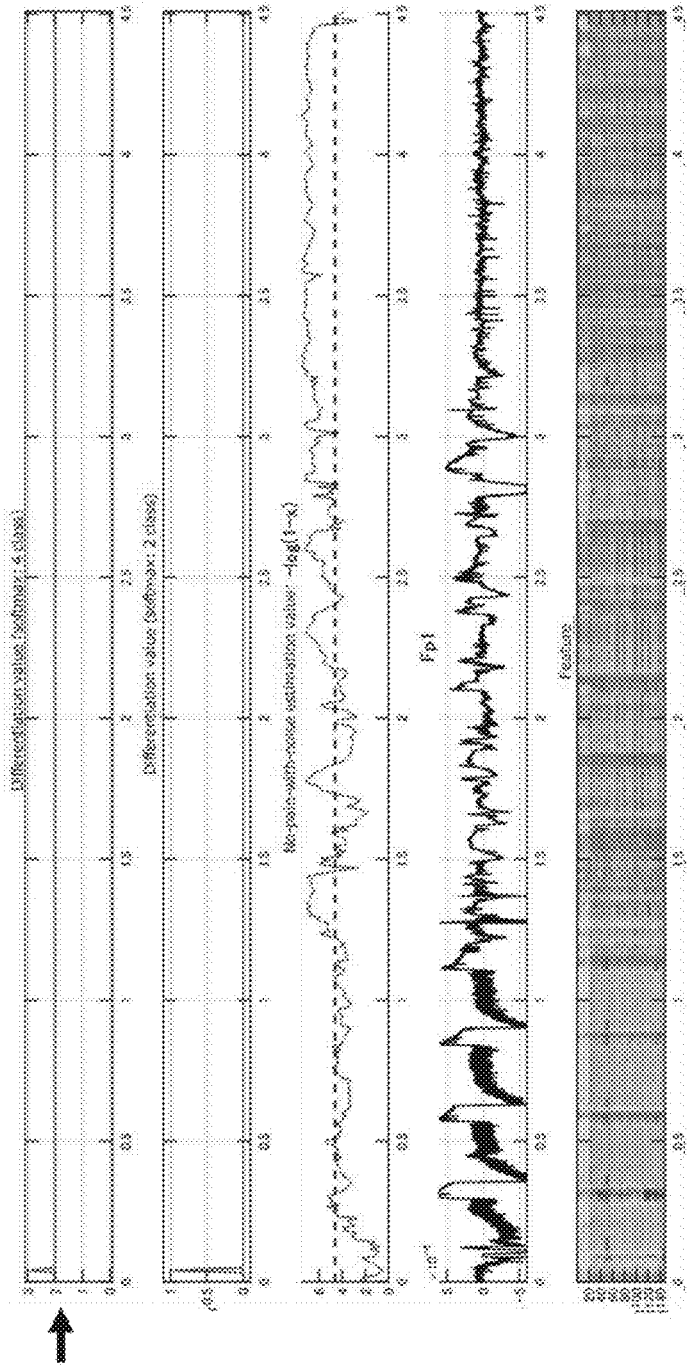
FIG. 30D shows the off-line chronological analysis result of the raw data obtained in Example 1.
Figure 30E:
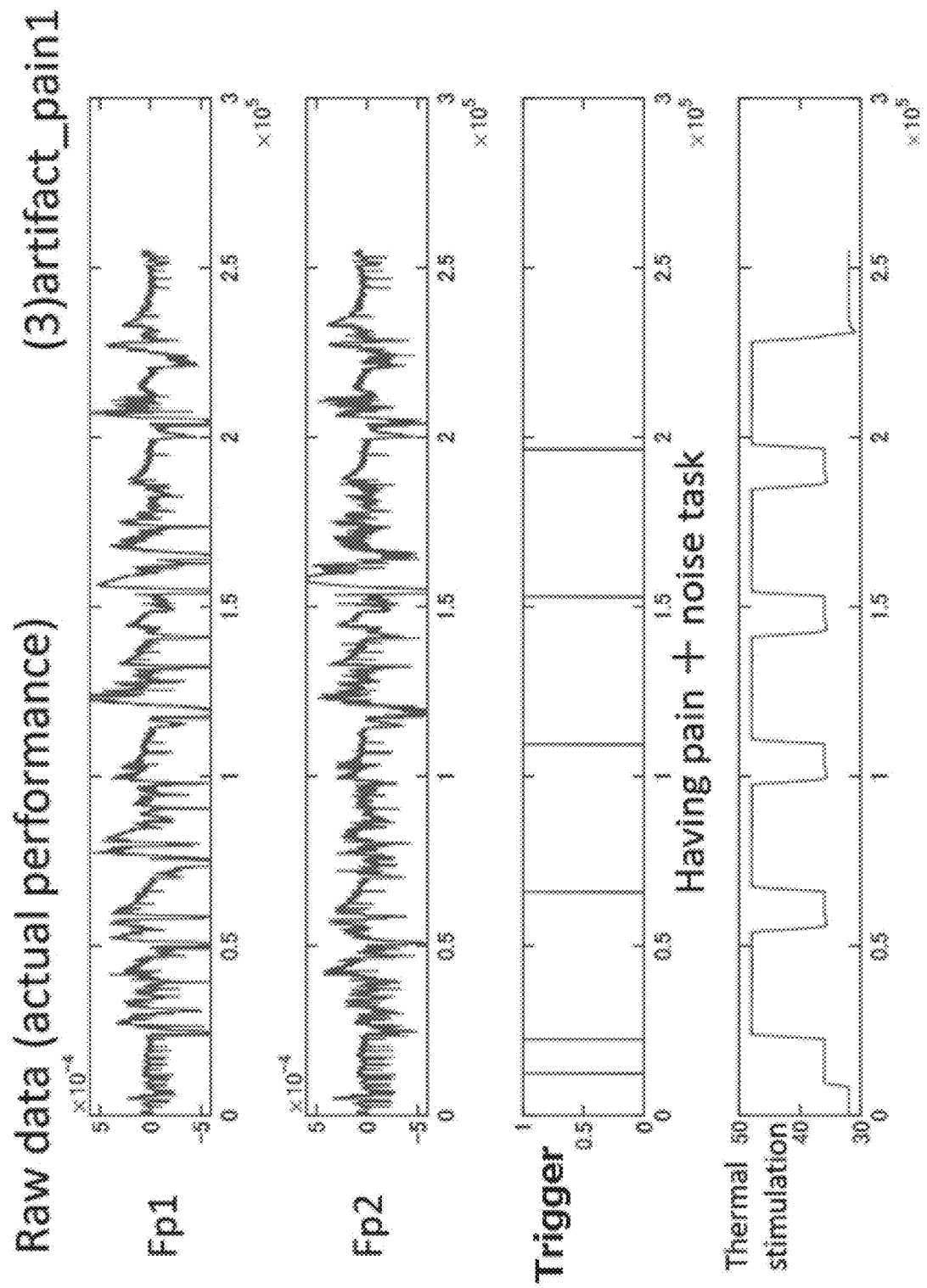
FIG. 30E shows the raw data obtained in Example 1.
Figure 30F:
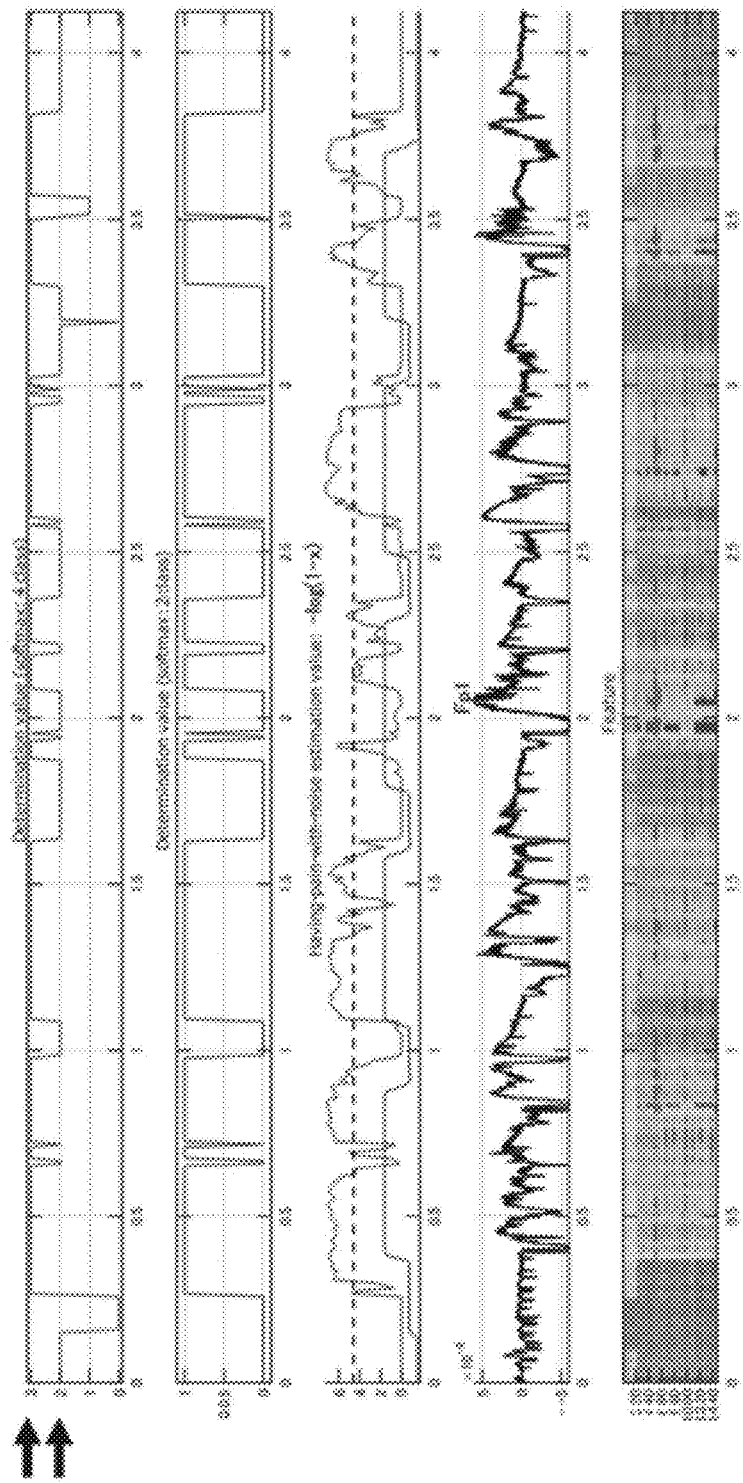
FIG. 30F shows the off-line chronological analysis result of the raw data obtained in Example 1.
Figure 30G:
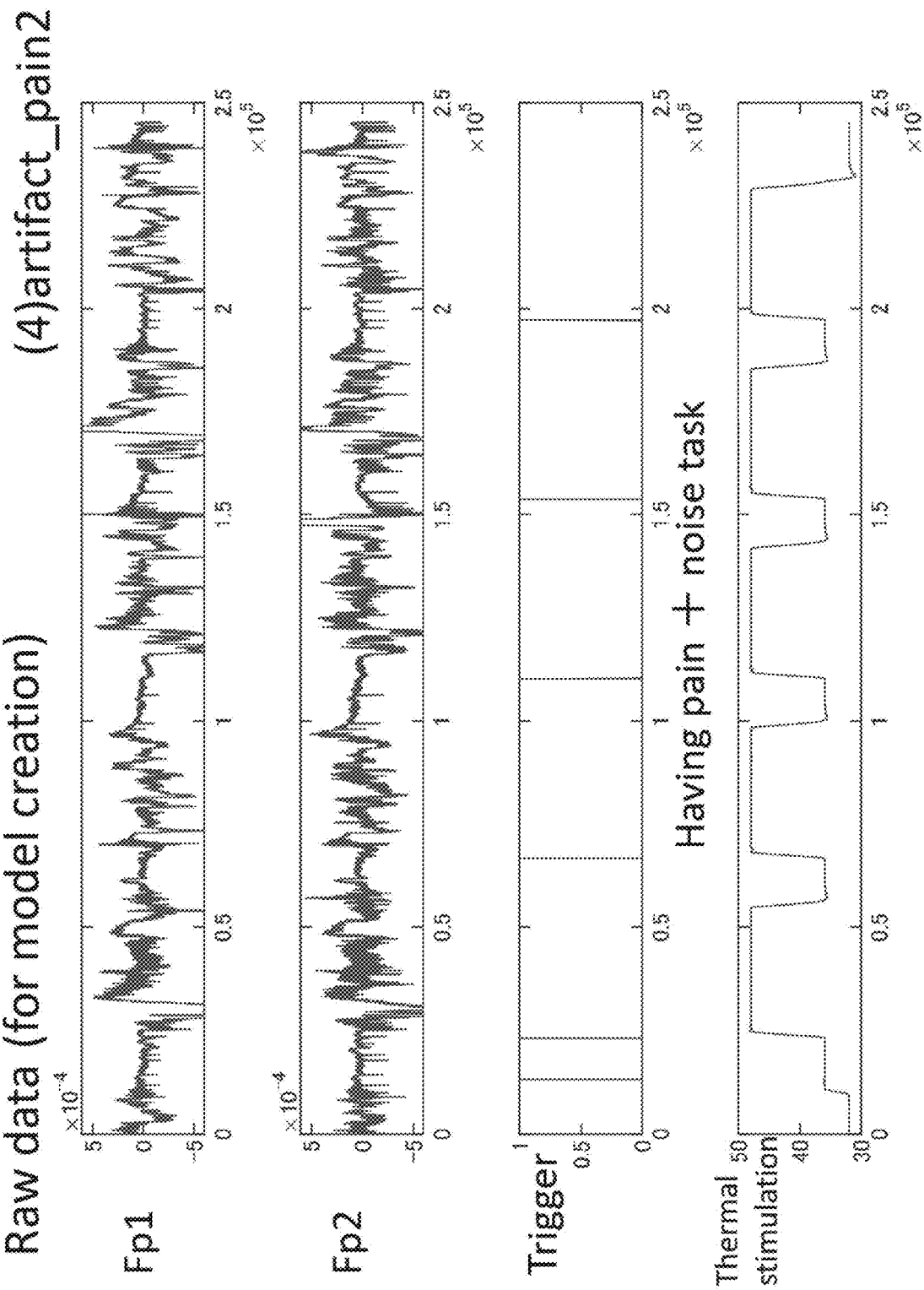
FIG. 30G shows the raw data obtained in Example 1.
Figure 30H:
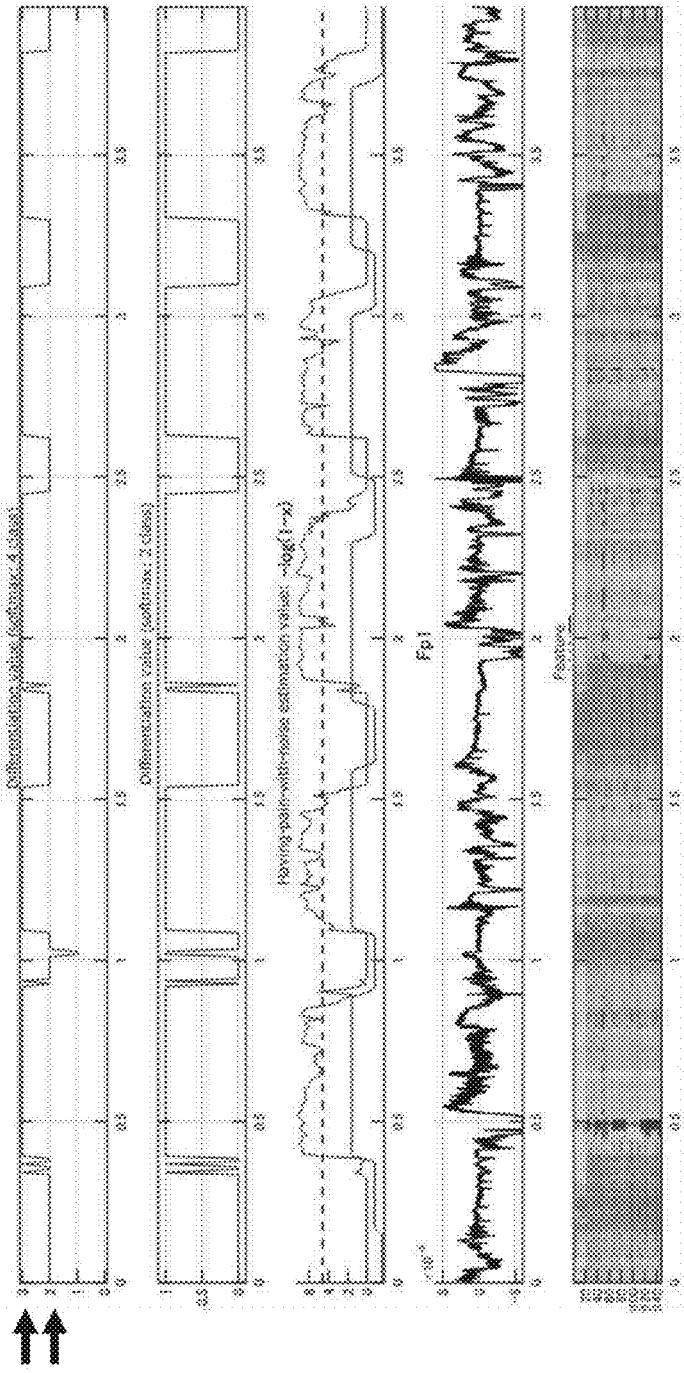
FIG. 30H shows the off-line chronological analysis result of the raw data obtained in Example 1.
Figure 30I:
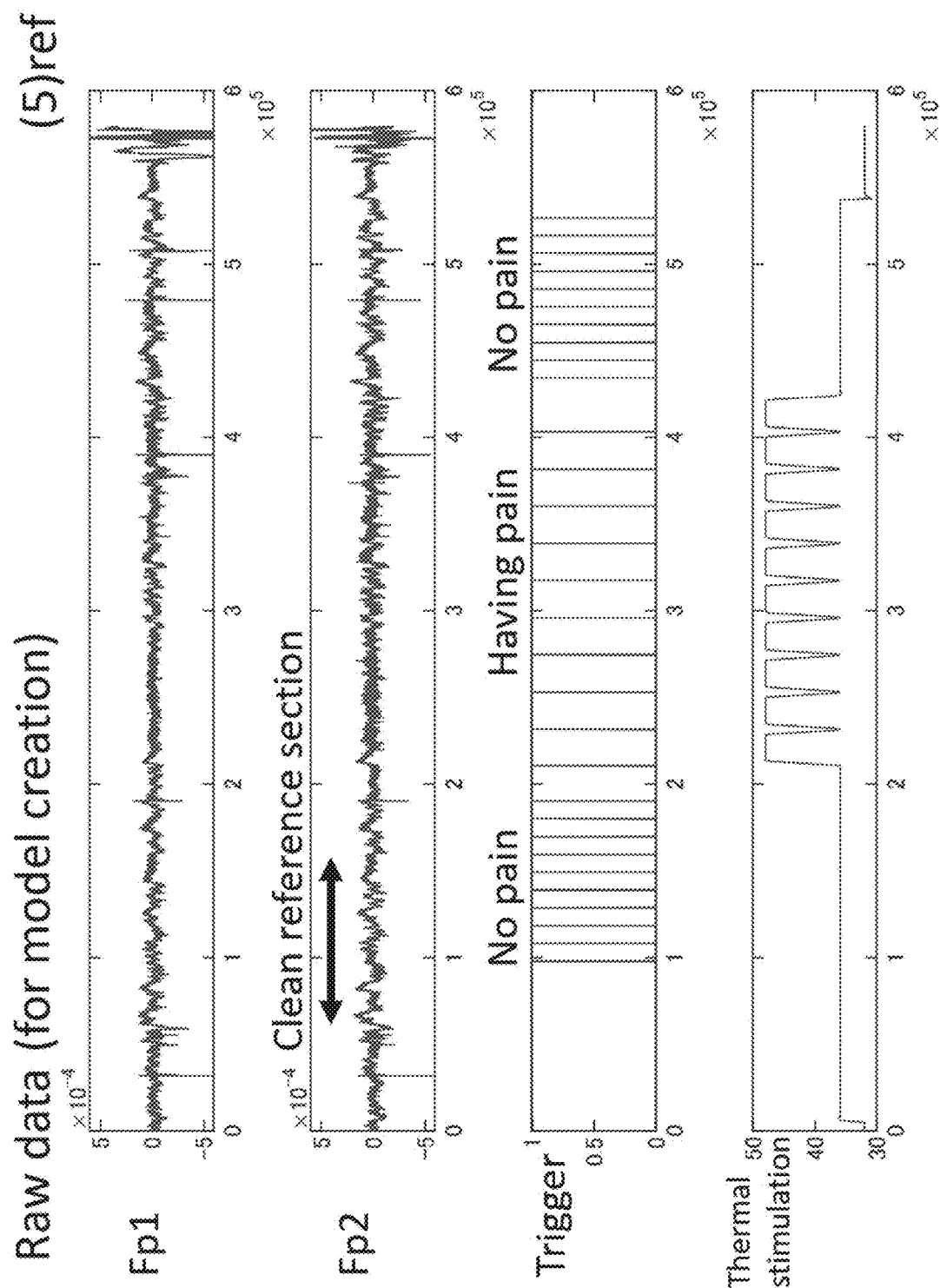
FIG. 30I shows the raw data obtained in Example 1.
Figure 30J:
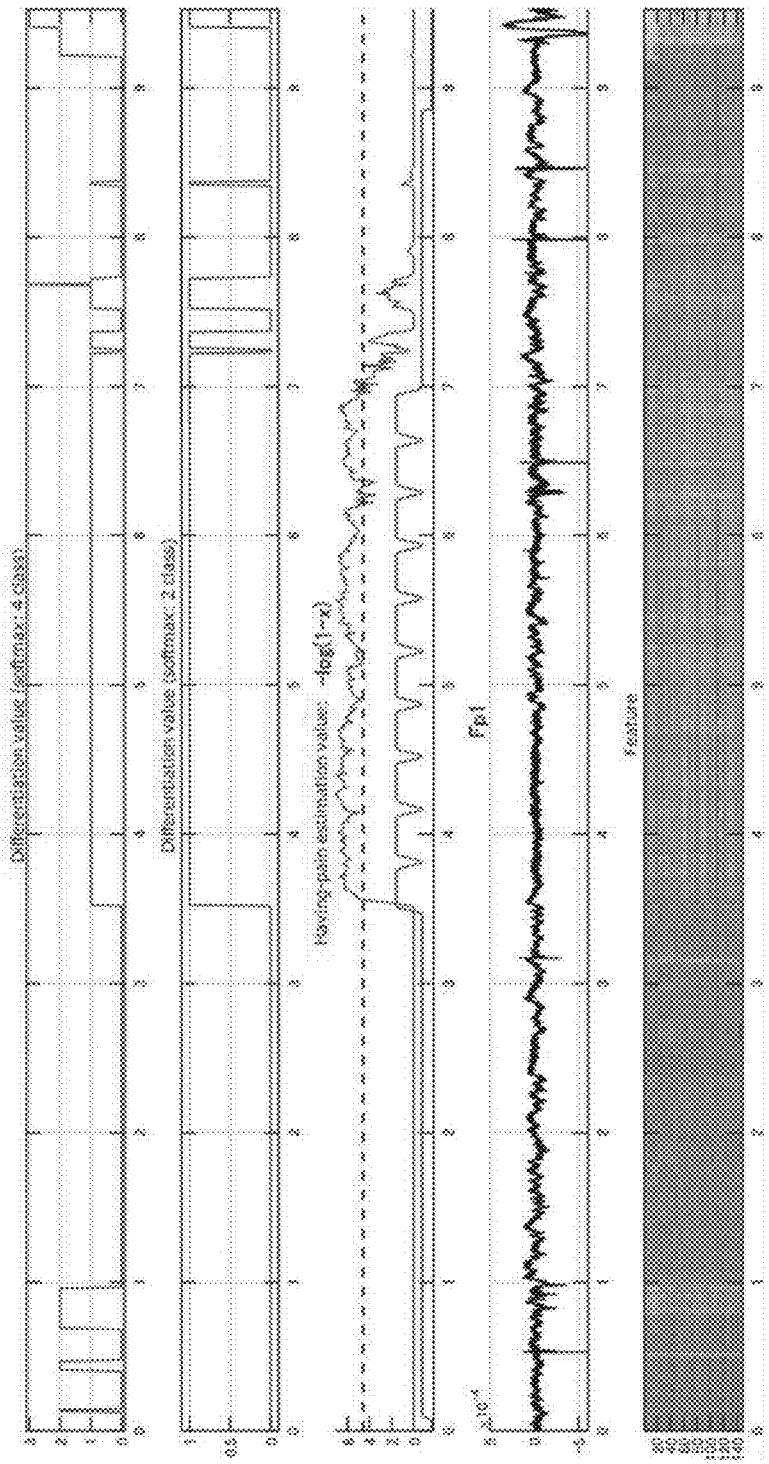
FIG. 30J shows the off-line chronological analysis result obtained in Example 1.
Figure 30K:
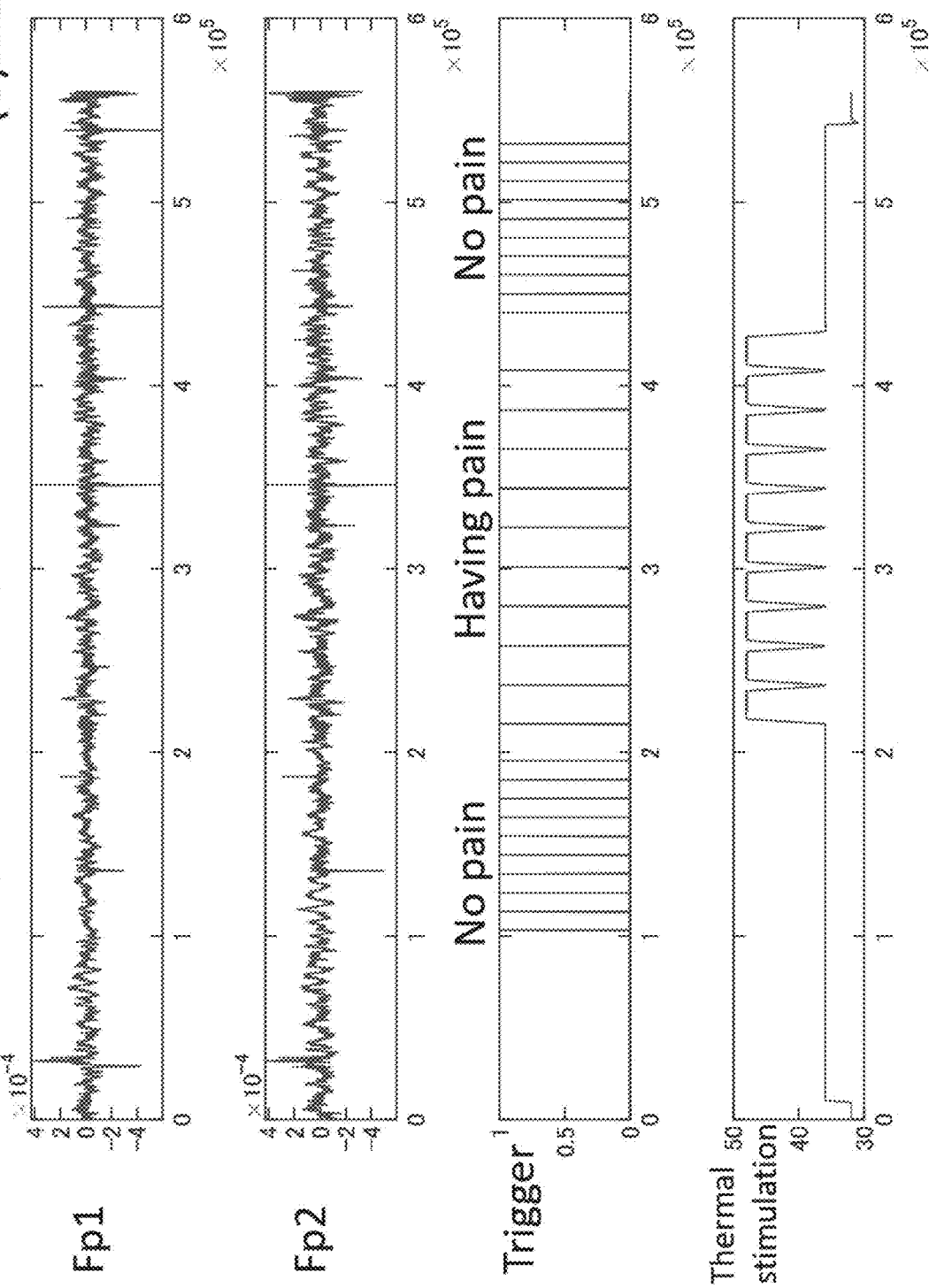
FIG. 30K shows the raw data obtained in Example 1.
Figure 30L:
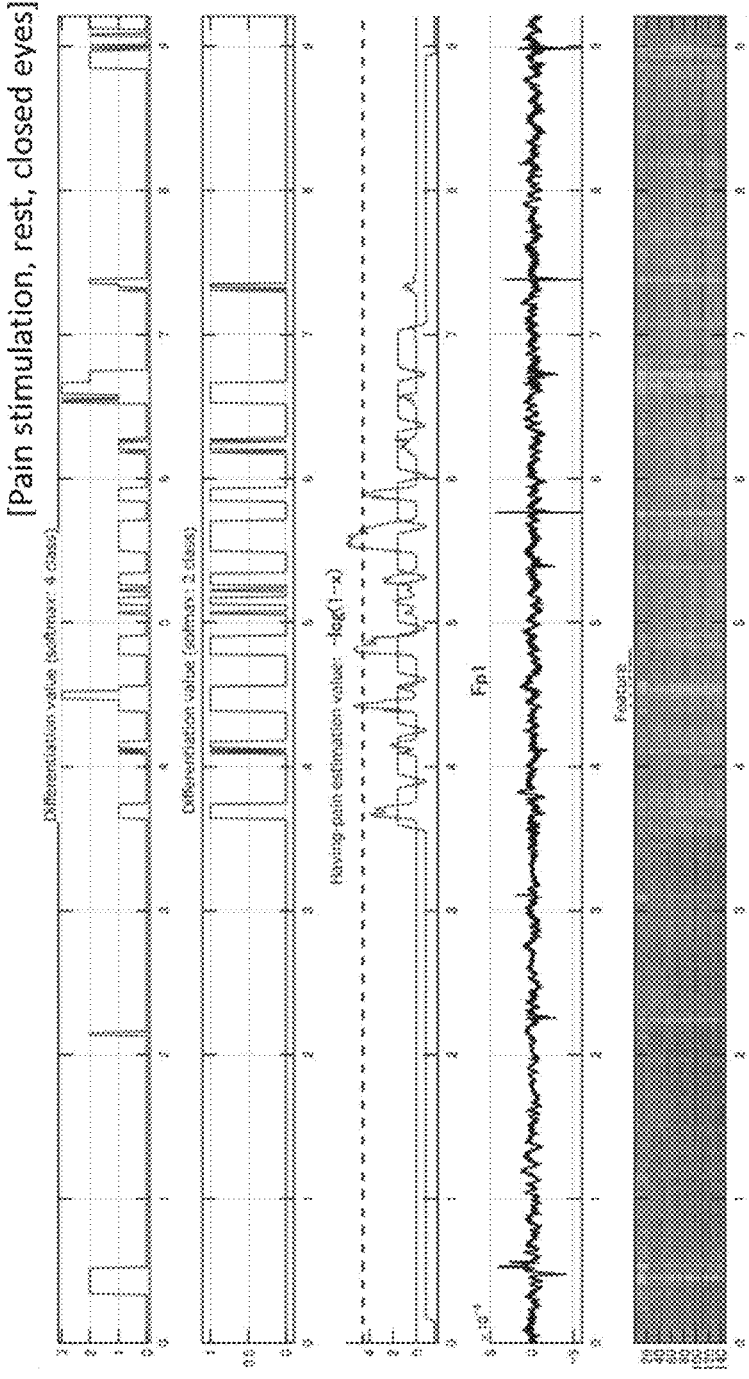
FIG. 30L shows the off-line chronological analysis result of the raw data obtained in Example 1.
Figure 30M:
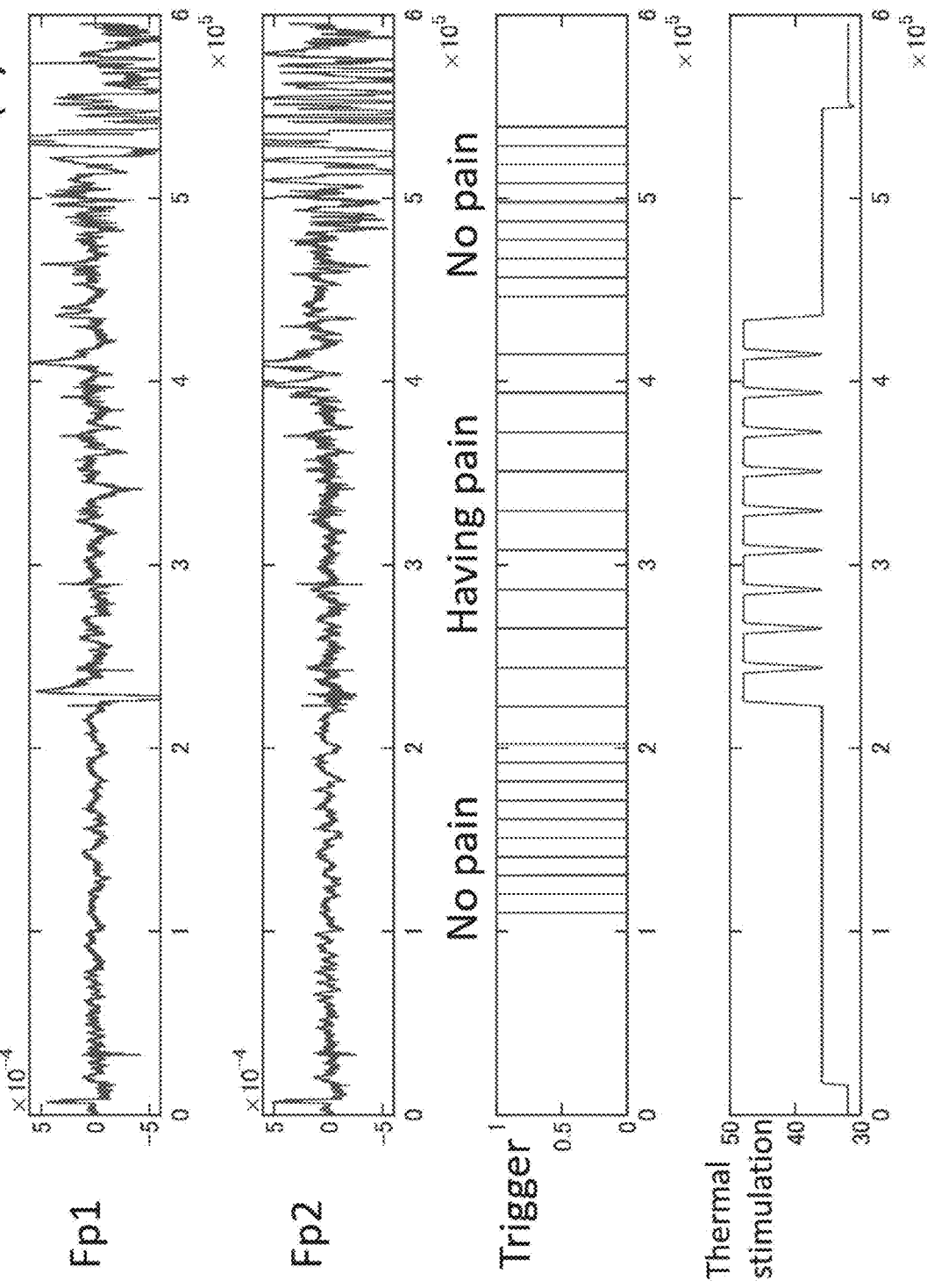
FIG. 30M shows the raw data obtained in Example 1.
Figure 30N:
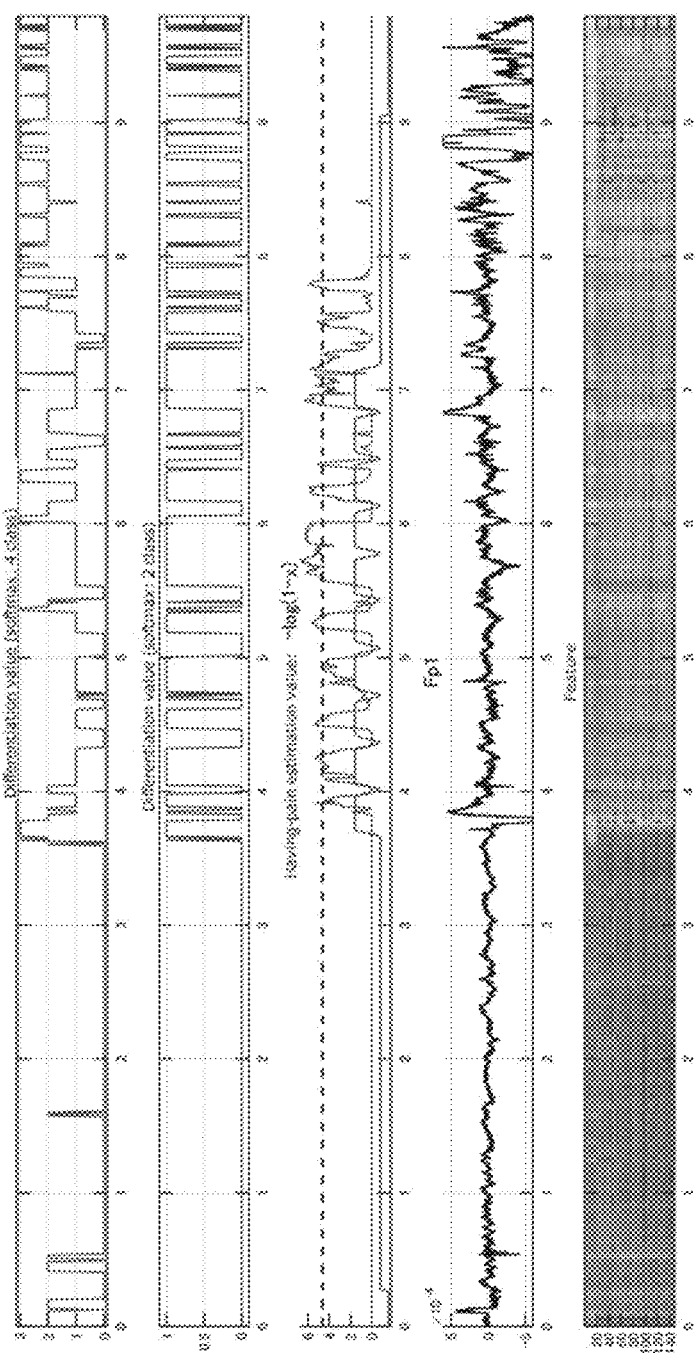
FIG. 30N shows the off-line chronological analysis result of the raw data obtained in Example 1.
Figure 30O:
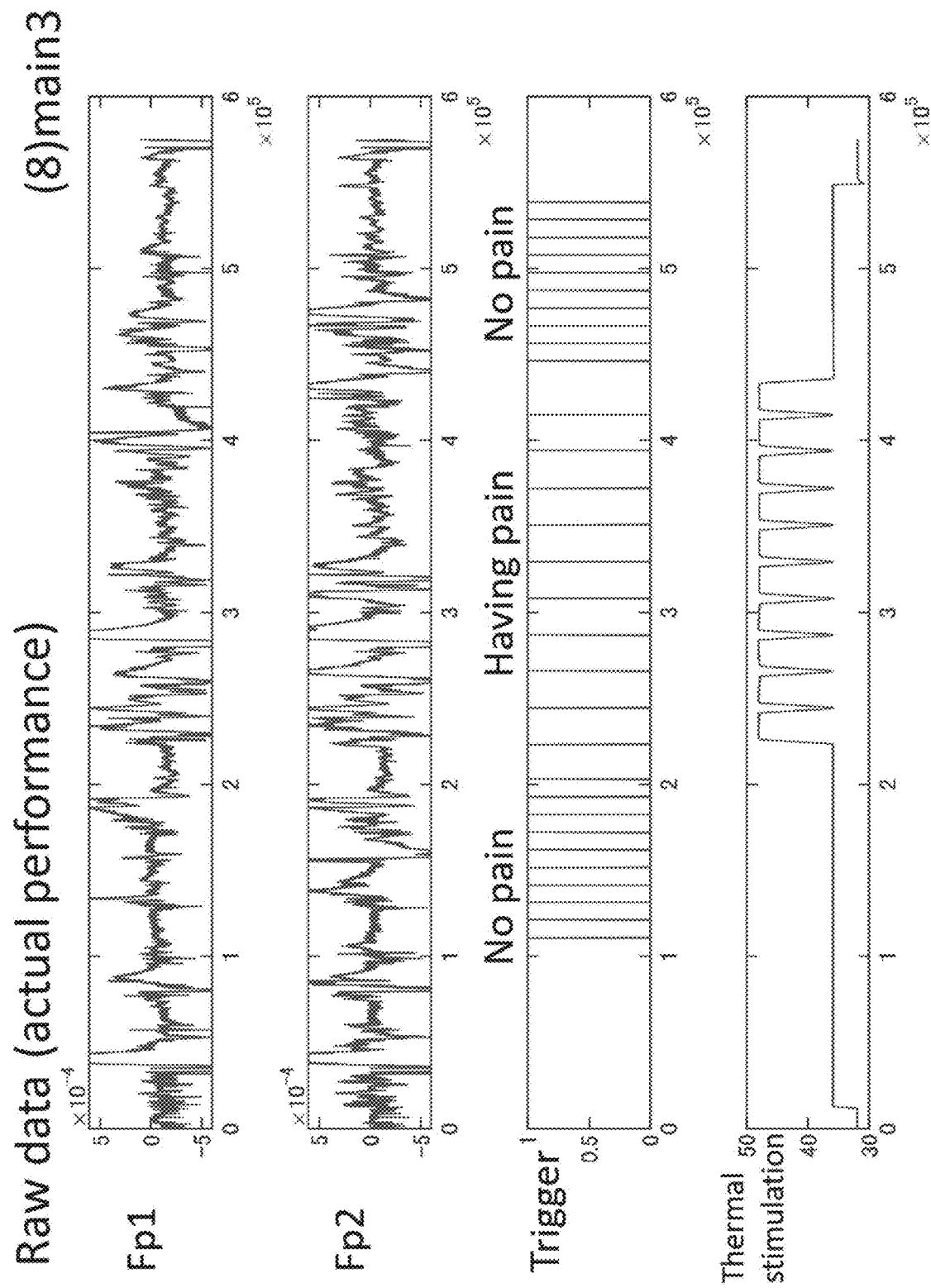
FIG. 30O shows the raw data obtained in Example 1.
Figure 30P:
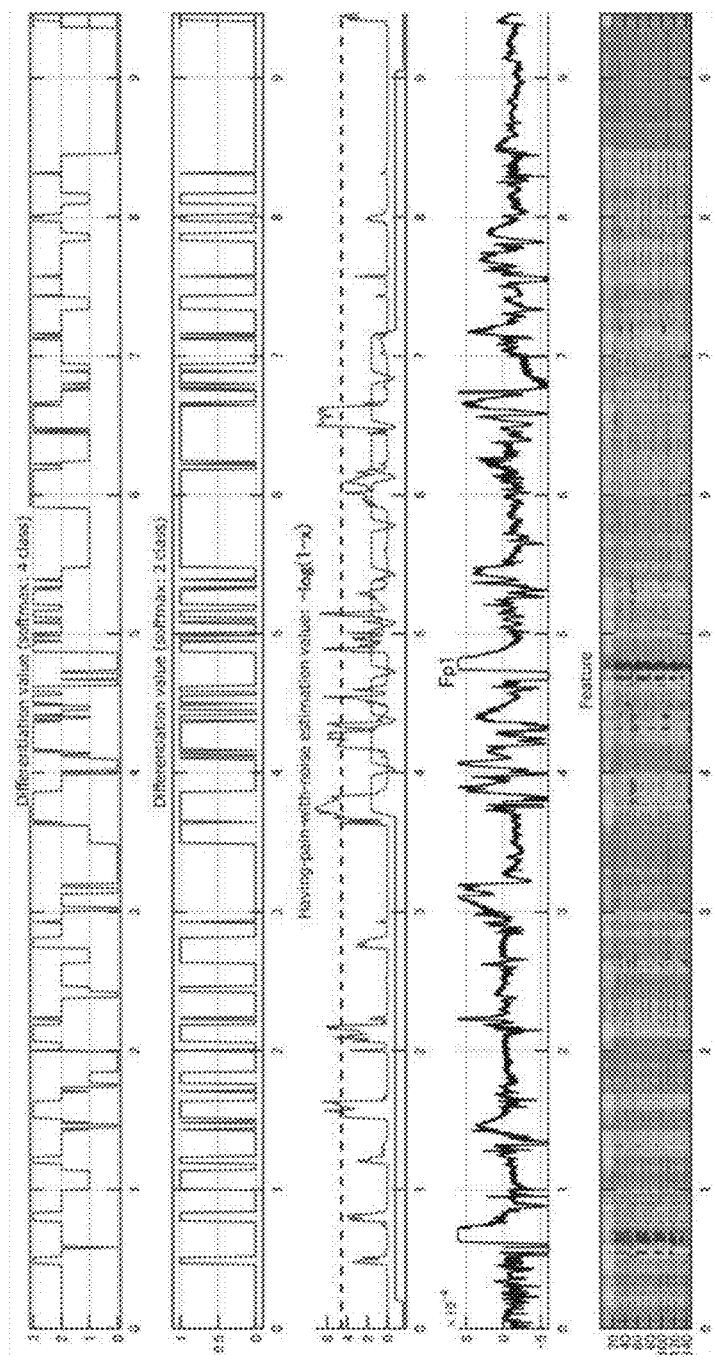
FIG. 30P shows the off-line chronological analysis result of the raw data obtained in Example 1.
Figure 30Q:
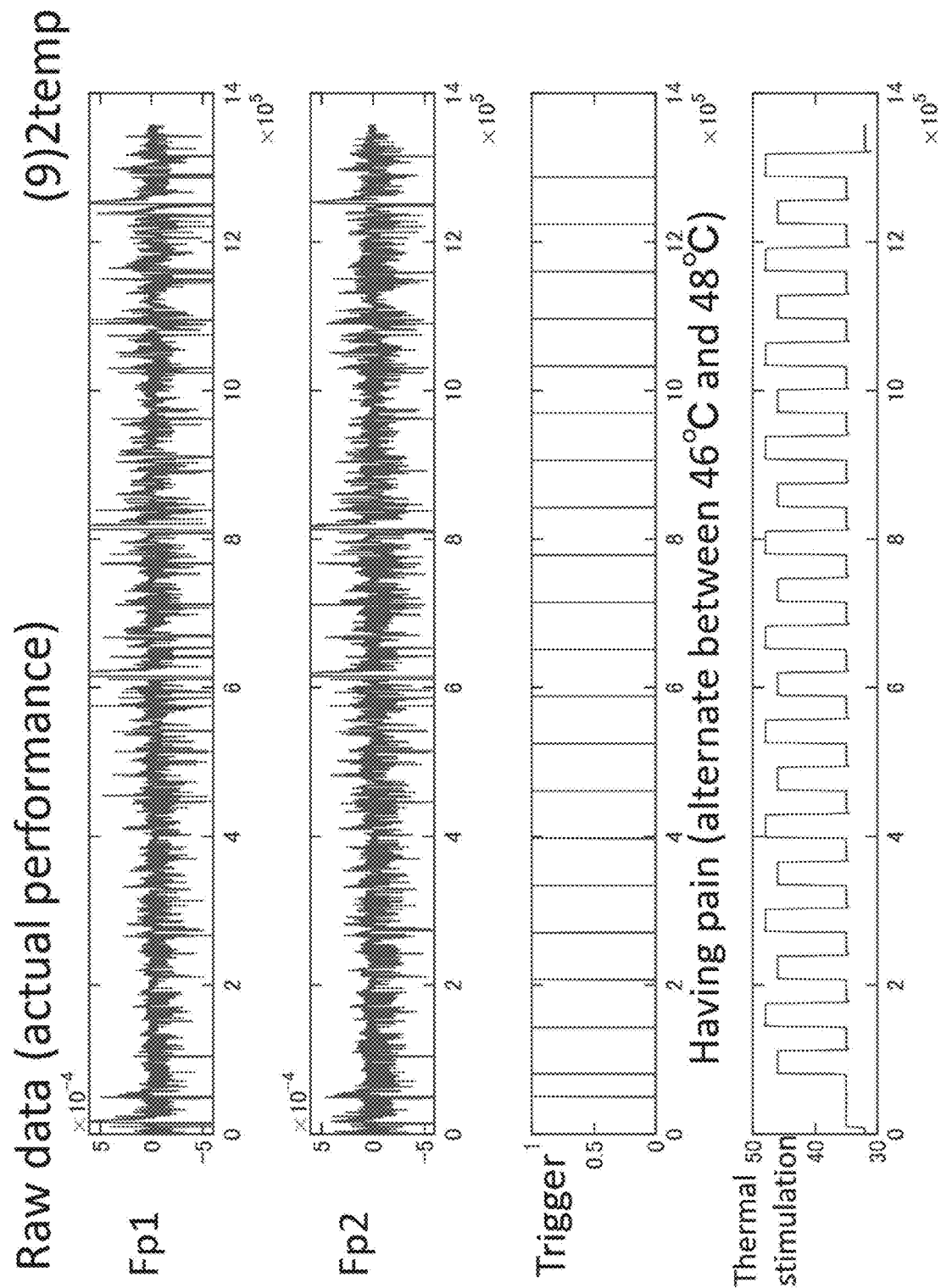
FIG. 30Q shows the raw data obtained in Example 1.
Figure 30R:
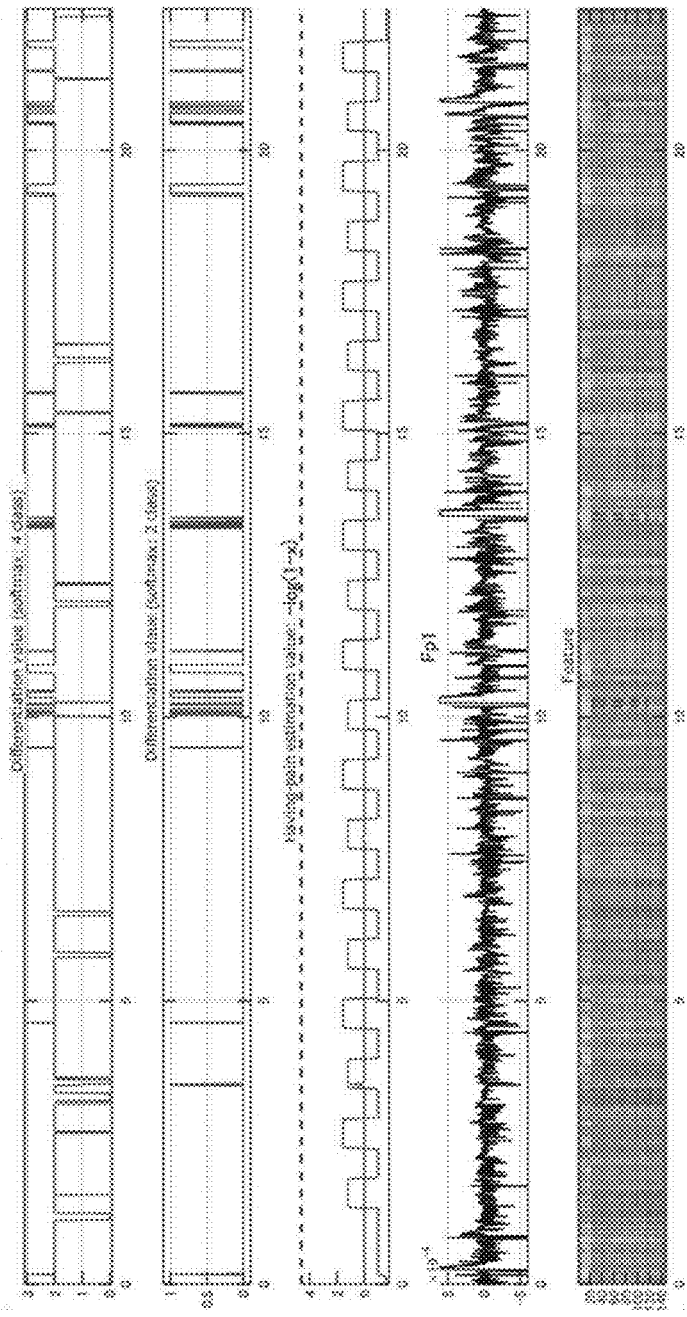
FIG. 30R shows the off-line chronological analysis result of the raw data obtained in Example 1.
Figure 30S:
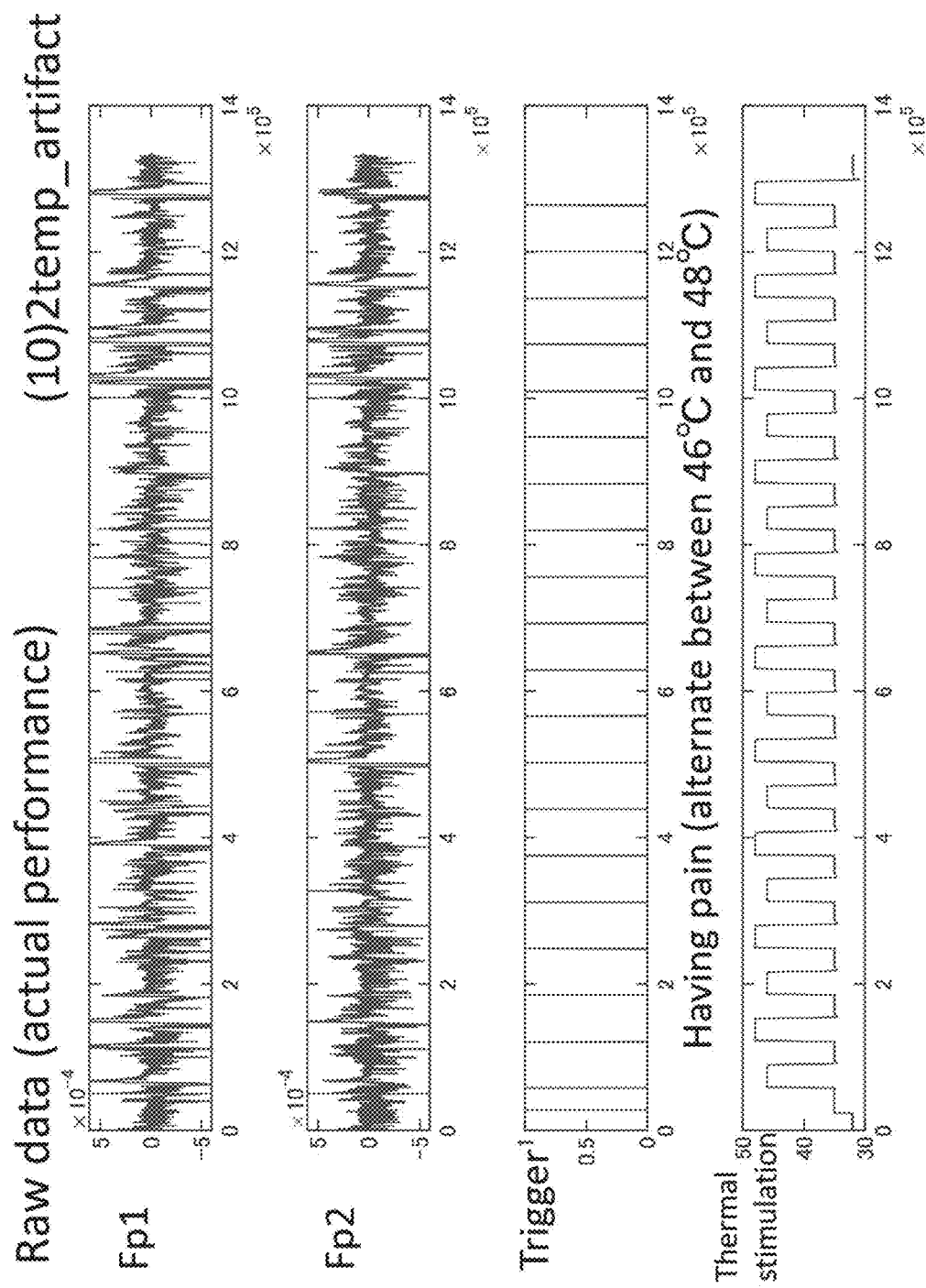
FIG. 30S shows the raw data obtained in Example 1.
Figure 30T:
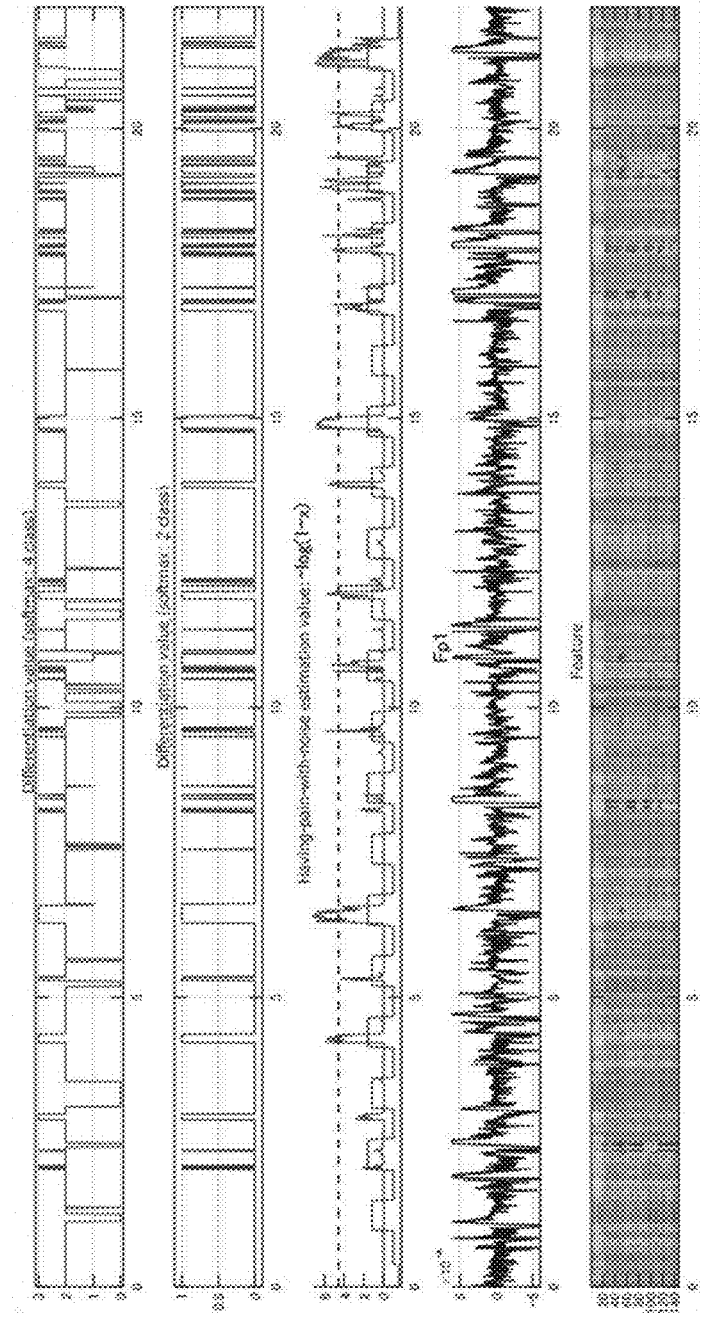
FIG. 30T shows the off-line chronological analysis result of the raw data obtained in Example 1.

FIG. 30(A) to FIG. 30(T) show the raw data obtained in this example, or the off-line chronological analysis result of the raw data. Among the off-line chronological analysis result of the raw data, the first data from the top and the second data from the top are important, wherein the first data is a result of the softmax function of 4 classes ("0: no pain/i: having pain/2: no pain with noise/3: having pain with noise") and the second data is the result of the softmax function of 2 classes ("0: no pain/1: having pain"). Each show to which class the feature calculated from the brainwave will be classified in the chronological data.

The data for test (actual performance) may correspond to unknown data, and modification of a model so as to obtain high differentiation precision upon testing (actual performance) is the problem to be solved of machine learning. For example, in (6) main1, (7) main2 and (8) main3, when it is differentiated as "having pain" when "having pain" with 48° C. of thermal stimulation and it is differentiated that there is "no pain" when there is "no pain" with no stimulation, it can be judged that the model is a good model.

Furthermore, since a noise that is not possible to be differentiated by the two-value classification of "having pain/no pain" may be inputted in the brainwave, the classification of the 4 classes also enabled classification of "noise" in consideration of such a case.

Example 2: Augmentation of MRI Analysis Result

In this example, the effect of sample augmentation was confirmed in the MRI analysis result. Sample augmentation regression was carried out.

(Method and Material)
1.1 Animal

Wild-type mice are used to be divided into the groups, Native group, Model day2 group and Model day28 group, to carry out comparison for each group. A group with nothing done was referred to as native, a group 28 days after operation was referred to as day28, a group in which 10 mg of gabapentin was administered to day28 was referred to as day28+gaba10, and a group in which 100 mg of gabapentin was administered to day28 was referred to as day28+gaba100.

1.2 Schedule

The administration schedule is as described below. Two days prior to the day of imaging, 15 mg/kg of manganese was intravenously administered for two days. Regarding agent administration groups, evaluation of 2 groups with different dosages of gabapentine which are 100 mg/kg and 10 mg/kg was attempted, wherein each underwent 2 times/day intraperitoneal administration for 2 days.

1.3 MRI

MRI measurement uses the 11.7T-MR scanner in the CiNet ward of Osaka University to carry out imaging of a T1 emphasized image and a T2 emphasized image using a spin echo sequence under isoflurane anesthesia. The imaging region was the entire brain. The MRI imaging parameter is as described below.

TABLE 1

| Type of image, | Item, | Condition |
|---|---|---|
| T2 enhanced image, | Slices, | 34 |
| T1 enhanced image, | Slices, | 10 |
| T2-T1 common, | Slice Orient, | Axial |
| T2-T1 common, | Slice Thickness, | 0.50 mm |
| T2-T1 common, | FOV Read, | 2.00 mm |
| T2-T1 common, | FOV P1, | 2.0 mm |

In order to carry out imaging of the entire brain with a T1 enhanced image, the imaging needs to be divided into 4 times. In order to prevent lack of slice, imaging was carried out in a manner in which two pieces overlap. Overlap of the T1 enhanced image divided into 4 was deleted to integrate into one image using a SanteDICOM software.

1.4 Correction of Image

Imaging of the T1 enhanced image is carried out while being divided into 4, wherein, since the brightness would greatly differ at the cut part of the image, direct use for analysis is not possible. Thus, an image processing software ImageJ is used to extract the muscle layers (7 sites) in each slice and brain brightness to correct the brightness.

1.5 Standardization Processing of Image

There are differences in the shape and size of the brain among individuals. Thus, standardization processing of the T1 enhanced image of an individual that underwent imaging was carried out. The standardization processing was carried out using MatLab.

1.5.1 Positioning of T2 Enhanced Image and T1 Enhanced Image

The T1 enhanced image was designated as the Reference Image and the T2 enhanced image was designated as the Source Image to carry out positioning by linear correlation.

1.5.2 Positioning of T2 Enhanced Image and Standard Template of T1 Enhanced Image A T2 standard template is designated as the Reference Image, a T2 enhanced image is designated as the Source Image, and a T1 enhanced image is designated as the Other image to carry out positioning by linear correlation.

1.5.3 Masking

A brain site extraction image of a T2 standard template and a T2 enhanced image (or T1 enhanced image) positioned with a template are designated as the Input Image, an output file name is inputted to the Output Filename, and the output folder is designated at the Output Directory to carry out extraction of the brain site.

1.5.4 Positioning of a Nonlinear Shape (Normalize)

A masked T2 enhanced image is designated as the Source Image and masked T2 enhanced image, T1 enhanced image and T2 enhanced image and T1 enhanced image positioned with a template are designated as the Images to Write to carry out standardization processing.

1.6 VOI Analysis of Standardization Data

VOI analysis was carried out using an in-house software after carrying out brightness correction again in the standardized T1 enhanced image. Brain map information uses a mouse template by Mirrione.

(Sample Augmentation)

Labeling was carried out while setting the pain score of native (N=7) as 0 and setting day28 (N=8) as 100. Data of native (N=7) and day28 (N=8) having 19 features (brain regions) are pooled to carry out standardization (forming z value using a mean value and a standard deviation: data=(data−mu)/sigma). By carrying out sample augmentation to these data, the N count of native and day28 is increased up to 100, 1000, 4000, 10000 and 20000, respectively, which was repeated 100 times at a time regarding each augmentation count (creating training data).

(Creation of a Model)

Each of day28+gaba100 (N=5) and day28+gaba10 (N=5) is standardized with a standardization parameter that has been preserved (test data was prepared). Next, each augmented sample (training data) [100, 1000, 5000, 10000, 20000] is used to create 100 regression models with SVR.

Each created model is used to carry out fitting regarding day28+gaba100 (N=5) and day28+gaba10 (N=5) to calculate the mean value. In this case, it can be understood that the result of regression is a pain score, and the group is a group wherein the larger the value, the stronger the pain is felt.

Figure 31:
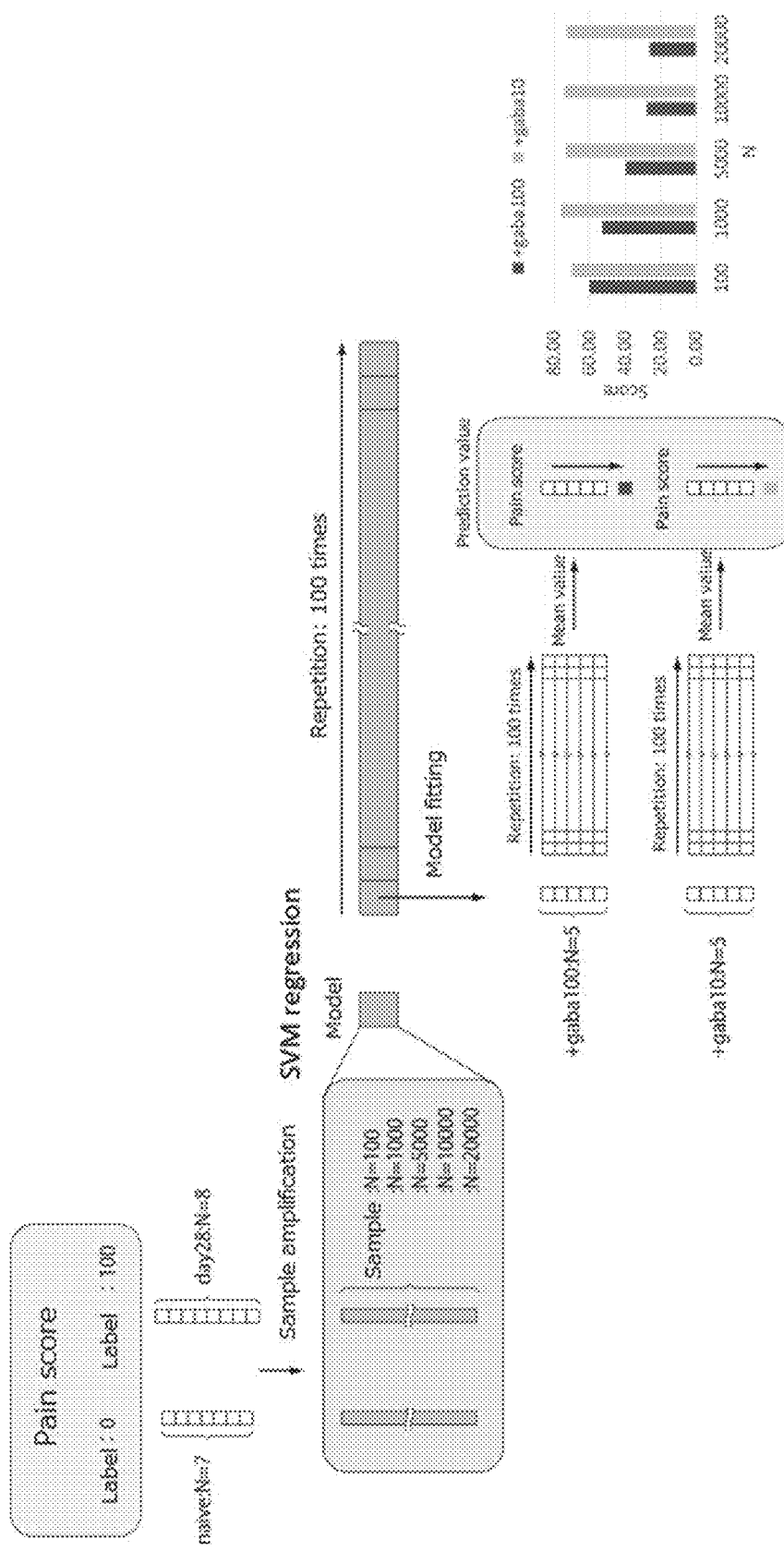
FIG. 31 shows the entire image of the analysis of Example 2.
Figure 32:
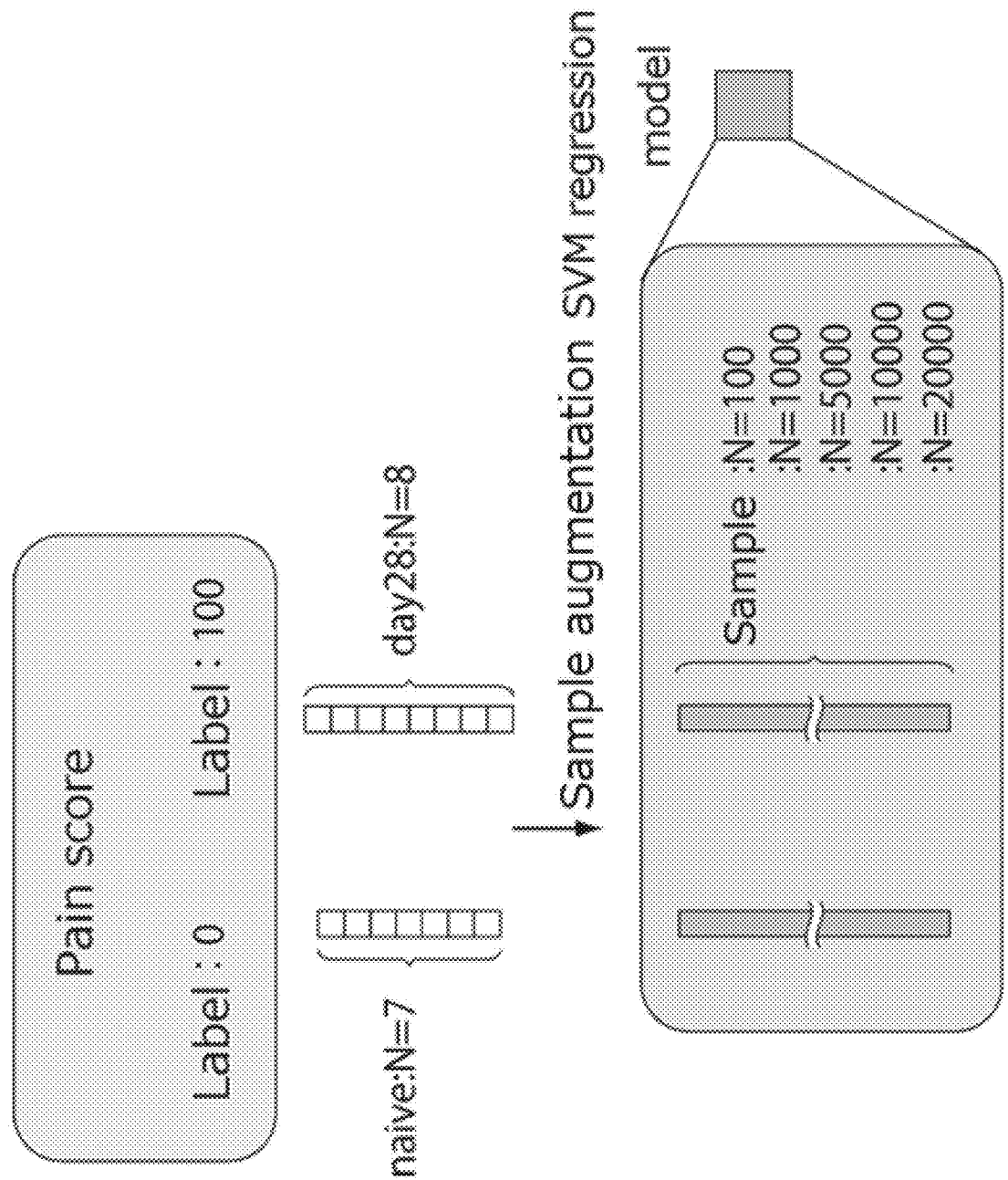
FIG. 32 shows an image of the stage of augmenting data of naive (N=7) and day28 (N=8).

FIG. 31 shows the entire image of the analysis of this example. FIG. 32 shows an image of the stage of augmenting data of naïve (N=7) and day28 (N=8). The data of native (N=7) and the data of day28 (N=8) are sued to augment each group up to 100, 1000, 5000, 10000 and 20000 by the sample augmentation of the present disclosure to create a model using the augmented data.

Figure 33:
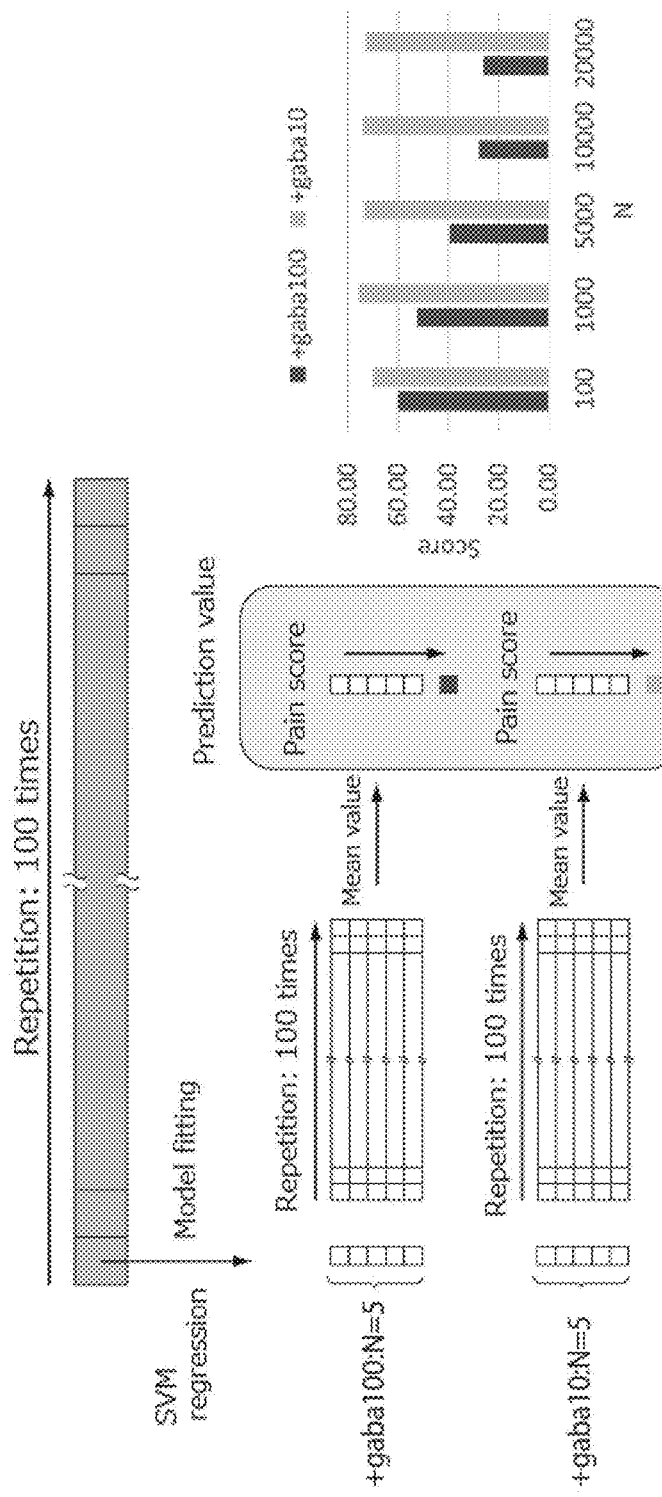
FIG. 33 shows an image of the stage of using a created model to carry out fitting and predicting a pain score.

FIG. 33 shows an image of the stage of carrying out fitting using a created model and predicting the pain score. Creation of a regression model using SUV is repeated 100 times in each augmented sample 100, 1000, 5000, 10000, 20000, wherein each model is used to carry out fitting regarding day28+gaba100 and day28+gaba10 to calculate a mean value.

(Result)

Figure 34:
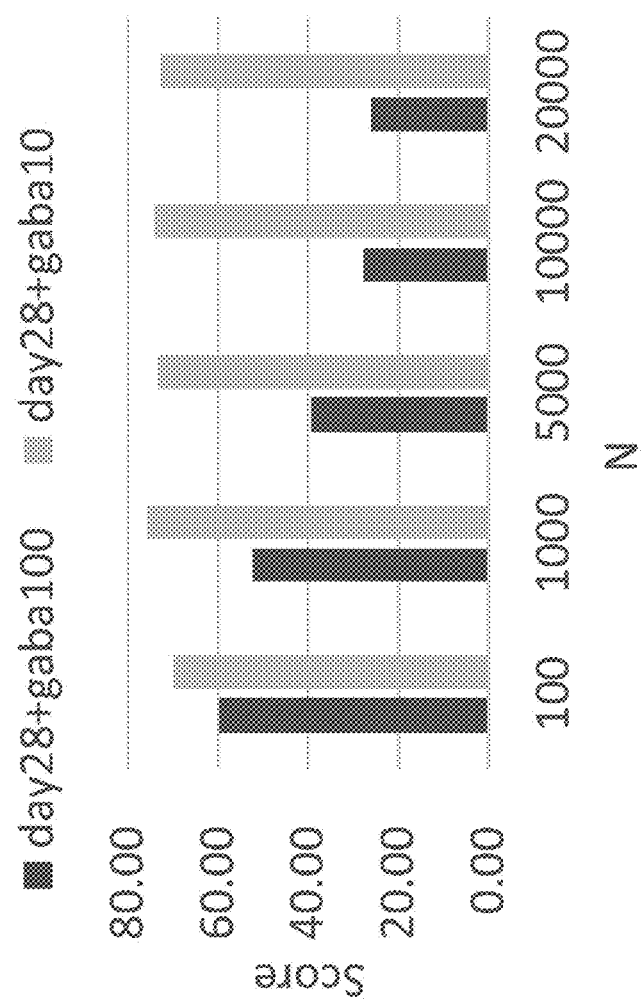
FIG. 34 shows the result of Example 2.

FIG. 34 shows the result of the present example.

In the augmented sample 100, the mean value of the pain score of day28+gaba100 (N=5) was 59.96, and the mean value of the pain score of day28+gaba10 (N=5) was 69.88. In the augmented sample 1000, the mean value of the pain score of day28+gaba100 (N=5) was 52.41, and the mean value of the pain score of day28+gaba10 (N=5) was 75.81. In the augmented sample 5000, the mean value of the pain score of day28+gaba100 (N=5) was 39.31, and the mean value of the pain score of day28+gaba10 (N=5) was 73.55. In the augmented sample 10000, the mean value of the pain score of day28+gaba100 (N=5) was 27.70, and the mean value of the pain score of day28+gaba10 (N=5) was 74.14. In the augmented sample 20000, the mean value of the pain score of day28+gaba100 (N=5) was 26.09, and the mean value of the pain score of day28+gaba10 (N=5) was 72.69.
(Observation)

The greater the number of augmentation samples, the more significantly the difference in the pain scores of day28+gaba100 and day28+gaba10 appeared. For example, in the case of N=20000, the pain score was 26.09 in day28+gaba100, whereas the pain score was 72.69 in day28+gaba10. This suggests that the group administered with 100 mg of gabapentin has greater pain relief effect compared to the group administered with 10 mg of gabapentin.

Example 3: Augmentation of miRNA Analysis Result

In the present example, the effect of sample augmentation was confirmed in the miRNA analysis result. Specifically, comparison of sample augmentation method for excluding outliers was carried out.
(Method and Material)

The extraction procedure of miRNA is as described below.
I. Mouse brain (about 0.4 to 0.45 g per mouse brain) was collected.
II. The mouse brain is crushed and the RNA was extracted.
III. Small RNA Library construction, cDNA purification and size selection (using Ion Total RNA-Seq Kit v2) were carried out.
IV. cDNA was augmented.
V. The generated cDNA is used to carry out gene analysis. Each step is explained below.
I. Mouse Brain Collection 1. Numbers were written to 5 mL tubes (QSP, 580-GRDS-Q) of RNase, DNase, & Pyrogen Free, 4 to 4.5 mL of RNAlater was added and the weight of each tube was measured and written in a table. A brain sample was immersed in five times the amount of RNAlater (about 04 to 0.45 g per mouse brain).

2. After blood sample collection, a mouse is perfused with 50 mL of PBS(−) to wash away the red blood cells in the tissue.

3. The entire brain is taken out and immediately put into a 5 mL tube with RNAlater therein. An iron was used to cut the brain sample so that the length of any piece would be 0.5 cm or less (e.g., 0.5 cm×1 cm×1 cm). The lid was tightly closed and the weight of each tube is measured again to sort out the weight of the brain sample. When there is not enough RNAlater, a necessary amount was added to the tube. The sample was preserved at 4.4° C. (the sample was preserved at 4° C. if it is within one month, and when preserved for a longer period, the sample was preserved at −20° C.).
II. Crushing of Mouse Brain and Extraction of RNA (A commercially available RNeasy Lipid Tissue Mini Kit was used as the QIAzol reagent, and a commercially available mirVana Isolation Kit was used for extraction of miRNA)

1. Sterilized zirconia beads (5Φ) were put into sterilization tubes for Tomy crushing one by one with sterilized tweezers. 1 mL of QIAzol Lysis Reagent was dispensed into each tube.

2. One whole brain is taken out from RNALater with sterilized tweezers and RNAlater was wiped off from the brain sample while being pressed with a Kimwipe.

3. The entire brain from which RNAlater was wiped off was divided into four and evenly placed into four tubes with zirconia beads and QIAzol Lysis Reagent therein.

4. A tube for crushing with ¼ of the brain therein was crushed one time at 4,100 rpm×30 seconds. After waiting for one minute (cooling), crushing was carried out again at 4,100 rpm×30 seconds and all solution samples were collected into one 5 mL tube. (When foam was made, especially the brain tissue was left for 2 to 3 minutes at room temperature.) When the 30 second crushing is repeated for 2 to 3 times, the brain tissue inside the tube is substantially crushed into small pieces.

5.1 200 μL was dispensed for miRNA (using a mirVana lit) from brain samples collected into one and 800 μL of Lysis/binding buffer was added to mix at a pipette tip. ¹⁄₁₀ capacity (100 μL) of miRNA Homogenate additive was added, Vortex was carried out, and equal division into two 1.5 mL tubes was carried out to perform On ice×10 min.

6. The remaining brain sample was divided into 3, wherein one (1 mL) of them is added to a 2 mL tube for total RNA to be left for 5 minutes at room temperature (RT). (Total RNA uses a Qiagen RNeasy Lipid tissue kit.) The remaining two was frozen and preserved at −80° C. Total RNA was extracted in accordance with the protocol of the kit.

7. Acid-phenol: chloroform was added in the amount of 1:1 to the brain sample for microRNA. (1:1 with respect to the amount of lysate w/out miRNA homogenate additive) →30 to 60 seconds of Vortex for mixing.

8. A microRNA tube underwent centrifugation in the conditions, 10,000×g, RT and 5 minutes. Since it is divided into three layers, the top layer, aqueous phase, was moved to a new tube. The amount (Vol.) of the aqueous phase that had been moved to the tube was written down and was On iced.

9. ⅓ of 99.5% EtOH was added to the aqueous phase of mirVana that was On iced. Vortex was carried out to be mixed well.

10. Filter cartridge was put into a collection tube and the Lysate-EtOH mixed in 21 was added to 700 μL of filter cartridge for centrifugation (10,000×g, RT, 15 seconds). The filtrate was collected. This was repeated until filtration/centrifugation of all Lysate-EtOH is completed.

11. ⅔ of 99.5% EtOH is added to the collected filtrate and Vortex was carried out to be mixed well.

12. A new filter cartridge and collection tube are taken out to add 700 μL of filtrate-⅔ EtOH mixing liquid for centrifugal separation (10,000×g, RT, 15 seconds). The flow through is thrown away. All filtrate-⅔ EtOH was repeated until completion of filtration/centrifugal separation. The flow through was thrown away.

13. 700 μL of miRNA wash Soln 1 was added to the filter for washing. Centrifugal separation (10,000×g, RT, 15 seconds) was carried out to throw out the flow through.

14. 500 μL of Wash Soln ⅔ was added to the filter for washing. Centrifugal separation (10,000×g, RT, 1 minute) was carried out. This was repeated 2 times and the flow through was thrown away.

15. When second washing is completed, the flow through is thrown away and centrifugal separation was carried out again (10,000×g, RT, 1 minute).

16. The filter cartridge is put into a new collection tube and the Elution Soln. that had been warmed at 95° C. was added with a 100 μL/tube for centrifugal separation (10, 000×g, RT, 30 seconds).

17. 10 µL is dispensed into a 500 µL tube for Bioanalyzer to measure the purity with the Bioanalyzer. The rest was preserved at −30° C. (the Bioanalyzer studies the purity of the extracted miRNA).

18. If the Bioanalyzer did not find any issue regarding the sample, the sample was moved to the small RNA library construct.

III. Construct of Small RNA Library, Purification of cDNA and Size Selection (Using Ion Total RNA-Seq Kit v2) were Carried Out.

(Operations Other than Defrosting were Carried Out on Ice.)

1. A necessary reagent and an miRNA sample was moved from 20° C. to a fridge (4° C.) for defrosting.

2. A reagent for hybridization was prepared on ice. (Total Vol=5 µL/sample) Hybridization solution (3 µL/sample) 3 µL×Ion Adaptro Mix v2 (2 µL/sample) 5 µL of the above-described mixed reagent was dispensed into a 2 µL×3.0.2 mL tube and 3 µL of miRNA sample was added to mix with tapping or pipetting for a light spin-down to collect the reaction liquid at the bottom of the tube. A defrosted miRNA sample lightly underwent Vortex before use to drop a droplet with a tabletop centrifuge.

4. Hybridization reaction is carried out. (65° C.×10 minutes, 16° C.×5 minutes)

*During the above, a reagent for ligation was prepared on ice (extra region is regulated in the consideration of pipetting loss) Vortex is carried out for a light spin-down.

2× Ligation Buffer (10 µL/sample) 10 µL× Ligation Enzyme Mix (2 µL/sample) 2 µL×

5. The regulated reagent for ligation is added 12 µL at a time to a 8 µL tube after hybridization reaction (the entire amount became 20 µL).

Mixing is carried out by tapping or pipetting for light spin-down to collect the reaction liquid at the bottom of the tube.

6. 20 µL of ligation reaction liquid was reacted for 16 hours at 16° C. (Overnight)

7. Before termination of a 16-hour ligation reaction, a region for reverse transcription is prepared on ice (extra region is regulated in the consideration of pipetting loss; Total vol.=16 µL/sample)

Nuclease-Free Water (2 µL/sample) 2 µL×10×RT Buffer (4 µL/sample) 4 µL×2.5 mM dNTP Mix (2 µL/sample) 2 µL× Ion RT Primer v2 (8 µL/sample) 8 µL×

8. The region for reverse transcription is added to the ligation reaction liquid 16 µL at a time, which is mixed 5 times with pipetting for light spin-down to collect the reaction liquid at the bottom of the tube.

9. Reaction under the condition of 70° C.×10 minutes is carried out in a state in which heat cover is set, which is immediately placed on ice.

10. 10× superscript III enzyme Mix is added to each tube (above-described tube) stored on ice 4 µL at a time, which is gently mixed with Vortex for a light spin-down.

11. reverse transcription was initiated with a thermal cycler to which a heat cover has been set (42° C.×30 minutes). *This achieves transcription of miRNA→cDNA The operation can be stopped at this point (cDNA with completed reverse transcription reaction was able to be frozen for preservation. 2 weeks at −20 to −30° C., −80° C.=long term preservation)

12. Before starting purification of cDNA and size selection, a required reagent was changed back into room temperature (RT) (e.g., Nucleic Acid Binding Beads & Nuclease-Free Water). Ethanol is added to the Wash solution Concentrate and a check mark was written on the lid.

Necessary amount of Nuclease-Free water was kept warm at 37° C.

13. The Nucleic Acid Binding tube gently undergoes Vortex to completely dissolve the Magnetic Beads. Beads of each sample were prepared (7 µL/sample/1.5 mL DNA LoBind tube). Binding solution concentrate is added to the tube with beads 140 µL at a time and pipetting was repeated 10 times to mix the beads and the Binding solution concentrate.

14. 40 µL of the cDNA sample with completed reverse transcription reaction is added to a 1.5 mL tube with beads therein. 120 µL of 100% ethanol (may be a 99.5% ethanol) was dispensed in each 1.5 mL tube with cDNA and beads therein. Each tube gently undergoes Vortex with the setting of 4 for a light spin-down. In order to prevent liquid leakage from the tip, ethanol undergoes pipetting 3 times to dampen the inside of the tip to then be dispensed.

15. Since a large cDNA molecule would be absorbed by the beads, the tube was left at RT for 5 minutes.

16. Each tube with cDNA and beads therein gently undergoes Vortex for a light spin-down to then be set at a Magnetic Stand to be left for 5 minutes. Once the supernatant became clear, the supernatant is separated from the beads using a pipette while leaving the tube at the Magnetic Stand and the supernatant is moved to a new 1.5 mL DNA LoBind tube (a tube with beads therein was disposed).

17. 72 µL of Nuclease-Free Water was added to a 1.5 mL tube with supernatant therein. 78 µL of 100% ethanol was added thereto. In order to prevent liquid leakage from the tip, ethanol underwent pipetting 3 times to dampen the inside of the tip to then be dispensed.

18. A Nucleic Acid binding beads tube gently underwent Vortex to completely dissolve the Magnetic beads. 7 µL of beads was added to a 1.5 mL tube with supernatant and ethanol therein. The tube gently undergoes Vortex with the setting of 4 for a light spin-down to be left for 5 minutes at RT as it is.

19. The above-described tube undergoes another light spin-down to be set at the Magnetic Stand. When the supernatant became clear and separated from the beads, the supernatant was removed from the tube while being set at the Magnetic Stand (the supernatant was thrown away).

20. 150 µL of Wash Solution Concentrate is added to the beads remaining within the tube set at the Magnetic Stand, which is left for 30 seconds. A pipette is set to 160 µL to cautiously remove the supernatant. The remaining solution was removed with P10 or P20 (the supernatant was thrown away). The tube was left with the lid open for 1 to 2 minutes to get rid of ethanol.

21. The 1.5 mL tube with beads therein was taken out from the Magnetic Stand. 12 µL of Nuclease-Free Water that had been kept at 37° C. was added to each tube to carry out pipetting 10 times for mixture. The tube was left at room temperature for 1 minute.

22. The tube is set at the Magnetic Stand to wait for 1 minute. When the supernatant became clear and separated from the beads, 12 µL of cDNA elution was collected in a new 500 µL tube.

IV. Augmentation of cDNA (Augmentation Using PCR and Barcode Label)

Before initiating augmentation, a reagent is defrosted in a fridge [4° C.], undergoes light centrifugal separation at max speed, and then used.

1. A PCR reagent for augmenting a cDNA sample using a barcode was prepared (Total=46 µL/sample).

Plutinum PCR SuperMix High Fidelity (45 µL/sample) 45 µL×

Ion Ixpress RNA 3' Barcoded Primer (1 µL/sample) 1 µL×

2. 6 µL of cDNA sample was added to a new PCR tube. 46 µL of PCR reagent was added thereto. Finally, 1 µL of selected Ion Xpress RNA-Seq Barcode BC Primer is added to each PCR tube. The lid of the tube was closed to undergo a light Vortex in the setting of 4 to drop the solution at the bottom of the tube with a tabletop centrifuge.

3. cDNA augmentation reaction was carried out with a thermal cycler. After completion of the reaction, the cDNA was preserved at 4° C.

Hold: 94° C.×2 minutes

Cycle (2): 94° C.×30 seconds, 50° C.×30 seconds, 68° C.×30 seconds,

Cycle (14): 94° C.×30 seconds, 62° C.×30 seconds, 68° C.×30 seconds,

Hold: 68° C.×5 minutes

4. Reagents were prepared before carrying out purification of cDNA with augmentation completed and size selection. A necessary amount of Nuclease-Free water was kept warm at 37° C.

5. The Nucleic Acid Binding tube gently underwent Vortex to completely dissolve the Magnetic Beads. Beads of each sample were prepared (7 µL/sample/1.5 mL DNA LoBind tube). The Binding solution concentrate was added to a tube with beads therein 140 µL at a time to gently undergo Vortex at the setting of 4 to mix the beads and the Binding solution concentrate.

6. 53 µL of cDNA sample augmented with PCR was added to a 1.5 mL tube with beads therein. 110 µL of 100% ethanol (may be 99.5% ethanol) was dispensed in each 1.5 mL tube with cDNA sample and beads therein. Each tube gently underwent Vortex at the setting of 4 for a light spin-down. In order to prevent liquid leakage from the tip, ethanol underwent pipetting 3 times to dampen the inside of the tip to then be dispensed.

7. Since a large cDNA molecule would be absorbed by the beads, the tube was left at room temperature (RT) for 5 minutes.

8. Each tube with cDNA and beads therein gently undergoes Vortex for a light spin-down to then be set at a Magnetic Stand to be left for 5 minutes. Once the supernatant became clear, the supernatant is separated from the beads using a pipette while leaving the tube at the Magnetic Stand and the supernatant is moved to a new 1.5 mL DNA LoBind tube (a tube with beads therein was disposed).

9. A 1.5 mL tube with supernatant therein was taken out from the Magnetic Strand to add 35 µL of Nuclease-Free Water. 35 µL of 100% ethanol was added thereto. In order to prevent liquid leakage from the tip, ethanol underwent pipetting 3 times to dampen the inside of the tip to then be dispensed.

10. A Nucleic Acid binding beads tube gently underwent Vortex to completely dissolve the Magnetic beads. In order to absorb miRNA fractions with the beads, 7 µL of beads was added to a 1.5 mL tube with supernatant and ethanol therein. The tube gently undergoes Vortex with the setting of 4 for a light spin-down to be left for 5 minutes at RT as it is.

11. The above-described tube undergoes another light spin-down to be set at the Magnetic Stand. When the supernatant became clear and separated from the beads, the supernatant was removed from the tube while being set at the Magnetic Stand (the supernatant was thrown away).

12. 150 µL of Wash Solution Concentrate is added to the beads remaining within the tube set at the Magnetic Stand, which is left for 30 seconds. A pipette is set to 160 µL to cautiously remove the supernatant. The remaining solution was removed with P10 or P20 (the supernatant was thrown away). The tube was left with the lid open for 1 to 2 minutes to get rid of ethanol.

13. The 1.5 mL tube with beads therein was taken out from the Magnetic Stand. 15 µL of Nuclease-Free Water that had been kept at 37° C. was added to each tube to carry out pipetting 10 times for mixture. The tube was left at room temperature for 1 minute.

14. The tube is set at the Magnetic Stand to wait for 1 minute. When the supernatant became clear and separated from the beads, 15 µL of cDNA elution corresponding to miRNA was collected in a new 500 µL tube.

15. The quality and quantity of the augmented cDNA was confirmed by the Bioanalyzer.

V. The Generated cDNA is Used to Carry Out Gene Analysis.

Through these procedures, all miRNA data has been prepared.

CCR2 gene KO mice were employed as the type of the mice to study the miRNA under three conditions, native (group with nothing done thereto), POD2 (group two days after the operation) and POD28 (group 28 days after the operation). The native was defined as C0, POD2 was defined as C1, and POD28 was defined as C2. From the three conditions, a pair of 2 groups was made, wherein application of a sample augmentation method was considered in each group. Specifically, native and POD2 were set as C0C1, native and POD28 were set as C0C2, and POD2 and POD28 were set as C1C2.

(Sample Augmentation)

In this example, the detection results of outliers by the following sample augmentation methods are compared.

1. Sample augmentation method (OLD)
2. Sample augmentation method (PCA)

Furthermore, (OLD) of 1. means that the method is older compared to 2. (PCA), which does not mean that it is a conventional technique.

(Sample Augmentation Method (OLD))

FIG. 35A to FIG. 35D show a schematic diagram of an analysis method using the sample augmentation method (OLD).

Figure 35A:
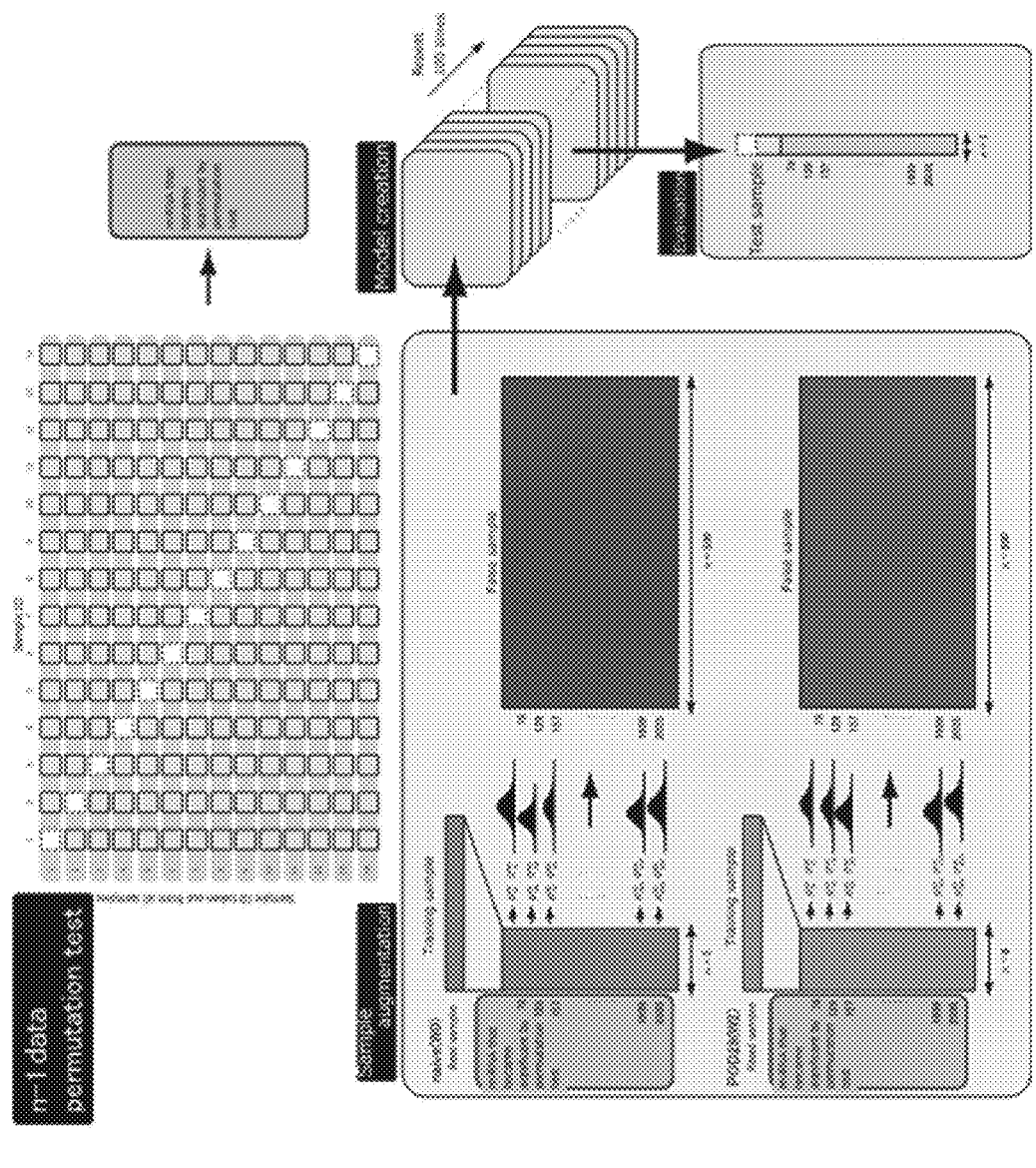
FIG. 35A shows a conceptual diagram of an analysis method using the sample augmentation method (OLD).
Figure 35B:
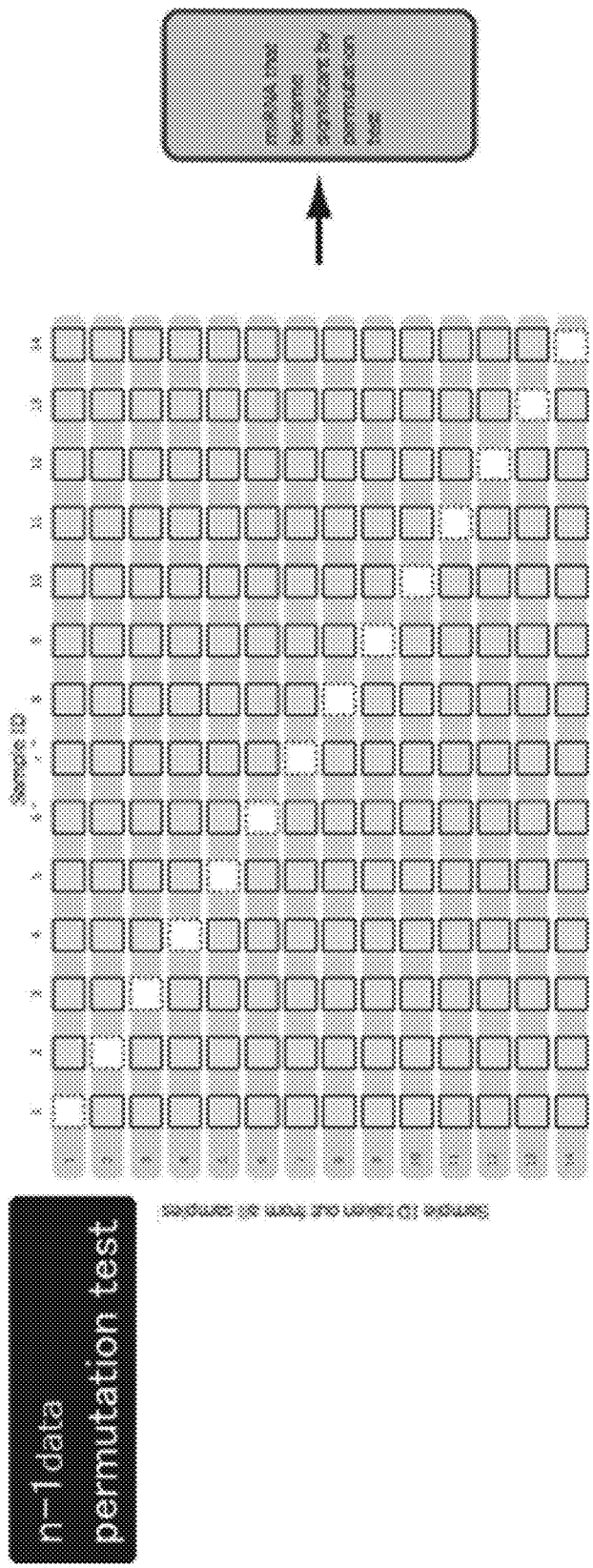
FIG. 35B shows a conceptual diagram of an analysis method using the sample augmentation method (OLD).

In the sample augmentation method (OLD), as shown in FIG. 35B, in the permutation test of leave-one-out (n−1) data, only the miRNA that became significant is used as a feature (feature selection).

Figure 35C:
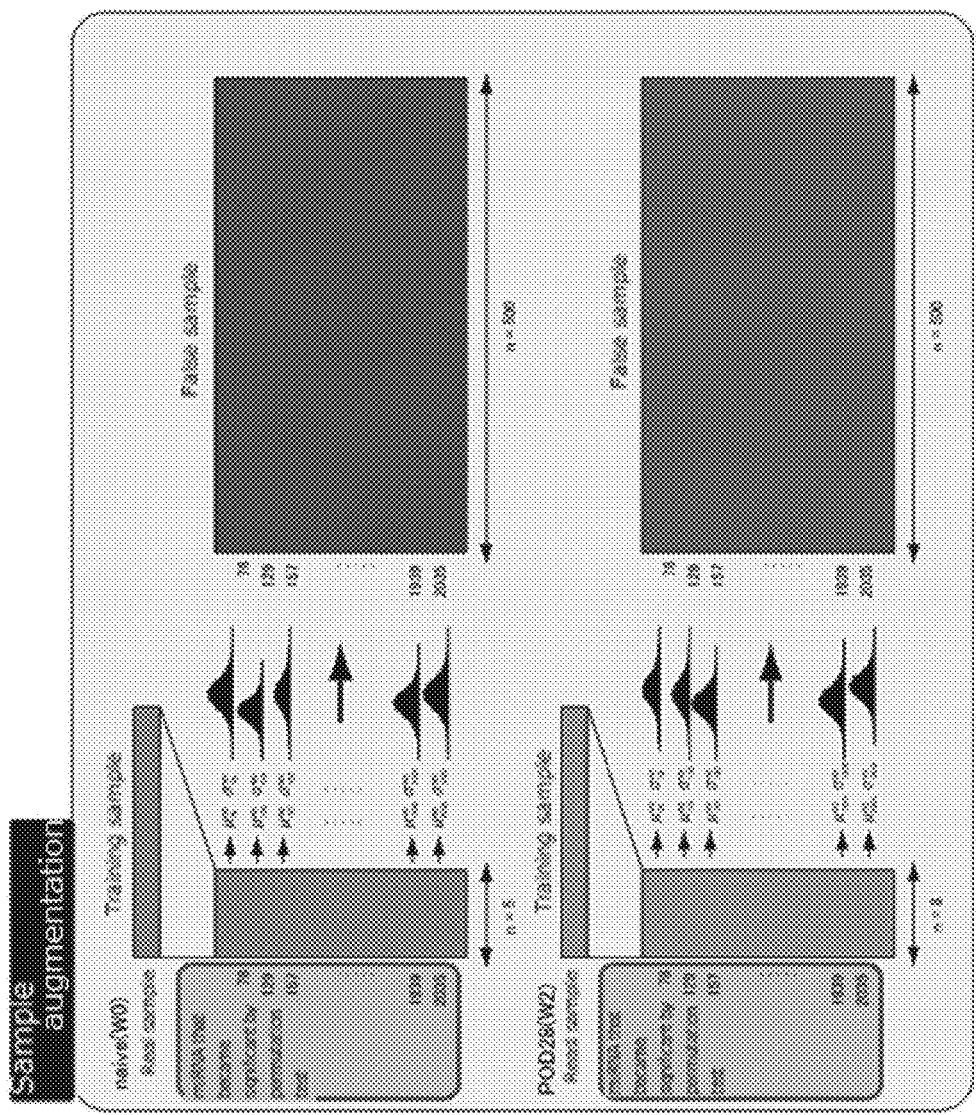
FIG. 35C shows a conceptual diagram of an analysis method using the sample augmentation method (OLD).

As shown in FIG. 35C, in the case of 2 class classification, for each class, a mean value and standard deviation of each feature that became significant for n times are calculated using leave-one-out (n−1) data. The sample augmentation method (OLD) is realized by multiplying the calculated standard deviation difference by a normal random number and adding the mean value.

Figure 35D:
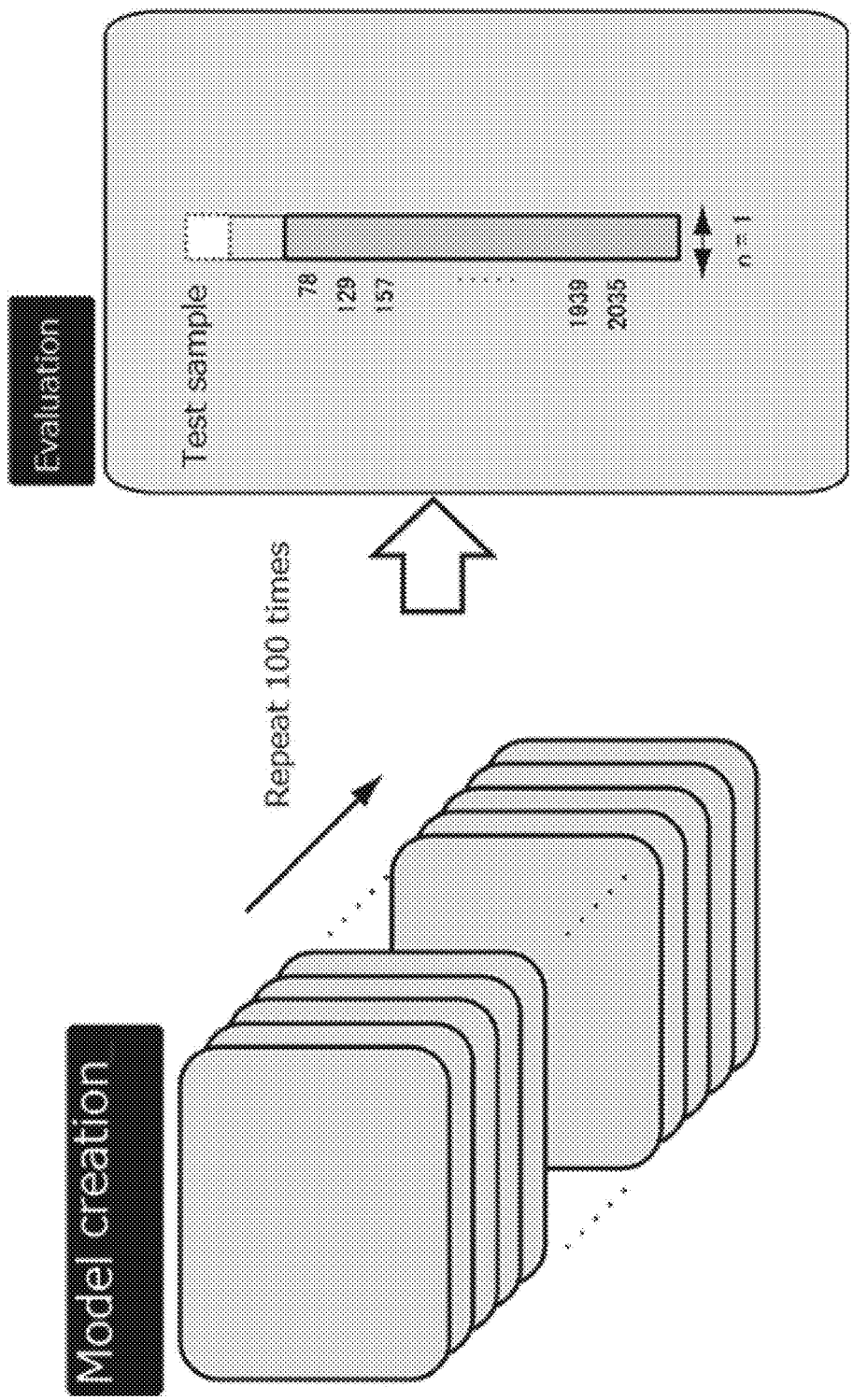
FIG. 35D shows a conceptual diagram of an analysis method using the sample augmentation method (OLD).

As shown in FIG. 35D, the sample augmented using the leave-one-out (n−1) data is used to create 1000 models to differentiate the remaining one 1000 times. This is repeated n times.

(Sample Augmentation (PCA))

The schematic diagram of the analysis method using the sample augmentation method (PCA) is the same as those shown in FIG. 35A to FIG. 35D.

In the sample augmentation (PCA), in the permutation test of leave-one-out (n−1) data, only the miRNA that became significant is used as a feature (feature selection). In the case of 2 class classification, for each class, the mean value is subtracted from each feature that became significant, and the leave-one-out (n−1) data is used to apply PCA to calculate standard deviation from a sample projected to the principal component space. The standard deviation and normal random number are used to apply the sample augmentation method (OLD) in the principal component space. The principal component coefficient is used to carry out projection conversion from the principal component space to the original space and add the mean value stored prior to the projection conversion to be able to realize the sample augmentation method (PCA). A sample augmented using leave-one-out (n−1) data is used to create 1000 models to differentiate the remaining one 1000 times. This is repeated n times.

As such, the sample augmentation method (PCA) is different from the sample augmentation method (OLD) in the point of using leave-one-out (n−1) data to apply PCA and using 1 the standard deviation sought from the sample projected to the principal component space and a normal random number to apply the sample augmentation method (OLD) in the principal component space.

(Parameter)

The parameter in the present example is as described below.
  logistic regression (λ=0.3)
  Division of a real sample (training: test=n−1:1)
  Augmentation sample count
(Explanation with b as an Example)
  Naïve (C0): n=500
  POD28 (C2): n=500
  Trial time of "sample augmentation, model creation, evaluation": 100 times
  Double cross variation (5×4 fold): augmentation sample was used.
  Final test; real sample (test: 1 sample) was used.
(Result)

The result is shown in FIG. 36A to FIG. 36H.

In FIG. 36A to FIG. 36H, a model created in leave-one-out (n−1) data is used to show the result of 1000 differentiations of the remaining one sample, wherein, when the differentiation precision is extremely low (0%), it can be interpreted that the sample can be estimated as an outlier.

Figure 36A:
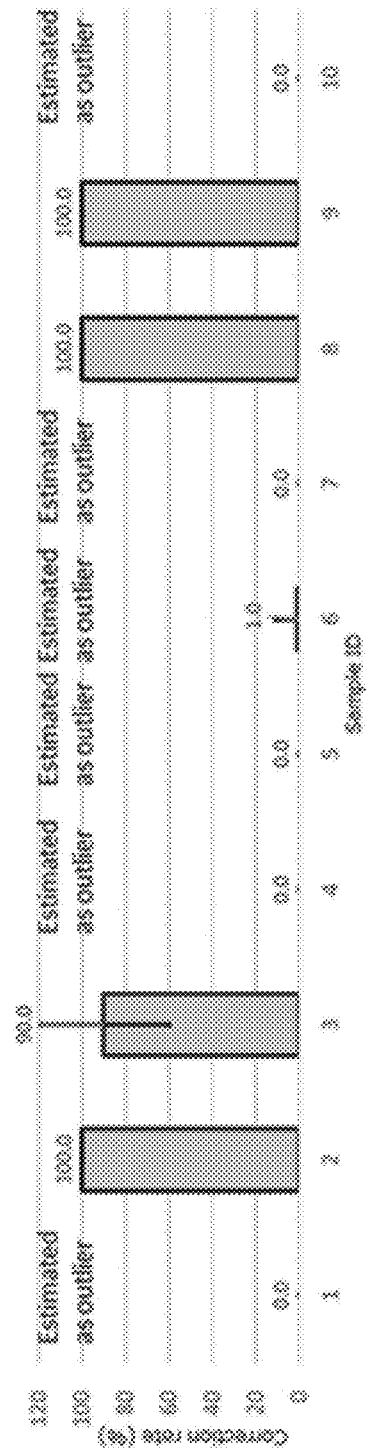
FIG. 36A shows the result of using a model created in leave-one-out (n−1) data and differentiating one sample that has been left out 1000 times.
Figure 36B:
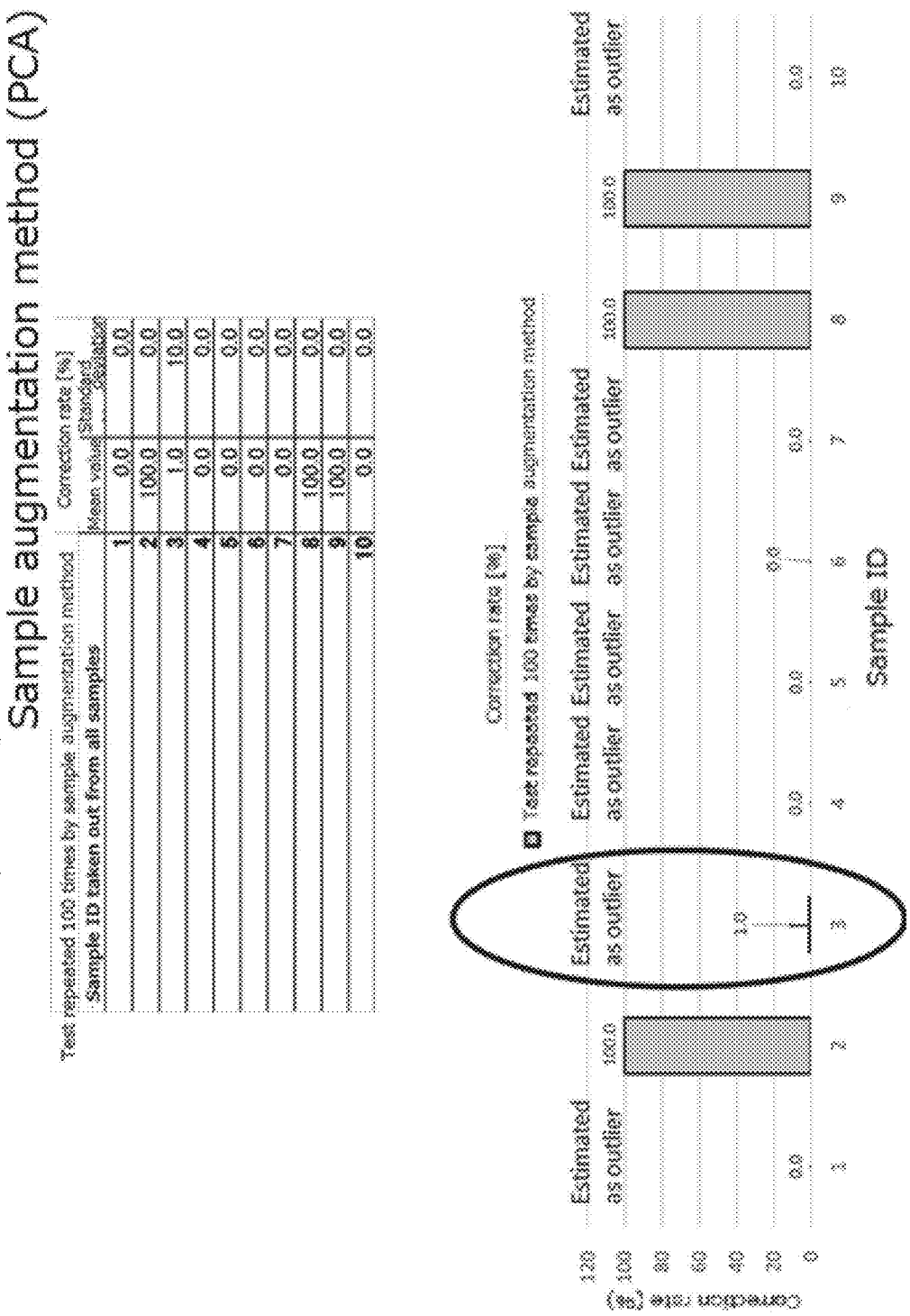
FIG. 36B shows the result of using a model created in leave-one-out (n−1) data and differentiating one sample that has been left out 1000 times.

As shown in FIG. 36A and FIG. 36B, the sample augmentation method (OLD) did not estimate that the sample ID3 is an outlier, but the sample augmentation method (PCA) estimated that this is an outlier.

Figure 36C:
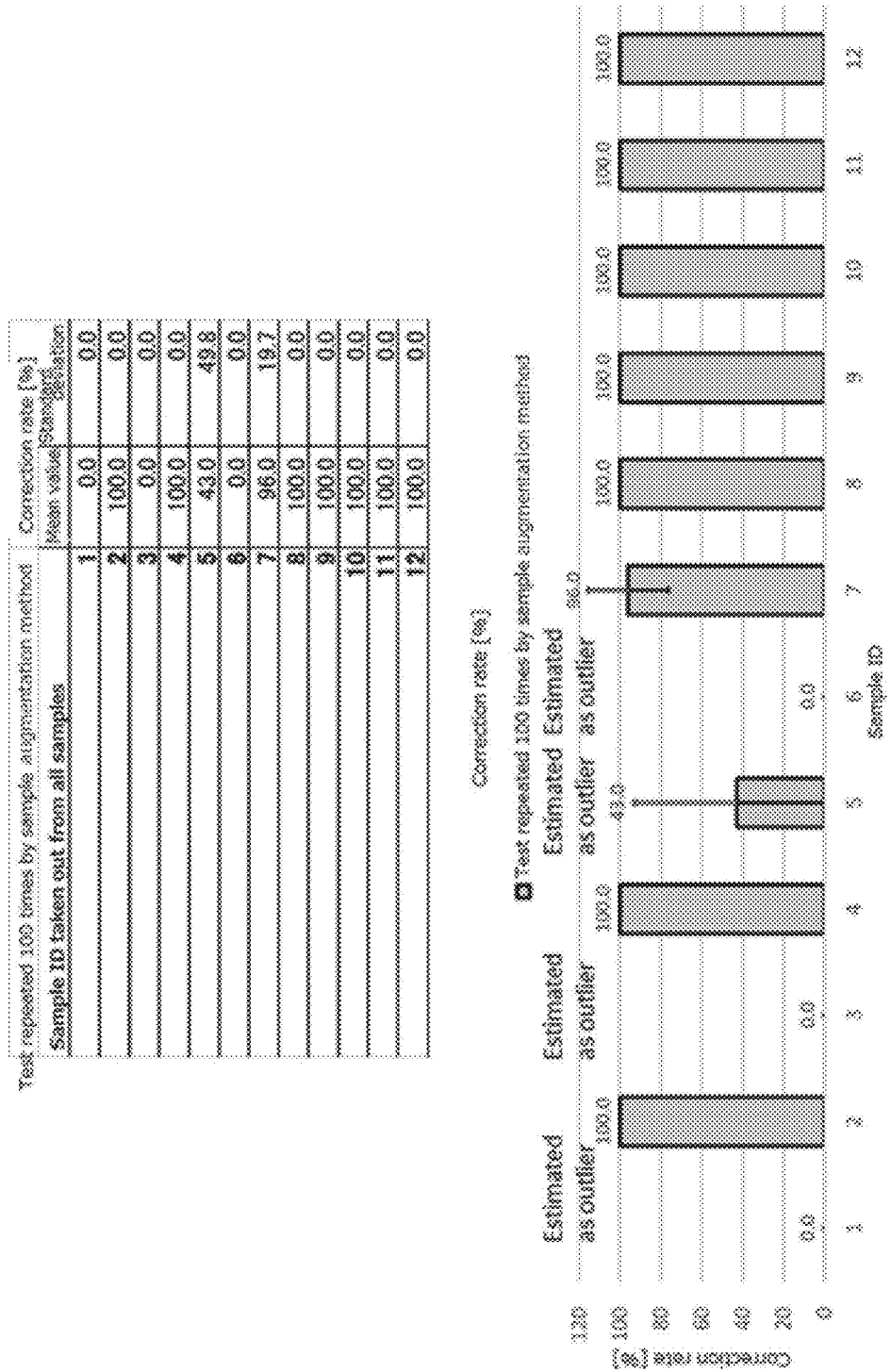
FIG. 36C shows the result of using a model created in leave-one-out (n−1) data and differentiating one sample that has been left out 1000 times.

As shown in FIG. 36C and FIG. 36D, the sample augmentation method (OLD) and the sample augmentation method (PCA) are different in the result of outlier.

Figure 36F:
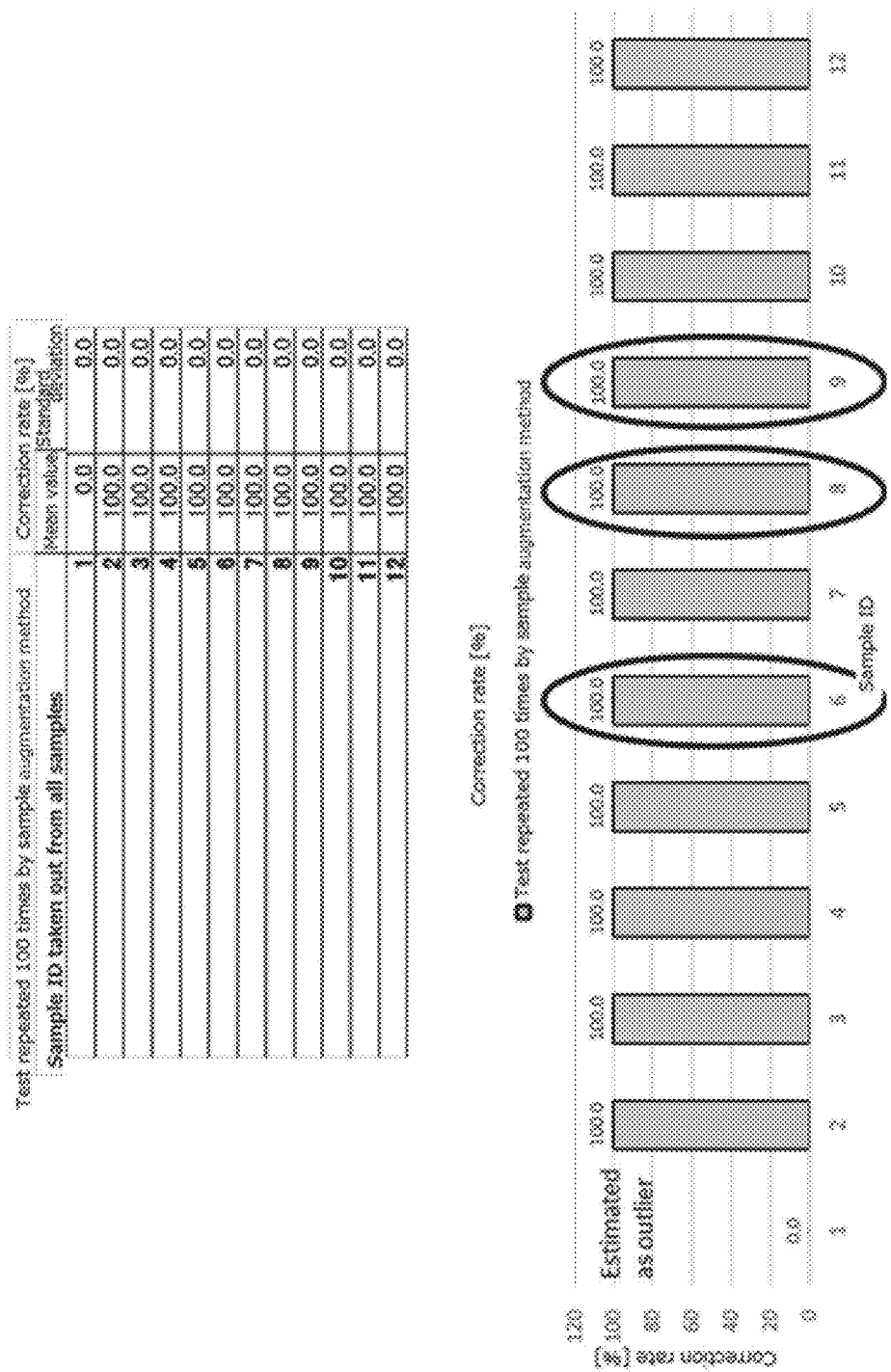
FIG. 36F shows the result of using a model created in leave-one-out (n−1) data and differentiating one sample that has been left out 1000 times.

As shown in FIG. 36E and FIG. 36F, the sample augmentation method (OLD) estimated that samples ID6, ID8 and ID9 are outliers, but the sample augmentation method (PCA) did not estimate that these are outliers.

Figure 36G:
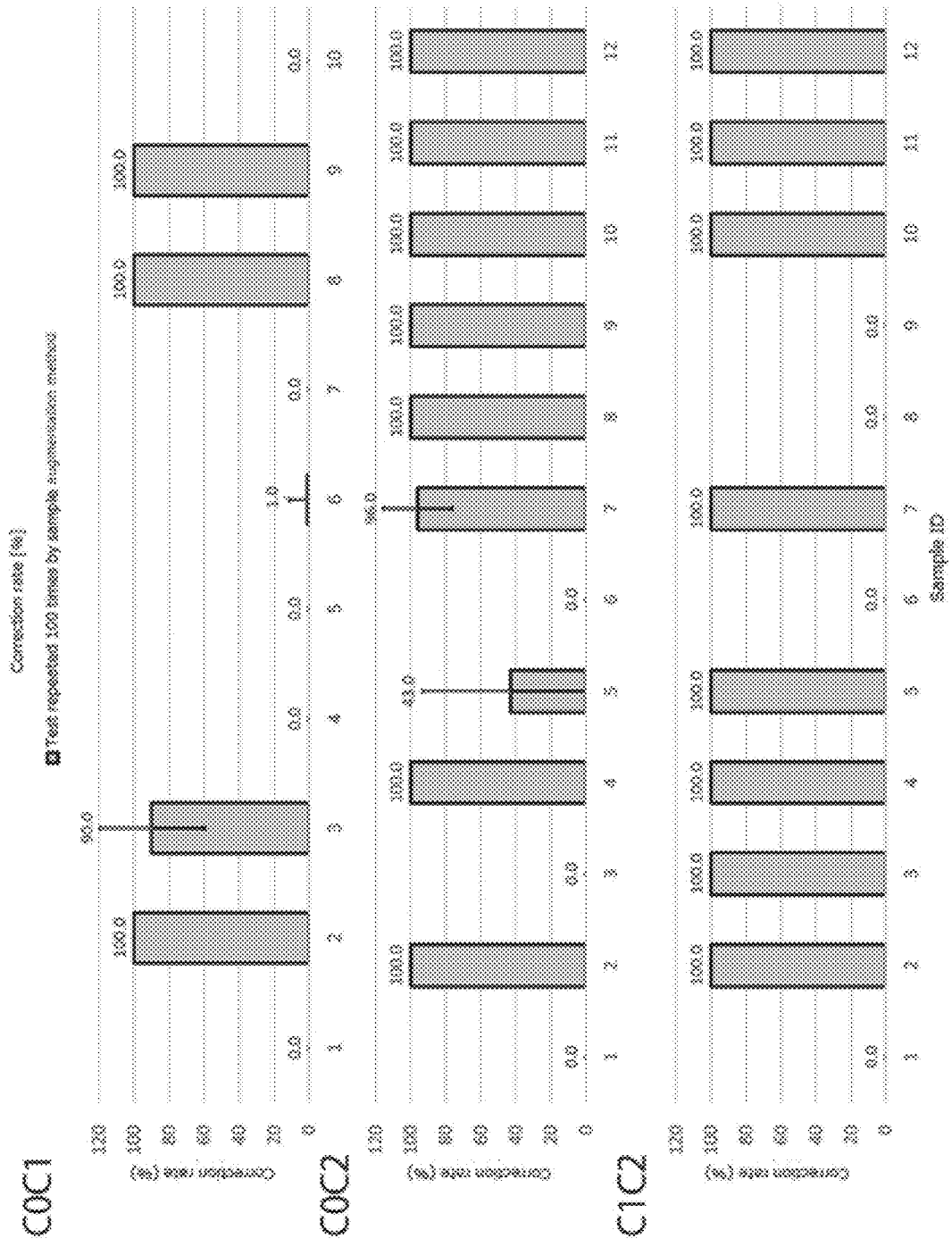
FIG. 36G shows the result of using a model created in leave-one-out (n−1) data and differentiating one sample that has been left out 1000 times.
Figure 36H:
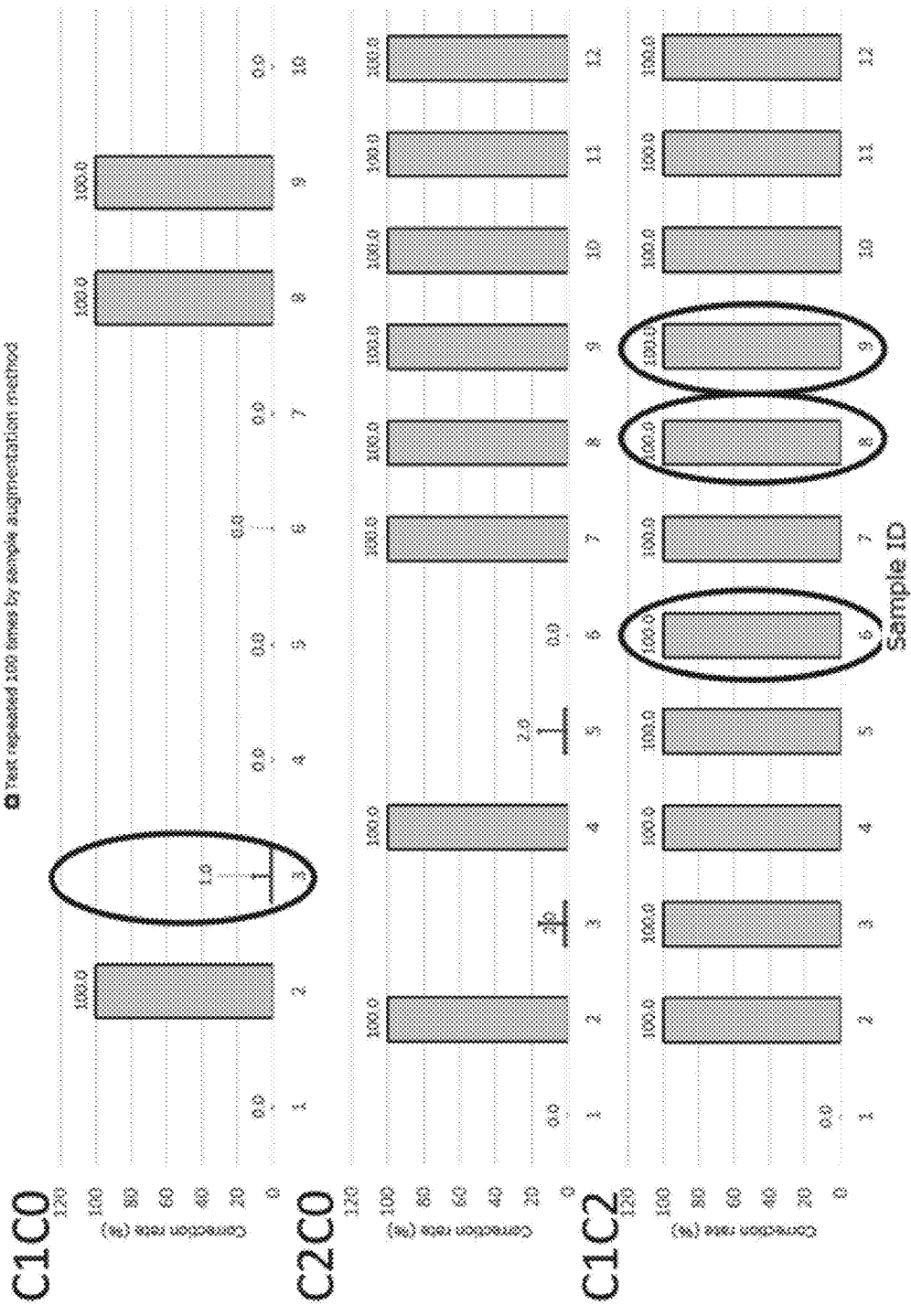
FIG. 36H shows the result of using a model created in leave-one-out (n−1) data and differentiating one sample that has been left out 1000 times.

FIG. 36G summarizes the result of FIG. 36A, FIG. 36C and FIG. 36E, and FIG. 36H is a summary of the result of FIG. 36B, FIG. 36D and FIG. 36F.

(Observation)

Even when miRNA is used for a sample, when comparing the sample augmentation method (OLD) and the sample augmentation method (PCA), there was a difference in the results of detection of outliers. When close to 100%, the excluded 1 sample would be predictable using the sample augmentation method, but when close to 0%, the sample can be interpreted as unpredictable. Since an outstanding correction percentage close to 100% or 0% can be calculated when using the sample augmentation method (PCA), it can be considered that this can be considered as an excellent outlier detection tool.

As such, it can be understood that sample augmentation enables machine learning while retaining quality.

Example 4: Augmentation of Pain Analysis Result=Closed Eye Sample Augmentation

In the present example, a closed eye sample is used to carry out pain analysis. Upon doing so, sample augmentation was carried out.
(Method and Material)
(Closed Eye Sample)

A closed eye sample refers to reaction data against stimulation of when the eyes of a subject are closed. In this example, in the eye-closing task of having the subject close the eyes, reaction data, which is brainwave data herein, against some gradual thermal stimulations from "no pain (36° C.)" to "having pain (48° C.)" was obtained. "No pain (36° C.)" shows the state of when there is 36° C. of thermal stimulation and "having pain (48° C.)" shows a state of when there is 48° C. of thermal stimulation.

The experimentation trial is as described below.
 (1) pre: gradual thermal stimulation (36° C. to 48° C.): reference stimulation imposed on a subject beforehand
 (2) main: after surgery (long-time (6 hours) measurement at bed side)
(COVAS Template)
 (1) of the experimentation trial was carried out to a plurality of healthy people (N=150) beforehand to obtain the COVAS data of N=150. A COVAS template was prepared beforehand by calculating the mean value of the COVAS data thereof. The COVAS template corresponds the gradual thermal stimulation of (1) of the experimentation trial to the subjective evaluation of the pain of the healthy people.

Figure 37A:
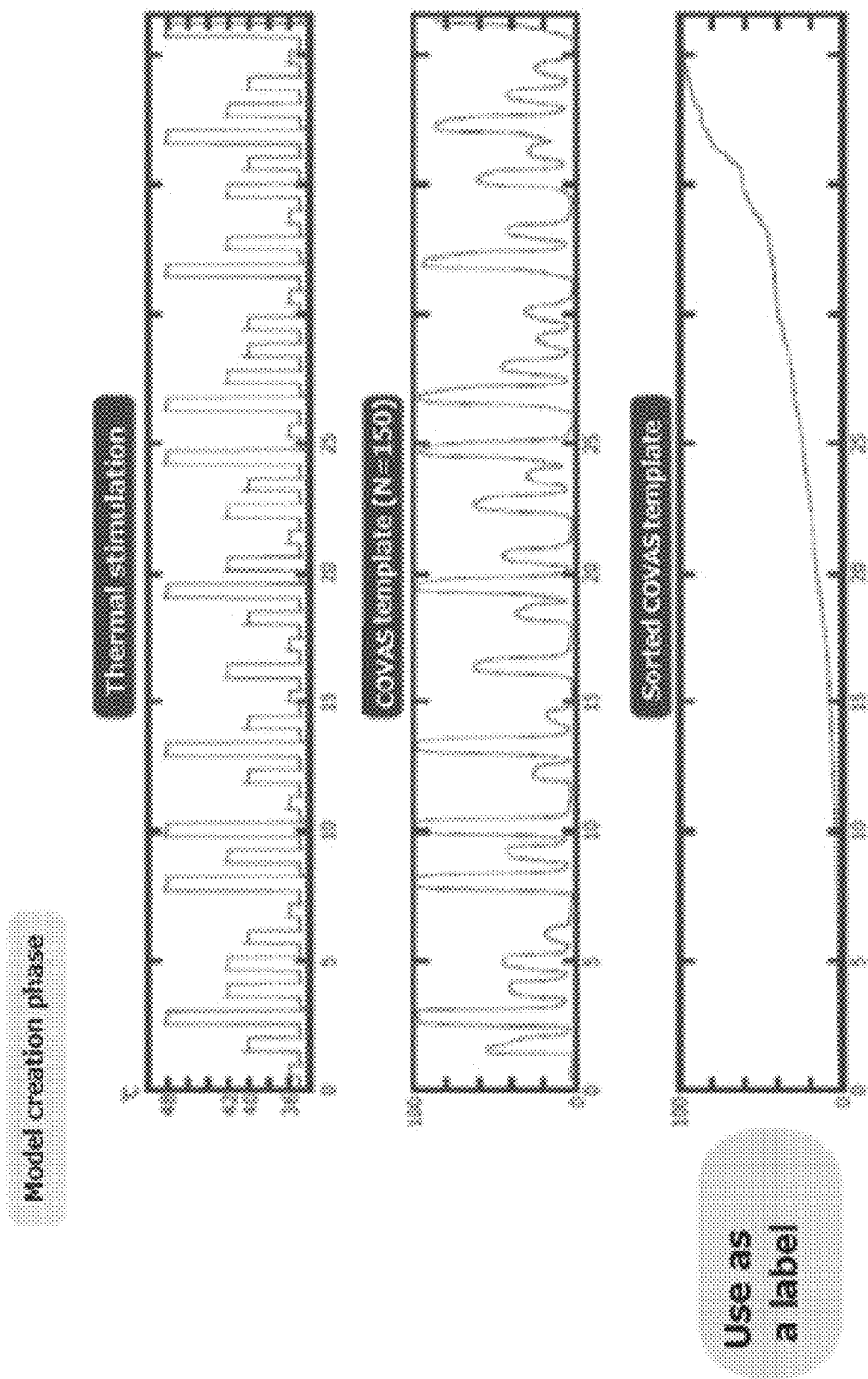
FIG. 37A shows an example of gradual heat stimulation of (1) of an experimental trial, an example of a COVAS template corresponding thereto and an example of a sorted COVAS template in which the COVAS template is sorted in ascending order from the minimum value 0 to maximum value 100.

FIG. 37A shows an example of the gradual thermal stimulation of (1) of the experimentation trial, example of COVAS template corresponding thereto, and an example of a sorted COVAS template in which COVAS templates are sorted in ascending order from the minimum value of 0 to the maximum value of 100.
(Preprocessing)

The sampling rate was set to 500 Hz.

The brainwave was measured by using a total of 18 ch, which are 6ch of the forehead (monopolar electrode arrangement) added with the 6 ch of the bipolar electrode arrangement and the 6 ch of CAR (Common Average Reference) electrode arrangement.

Brainwave data of 18 channels was cut out in the length of the COVAS template created beforehand with a trigger showing the initiation timing of thermal stimulation (pain stimulation) as the initiation point. This causes the COVAS template to match with the length of the brainwave data of 18 channels. The COVAS template can be corresponded as a label to the brainwave data used for learning by matching the COVAS template with the length of the brainwave data of 18 channels. In other words, the subjective evaluation of pain would be corresponded to the brainwave data used for learning.

The data was collected while being divided into data for model creation and data for test (actual performance) in clinical experimentation. (1) of the experimentation trial is for model creation and (2) of the experimentation trial is for test. The time window of 16 seconds was cut out while shifting one second at a time with respect to the entire length of the brainwave data. The time window is shifted in the direction of the time axis to cut out a plurality of times to generate a plurality of original samples.

As a pre-processing, a dedicated noise processing method is applied to the plurality of original samples. Brainwave data of each channel was cut out so as to secure 9 sequences while shifting an 8-second window 1 second at a time with respect to a 16-second brainwave data of the original sample that underwent pre-processing. 4 types of features, absolute amplitude, entropy, frequency power from 8 frequency bands (2-5 Hz, 5-8 Hz, 8-14 Hz, 14-28 Hz, 28-58 Hz, 62-118 Hz, 122-178 Hz and 182-238 Hz) and coherence, are extracted from the brainwave data of each channel. The four types of features (amplitude, frequency power, coherence and entropy) were bound and a total of 324 features were extracted. 324×9 features in which 324 feature and 9 chronological sequences are a unit were obtained thereby.

With respect to the extracted feature, a sample augmentation method is applied to each individual to increase the number of samples. The increased samples are used to create a model to be fitted to the individual using LSTM (Long short-term memory).

(Definition of Standardization Parameter for Searching a Model)

COVAS templates created beforehand were sorted in ascending order from the minimum value of 0 to the maximum value of 100. From the sorted COVAS templates, 19 ranges were cut out from the minimum value 0 to the maximum value 1000 in the unit of 10 while shifting 5 at a time. These 19 ranges are 19 types of standardization parameters, wherein the mean value and standard deviation of each of these 19 types of standardization parameters are calculated. 19 mean values and 19 standard deviations are each preserved for use upon the off-line chronological data analysis later on.

(Standardization of Feature Data by 10 Standardization Parameters)

From the sorted COVAS templates, 10 ranges were cut out from the minimum value of 0 to the maximum value of 100 in the in the unit of 10 while shifting 10 at a time. Since these 10 ranges are 10 types of standardization parameters wherein the COVAS template and the brainwave data are corresponded, features corresponded to the 10 types of standardization parameters are extracted. The extracted features were standardized (turned into z value) using a corresponding standardization parameter.

With respect to 10 standardized features, the following steps are repeatedly carried out to create 10 models (LSTM regression).

1) Regression: (Sample augmentation) Upon learning, when labels are equally present, it is understood that it is easier to acquire generalization capability, and thus, upon sample augmentation, a parameter regulating the number of augmentation samples for each label is defined so that the proportion of the values of the labels of the (sorted) COVAS templates corresponding to each feature would be equal.
2) Regression: (Sample augmentation) 5 samples are used as a unit and the samples generated by a random number from the multivariate normal distribution based on the mean value and covariance matrix thereof are increased by the parameters defined for each label in 1). The samples are increased by the number of repetition.
3) Regression: (Model creation: (learning)) The augmented sample is defined as a learning sample to be learned together with a corresponding label to create a model by LSTM regression.

FIG. 37B shows the range of 19 types of standardization parameters cut out from the sorted COVAS templates and 10 models corresponding to 10 types of standardization parameters.

(Off-Line Chronological Data Analysis)

In order to search for the best combination from the combinations of 19 standardization parameters and 10 models, the 19 standardization parameters and 10 models are used to calculate the result of 190 regressions. In the off-line chronological data analysis, features were first extracted with respect to the entirety of the time direction of test data. The data after feature extraction was retained in an unstandardized state (unstandardized feature). With respect to the unstandardized feature, each of the 19 standardized parameters is used to carry out standardization (turning into z value) to calculate the standardization feature. In other words, regarding the i-th standardization parameter among the 19 standardization parameters (0<i≥19), when mean $\mu_i$ and standard deviation $\sigma_i$ are set and unstandardized feature is set as x and the standardized feature regarding the standardization parameter i is set as $x'_i$, calculation is carried out by: $x'_i = (x - \mu_i)/\sigma_i$ The pain score was predicted by administering a standardization feature to a model.

In this example, regarding 4 types of models among the 10 types of models, only the diagonal component of 10×19 matrix is used to carrying out ensemble learning of the pain score (prediction value of regression) to calculate the correlation function and RMSE (Root Mean Square Error) to display the result of regression.

(Result)

Figure 37C:
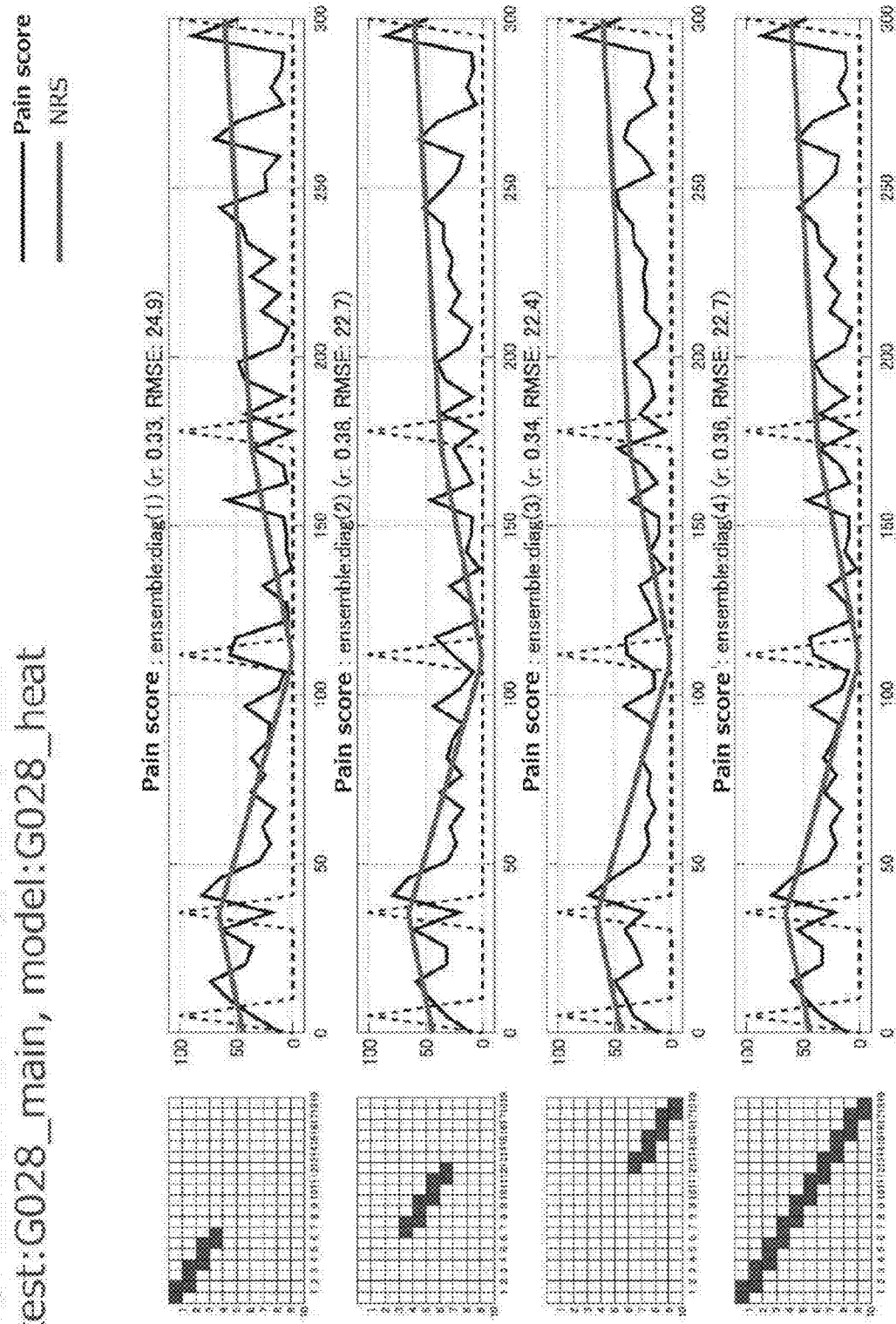
FIG. 37C shows the result of Example 4.

FIG. 37C shows the result of the present example.

In FIG. 37C, the matrix on the left side expresses the combination of the used 19 standardization parameters and 10 models, wherein the row expresses the model and the column expresses the standardization parameter. The colored cell shows the selected combination. The ensemble learning (i.e., mean value) of what was selected corresponds to the pain score (black line) of the graph on the right side of FIG. 37C. The gray line of the graph on the right side of FIG. 37C shows NRS which is a subjective evaluation of the pain of a patient. The position of the triangle formed in a dotted line shows the timing when NRS is asked to the patient.

Among the 4 graphs, the first graph from the top shows the result of when using the first to fourth models and first to seventh standardization parameters, the second graph from the top shows the result of when using the fourth to seventh model and the seventh to thirteenth standardization parameters, the third graph from the top shows the result of when using the seventh to tenth models and thirteenth to nineteenth standardization parameters, and the fourth graph from the top shows the result of when using all models and standardization parameters.

It can be understood from the result of FIG. 37C that NRS corresponds to the pain score to some extent.

Example 5: Augmentation of Pain Analysis Result=Closed Eye Sample Augmentation

In the present example, a closed eye sample is used to carry out pain analysis. Upon doing so, sample augmentation was carried out.

(Method and Material)

(Closed Eye Sample)

A closed eye sample refers to reaction data against stimulation of when the eyes of a subject are closed. In this example, in the eye-closing task of having the subject close the eyes, reaction data, which is brainwave data herein, against some gradual thermal stimulations from "no pain (36° C.)" to "having pain (48° C.)" was obtained. "No pain (36° C.)" shows the state of when there is 36° C. of thermal stimulation and "having pain (48° C.)" shows a state of when there is 48° C. of thermal stimulation.

The experimentation trial is as described below.

An experimentation (minimum_set_heat), in which minimum data obtainment would be enough, which was carried out for algorithm development, was carried out.
(1) First minimum_set_heat: gradual thermal stimulation (36° C. to 48° C.)
(2) Second minimum_set_heat: gradual thermal stimulation (36° C. to 48° C.)

In the minimum_set_heat, thermal stimulation, which the thermal stimulation was increased from 36° C. to 48° C. in a step-like manner, and the decreased from 48° C. to 36° C. in a step-like manner, was imposed.

(COVAS Template)

(1) of the experimentation trial was carried out to a plurality of healthy people (N=150) beforehand to obtain the COVAS data of N=150. A COVAS template was prepared beforehand by calculating the mean value of the COVAS data thereof. The COVAS template corresponds the gradual thermal stimulation of (1) of the experimentation trial to the subjective evaluation of the pain of the healthy people.

(Preprocessing)

The sampling rate was set to 1000 Hz.

The brainwave was measured by using a total of 18 ch, which are 6ch of the forehead (monopolar electrode arrangement) added with the 6 ch of the bipolar electrode arrangement and the 6 ch of CAR (Common Average Reference) electrode arrangement.

Brainwave data of 18 channels was cut out in the length of the COVAS template created beforehand with a trigger showing the initiation timing of thermal stimulation (pain stimulation) as the initiation point. This causes the COVAS template to match with the length of the brainwave data of 18 channels. The COVAS template can be corresponded as a label to the brainwave data used for learning by matching the COVAS template with the length of the brainwave data of 18 channels. In other words, the subjective evaluation of pain would be corresponded to the brainwave data used for learning.

The data was collected while being divided into data for model creation and data for test (actual performance). (1) of the experimentation trial is for model creation and (2) of the experimentation trial is for test. The time window of 8 seconds was cut out while shifting one second at a time with respect to the entire length of the brainwave data. The time window is shifted in the direction of the time axis to cut out a plurality of times to generate a plurality of original samples.

As a pre-processing, a dedicated noise processing method is applied to the plurality of original samples. Brainwave data of each channel was cut out so as to secure 9 sequences while shifting an 8-second window 1 second at a time with respect to a 16-second brainwave data of the original sample that underwent pre-processing. 4 types of features, absolute amplitude, entropy, frequency power from 8 frequency bands (2-5 Hz, 5-8 Hz, 8-14 Hz, 14-28 Hz, 28-58 Hz, 62-118 Hz, 122-178 Hz and 182-238 Hz) and coherence, are extracted from the brainwave data of each channel. The four types of features (amplitude, frequency power, coherence and entropy) were bound and a total of 324 features were extracted. 324×9 features in which 324 feature and 9 chronological sequences are a unit were obtained thereby.

With respect to the extracted feature, a sample augmentation method is applied to each individual to increase the number of samples. The increased samples are used to create a model to be fitted to the individual using LSTM (Long short-term memory).

(Definition of Standardization Parameter for Searching a Model)

COVAS templates created beforehand were sorted in ascending order from the minimum value of 0 to the maximum value of 100. From the sorted COVAS templates, 10 ranges were cut out from the minimum value 0 to the maximum value 1000 in the unit of 10 while shifting 10 at a time. These ranges are 10 types of standardization parameters, wherein the mean value and standard deviation of these 10 types of standardization parameters are calculated. 10 mean values and 10 standard deviations are each preserved for use upon the off-line chronological data analysis later on.

(Standardization of Feature Data by 10 Standardization Parameters)

From the sorted COVAS templates, 10 ranges were cut out from the minimum value of 0 to the maximum value of 100 in the in the unit of 10 while shifting 10 at a time. Since these 10 ranges are 10 types of standardization parameters wherein the COVAS template and the brainwave data are corresponded, features corresponded to the 10 types of standardization parameters are extracted. The extracted features were standardized (turned into z value) using a corresponding standardization parameter.

With respect to 10 standardized features, the following steps are repeatedly carried out to create 10 models (LSTM regression).
1) Regression: (Sample augmentation) Upon learning, when labels are equally present, it is understood that it is easier to acquire generalization capability, and thus, upon sample augmentation, a parameter regulating the number of augmentation samples for each label is defined so that the proportion of the values of the labels of the (sorted) COVAS templates corresponding to each feature would be equal.
2) Regression: (Sample augmentation) 5 samples are used as a unit and the samples generated by a random number from the multivariate normal distribution based on the mean value and covariance matrix thereof are increased by the parameters defined for each label in 1). The samples are increased by the number of repetition.
3) Regression: (Model creation: (learning)) The augmented sample is defined as a learning sample to be learned together with a corresponding label to create a model by LSTM regression.

Figure 38A:
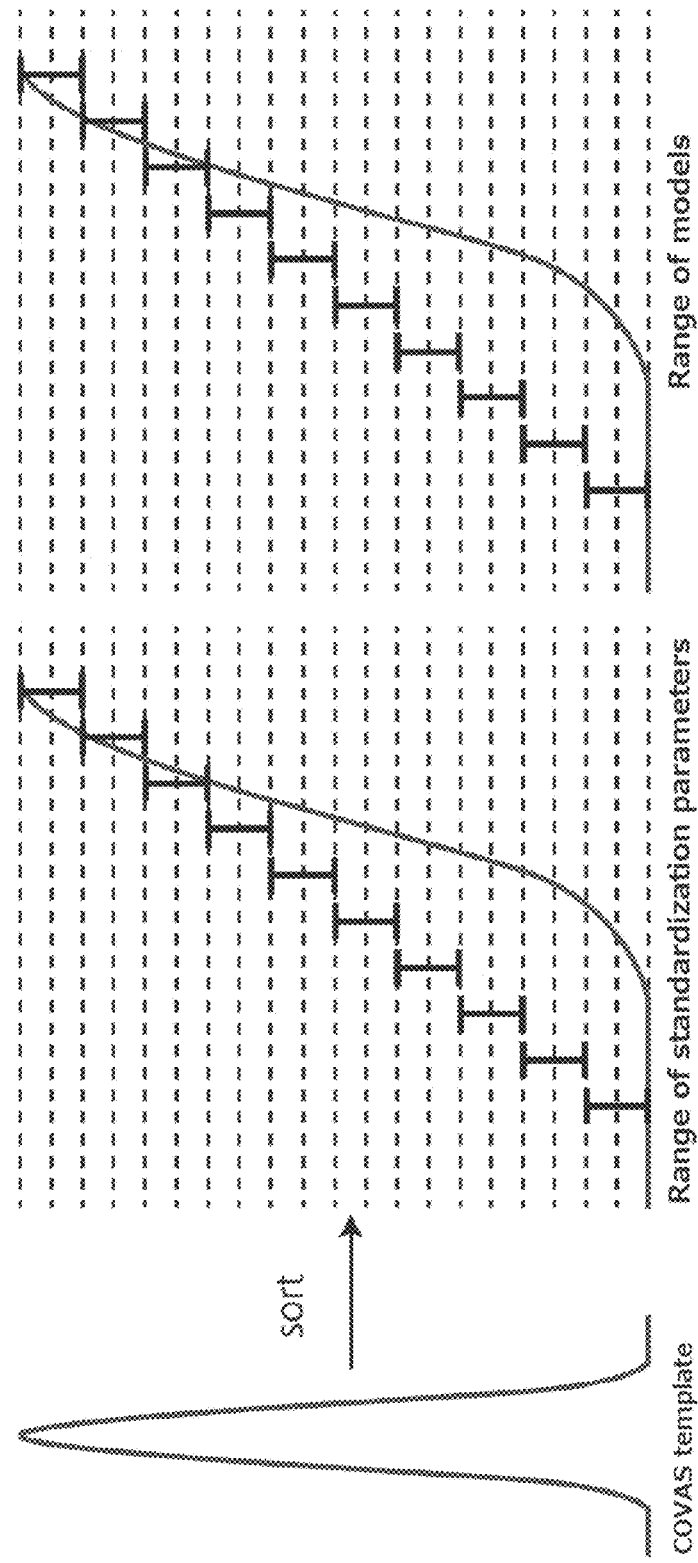
FIG. 38A shows 10 types of standardization parameters cut out from the sorted COVAS template and 10 models corresponding to 10 types of standardization parameters.

FIG. 38A shows the range of 19 types of standardization parameters cut out from the sorted COVAS templates and 10 models corresponding to 10 types of standardization parameters.

(Off-Line Chronological Data Analysis)

In order to search for the best combination from the combinations of 10 standardization parameters and 10 models, the 10 standardization parameters and 10 models are used to calculate the result of 100 regressions. In the off-line chronological data analysis, features were first extracted with respect to the entirety of the time direction of test data. The data after feature extraction was retained in an unstandardized state (unstandardized feature). With respect to the unstandardized feature, each of the 10 standardized parameters is used to carry out standardization (turning into z value) to calculate the standardization feature. In other words, regarding the i-th standardization parameter among the 10 standardization parameters ($0 < i \leq 10$), when mean $\mu_i$ and standard deviation $\sigma_i$ are set and unstandardized feature is set as x and the standardized feature regarding the standardization parameter i is set as $x'_i$, calculation is carried out by: $x'_i = (x - \mu_i)/\sigma_i$ The pain score was predicted by administering a standardization feature to a model.

In this example, among 10×10 matrix, top several numbers of pieces (top 1, top 5, top 10, all) that satisfy the standard are secured beforehand based on the standard of threshold consisting of a correlation function and RMSE, wherein ensemble learning of pain score (prediction value of regression) is carried out for each condition and the correlation coefficient and RMSE (Root Mean Square Error) are calculated to display the result of the regression.

(Result)

Figure 38B:
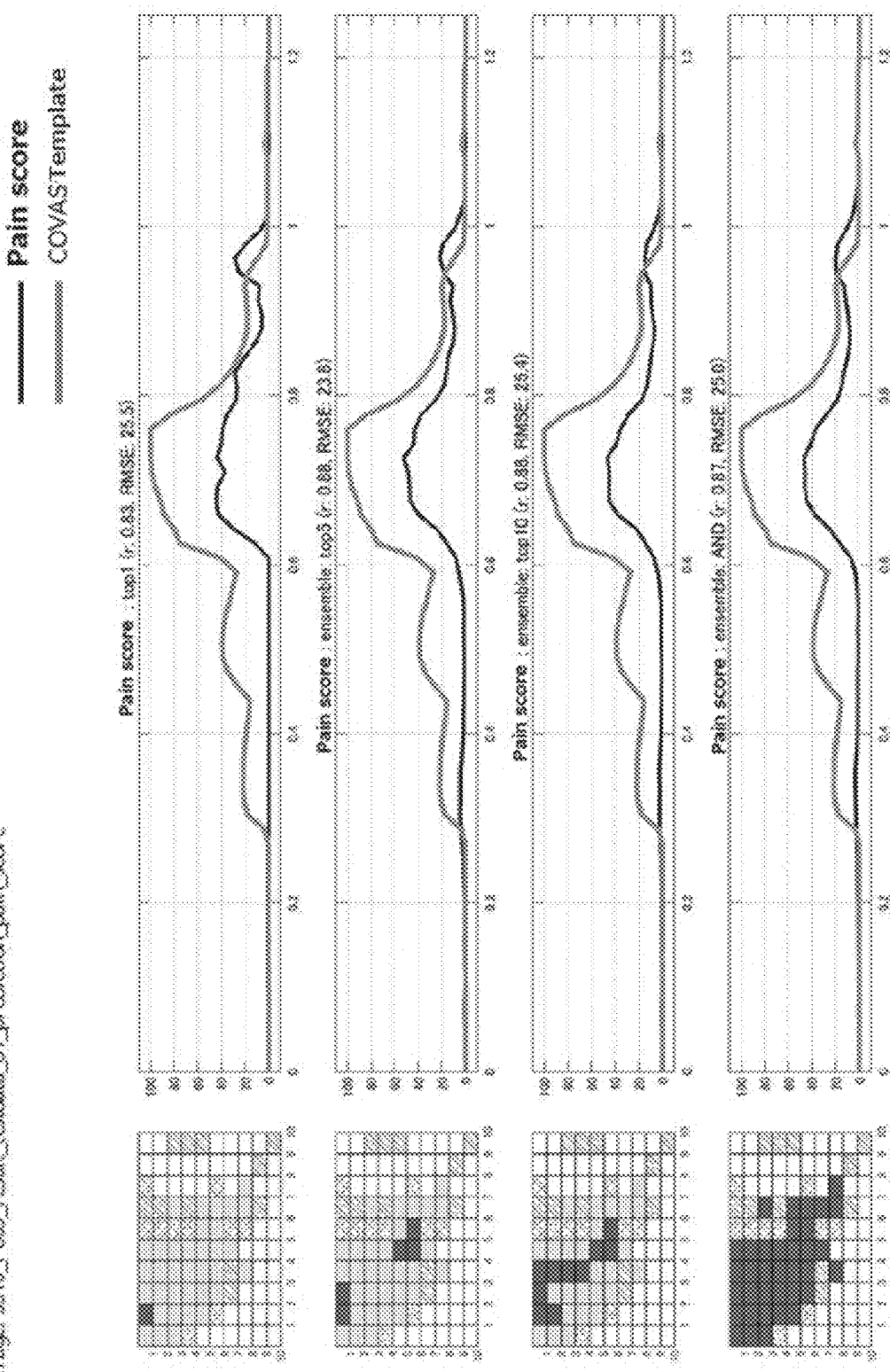
FIG. 38B shows the result of Example 5.

FIG. 38B shows the result of the present example.

In FIG. 38B, the matrix on the left side expresses a combination of 10 standardization parameters and 10 models that have been used, wherein the row expresses a model and the column expresses a standardization parameter. Coloring is carried out based on whether or not the correlation coefficient and RMSE satisfy the threshold. The slanted lines express a combination in which RMSE is smaller than the threshold, the stipple expresses a combination in which the correlation coefficient is higher than the threshold, and the light color expresses a combination in which RMSE is smaller than the threshold and the correlation coefficient is higher than the threshold. The higher the correlation coefficient showing how well the fitting is, the better standard would be set, and the lower the RMSE showing an error, the better standard would be set. Among the light color combinations, those selecting the top 1, top 5, top 10 and all that satisfy the standard of RMSE being smaller than the threshold and the correlation coefficient being higher than the threshold are shown with the dark color, wherein each result is shown in the first graph, second, graph, third graph and fourth graph from the top, respectively.

The graph on the right side of FIG. 38B corresponds to the result of when using the combination on the left side. The ensemble learning of the combinations selected with the dark color, i.e., mean value, expresses the pain score (back line: prediction value), and the gray line shows the template of COVAS (actual measurement value) which is the subjective evaluation of pain of a patient.

It can be understood from the result of FIG. 38B that the COVAS template (actual measurement value) corresponds to the pain score (prediction value) to some extent.

(Note)

As disclosed above, the present disclosure has been exemplified by the use of its preferred embodiments. However, it is understood that the scope of the present disclosure should be interpreted based solely on the Claims. It is also understood that any patent, patent application, and references cited herein should be incorporated herein by reference in the same manner as the contents are specifically described herein. The present application claims priority to Japanese Patent Application No. 2019-85782 filed on Apr. 26, 2020 with the Japan Patent Office. The entire content thereof is incorporated herein by reference.

INDUSTRIAL APPLICABILITY

The present disclosure is useful upon providing a system and the like for augmenting supervisory data while maintaining the relationship among a plurality of supervisory data used for machine learning.

REFERENCE SIGNS LIST

100: system
110: obtaining means
120: processor
130: memory
140: output means
1000: object
1100: system comprising a pain level differentiation/estimation apparatus
1110: pain level differentiation/estimation apparatus
1111: measurement unit
1112: feature extraction unit
1113: pain index generation unit
1114: standard determination unit
1115: pain level monitoring unit
1120: electroencephalograph
101000: feature contracting unit
102000: feature extraction unit
103000: pain differentiation/estimation model generation unit
104000: pain differentiation/estimation unit
105000: reference stimulation application unit
105200: brainwave data measurement unit
106000: object
107000: pain level visualization unit
108000: apparatus
110000: brainwave data measurement unit
120000: data transceiver unit
125000: data transceiver unit
130000: pain level visualization unit
135000: pain level visualization unit
140000: brainwave feature extraction unit
145000: brainwave feature extraction unit
150000: pain level differentiation estimation unit
160000: pain differentiation model generation unit
170000: data storage unit
180000: brainwave database
301000: feature contracting unit
302000: feature extraction unit
303000: pain differentiation/estimation model generation unit
304000: pain differentiation/estimation unit
305000: reference stimulation application unit
305200: brainwave data measurement unit
306000: object
307000: pain level visualization unit
307500: data storage unit
308000: apparatus

The invention claimed is:

1. A computer implemented method of generating, by machine learning, a pain classifier for classifying pain that an object being estimated has based on a brainwave of the object being estimated, wherein the pain classifier is generated to distinguish whether the pain requires therapy, and the computer includes a memory, a processor and an interface connected to an electroencephalograph and a stimulation application unit for applying a plurality of levels of stimulation intensities to the object, comprising:

a) the step of creating computerized visual analog scale (COVAS) templates that expresses subjective evaluation of pain by healthy people by averaging COVAS data respectively corresponding to the plurality of levels of stimulation intensities applied to the healthy people by the stimulation application unit, wherein the stimulation intensities vary from first level to second level and include an intensity corresponding to the pain that requires therapy, wherein the healthy people feel no pain by the first level and feel a pain by the second level;

b) the step of stimulating, by the stimulation application unit, the object being estimated with the plurality of levels of stimulation intensities respectively corresponding to the COVAS templates;

c) the step of obtaining, by the electroencephalograph, brainwave data or analysis data thereof of the object being estimated respectively corresponding to the stimulation intensities;

d) the step of augmenting, by the processor, brainwave data or analysis data thereof of the object being estimated with the corresponding COVAS templates, comprising:
 i) deriving a covariance matrix from brainwave data or analysis data thereof of the object being estimated;
 ii) decomposing the covariance matrix; and
 iii) applying a random number to the decomposed matrix;

e) the step of plotting, by the processor, the stimulation intensities or subjective pain sensation levels labeled by the COVAS templates each corresponding to the stimulation intensity and the augmented brainwave data or analysis data thereof to fit to a pain function to obtain a pain function specific to the object being estimated; and f) the step of, when regression coefficient of the fitting to the specific pain function is equal to or more than what is predetermined, identifying, by the processor, a pain classifier for dividing a pain level into at least two or more sub-levels based on the specific pain function, wherein the sub-levels include a level corresponding to the pain that requires therapy.

2. An apparatus generating a pain classifier, by machine learning, for classifying pain that an object being estimated has based on a brainwave of the object being estimated wherein the pain classifier is generated to distinguish whether the pain requires therapy, comprising:
 a processor;
 a stimulation application unit for applying a plurality of levels of stimulation intensities to the object; and
 an interface, wherein the processor includes:
 a computerized visual analog scale (COVAS) template creating unit for creating COVAS templates that express subjective evaluation of pain by healthy people by averaging COVAS data respectively corresponding to the plurality of levels of stimulation intensities applied to the healthy people by the stimulation application unit, wherein the stimulation intensities vary from first level to second level and include an intensity corresponding to the pain that requires therapy, wherein the healthy people feel no pain by the first level and feel a pain by the second level;
 a stimulation unit connected through the interface to the stimulation application unit for stimulating the object being estimated with the plurality of levels of stimulation intensities respectively corresponding to the COVAS templates;
 a brainwave data obtaining unit connected through the interface to an electroencephalograph for obtaining brainwave data or analysis data thereof the object being estimated respectively corresponding to the stimulation intensities;
 an augmentation unit for augmenting the brainwave data or analysis data thereof of the object being estimated with the corresponding COVAS templates, wherein the augmentation unit is configured to:
  i) derive a covariance matrix from brainwave data or analysis data thereof of the object being estimated;
  ii) decompose the covariance matrix; and
  iii) apply a random number to the decomposed matrix; and
 a pain classifier generation unit for plotting the stimulation intensities or subjective pain sensation levels labeled by the COVAS templates each corresponding to the stimulation intensity and the augmented brainwave data or analysis data thereof to fit to a pain function to obtain a pain function specific to the object being estimated and identifying a pain classifier for dividing a pain level into at least two or more sub-levels based on the specific pain function, wherein the sub-levels include a level corresponding to the pain that requires therapy.

* * * * *